United States Patent [19]

Mischenko et al.

[11] Patent Number: 4,926,105
[45] Date of Patent: May 15, 1990

[54] METHOD OF INDUCTION MOTOR CONTROL AND ELECTRIC DRIVE REALIZING THIS METHOD

[76] Inventors: Vladislav A. Mischenko; Natalya I. Mischenko, both of Orekhovy bulvar 5, kv. 78, Moscow, Orekhovy bulvar, U.S.S.R.

[21] Appl. No.: 15,748
[22] Filed: Feb. 17, 1987
[51] Int. Cl.$^5$ .............................................. H02P 5/40
[52] U.S. Cl. ....................................... 318/800; 318/805
[58] Field of Search ................. 318/803, 805, 807–811

[56] References Cited

U.S. PATENT DOCUMENTS

| | | | |
|---|---|---|---|
| 3,842,437 | 7/1974 | Blaschke. | |
| 4,361,794 | 11/1982 | Kawada et al. | 318/800 |
| 4,509,003 | 4/1985 | Ohnishi et al. | 318/800 |
| 4,532,464 | 7/1985 | Igarashi et al. | 318/807 |
| 4,672,287 | 6/1987 | Fujioka et al. | 318/800 |
| 4,677,360 | 6/1987 | Garces | 318/803 |

*Primary Examiner*—David Smith, Jr.
*Attorney, Agent, or Firm*—Lilling & Greenspan

[57] ABSTRACT

Method of induction motor vector control in Cartesian and polar coordinates, whereby control of the rotor speed, induction motor torque, as well as dynamic, power, and thermal processes, which is interconnected with control of the rotor flux linkage amplitude and phase as functions of the desired induction motor torque, is achieved in an electric drive by synchronizing the stator current control by a controlled synchronization frequency by means of three control inputs, one control input is used to control the synchronization frequency and phase as functions of the desired rotor torque and speed; two other control inputs are used to control the amplitudes of ortho-phasal and current phase to a phase angle equal to the ratio of the ortho-phasal and co-phasal and ortho-phasal currents as functions of the desired induction motor torque, the actual desired amplitude of the rotor flux linkage, and magnetizing characteristic of the induction motor, while the amplitudes of the ortho-phasal and co-phasal currents is kept mostly equal, the synchronization phase being additionally controlled as a function of the induction motor temperature. An apparatus is described to carry out the method.

6 Claims, 17 Drawing Sheets

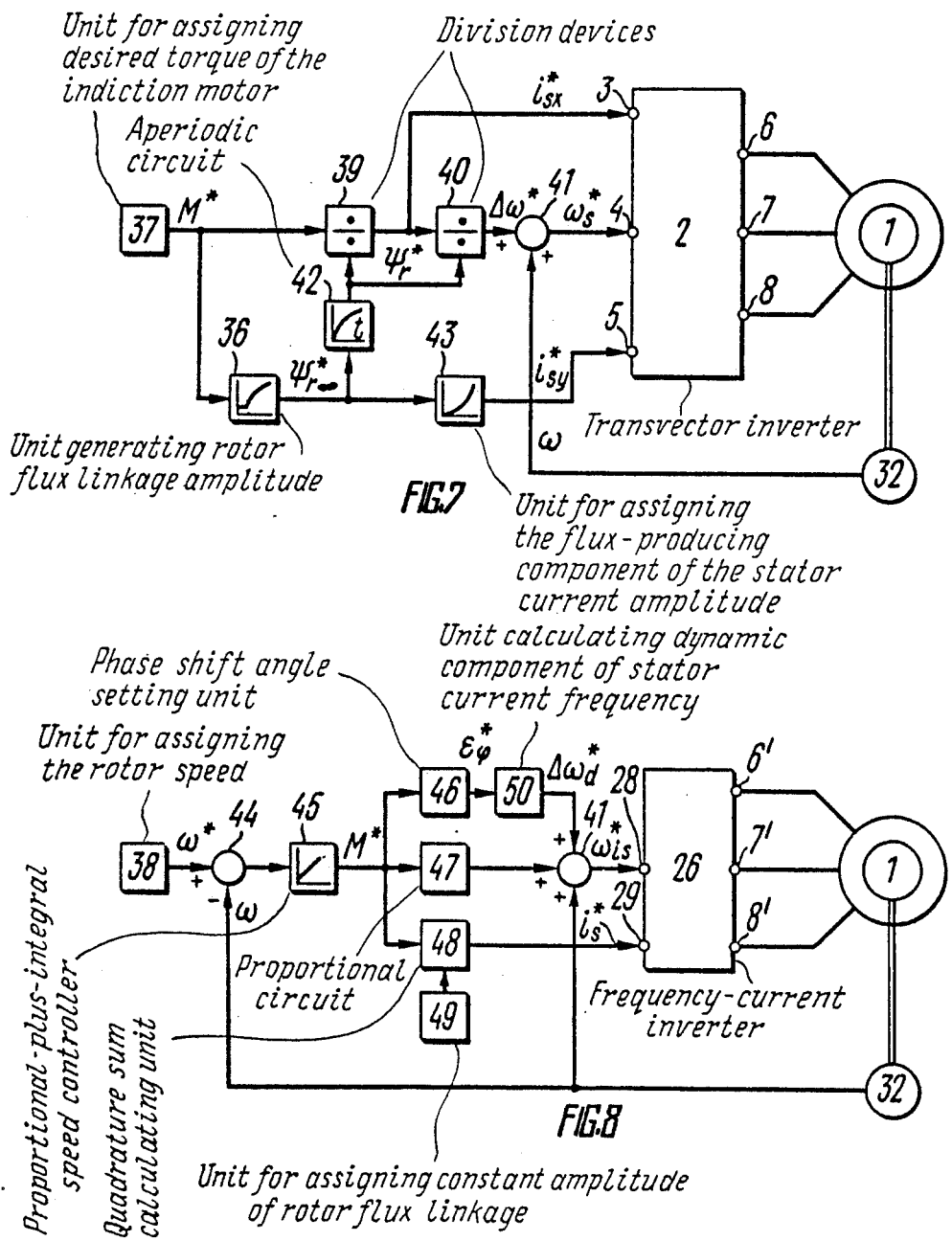

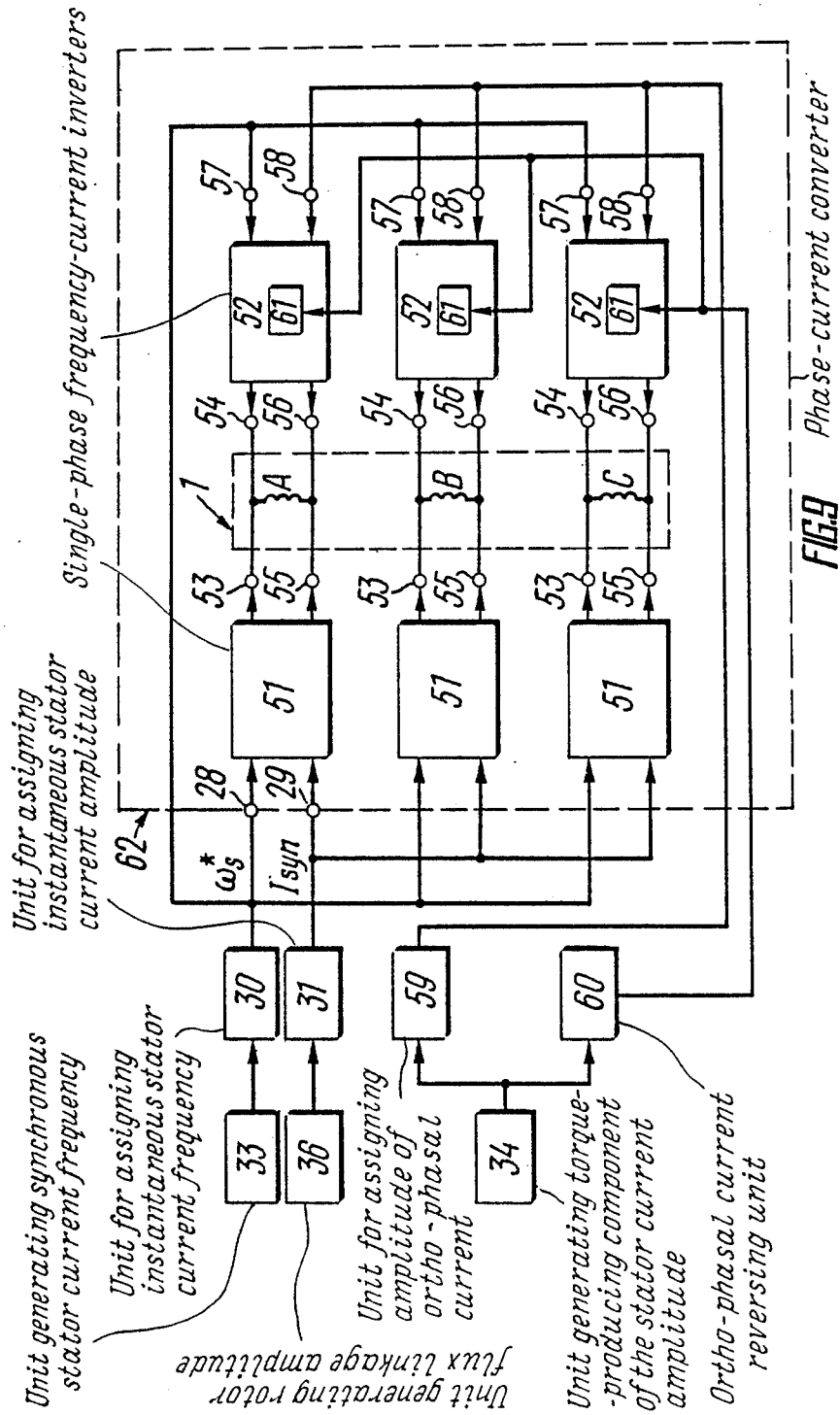

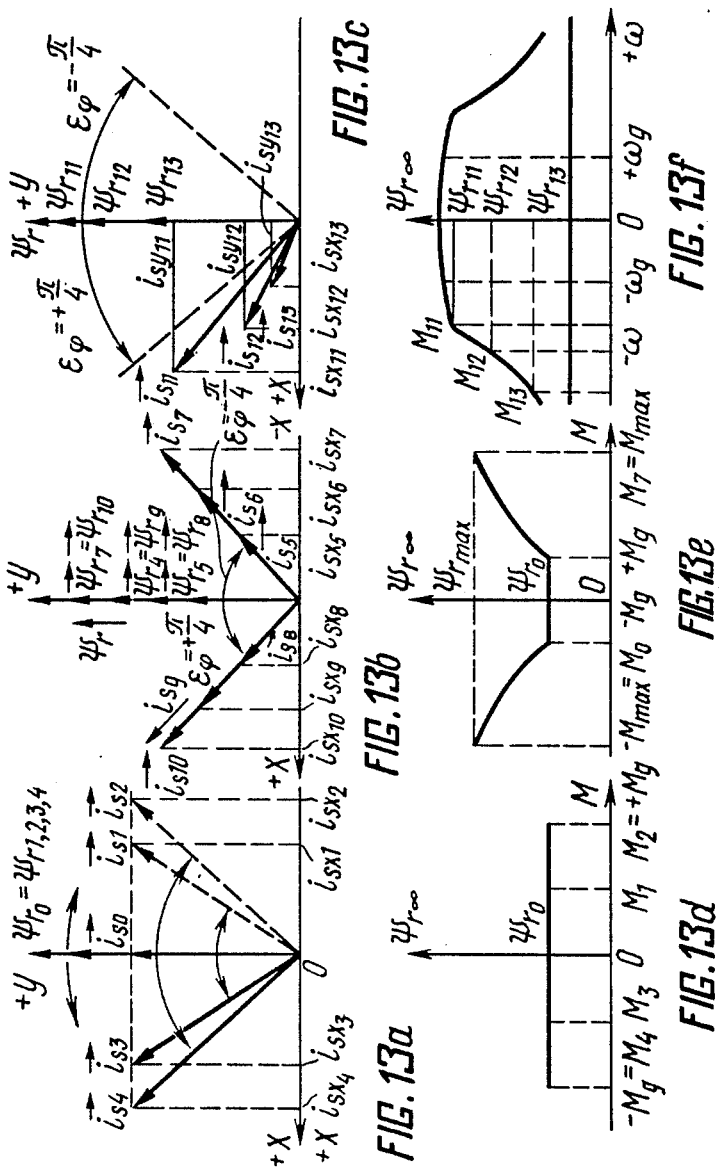

METHOD OF INDUCTION MOTOR CONTROL AND ELECTRIC DRIVE REALIZING THIS METHOD

BACKGROUND OF THE INVENTION

1. Field of the Invention

This invention relates to AC electric drives and, in particular, to a method of induction motor control and an electric drive realizing this method.

This invention is of particular advantage in robotics and flexible manufacturing systems to control the torque, speed, and positioning of actuators of industrial robots, NC machine tools, and flexible manufacturing systems equipped with squirrel-cage induction motors, including assembly and welding robot systems.

2. Description of the Prior Art

The most challenging problem in developing automatic systems for rotor speed and position control in three-phase asynchronous or induction motors consists in providing control of the induction motor magnetic field and torque. The physical processes involved in their generation and control are determined by one and the same process of modifying the three-phase stator current and its parameters: phase, frequency, and magnitude.

In contrast to other types of electric motors, the energy characteristics of a variable-speed induction motor, regarded as an electromechanical energy converter, cannot be unambiguously described by the design characteristics of the induction motor or the physical properties of active parts of the stator and rotor, since it largely depends on the processes of induction motor magnetic field and torque control, which are, in turn, determined by the method and principles of control of the stator current parameters. Induction motor control is peculiar in that the same torque, speed, and power on the motor shaft can be obtained with substantially different magnitudes of the stator current and flux amplitudes, various saturation levels of the core, and, consequently, different redistribution and losses in power and heating in the active parts of the induction motor, e.g. in stator.windings, stator steel, and shorted rotor bars.

In this connection, development of methods to control induction motor stator current and attempts to realize such methods within the framework of automatic speed control systems and induction motor servodrives responding to perform a specified change of position encounter serious difficulties when an integrated solution is sought to achieve contradictory targets involving performance and power requirements of an electric drive. Induction motor control has to be dealt with in terms of three basic targets:

1. Invariant control (independent of disturbance factors, including the magnitude and type of variations in the load moment and rotor speed) which is independent control of the induction motor torque, magnitude and angular position of the magnetic flux in accordance with the input control actions with arbitrary, including spasmodic, changes of this control input proportional to the desired induction motor torque.

2. Optimal control of stator current and magnetic flux is performed in steady-state conditions, when the rotor speed and induction motor torque are constant, to achieve the minimal stator current, minimal losses of power, and minimal heating of the stator winding insulation which is the most vulnerable active part of an induction motor; and, in dynamic conditions, to achieve the maximum torque with constraints being imposed on the stator current and voltage, and the temperature of the stator winding.

3. Linear control of the rotor speed and position should be performed, irrespective of the load moment, in conformity with the magnitude and type of control input changes over a broad range of rotor speed up to the zero speed and subject to the minimal control time and minimal steady-state and dynamic errors in the rotor speed and position in response to smooth or abrupt variations of the load moment. It should also permit holding zero speed for long periods with the load applied or when the load moment varies.

This package solution to the problem of induction motor control is required when such induction motors are employed as actuator motors of robots and flexible manufacturing systems where maximum efficiency is to be combined with positioning accuracy and repeatability irrespective of the load variations with minimal weight and restricted size of the electric actuating devices and electromechanical modules which are a combination of an electric motor, transducers, and mechanical transmission.

But induction motors are not used in robot technology precisely because the problems of control have not been yet adequately resolved. Obvious economic, operational, structural, and technological advantages of induction motors, as compared to DC motors and synchronous motors with permanent magnets, are defeated by shortcomings of known induction motor drives, such as inferior accuracy of rotor speed and position control, slower response time, lesser specific torque per unit weight and volume, and lesser torque-to-current ratio.

Even more efficient induction motor control systems based on frequency control are deficient in that the induction motor torque tends to fluctuate. This results in rotor speed pulsations, particularly when the rotor is loaded at infraslow speed which is close to zero speed. Changes of the torque become sluggish and non-linear, which results in slower response when controlling rotor speed and position, excessive correction of speed and position, which is inadmissible in robot technology. The induction motor is overheated due to excessive initial excitation currents flowing in the stator windings in the absence of the induction motor torque, which reduces the heating margin, considering frequent positioning cycles, adds to the load demand of the induction motor, and makes the actuating motor heavier and more bulky.

But if these disadvantages are eliminated, the use of induction motors in robotics looks extremely promising and advisable since it is at least ten times cheaper than DC and AC motors featuring high-efficiency permanent magnets made of rare earth metals. The specific power per unit weight of high-frequency three-phase induction motors with a rated frequency of 200 Hz and 400 Hz and rated synchronous speed of up to 12,000 rpm is at least twice as large. These advantages of induction motor drives become particularly evident in high-speed mechanical transmissions having a high gear ratio of 200–500, which is in line with the long-term prospects of development of robot technology. The use of precision induction motor drives having a wide speed range and no shaft-mounted sensors is particularly advisable for high-speed main drives of machine tools, high-speed electric spindles rated for at least 20,000 rpm, electrode wire feed drives of welding robots, fully automatic and semi-automatic arc welding machines, and plasma generators employed in flexible manufacturing technology.

Variable-speed induction motors rated for synchronous speed of 750–1,000 rpm are also economically advantageous when used in feed servodrives of NC machine tools in order to provide high accuracy and smoothness of motion at infralow rotor speeds and high dynamic rigidity of speed-to-torque characteristics when responding to abrupt variations of the load moment.

A unified closed-loop speed control induction motor for robot applications and flexible manufacturing systems should have a rotor speed control range of at least 10,000, the control range being defined as a ratio of the maximum rotor speed to its minimum speed, wherein the motion smoothness, as well as the linearity and rigidity of speed-to-torque characteristics are maintained. The rotor zero speed drift should be eliminated. At minimal speed, in the range of 0.1–1 rpm, the drop in speed caused by the load moment increasing to the motor rated torque should not exceed, respectively, 0.02–0-2 rpm; the amplitude of fluctuations of the minimal instantaneous speed should not go lower than 0.025–0.25 rpm; the minimal speed recovery time in case of a nominal load moment surge should not be lower than 0.01 sec. A variable-speed induction motor should be capable of executing the harmonic law of rotor speed control, prescribed by a control input, with a frequency not less than 100 Hz, while the rotor speed should correspond to not less than 0.707 of the amplitude of the harmonic control input with a phase lag not more than 90°. In case of a step change in the speed control input, excessive correction of the actual speed of the rotor should not be more than 10%.

In a closed-loop induction motor servomechanism of a robot, position control should be performed without excessive correction, the positioning error being not more than one increment of a discrete position sensor. The dynamic error of the robot contouring control system should not exceed two discrete elements (increments).

In this case, the above quality characteristics of the rotor speed and position control should be achieved in conditions of the maximum shaft torque and power of the induction motor with certain constraints imposed on the stator current, stator voltage, and motor temperature.

Besides, it is advisable to make use of transducers commonly employed in robotics and flexible manufacturing systems. Rated power of actuating motors in robot technology commonly ranges from 10 W to 2.2. kW. It is, therefore, technologically difficult to insert field sensors, such as Hall-effect devices, into the air gap of an induction motor. It is also inadvisable from the point of view of operational reliability. In consequence, magnetic field should be controlled by methods whereby this magnetic field is measured indirectly, and this only further complicates the problem of induction motor control.

Known in the art are various methods of induction motor control by changing the stator current magnitude and frequency. Thus, for example, there has been proposed an induction motor control method (cf., for example, U.S. Pat. No. 3 824 437, Cl. HO 2P 5/40, 1974) comprising the steps of measuring the magnetic field in the air gap of an induction motor, measuring stator current, converting the measured stator current into two stator current quadrature components oriented in relation to the measured magnetic flux, adjusting one of the quadrature stator current components which is proportional to the desired amplitude of the rotor flux linkage so that it remains on a constant level assigned by a permanent control input corresponding to the desired constant amplitude of the rotor flux linkage, while the other quadrature stator current component is changed in proportion to a second control input whose magnitude is proportional to the desired torque of the induction motor.

The electric drive realizing this method comprises an induction motor whose stator windings are connected, via a stator current transducer, to outputs of an inverter, two Hall-effect devices being installed in the air gap of the induction motor and the outputs thereof being joined, via adders, with the outputs of the stator current transducer and coupled to inputs of a vector analyzer. Two outputs of the vector analyzer are connected to first and second inputs of a coordinate converter whose third input is connected to a unit for assigning a constant amplitude of the rotor flux linkage. The fourth input of the coordinate converter is connected to an output of a proportional-integral speed controller, while two outputs of the coordinate converter are connected to control inputs of two current regulators whose two other inputs are connected to the outputs of the current transducer. The outputs of the two current regulators are connected to inputs of a unit for converting a two-phase signal into a three-phase signal assigning the stator voltage, outputs of this converting unit being connected to control inputs of the inverter.

This control method is deficient in that the speed control range is not sufficiently broad, pulsations increase at infralow rotational speeds, control time in response to load disturbances is too long, the bandwidth of the speed control loop is narrow due to the use of sensed magnetic flux quantities as reference control inputs, these sensed quantities being subjected to discrete variations, especially at low rotational speed, because of minute serrations on the stator and rotor of the induction motor as a result of the machining process. Other disadvantages include inferior energy characteristics and a low ratio of the induction motor torque to the stator current, which is due to control based on the principle of constant amplitude of the rotor flux linkage. This results in substantial losses for magnetic field excitation with the torque being absent or insignificant. This is particularly true for low-power induction motors wherein the magnetizing current level is close to the stator rated current level The electric drive realizing the disclosed method is deficient in that it is too complicated. Moreover, measurements of the magnetic flux by Hall-effect devices which should be fit into the serrated surface of the stator are often unreliable and the air gap between the stator chambers and the rotor surface is seriously reduced, which is particularly important for low-power induction motors whose air gap is already very narrow.

Also known in the art is a method of induction motor control (cf., for example, USSR Inventor's Certificate No. 193604, Cl. HO 2K, 1967), comprising the steps of controlling, phase-after-phase, instantaneous phase currents of the induction motor stator by comparing the commanded and sensed magnitudes of instantaneous stator phase currents, measuring stator current as a proportion of the quadrature sum of two stator current components, one component being constant and corresponding to the desired constant value of the magnetic flux, while the other current component is a variable which is changed proportionally to the input corresponding to the desired induction motor torque. Concurrently, the stator current frequency is changed in proportion with the sum of two frequencies, one frequency being the rotor speed, while the other is changed proportionally with the desired torque.

An electric drive realizing this method comprises an inverter whereto phase negative feedbacks are applied, which use instantaneous phase currents of the stator. The outputs of the inverter are connected to the stator windings of the induction motor, while three control inputs thereof are connected to the outputs of a synchro resolver whose shaft is connected to the shaft of the induction motor, two inputs of the synchro resolver are coupled to an electromechanical transducer of input control signals.

This method is deficient in that a change in the induction motor torque is oscillatory because the stator current frequency is changed as a sum of two frequencies. Another disadvantage is relatively poor performance due to control on the basis of the constant magnetic flux and oscillatory changes in the phase angle between stator current and magnetic flux.

The electric drive realizing this method is deficient in that the control procedure is too complicated, involving electromechanical conversion of control signals.

Also known in the art is a method of induction motor control (cf., for example, U.S. Pat. No. 4 418 308, Cl. HO 2P 5/34 1983) whereby stator windings of an induction motor are supplied with stator symmetrical three-phase voltage whose instantaneous phase values are changed by PDM (pulse-duration modulation) methods in accordance with the desired stator voltage amplitude and frequency, instantaneous stator phase currents and stator current amplitude are measured, and the stator voltage amplitude is controlled as an error between the desired and sensed amplitude of the stator current. After that, the rotor speed is measured, as well as the torque of the induction motor and the amplitude of the rotor flux linkage. The stator voltage frequency is controlled proportionally to the sum of two quantities, one quantity proportional to the sensed rotor speed, while the other quantity equal to the slip frequency is controlled as an error between the desired and sensed torque of the induction motor. The desired torque is produced as a function of an error between the desired and sensed rotor speed. The desired current amplitude of the stator is controlled as a function of the desired torque of the induction motor, taken as a square sum of two components of the stator current amplitude, one component being constant and corresponding to the desired constant amplitude of the rotor flux linkage, while the other is changed proportionally to the slip frequency. After that, the measured amplitude of the rotor flux linkage is compared with the constant value of the desired amplitude of the rotor flux linkage, which is assigned by a constant input. The desired amplitude of stator current is changed by the increment value of the stator current amplitude, which is controlled as an error between the amplitude of the rotor flux linkage assigned by the constant input and measured in the process of control.

The electric drive realizing this method comprises an induction motor whose stator windings are connected, via instantaneous phase current sensors, to outputs of a PDM voltage inverter. The rotor of the induction motor is connected to a tachometer generator. Three inductive pickups are installed in the induction motor. The outputs of the induction motor and outputs of instantaneous phase current sensors are connected to inputs of a processor calculating the rotor torque and flux amplitude, one such input being connected to a comparison unit of a torque regulator, while the other to a comparison unit of a rotor flux amplitude regulator. The output of the rotor flux amplitude regulator and the output of a stator current amplitude calculating unit are connected to two inputs of the comparison unit of the stator current amplitude regulator. The third input of the comparison unit of the stator current amplitude regulator is connected to the output of a stator current amplitude measuring unit whose inputs are connected to outputs of the instantaneous stator phase current sensors. The output of the stator current amplitude regulator is connected, via a correcting adder, to an amplitude setting input of the PDM voltage inverter. The second input of the correcting adder is connected, via a stator voltage amplitude correcting unit, to a frequency setting input of the PDM voltage inverter. The frequency setting input is connected to the output of an adder whose one input is connected to the output of the tachometer generator, while the other input is connected to an input of the stator current amplitude calculating unit and to the output of the torque regulator. The second input of the comparison unit of the torque regulator is connected to the output of the speed regulator whose input is connected to the output of the tachometer generator.

This method is deficient in that it provides narrow range and low accuracy of speed control at low rates and under load. Moreover, with the zero speed of the rotor the torque control response is sluggish, static and dynamic stability of the speed-torque characteristics is not sufficient due to oscillations, nonlinearity, and inertia of the torque control of the induction motor, which is caused by nonlinearity and ambiguity of the coupling of the stator voltage phase produced by the voltage inverter through the frequency control channel with instantaneous values of the induction motor torque and the amplitude of the rotor flux.

The electric drive realizing this method is deficient in that its power characteristics are poor due to appreciable heating of the stator winding insulation when the motor is idling at low torque. This is caused by the constant amplitude of the rotor flux and, at high dynamic ratings of the induction motor torque, by the low ratio of the maximum torque to the admissible amplitude of stator current.

Another disadvantage of this electric drive consists in that the control system is too complicated. Inductive pickups have to be installed inside the induction motor, induction motor torque has to be calculated on the basis of signals fed from instantaneous phase current sensors and inductive pickups; the instantaneous amplitude of stator current has to be calculated at a frequency close to zero. Moreover, it is not easy to adjust four regulators and a complex stator voltage amplitude correcting unit.

A general disadvantage of the disclosed method and electric drive consists in that special-purpose sensors and pickups are incorporated into the induction motor design. They are additional, as compared to other types of induction motor drives, components which are complicated, expensive, and not easy to manufacture and install. This feature seriously affects the basic advantages of an induction motor as an adjustable actuating motor for flexible manufacturing systems and robot technology, such as uncomplicated design, low cost, and adaptability to production processes.

Unstable dynamic and power characteristics of such induction motor drives during lengthy operational periods is another limitation connected with deviations of the actual electrical parameters of the induction motor from the adjusted parameters of the control system. Such deviations are not infrequent when the motor is heated during operation.

All these shortcomings prevent induction motor drives from being employed in robotics and flexible manufacturing systems instead of DC electric drives. More efficient control methods have to be devised to provide better dynamic characteristics, power performance, and accuracy of control. Such novel methods will have, for economic reasons, to do with a minimum number of standard sensors or pickups already widely used to control DC electric drives in many industrial systems.

It is advisable, therefore, to make use of indirect control methods involving some vectors characterizing the condition of an induction motor, e.g. rotor flux vector, and do without their direct measuring. In this case the well known field-oriented principle whereby a reference magnetic flux vector is measured and all control operations are referred to this measured vector has to be abandoned in favour of a more economically efficient and general principle of control synchronization, whereby the control input based on predetermined optimal laws is used to assign a control synchronization frequency which is found to be the most effective one in terms of utmost simplicity of the control system and its required accuracy. This control input is also used to produce optimal control processes in relation to a system of coordinates, which rotates with the synchronization frequency. Here the phase of the control synchronization signal is the reference phase and the phase of the controlled vector is produced in relation to this reference phase in accordance with optimal laws.

The prior art method which is the closest to the disclosed method of induction motor control (cf., for example, USSR Inventor's Certificate No. 1064411, Cl. HO2P 5/34, 1983) consists in that the rotor speed and induction motor torque are controlled in steady state conditions, and to this end the method comprises the steps of assigning a control input proportional to the desired amplitude of the rotor flux linkage, which is equal to the actual amplitude of the rotor flux linkage, producing a first quadrature phase component of the desired amplitude of stator current, which characterizes the flux-generating component of the stator current amplitude, in accordance with the desired amplitude of the rotor flux linkage, producing a second control input whose magnitude is proportional to the desired torque of the induction motor, in accordance with the desired and actual rotor speeds, producing a second quadrature component of the desired amplitude of stator current, which characterizes the torque-generating component of the stator current amplitude, in accordance with the magnitude of the desired torque of the induction motor, producing a static frequency of symmetrical instantaneous phase currents of the stator in steady state condition of the induction motor. The method further comprises the steps of phase-after-phase control, depending on the rotor speed and desired torque of the induction motor, of symmetrical instantaneous phase currents in the stator windings as errors between the desired and measured stator phase currents. The desired amplitude of stator current, which is equal to the desired amplitude of instantaneous stator phase currents, is in this case produced equal to the quadrature sum of the first and second quadrature components of the desired amplitude of stator current.

Besides, in this control method, the steady-state frequency of stator current is produced equal to the sum of the rotor speed and a quantity proportional to the induction motor torque. Further steps comprise producing sync sweep pulses by sweeping the steady-state frequency of stator current, the sync pulse frequency being changed proportionally to the steady-state frequency of stator current, producing asynchronous pulses whose number is proportional to the increment of the arctangent function of the desired torque of the induction motor, dicretely changing the phase of desired instantaneous stator phase currents by one increment in the forward or reverse direction as each sync pulse is supplied, said sync pulses bein used to control changes of the synchronous phase of stator current, and as each asynchronous pulse is supplied. The direction of the discrete changes of the phase of instantaneous phase currents is determined depending on the sign of the increment of the arctangent function with the arrival of an asynchronous pulse and depending on the sign of the synchronous frequency with the arrival of the sync sweep pulse. The torque-generating component of the stator current amplitude is changed in proportion to the desired torque of the induction motor. The second permanent control input is to produce a constant desired amplitude of the rotor flux linkage. The constant flux-generating component of the stator current amplitude is produced proportional to the predetermined constant value of the second control input action. The ratio of the number of asynchronous pulses to the increment of the inverse tangent function of the desired torque of the induction motor, as well as the proportionality factor of the input control action proportional to the required torque of the induction motor and the magnitude of the second component of the synchronous frequency of stator current, which is equal to the slip of the rotor flux linkage, are controlled as functions of the magnitude of the rotor resistance and mutual inductance of the induction motor assuming that the synchronous frequency of stator current is equal to the rate of rotation of the rotor flux in relation to the axis of the stator reference phase winding.

The electric drive realizing this method comprises an induction motor whose stator windings are connected, via instantaneous phase current sensors, to a pulse inverter embraced by instantaneous phase current negative feedbacks, while the rotor thereof is connected with a tachometer generator whose output is connected to one of the inputs of a proportional-plus-integral speed controller. A second input of said proportional-plus-integral speed controller is connected to an output of a speed setting unit. An output of the proportional-plus-integral speed controller is connected to inputs of three units: a stator current amplitude generator, a slip generator, and a stator current phase correction unit. The output of the slip generator and the output of the tachometer generator are connected to inputs of an adder whose output is connected to the pulse generator of the synchronous frequency of stator current. The output of the adder is also connected to an input of a unit for determining the direction of synchronous rotation of the stator current vector. The output of the stator current phase correction unit is connected to inputs of a pulse generator-counter and of a unit for determining the direction of the phase shift of the stator current vector. The outputs of a synchronous frequency generator and the pulse generator-counter are connected to the inputs of the pulse adder. The outputs of the units for determining the direction of the synchronous rotation and of the phase shift of the stator current vector are connected to inputs of a gate pulse adder. The outputs of the pulse adder and of the gate pulse adder are connected to stator current frequency control inputs of the pulse inverter. The output of stator current amplitude generator is connected to a stator current amplitude control input of the pulse inverter.

In this method the stator current vector control is synchronized in polar coordinates.

One self-contained channel is used to control the amplitude of stator current, which is equal to the length of the stator current vector.

The other self-contained channel is used to control the frequency of stator current, which is equal to the rate of rotation of the stator current vector. Non-linear dynamic stator current phase corrective action is introduced in the second control channel.

This method of induction motor control can, therefore, be referred to as a phase-frequency-current method.

The electric drive realizing this method operates as follows.

The rotor speed being zero, a constant flux-generating component of the stator current amplitude is produced in order to excite, in the induction motor, a static magnetic field characterized by a constant rotor flux in an arbitrary initial angular position which corresponds to the initial phase of stator current.

A jump in the first control input proportional to the desired torque of the induction motor produces an increment of the inverse tangent function of said first control input, which is proportional to the magnitude of the jump. The increment of the inverse tangent function results in a burst of asynchronous pulses, the number of said asynchronous pulses in the burst being equivalent to the magnitude of the increment of the inverse tangent function. Since each asynchronous pulse alters the stator current pulse by one discrete element, the stator current vector is subjected to a discrete shift in relation to the initial angular position of the rotor magnetic flux. The angle between the space vector of stator current and the space vector of the rotor flux linkage increases with each next asynchronous pulse, thus increasing the torque of the induction motor. After all asynchronous pulses are responded to, the desired induction motor torque is maintained by discrete changes of the synchronous phase of stator current as each synchronous sweep pulse arrives. The result of the simultaneous discrete turn of the stator current vector by synchronous and asynchronous pulses is synchronized control of the space vector of the rotor flux linkage, which is subjected to synchronous and cophasal angular motion concurrently with the synchronous phase assigned by the synchronous scan pulses.

In steady state conditions of the induction motor, which are characterized by constant values of induction motor torque, the rotor speed and, the amplitude of the rotor flux linkage, the rate of rotation of the space vector of the rotor flux linkage is equal to the stator current frequency. There are no asynchronous pulses, and the stator current frequency is equal to the synchronous frequency of stator current, which is assigned by synchronous scan pulses.

To summarize, the prior art method provides invariant control of the induction motor torque. It can maintain constant amplitude of the rotor magnetic flux linkage by controlling the synchronous frequency of stator current, which is equal to the rotor flux frequency, and by discrete control of the asynchronous motion of the stator current vector in relation to the rotor flux vector.

The prior art method provides for control synchronization being effected in polar coordinates by a control input action proportional to the desired motor torque and the output signal of the rate sensor without changing the reference vector of the rotor magnetic flux and employing standard transducers: a speed transducer (tachometer generator) and a current transducer.

But this prior art method and device are deficient in that their response is not sufficiently fast, the accuracy is low, and the specific torque is inadequate. The main reason of these shortcomings consists in that control is effected in accordance with the law of constant rotor flux linkage and the stator current phase control is characterized by inertia and errors, particularly when the desired torque instruction changes abruptly and asynchronous pulses arrive in sequence to follow the step. The electric drive realizing this method is deficient in that at low torque the losses for excitation of the magnetic field are too high and this narrows the motor heat margin during frequent start-stop cycles and frequent positioning of the servomechanism. At great load torque or during operational conditions, when the motor torque is twice (or thrice) as large as the rated torque value, the stator current magnitude grows substantially, power losses for heating increase, and the motor is overheated in general with respect to the minimal temperatures for a given torque. It is difficult to provide adequate dynamic accuracy of actuator motions through feedback control because of limited capabilities for momentarily boosting the motor torque. The ratio of the induction motor torque to the stator current magnitude is too low in the proposed control method based on the constant amplitude of the rotor flux linkage. This limits the safe frequency of positioning cycles during position control of robots. The efficiency of robots and other flexible manufacturing systems is seriously affected.

TERMINOLOGY

Complex processes of dynamic and power processes of induction motor control and the multi-criteria approach to optimization of induction motor drives from the point of view of the disclosed conception of vector control inevitably result in use of new concepts and terms which simplify the description of novel control methods and techniques.

The following new notions and terminology will be used hereinbelow in the description of the invention.

Vector control of an induction motor is a purposeful, interrelated action subjected to specific laws, to change parameters of energy time vectors characterizing parameters of electric power and expressed in instantaneous values of phase, frequency, and amplitude of stator current or voltage. This action is used to control parameters of the space vector of the magnetic field in an induction motor, which are expressed by the instantaneous space angular position and instantaneous magnetic flux linkage of the rotor or stator, by means of control inputs in an interrelated manner, in accordance with relevant laws, and at each moment of time.

Synchronization of vector control is a control process whereby a discrete control action is used to assign and change, according to the frequency of a unit synchronization time vector which is used as a reference to form parameters of a control time vector in the coordinates of the unit synchronization vector, and thereafter the control vector thus obtained can be transformed into a specific output coordinate system.

Synchronous frequency is the frequency of a unit synchronization vector in relation to which parameters of the control time vector, e.g. a stator current vector, are produced.

Synchronous phase is the phase of a unit synchronization time vector.

Co-phasal quantity (e.g. co-phasal current) is a parameter of a control time vector (e.g. stator current vector) equal to the projection of the control time vector onto the axis of the unit synchronization vector.

With the assigned phase shift of the time vector of stator current in relation to the unit synchronization vector of the constant synchronization frequency, the co-phasal current is determined by the amplitude of the periodic current whose phase coincides with the phase of the unit synchronization vector (synchronous phase).

Ortho-phasal quantity (e.g. ortho-phasal current) is a parameter of a control time vector (e.g. stator current vector) equal to the projection of the control time vector onto the axis orthogonal to the unit synchronization vector.

With the assigned phase shift of the time vector of stator current in relation to the unit synchronization vector, the ortho-phasal current is defined as the amplitude of the periodic current whose phase lags behind or precedes the synchronous phase by 90°.

If the synchronous frequency matches the voltage frequency, the co-phasal current corresponds to the active current, while the ortho-phasal current corresponds to the reactive current, these parameters are known to any person skilled in electrical engineering. But, with vector control, the synchronous frequency may be controlled according to arbitrary laws not necessarily connected with the voltage frequency, the synchronous frequency may correspond to the desired optimal frequency of the rotor flux linkage or to the current rotor rate of rotation. With the synchronous frequency equal to the rotor flux linkage, the physical meaning of co-phasal current is, on the contrary, closer to reactive current but does not coincide with neither phase nor the amplitude of this reactive current.

Co-phasal input is the input of a synchronized control system or synchronized control unit to which a co-phasal quantity signal, e.g. co-phasal current signal, is applied.

Ortho-phasal input is an input of a synchronized control system or a control unit to which an ortho-phasal quantity signal, e.g. ortho-phasal current signal, is applied.

"Frequency-current" inverter is a power inverter having two autonomous control channels. One control channel is used to control the instantaneous amplitude of instantaneous phase currents, which is equal to the vector modulus of stator current. The other control channel is used to control the instantaneous frequency of stator current, which is equal to the rotational speed of the stator current vector. In this case, instantaneous phase currents are controlled in accordance to the assigned instantaneous phase current values by means of phase-after-phase comparison of measured instantaneous phase current values with corresponding assigned instantaneous phase current values whose instantaneous amplitude and frequency are assigned by control inputs in two autonomous control channels.

The frequency-current inverter converts electric power when current is controlled in polar coordinates. The output current frequency of such a "frequency-current" inverter is at all times equal to the synchronous frequency prescribed by the control input. Step changes of inputs, in this type of inverters, do not lead to step changes in the current phase.

Transvector inverter is a power inverter synchronized by a control input fed to a frequency input of the power inverter whose two other inputs are co-phasal and ortho-phasal inputs. Instantaneous output current is controlled by changing co-phasal and ortho-phasal currents in the system of coordinates of the unit synchronization time vector which is prescribed and changed in accordance with an arbitrary law on the frequency input of the power inverter, while the current vector is controlled in the Cartesian synchronously rotating coordinates.

Reference phase winding of a stator is one of the stator phase windings of an induction motor, wherein the instantaneous phase of instantaneous phase current coincides with the synchronous phase in the absence of ortho-phasal current.

Stator two-phase current comprises two ac currents, one current being instantaneous phase current in the reference phase winding of the stator, and the other current having the same instantaneous amplitude phase-shifted in relation to the first current to a phase angle of 90°.

Stator current phase is the phase of instantaneous phase current in the reference phase winding of the stator, which can be any of the phase windings "A", "B", or "C", e.g. the phase winding "A", providing the stator phase currents are symmetrical.

The stator current phase is equal to the phase angle (argument) of the space vector of stator current, in relation to the reference axis "a" of the reference phase winding "A".

Rotor flux linkage phase is the phase of the instantaneous rotor phase flux linkage on the reference axis "a", which is equal to the argument of the space vector of the rotor flux linkage in relation to the reference axis "a".

SUMMARY OF THE INVENTION

The object of this invention is to provide a method of induction motor control and an electric drive realizing this method, which can improve the efficiency, speed of response, accuracy, and economic effectiveness of industrial robots, flexible manufacturing systems, and other industrial devices using induction motors, through autonomous control of the stator current phase of an induction motor, interrelated change of the magnitude and spatial arrangement of the magnetic field in accordance with the desired induction motor torque, and optimal related control of amplitudes and phases of the rotor flux linkage and stator current, ensuring minimal heating of the stator winding of the induction motor, maximum torque of the induction motor, the fastest possible response, and maximum accuracy of control of induction motor torque, speed, and rotor positioning.

This object is achieved in that a method of induction motor control, consisting in controlling the rotor speed and induction motor torque in a steady state condition, and, to this end, comprising the steps of producing a control input proportional to the desired amplitude of the rotor flux linkage, which is equal to the actual amplitude of the rotor flux linkage; generating a first quadrature component of the desired stator current amplitude, which characterizes the flux-generating component of the stator current amplitude, in accordance with the magnitude of the desired amplitude of the rotor flux linkage; generating a second control input whose magnitude is proportional to the desired induction motor torque, in accordance to the desired rotor speed and the actual rotor speed; generating a second quadrature component of the desired stator current amplitude, which characterizes the torque-generating component of the stator current amplitude, in accordance with the desired induction motor torque; assigning a static frequency of symmetrical instantaneous phase currents of the stator in the steady-state condition of the induction motor in accordance with the rotor speed and the desired induction motor torque; providing phase-after-phase control of symmetrical instantaneous phase currents of the stator in the phase stator windings of the induction motor as functions of errors between the desired and measured instantaneous stator phase currents, the desired stator current amplitude equal to the desired amplitude of instantaneous stator phase currents and to the amplitude of stator current being produced equal to the quadrature sum of the first and second quadrature components of the desired stator current amplitude, according to the invention, also consists in controlling the rotor flux linkage amplitude and interrelated static, dynamic, electromagnetic, power, and thermal processes in the induction motor by introducing vector phase-current control and interrelated control of the stator current phase and amplitude, the magnitude and spatial angular position of the magnetic field, which are characterized by the phase and amplitude of the rotor flux linkage, in accordance with the desired induction motor torque, and, to this end, comprising the steps of generating a synchronization frequency whose magnitude is equal to the static frequency of symmetrical instantaneous stator phase currents in a steady state condition of the induction motor, which characterizes the stator current synchronous frequency equal to the sum of two components of the synchronization frequency, one said component being controlled proportionally to the rotor speed, while the other component is controlled in accordance with the ratio of the desired induction motor torque to the quadrature value of the desired amplitude of the rotor flux linkage; producing a synchronization phase equal to the synchronous stator current phase and characterizing the instantaneous phase of instantaneous stator phase current in a stator phase winding which is a reference phase winding of the stator, said synchronization phase being produced with the zero value of the desired induction motor torque; producing a stator current phase characterizing the instantaneous phase of stator phase current in the reference phase stator winding of the induction motor by changing this stator current phase in relation to the synchronous phase of stator current to the value of the stator current phase shift, which is proportional to the inverse tangent function of the ratio between the torque-generating component of the stator current amplitude and the flux-generating component of the stator current amplitude, which is changed in accordance with the desired induction motor torque by increasing the desired amplitude of the rotor flux linkage to match the increase of the desired induction motor torque and the analogous and symmetrical change of instantaneous phase currents in other phase windings of the stator.

In order to operate the induction motor in Cartesian coordinates synchronized by the synchronizing frequency, the synchronization phase should advisably be additionally controlled by changing the second component of the synchronizing frequency, which characterizes the slip of the rotor flux linkage in relation to the rotor of the induction motor, in proportion to the ratio of the torque-generating component of the stator current amplitude to the actual value of the desired rotor flux amplitude. With the increase of the desired induction motor torque, the actual value of the desired rotor flux amplitude should advisably be increased as a function of time in accordance with an aperiodic law, and the flux-generating component of the stator current amplitude, which is equal to the first quadrature component of the desired stator current amplitude, should advisably be controlled in accordance with the steady state value of the desired amplitude of the rotor flux linkage by assigning a magnetization characteristic of the induction motor, while the torque-generating component of the stator current amplitude, which is equal to the second quadrature component of the desired stator current amplitude, should be advisably changed in proportion to the ratio of the desired induction motor torque to the actual value of the rotor flux linkage amplitude.

In order to operate the induction motor in polar coordinates, the synchronization phase should preferably be produced by means of the time base of the desired stator current frequency, which is equal to the rate of change of the instantaneous phase of instantaneous phase current in the reference stator phase winding, and, to this end, the procedure should comprise the steps of assigning a constant value of the desired rotor flux linkage amplitude and respective values of the first quadrature component of the desired stator current amplitude and the flux-generating component of the stator current amplitude; changing the second quadrature component of the desired stator current amplitude in proportion to the desired induction motor torque; generating the desired stator current amplitude equal to the quadrature sum of the first and second quadrature components of the desired stator current amplitude, producing the desired stator current frequency characterising the synchronizing frequency equal to the sum of three components of the synchronising frequency, changing the first said component proportionally to the rotor speed, changing the second said component proportionally to the desired induction motor torque, and generating the third dynamic component of the synchronizing frequency and the respective third dynamic component of the stator current frequency, in response to changes in the desired induction motor torque, equal to the rate of change of the inverse tangent function of a quantity proportional to the desired induction motor torque; and, with the linear change of the desired induction motor torque, the third dynamic component of the stator current frequency should advisably be controlled according to the law $$\Delta\omega_d = \frac{\dfrac{2L_r}{3Z_p \cdot \psi_{ro}^{*2}}}{1 + \left(\dfrac{2L_r \cdot a_M}{3Z_p \cdot \psi_{ro}^{*2}}\right)^2 \cdot t^2} \cdot a_M,$$

where
- $\Delta\omega_d$ is the third dynamic component of the stator current frequency;
- $L_r$ is the rotor inductance;
- $Z_p$ is the number of poles of the induction motor;
- $\omega^*_{ro}$ is the constant desired amplitude of rotor flux linkage;
- $a_M = (dM^*/dt)$ is the rate of change of the desired torque $M^*$ of the induction motor;
- $t$ is the actual time of the linear change in the desired torque $M^*$ of the induction motor.

It is advisable, in order to control the induction motor in Cartesian coordinates, that the phase shift of the stator current in relation to the synchronous phase of the stator current, which is equal to the synchronizing phase, should be changed in magnitude and direction by generating the value of the instantaneous stator phase current in the reference phase winding of the stator equal to the difference between two periodic currents, the first current which is co-phasal current should be generated by synchronizing said change with the synchronizing frequency of the flux-generating component of the stator current amplitude in accordance with the cosine laws a function of the synchronizing phase, which is equal to the synchronizing phase, while the second current which produces ortho-phasal current should be generated by synchronizing said change with the synchronizing frequency of the torque-generating component of the stator current amplitude in accordance with the sine law as a function of the synchronizing phase, and, with an instantaneous increment of the desired induction motor torque, the stator current phase should be displaced in relation to the synchronizing phase by a jump in a respective direction by abruptly changing the magnitude and respective direction of the ortho-phasal current, or, in response to the actual value of the desired rotor flux amplitude, the stator current phase should be displaced by changing the value of cophasal current, the actual value of the desired rotor flux amplitude should be changed in accordance with the flux-generating component of the stator current amplitude conformably to the aperiodic law, the time constant being equal to the electromagnetic time constant of the rotor.

It is advisable that the instantaneous phase of the instantaneous stator phase current in the reference stator phase winding should be shifted in relation to the stator synchronous current phase to a constant phase displacement value to a quantity $\pm \pi/4$ by changing, uniformly and simultaneously, the torque—and flux-generating components of the stator current amplitude as functions of the desired induction motor torque, and, in case of an instantaneous increment of the desired induction motor torque, the instantaneous stator current amplitude should be made proportional to the torque-generating and flux-generating components of the stator current amplitude conformably to the law $$i_s = \sqrt{2} \; \dfrac{\sqrt{\dfrac{2L_p}{3Z_p}}}{L_m} \cdot \dfrac{M^*}{\sqrt{M^*_o + (M^* - M^*_o)\left(1 - e^{\dfrac{-2t}{T_r}}\right)}},$$

where
- $i_s$—instantaneous amplitude of stator phase current;
- $e$—natural number or positive integer;
- $t$—actual time of a transient process;
- $L_r$—rotor inductance;
- $Z_p$—number of pole pairs of induction motor;
- $L_m$—mutual inductance;
- $M^*$—desired induction motor torque;
- $M^*_o$—initial desired torque of the induction motor;
- $T_r = (L_r R_r)$—electromagnetic time constant of the rotor;
- $R_r$—rotor resistance, while the second component of the stator current frequency, which corresponds to the rotor flux linkage slip and is equal to the stator current slip, should be changed conformably to the law $$\Delta\omega = \dfrac{R_r}{L_r} \cdot \dfrac{M^*}{M^*_o + (M^* - M^*_o)\left(1 - e^{\dfrac{-2t}{T_r}}\right)}.$$

It is also advisable that the stator current phase shift in relation to the synchronous phase of the stator current and the synchronizing phase should be changed conformably to the boundary values of the maximum stator current and voltage amplitudes, the desired boundary value of the induction motor torque, the measured rotor speed, and the desired period of forcing the induction motor torque; and the saturation level of the magnetic core of the induction on motor should be changed conformably to said boundary quantities by multi-range phase-current control of the induction motor, whereby it is necessary, in each control zone, to change the laws of interrelated control of ortho-phasal and co-phasal currents, and, specifically, in the first range of phase-current control of an induction motor, when the desired torque and measured speed of the rotor are less than their boundary values, to reduce by at least one half the desired amplitude of the rotor linkage amplitude, the flux-generating component of the stator current amplitude, and co-phasal current in relation to respective quantities during the rated steady-state condition of the induction motor; to excite the initial magnetic field in the induction motor at a constant rotor flux amplitude whose value should be produced in proportion to the amplitude of co-phasal current conformably to the boundary value of the maximum stator current amplitude and the initial value of the desired induction motor torque; to change the stator current phase shift in relation to the synchronizing phase and the stator current synchronous phase in response to a change in the desired induction motor torque by changing the amplitude of ortho-phasal current in proportion to the desired induction motor torque, while the instantaneous phase current in the reference stator phase winding of the induction motor should be changed conformably to the law $$i_{sa}(t) = K_1\psi_{ro}^* \cos \int_0^t (\omega + K_2M^*)dt -$$

$$K_3M^* \sin \int_0^t (\omega + K_2M^*)dt,$$

where
- $i_{sa}(t)$—instantaneous phase current in the reference phase winding of the stator;
- $M^*$—desired torque of the induction motor;
- $K_1, K_2, K_3$—constant coefficients dictated by the parameters of the induction motor;
- $\psi_{ro}^* \leq 0{,}5\psi_{rn}$—initial amplitude of the rotor flux linkage;
- $\psi_{rn}$—nominal amplitude of the rotor flux linkage;
- $\omega$—rotor speed, and, in the second range of phase-current control, when the desired torque of the induction motor is greater than the boundary value of the desired torque, and when the measured rotor speed is less than its boundary value, it is advisable that the constant phase shift $\pm\pi/4$ of the stator current in relation to the synchronizing phase and the stator current synchronous phase should be produced by controlling, unformly and simultaneously, the amplitudes of ortho-phasal and co-phasal currents as functions of the desired induction motor torque and simultaneous controlling, conformably to the aperiodic law, the desired rotor flux amplitude as a function of the co-phasal current amplitude which corresponds to the magnetizing characteristic of the induction motor, and, in the third range of phase-current control, when the measured rotor speed is greater than the boundary value of this measured rotor speed, it is advisable that the absolute value of the stator current phase shift should be made greater than $\pm\pi/4$ in relation to the synchronous phase of the stator current, as the rotor speed grows, by reducing the co-phasal current amplitude conformably to the boundary value of the maximum amplitude of the stator voltage and rotor speed.

It is also advisable that the maximum induction motor torque should be produced, during short-time torque forcing conditions and acceleration in the forcing period, to be less than the rotor electromagnetic time constant by modifying the stator current phase in one step to the phase angle $\pm\pi/2$ in relation to the synchronous stator current phase, which is achieved by disconnection of co-phasal current, and, to this end, co-phasal current should be disconnected for the required period of the induction motor torque forcing and ortho-phasal current should be abruptly increased to a value less than the maximum stator current amplitude, and it is advisable that, in the second range of phase-current control, the induction motor forced torque should be greater, by a factor of at least 1.4, than the induction motor torque in the period prior to forcing, the stator current amplitude of the forcing period, which is equal to the stator current amplitude of the previous period, being kept at the same level even after the co-phasal current is disconnected by increasing the ortho-phasal current by a quantity which is less than the disconnected co-phasal current by a factor of approximately $\sqrt{2}-1$.

Besides, it is advisable that the synchronous stator current frequency should be controlled by changing the value of the control input proportional to the desired rotor speed by a quantity proportional to the measured amplitude of the stator ortho-phasal current, which is produced by synchronizing the measured two-phase stator current by means of the synchronizing frequency of the stator current, while the induction motor rotor speed should be controlled, irrespective of the induction motor load moment, by proportional-and-integral regulation of the ortho-phasal and co-phasal components of the rotor flux linkage, whose measures values are advisable to be produced through synchronization of the measured two-phase rotor flux linkage, while said two-phase rotor flux linkage should be produced by way of measuring the two-phase stator current and two-phase stator voltage, and it is necessary to regulate the co-phasal component of the rotor flux linkage, which is co-phasal in relation to the synchronous phase of the stator current, at the level of the desired rotor flux amplitude, said two-phase rotor flux linkage being assigned by a second control input, while the deviation of the rotor speed from the desired rotor speed assigned by the first control input should be compensated by shifting the stator current phase and modifying the ortho-phasal current as a function of the deviation of the ortho-phasal component of the rotor flux linkage from the zero level of the desired ortho-phasal component ($\psi_{r\,ort}=0$) of the rotor flux linkage.

It is also advisable that the stator current synchronous phase should be additionally controlled as a function of the induction motor heating temperature, and, to this end, it is necessary to measure the actual induction motor temperature and to compare this temperature with the constant adjustment temperature of the induction motor, to adjust control of the second component of the stator current synchronous frequency at this temperature, to produce the required increment to the second component of the stator current synchronous frequency in proportion to the product of the desired value of the second component of the stator current synchronous frequency at the constant adjustment temperature of the induction motor by the obtained difference between the two temperatures, to modify the desired value of the second component of the stator current synchronous frequency by the value of the obtained increment of the second component of the stator current synchronous frequency, and, as the difference between said two temperatures grows and the error exceeds the boundary level of the induction motor temperature, to reduce the maximum value of the desired induction motor torque, or, when the maximum permissible heating level of the induction motor is exceeded, to reduce the required rotor speed to zero.

To summarize, the minimum stator current conditions can be provided by modifying the required rotor flux amplitude and the flux-producing component of the stator current amplitude as functions of the desired induction motor torque in static conditions, at a steady-state speed, and predetermined load moment, because the magnetic flux increases with the motor torque. Since the stator current is minimized for a predetermined load moment which can be varied over a broad range, the mode of operation of the induction motor becomes close to conditions of minimal total power losses in the induction motor and minimal heating of the stator winding. This makes it possible to increase the specific torque of the induction motor, both long-time and short-time, per unit weight and volume. Electromechanical modules become ligher and less bulky. Robots and flexible manufacturing systems become more efficient and economical because their actuators are smaller and ligher.

In dynamic conditions, when the current phase and mutual variations of the magnitude and angular position of the magnetic field are controlled as functions of the induction motor torque, the process of torque formation becomes faster, the induction motor dynamic torque is stepped up, and the ratio of the actual and steady-state dynamic torque of the induction motor to the stator current amplitude increases. Also improved are acceleration and accuracy of the rotor speed and position control. Power and thermal characteristics of the induction motor drive are also improved. The specific torque and power of the induction motor are increased due to regulation of the rotor flux linkage amplitude. Accurate speed control can be achieved with various transducers, including an embodiment without a shaft speed pickup. All this permits the use of induction motor drives as unified electric drives of robots and flexible manufacturing systems, including precision induction motor sevomechanisms of assembly and welding robot lines. Such features of robots and flexible manufacturing systems as efficiency, fact response, accuracy, and economy are brought to a higher level.

This object is also achieved in that in an electric drive realizing the method of induction motor control, comprising an induction motor whose stator windings are connected to outputs of a power converter, a rotor of the induction motor, connected to a rotor speed transducer connected to a first input of a unit for assigning the desired induction motor torque, the second input thereof being connected to a rotor speed setting unit, while the output of the unit for assigning the desired induction motor torque is connected to an input of a unit for generating the torque-producing component of the stator current amplitude, the frequency input of the power converter being connected, via a unit for generating the stator current synchronous frequency, to the output of the unit for assigning the desired induction motor torque, the second input of the unit for generating the stator current synchronous frequency being connected to the output of the rotor speed transducer, according to the invention, the power converter is a transvector inverter having three control inputs, the first input being a frequency input, the first input being a frequency input, the second input being an ortho-phasal input, and the third input being a co-phasal input, and the electric drive also comprises a unit for generating the rotor flux linkage amplitude and a unit for generating the rotor flux linkage slip, the output of the unit for assigning the desired induction motor torque is connected to inputs of the units for generating the rotor flux linkage amplitude and slip, the output of the unit for generating the torque-producing component of the stator current amplitude is connected to the ortho-phasal input of the transvector inverter, the output of the unit for generating the rotor flux linkage amplitude is connected to the co-phasal input of the transvector inverter, and the output of the unit for generating the rotor flux linkage slip is connected to the first input of the unit for generating the stator current synchronous frequency.

It is advisable that the elecric drive is provided, when control is in Cartesian coordinates, with an aperiodic unit and a unit for assigning the flux-producing component of the stator current amplitude, the joint input of said two units being connected to the output of the unit for generating the rotor flux linkage amplitude, while the output of the unit for assigning the flux-producing component of the stator current amplitude is connected to the co-phasal input of the transvector inverter, the unit for generating the torque-producing component of the stator current amplitude is advisably made as a division device, the input of the divider thereof is connected to the output of the aperiodic unit, the unit for generating the rotor flux linkage slip is advisably made as a second division device, the input of the divider thereof is also connected to the output of the aperiodic unit whose input is connected to the output of the unit for generating the rotor flux linkage amplitude, the output of the first division device is connected to the ortho-phasal input of the transvector inverter and to the dividend input of the second division device, while the unit for generating the stator current synchronous frequency is advisably made as a summer.

This object is also achieved in that an electric drive, when control is effected in polar coordinates, comprising an induction motor whose stator windings are connected to outputs of a power converter and whose rotor is connected to a rotor speed transducer whose output is connected to inputs of two summers, the first summer is inserted between the output of a rotor speed setting unit and the input of a proportional-plus-integral speed controller, while the second summer is inserted between the output of a proportional unit and one of the inputs of the power converter, the output of the proportional-plus-integral speed controller being connected to the input of the proportional unit and an input of a quadrature sum calculating unit whose second input is connected to the output of a unit for assigning the amplitude of the rotor flux linkage, while the output of the quadrature sum calculating unit is connected to the amplitude input of the power converter, according to the invention, also comprises, connected in series, a phase shift angle setting unit and a unit for calculating the dynamic component of the stator current frequency, the input of the phase shift angle setting unit being connected to the output of the proportional-plus-integral speed controller, while the output of the unit for calculating the dynamic component of the stator current frequency is connected to the third input of the second summer, the power converter being made as a frequency-current inverter.

Advisably, an electric drive controlled in Cartesian coordinates should comprise a unit for assigning the instantaneous amplitude of stator current, a unit for assigning the instantaneous frequency of stator current, a unit for assigning the ortho-phasal current amplitude, and an ortho-phasal current reversing unit, and the transvector inverter should be made as a phase-current converter comprising three first and three second single-phase frequency-current inverters, the outputs of the three first and three second single-phase frequency-current inverters should be connected in pairs parallel to respective phase windings of the induction motor stator, the amplitude inputs of the first three single-phase frequency-current inverters should be joined together and connected to the output of a co-phasal current amplitude setting unit whose input is connected to the output of the unit for generating the amplitude of the rotor flux linkage, the frequency inputs of three first and three second single-phase frequency-current inverters should be joined together and connected to the output of the unit for assigning the instantaneous frequency of stator current, whose input is connected to a unit for generating the synchronous frequency of stator current, the amplitude inputs of the second three single-phase frequency-current inverters should be connected to the output of the ortho-phasal current amplitude setting unit, the pulse inputs of each unit for generating desired instantaneous phase currents of the second three single-phase frequency-current inverters, which are joined together, should be connected to the output of the ortho-phasal current reversing unit whose input is joined with the input of the ortho-phasal current amplitude setting unit and connected to the output of the unit for generating the torque-producing component of the stator current amplitude.

This object is also achieved in that an electric drive realizing the control method and comprising an induction motor whose stator windings are connected to outputs of the power converter and whose rotor is connected to a rotor speed transducer coupled to a first input of a first summer whose second input is connected to the output of a rotor speed setting unit, while the output thereof is connected to an input of a proportional-plus-integral speed controller, according to the invention, also comprises first and second division devices, a second summer, an aperiodic unit, a co-phasal current setting unit, and a saturation non-linearity unit, the power converter being made as a transvector inverter having ortho-phasal, frequency, and co-phasal inputs, while the input of the proportional-plus-integral speed controller is connected to the dividend input of the first division device whose output is joined with the ortho-phasal input of the transvector inverter and connected to the dividend input of the second division device and to the input of the co-phasal current setting unit, the output of the second division device and the output of the rotor speed transducer are connected to the inputs of the second summer whose output is connected to the frequency input of the transvector inverter whose co-phasal input is connected to the output of the co-phasal current setting unit, and the output of said co-phasal current setting unit is also connected to the input of the aperiodic unit whose output is connected to the input of the saturation non-linearity unit whose output is connected to the dividing inputs of the first and second division devices.

Advisably, the electric drive should comprise a torque controlled limitation unit, a third summer, a torque limitation non-linearity unit, a module isolating unit, and a field reduction non-linearity unit, which form, in combination with the division devices, the second summer, the co-phasal current setting unit, the saturation non-linearity unit, and the aperiodic unit, an adaptive torque controller, the first input of the torque controlled limitation unit, which forms the first input of the adaptive torque controller, should be connected to the output of the proportional-plus-integral speed controller, while the second input thereof is connected to the output of the torque limitation non-linearity unit, and the output thereof is connected to the dividend input of the first division device whose output which forms the ortho-phasal output of the adaptive torque controller should be connected simultaneously to the input of the co-phasal current setting unit and to the dividend input of the second division device whose output should be connected to the first input of the second summer, the output of the second summer forming the frequency output of the adaptive torque controller, the output of the co-phasal current setting unit should be connected to the first input of the third summer whose output forms the co-phasal output of the adaptive torque controller and should be simultaneously connected to the input of the aperiodic unit whose output should be connected to the input of the saturation non-linearity unit whose output should be connected to divider inputs of the first and second division devices, the input of the torque limitation non-linearity unit, which is joined with the input of the field reduction non-linearity unit, should be connected to the output of the module isolating unit whose input is joined with the second input of the second summer and should form the second input of the adaptive torque controller, the first input of the adaptive torque controller is advisable to be connected to the output of the proportional-plus-integral speed controller, the second input of the adaptive torque controller is connected to the output of the speed transducer, while the ortho-phasal, frequency, and co-phasal outputs of the adaptive torque controller should be respectively connected to the ortho-phasal, frequency, and co-phasal inputs of the transvector inverter.

Advisably, the electric drive should comprise a unit for assigning torque forcing and a torque forcing unit comprising a summer, an amplifier-limiter, a comparator, a switching device, an inverting amplifier, and a switch, the first input of the summer and the input of the comparator should be joined together to form an ortho-phasal input of the torque forcing unit, the output of the summer is to be connected to the input of the amplifier-limiter whose output should form an ortho-phasal output of the torque forcing unit, the output of the comparator should is to be connected to a control input of the switching device whose commutated input is to be joined with the input of the inverting amplifier and connected to the first output of the switch whose switching input is to form a co-phasal input of the torque forcing unit, the output of the switching device and the output of the inverter amplifier should be joined together and connected to a second input of the summer, the second output of the switch should form a co-phasal output of the torque forcing unit, the control input of the switch should form a control input of the torque forcing unit, the output of the unit for assigning the torque forcing should advisably be connected to the control input of the torque forcing unit, the ortho-phasal and co-phasal outputs of the torque forcing unit should be respectively connected to the ortho-phasal and co-phasal inputs of the transvector inverter, while the ortho-phasal and co-phasal inputs of the torque forcing unit should be respectively connected to the ortho-phasal and co-phasal outputs of the adaptive torque controller.

This object is achieved in that an electric drive realizing the control method, comprising an induction motor whose stator windings are connected to a power converter and whose rotor is connected to a rotor speed transducer, according to the invention, also comprises a unit for assigning the desired induction motor torque, a unit generating the stator current synchronous frequency, and a unit generating the rotor flux linkage amplitude, which are built respectively around first, second, and third operational amplifiers, the power converter is a transvector inverter having ortho-phasal, frequency, and co-phasal inputs, first inputs of the first and second operational amplifiers are joined together and connected to an output of the rotor speed transducer, the output of the first operational amplifier, which is linked with the second input of the second operational amplifier, is connected to the ortho-phasal input of the transvector inverter, the output of the second operational amplifier is connected to the frequency input of the transvector inverter, while the output of the third operational amplifier is connected to the co-phasal input of the transvector inverter.

This object is also achieved in that an electric drive realizing the control method and comprising an induction motor whose stator windings are connected to outputs of a power converter, according to the invention, also comprises a first operational amplifier which forms the proportional-plus-integral speed controller, and a second operational amplifier which forms a unit for assigning the rotor flux linkage amplitude, an incremental transducer, a frequency-voltage converter, and a digital-analog converter of Cartesian coordinates, wherein the power converter is made as a transvector inverter synchronized by a rotor comprising an electronic reduction unit, a unit for transvector generation of desired instantaneous phase currents, and a unit for regulating instantaneous phase currents, all three units being electrically connected to one another, the induction motor rotor is mechanically connected to the incremental transducer whose outputs which form pulse inputs of the transvector inverter synchronized by the rotor are connected to inputs of the electronic reduction unit and to inputs of the frequency-voltage converter, outputs of the electronic reduction unit are connected to pulse inputs of the unit for transvector generation of desired instantaneous phase currents whose two other inputs form the ortho-phasal and co-phasal input of the rotor-synchronized transvector inverter, outputs of the unit for transvector generation of desired instantaneous phase currents are connected to control inputs puts of the instantaneous phase current regulating unit whose outputs form outputs of the rotor-synchronized transvector inverter and are connected to induction motor stator windings, and wherein the digital-analog Cartesian coordinate converter should comprise a pulse scanning unit, a reversible address counter, two programmable read-only memories, four digital-analog converters, and two adders, outputs of the pulse scanning unit should advisably be connected to the input of the reversible address counter whose outputs are connected to inputs of the first and second programmable read-only memories, outputs of the first programmable read-only memory which is programmed to follow the sine function should be connected to digital inputs of the first and second digital-analog converters, outputs of the second programmable read-only memory programmed to follow the cosine function should be connected to digital inputs of the third and fourth digital-analog converters, outputs of the second and third digital-analog converters should be connected to inputs of the first adder, outputs of the first and fourth digital-analog converters should be connected to inputs of the second adder, analog inputs of the first and third digital-analog converters are joined together and should form the ortho-phasal input of the Cartesian coordinate digital-analog converter, the input of the pulse scanning unit should form the frequency input of the Cartesian coordinate digital-analog converter, analog inputs of the second and fourth digital-analog converters are joined together and should form the co-phasal input of the Cartesian coordinate digital-analog converter whose ortho-phasal and co-phasal outputs should form, respectively, outputs of the first and second adders, and, besides, the output of the first operational amplifier operating as the proportional-plus-integral speed controller roller should be connected to the ortho-phasal and frequency inputs of the Cartesian coordinate digital-analog converter, the output of the second operational amplifier should be connected to the co-phasal input of the Cartesian coordinate digital-analog converter whose ortho-phasal and co-phasal outputs should be connected, respectively, to the ortho-phasal and co-phasal inputs of the transvector inverter synchronized by the rotor, while the input of the first operational amplifier should be connected to the output of the frequency-voltage converter whose inputs are connected to the outputs of the incremental transducer.

It is advisable that in an electric drive inputs of the Cartesian coordinate digital-analog converter should be connected to the torque forcing unit and the adaptive torque controller, which form, in combination with the Cartesian coordinate digital-analog converter, a phase-vector adaptive control processor whose input should be connected to a mode selection unit, a digital-analog converter, a rotor position digital controller, a code error unit, and a robot control processor; wherein ortho-phasal and co-phasal outputs of the adaptive torque controller should be connected, respectively, to the ortho-phasal and co-phasal inputs of the torque forcing unit, while the ortho-phasal and co-phasal outputs of the torque forcing unit should be connected, respectively, to the ortho-phasal and co-phasal inputs of the Cartesian coordinate digital-analog converter, a frequency output of the adaptive torque controller, which is formed by the output of the second division device of the adaptive torque controller, should be connected to the frequency input of the Cartesian coordinate digital-analog converter whose outputs should form, respectively, the ortho-phasal and co-phasal outputs of the phase-vector adaptive control processor, first and second inputs of the adaptive torque controller should form, respectively, first and second inputs of the phase-vector adaptive control processor whose third input should form the control input of the torque forcing unit, the ortho-phasal and co-phasal outputs of the phase-vector adaptive control processor should advisably be connected, respectively, to the ortho-phasal and co-phasal inputs of the transvector inverter synchronized by the rotor, the first input of the phase-vector adaptive control processor should be connected to an output of a first operational amplifier whose first input is joined with the second input of the phase-vector adaptive control processor and should be connected to the output of the speed transducer, while the second input thereof should be connected to the output of the mode selection unit whose first input should be connected to the output of the digital-analog converter whose digital inputs are to be connected to digital outputs of the rotor position digital controller whose inputs are connected to outputs of the code error unit having its first inputs connected to outputs of the robot control processor and its second inputs to outputs of the incremental transducer, inputs of the robot control processor should be connected to the outputs of the incremental transducer, while two outputs of the robot control processor should be connected to the inputs of the mode selection unit, and a pulse output of the rotor position digital controller should be connected to the third input of the phase-vector adaptive control processor, which is formed by the control input of the torque forcing unit.

Advisably, the electric drive should also comprise a torque drive switch inserted between the output of the first operational amplifier and the first input of the phase-vector adaptive control processor, and two control inputs of the torque drive switch should be connected to two additional outputs of the robot control processor.

Advisably, the electric drive should also comprise a temperature sensitive element built into the induction motor and a temperature adaptation unit which forms, in combination with the phase-vector adaptive control processor, a temperature-adapted phase-vector adaptive control processor, the temperature adaptation unit should comprise a measuring amplifier, a comparison block, an initial temperature setting unit, an overheat limiter, in analog-digital converter, a digital-analog converter, an adder, a comparator, and a maximum value determination unit; measuring inputs of the temperature adaptation unit should advisably be connected to outputs of the temperature-sensitive element and linked to the measuring amplifier, two inputs of the comparison block should be connected to outputs of the initial temperature setting unit and outputs of the measuring amplifier, the output of the comparison block should be connected to inputs of the overheat limiter and to inputs of the analog-digital converter whose digital output forms the digital output of the temperature adaptation unit and should be simultaneously connected to a digital input of the digital-analog converter whose analog input and output should be connected to inputs of the adder, two inputs of the overheat limiter should be connected to inputs of the comparator, a third input of the overheat limiter should be connected to a first input of the maximum value determination unit whose second input should form a torque limiting input of the temperature adaptation unit, the output of the maximum value determination unit should form a torque liming output of the temperature adaptation unit, the output of the comparator should form a temperature blocking output of the temperature adaptation unit, the analog input of the digital-analog converter should form a frequency input of the temperature adaptation unit, the output of the adder should form a frequency output of the temperature adaptation unit, and, besides, the temperature blocking output of the mode selection unit, the input and the torque limiting output of the temperature adaptation unit should be connected, respectively, to the output of the torque limitation non-linearity unit and to the second input of the torque controlled limitation unit of the adaptive torque controller, the frequency input of the temperature adaptation unit should be connected to the frequency output of the adaptive torque controller, which is formed by the output of the second division device of the adaptive torque controller, the frequency output of the temperature adaptation unit should be connected to the frequency input of the phase-vector adaptive control processor, which is formed by the input of the digital-analog converter of Cartesian coordinates, whose ortho-phasal and co-phasal outputs form, respectively, the ortho-phasal and co-phasal outputs of the temperature-adapted, phase-vector adaptive control processor whose digital output is formed by the digital output of the temperature adaptation unit and should be connected to an additional digital input of the robot control processor.

This object is also achieved in that in an electric drive realizing the control method and comprising an induction motor whose stator windings are connected to a power converter, according to the invention, said power converter is a transvector inverter having digital outputs, and ortho-phasal, frequency, and co-phasal inputs, and the electric drive also comprises a magnetic field vector controller, a measuring transducer whose power inputs are connected to power outputs of the transvector inverter and whose power outputs are connected to stator windings of the induction motor, a speed control unit, and a rotor flux amplitude control unit; the magnetic field vector controller comprising two proportional-plus-integral controllers formed, respectively, by the first and third operational amplifiers, a summing synchronous frequency amplifier formed by the second operational amplifier, and a two-vector digital-analog Cartesian coordinate inverse converter whose four first inputs are connected to four measuring outputs of the measuring transducer, while two digital inputs thereof are connected to two digital outputs of the transvector inverter, which are formed by two digital sine and cosine outputs of a unit for transvector generation of the desired instantaneous phase currents of the transvector inverter, the output of an ortho-phasal current measuring device of the two-vector digital-analog Cartesian coordinate inverse converter being connected to the first input of the summing synchronous frequency amplifier whose second input which forms the first control input of the magnetic field vector controller is connected to the output of the speed control unit, an output of a rotor co-phasal flux linkage measuring device of the two-vector digital-analog Cartesian coordinate inverse converter is connected to the first input of the second proportional-plus-integral controller whose second input which is the second control input of the magnetic field vector controller is connected to an output of the rotor flux amplitude control unit; the output of the rotor ortho-phasal flux linkage measuring device of the two-vector digital analog Cartesian coordinate inverse converter is connected to an input of the first proportional-plus-integral controller whose output forms an ortho-phasal output of the magnetic field vector controller, the output of the summing synchronous frequency amplifier forms a frequency output of the magnetic field vector controller, while the output of the second proportional-plus-integral controller forms a co-phasal output of the magnetic field vector controller; the ortho-phasal, frequency, and co-phasal outputs of the magnetic field vector controller being connected, respectively, to the ortho-phasal, frequency, and co-phasal inputs of the transvector inverter.

Advantageously, in the electric drive the two-vector digital-analog Cartesian coordinate inverse converter should be composed of six digital-analog converters having three summing and two inverting amplifiers coupled to the outputs thereof; a cosine function digital input thereof should be connected to digital inputs of the first, third, and fifth digital-analog converters, while a sine function digital input thereof should be connected to digital inputs of the second, fourth, and sixth digital-analog converters; analog inputs of the first and second digital-analog converters should be connected to inputs of the two-vector digital-analog Cartesian coordinate inverse converter, while analog inputs of the fourth and fifth digital-analog converters should be connected to one input of said inverse converter, and analog inputs of the third and sixth digital-analog converters, which are joined together, should be connected to another input of said inverse converter; the output of the first digital-analog converter should be connected, via the first inverting amplifier, to an input of the first summing amplifier, while the output of the second digital-analog converter should be connected directly to another input of said first summing amplifier whose output should form an output of the ortho-phasal current measuring device; outputs of the third and fourth digital-analog converters should be joined with inputs of the second summing amplifier whose output should be an output of the rotor co-phasal flux linkage measuring device; the output of the fifth digital-analog converter should be connected directly to an input of the third summing amplifier, while the output of the sixth digital-analog converter should be connected, via the second inverting amplifier, to another input of the third summing amplifier whose output should be the output of the rotor ortho-phasal flux linkage measuring device; three outputs of the two-vector digital-analog Cartesian coordinate inverse converter should be formed by outputs of measuring devices of the ortho-phasal current, co-phasal and ortho-phasal rotor flux linkages, respectively.

Advisably, in the electric drive the measuring transducer should comprise a current measuring device, a voltage measuring device, four decoupling units, five adders, an inverting amplifier, two inverters; outputs of the current measuring device should be connected to inputs of the first two decoupling units, outputs of the voltage measuring device should be connected to inputs of the third and fourth decoupling units whose outputs are connected to two first inputs of the first adder whose third input is connected, via a second adder, to outputs of the first two decoupling units, the output of the first decoupling unit is connected, via the inverting amplifier, to an input of the third adder, while an output of the fourth decoupling unit is connected directly to another input of the third adder whose output should be connected to an input of the first inverter; the output of the first adder should be connected to an input of the second integrator whose output is connected to a first input of the fourth adder having the second input thereof connected to the output of the second adder; the output of the first integrator should be connected to a first input of the fifth adder having the second input thereof connected to the output of the inverting amplifier, while four measuring inputs of the measuring transducer should be formed, respectively, by the outputs of the second adder, the inverting amplifier, the fifth and fourth adders; the outputs of the fifth and fourth adders being the outputs of a rotor two-phase flux linkage measuring device composed of two integrators and two adders.

The electric drive realizing the disclosed induction motor control method provides invariant control of the induction motor torque in polar and Cartesian coordinates, in steady-state and dynamic conditions, in proportion to a control input assigning the desired induction motor torque. This offers the advantage of increasing the speed of response of a torque electric drive to 0.0005 seconds, broadening the range of integral-action rotor speed control irrespective of the load moment with the ratio of the maximum rotor speed to its minimum speed of 10,000 and higher, broadening the speed signal bandwidth to 250 Hz when the induction motor rotor operates to follow the harmonic signal assigning the rotor speed.

There is provided a high-precision high-speed servo drive based on an induction motor with the positioning accuracy reaching one increment of the pulse transducer.

In addition, an electric drive controlled in the Cartesian coordinates offers the advantage of the utmost use of the induction motor power in terms of the maximum ratio of the induction motor torque to the stator current amplitude, including the optimal use of the saturation level of the induction motor core with the varying amplitude of the rotor flux linkage. In dynamic conditions, the ratio of the induction motor torque factor to the stator current amplitude factor can be doubled, and a ten-fold increase in the induction motor torque can be achieved with only a five-fold increase in the stator current amplitude. A short-time 40% increase in torque, in relation to its steady-state value, can be attained without altering the stator current amplitude.

Moreover, the heating of the induction motor running idle can be cut down at least by a factor of four. In long-time operating periods the heating can be reduced by at least 20 percent. With the dissipation power losses of the inductor motor operating in dynamic conditions limited, rotor acceleration can be stepped up by at least 50 percent. Also, the frequency of positioning cycles can be increased in a robot equipped with induction motors, and the accuracy of speed control and rotor positioning can be improved during temperature adaptation.

An electric drive provided with multi-zone phase-current control can ensure invariant torque control when the induction motor operates at a limited stator current amplitude or a limited stator voltage amplitude. In these conditions, the maximum possible torque of the induction motor can always be achieved.

These advantages of the electric drive realized in accordance with the invention can be used to make the induction motor lighter and smaller, which is important when they are used in actuators. Since lighter weight and smaller size in no way affect the accuracy and speed of induction motors described above, they can be used as actuating electric motors of robots.

The broad range of speeds and improved accuracy of torque control permit the use of the disclosed electric drive in feed drives of NC machine tools.

The electric drive equipped with a vector magnetic field controller can be used to control the speed of an induction motor over a wide range without any transducers installed on the motor shaft and without any transducers mechanically connected with the inductor motor. This makes it possible to utilize this electric drive for spindles and main drives of machine tools.

The disclosed electric drive is, therefore, characterized by superior dynamic, power, and thermal features. In addition, it is extremely accurate in maintaining a zero speed of the rotor, as well as in controlling the rotor speed and position. All this makes it possible to utilize this electric drive equipped with an induction motor as a building-block drive for robots, robot complexes, and flexible manufacturing systems. This makes production equipment much more reliable, its cost and specific consumption of materials lower, and its efficiency much higher. In addition, the servicing and operational costs are substantially cut down.

BRIEF DESCRIPTION OF THE DRAWINGS

Other objects and advantages of the present invention will become more apparent from its following detailed description of preferred embodiments thereof, taken in conjunction with the accompanying drawings, wherein:

FIG. 7 shows a functional block diagram of a torque induction motor drive with optimal phase-current control in Cartesian coordinates, based on the torque maximum in steady-state conditions;

FIG. 8 shows a functional block diagram of a variable-speed induction motor drive having frequency-current control in polar coordinates;

FIG. 9 shows a functional block diagram of a phase-current converter;

FIGS. 13a, b, c, d, e, f show vector diagrams and characteristics of the rotor flux amplitude for three zones of adaptive control;

FIG. 20 shows a schematic of a measuring transducer to

DESCRIPTION OF THE PREFERRED EMBODIMENTS

Figure 1:
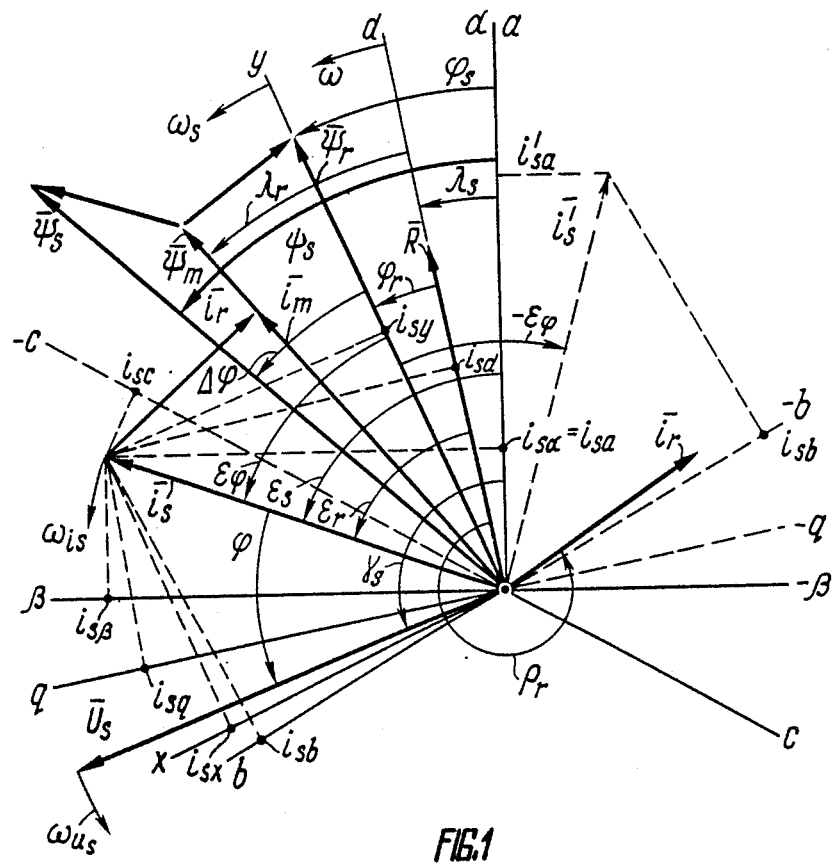
FIG. 1 shows a vector diagram of state vectors of an induction motor, according to the invention.

The following notation system is used in FIGS. 1–20 and the description given below.

$\overline{U}_s$—space vector of stator voltage;

$U_s = |\overline{U}_s|$—amplitude of stator phase voltage, equal to the modulus of the space vector of stator voltage and the stator voltage amplitude;

$\gamma_s$—stator voltage phase equal to the phase angle of the space vector of stator voltage in relation to axis "a" of the reference stator phase winding "A";

$\overline{i}_2$—space vector of stator current;

$i_s = |\overline{i}_s|$—amplitude of stator phase current, equal to the modulus of the space vector of stator current and the stator current amplitude;

$\omega_{is}$—stator current frequency equal to the angular speed of the space vector of stator current;

$\gamma_s$—stator current phase equal to the phase angle of the space vector of stator current in relation to axis "a" of the reference stator phase winding "A".

$\phi$—phase shift of stator voltage in relation to stator current, which is equal to the angle of the space vector of stator voltage $\overline{U}_s$ in relation to the vector of stator current $\overline{i}$;

$\overline{i}_r$—space vector of rotor current and rotor current amplitude, referred to the stator;

$i_r = |\overline{i}_r|$—amplitude of rotor phase current (reduced value), equal to the modulus of the space vector of rotor current and the amplitude of magnetizing current;

$\overline{i}_m$—space vector of magnetizing current;

$i_m = |\overline{i}_m|$—amplitude of magnetizing phase current, equal to the modulus of the space vector of magnetizing current;

$\overline{\psi}_m$—space vector of flux linkage in the air gap;

$\psi_m = |\overline{\psi}_m|$—amplitude of phase flux linkage in the air gap, which is equal to the modulus of the space vector of the rotor flux linkage and the amplitude of the flux linkage in the air gap;

$\overline{\psi}_r$—space vecstor of rotor flux linkage;

$\psi_r = |\overline{\psi}_r|$—amplitude of rotor phase flux linkage, equal to the modulus of the space vector of the rotor flux linkage and to the rotor flux linkage;

$\phi_s$—synchronous phase of the rotor flux linkage, equal to the phase angle of the space vector of the rotor flux linkage in relation to axis "a" of the reference stator winding "A";

$\epsilon_\phi$—phase shift of stator current in relation to the rotor flux linkage, which is equal to the phase angle of the space vector $\overline{i}_s$ of stator current in relation to the space vector of the rotor flux linkage;

$\phi_r$—phase shift of the rotor flux linkage in relation to the rotor axis;

$\Delta\phi$—phase shift of the stator flux linkage in relation to the rotor flux linkage, equal to the phase angle of the space vector $\overline{\psi}_s$ of the stator flux linkage in relation to the space vector of the rotor flux linkage $\overline{\psi}_r$;

$\psi_s$—phase of the stator flux linkage, equal to the phase angle of the space vector of the stator flux linkage in relation to axis "a" of the reference stator winding "A";

$\overline{R}_r$—unit vector of the rotor space position;

$\lambda$—solid angle of rotor axis (unit vector $\overline{R}$) in relation to the stator axis (axis "a" of the reference stator phase winding "A") expressed in electric radians through the number $Z_p$ of pole pairs of the induction motor;

$\epsilon_r$—phase shift of stator current relative to the rotor axis, equal to the phase angle of the space vector of stator current in relation to the rotor vector $\overline{R}$;

a—geometrical axis of the stator cross-section, which coincides with the magnetic axis of the reference stator phase winding "A";

b—geometrical axis of the stator cross-section, which is shifted in the positive direction in relation to the axis "a" to 120°;

c—geometrical axis of the stator cross-section, which is shifted in relation to the axis "a" to 270° in the positive direction;

α—fixed axis of the orthogonal or Cartesian system of coordinates α-β, which coincides with the axis "a" of the reference stator phase winding "A";

β—orthogonal fixed axis of the Cartesian system of coordinates α-β, which is displaced in the plane of the stator cross-section in relation to the fixed axis α to an angle of ±90°, that is counter-clockwise;

Y—synchronous axis of synchronously rotating Cartesian system of coordinates Y-X, which coincides with the direction of the reference space vector;

X—orthogonal axis of the synchronously rotating Cartesian system of coordinates Y-X, which is displaced in the plane of the stator cross-section in relation to the axis Y to an angle of ±90°, that is counter-clockwise;

$\omega_s$—synchronous frequency of the rotor flux linkage, equal to the angular speed of the synchronous rotation of the Cartesian system of coordinates Y-X in relation to the fixed axis α;

d—longitudinal axis of the Cartesian system of coordinates d-q, which coincides with the unit vector $\overline{R}$ of the rotor position;

q—transverse axis of the Cartesian system of coordinates d-q, which is displaced in relation to the axis "d" to an angle of ±90° in the counter-clockwise direction;

$i_{sa} = i_{sa}$—instantaneous phase current in the reference phase winding of the stator;

M—electromagnetic moment of the induction motor in newton-meters ($N_m$), hereinafter referred to as induction motor torque;

$$\Delta\omega = \frac{d\phi_r}{dt}$$

—angular speed of rotation of the space vector $\overline{\psi}_r$ of the rotor flux linkage in relation to the rotor axis $\overline{R}$, equal to the rotor flux slip in radians per second (rad/sec);

*—symbol indicating a desired parameter of the state vector of an induction motor, which is assigned by a control input proportional to the desired parameter of an induction motor;

$i_{sx}*$—desired value of the quadrature torque-producing component of the stator current amplitude, equal to the orthogonal projection of the space vector $\bar{i}_s$ of stator current onto the axis X;

$\omega_s*$—synchronization frequency equal to the desired angular speed of the synchronously rotating system of coordinates Y-X;

$i*_{sy}$—desired value of the quadrature flux-producing components of the stator current amplitude, equal to the projection of the space vector $\bar{i}_s$ of stator current onto the synchronous axis Y;

$\phi*_s$—synchronization phase equal to the desired synchronizing phase of the synchronously rotating system of coordinates Y-X;

sign $\phi*_s$—desired direction of the synchronous rotation of the system of coordinates Y-X;

$i*_{sa}, i*_{sb}, i*_{sc}$—desired instantaneous phase currents of the stator in phase stator windings "A", "B", and "C".

$\omega*_{is}$—desired frequency of stator current, equal to the assigned angular speed of the space vector of stator current;

$\epsilon*_s$—desired stator current phase equal to the desired phase angle of the space vector of stator current in relation to the stator axis "a";

$$i*_s = \sqrt{i_{sx}*^2 + i_{sy}*^2}$$

—desired amplitude of stator current equal to the quadrature sum of two desired quadrature components of stator current;

$$\omega = \frac{d\lambda_s}{dt} = Z_p\omega_m$$

—rotor speed expressed as an angular speed of the rotor unit vector $\overline{R}$ in relation to the stator axis "a";

$\omega_m$—mechanical angular speed of the rotor;

$Z_p$—number of pole pairs of the induction motor;

$\omega*$—desired rotor speed proportional to the value of a control input assigning the rotor speed;

M*—desired torque of an induction motor, proportional to the value of a control input assigning the induction motor torque;

$\psi*_r$—desired amplitude of the rotor flux linkage, proportional to the value of a control input assigning the rotor flux amplitude;

$\psi*_{r\infty}$—desired steady state amplitude of the rotor flux linkage;

$\epsilon*_\phi$—desired phase shift of the stator current vector in relation to the rotor flux linkage vector;

$\Delta\omega*_d$—desired dynamic frequency of stator current, equal to the speed of change of the desired angle of the phase shift $\epsilon*_\phi$;

$i_{ort}$—ortho-phasal current lagging behind or running ahead of the synchronizing phase by ±90°;

$i_{syn}$—co-phasal current whose phase coincides with the synchronizing phase.

The method of induction motor control, according to the invention, consists in that the torque of an induction motor (FIG. 1), which is a product of the amplitude of the stator current $i_s$ and the amplitude $\psi_r$ of the rotor flux linkage by the sine of the angle of the phase shift $\epsilon_\phi$ of the stator current between the instantaneous phase current $i_{sa}$ and the instantaneous phase flux linkage $\psi_{ra}$, which is given by the expression:

$$M = \frac{3}{2} Z_p \frac{L_m}{L_r} \cdot \psi_r \cdot i_s \cdot \sin\epsilon_\phi, \qquad (1)$$

is controlled by changing the rotor flux linkage amplitude in accordance with an optimal law as a function of the induction motor torque $$\psi_r = \psi_{opt}(M). \qquad (2)$$

To this end, control of the instantaneous amplitude of stator current $i_s$ is connected with control of the instantaneous phase $\epsilon_s$ of stator current, which, in this control method, is an autonomous new parameter of interrelated optimal control of dynamic, power, and thermal processes in an induction motor. Phase-after-phase control of instantaneous stator phase currents provides symmetry of instantaneous phase current $i_{sa}$, $i_{sb}$, and $i_{sc}$ of the stator. In such conditions, currents having the same instantaneous amplitude $i_{sma}=i_{smb}==i_{smc}=i_s$ are produced in each of the three phase windings. These currents also have the same controlled instantaneous phase $\epsilon_s$ of stator current and a constant time phase shift $\pm 120°$ between the phases:

$$i_{sa} = i_s(t)\cos(\epsilon_s(t) + \epsilon_{so}), \tag{3}$$
$$i_{sb} = i_s(t)\cos\left(\epsilon_s(t) - \frac{2\pi}{3} + \epsilon_{so}\right)$$
$$i_{sc} = i_s(t)\cos\left(\epsilon_s(t) + \frac{2\pi}{3} + \epsilon_{so}\right)$$

where $\epsilon_{so}$ is the initial instantaneous phase of stator current in the phase winding "A" at the initial moment $t=0$.

The time parameter of induction motor control, which is the stator current phase $\epsilon_s(t)$, is produced for the reference stator phase winding "A". For two other phase windings "B" and "C", the stator current phase is assigned by the phase-after-phase control of the instantaneous currents as shown in equations (3).

The vector diagram (FIG. 1) is compiled for eight space state vectors of an induction motor provided they coincide with respective time state vectors of the reference stator phase winding which is the phase winding "A". This is possible because in an induction motor the time phase shift of phase state vectors in the phase windings "A", "B", and "C" is equal to the space angular shift of the axes "a", "b", and "c" of the phase windings and constitutes the same angle of $\pm 120°$.

It is possible, therefore, by controlling the time phase $\epsilon_s$ of the stator current, to control the angular position of the space vector $\bar{i}_s$ of the stator current and the multidimensional state vector of the induction motor, shown as a "fan" of space state vectors in FIG. 1.

Control of the instantaneous phase $\epsilon_s(t)$ of the stator current is tied up, according to the invention, with control of the instantaneous amplitude of the stator current $i_s(t)$ so that the interrelated change of the argument $\epsilon_s$ and the modulus $i_s$ of the space vector $\bar{i}_s$ of the stator current, which corresponds to this interrelated control, leads to mutual spatial displacement and respective modification of the magnitude of other space vectors of the induction motor state, i.e. arguments and magnitudes of the stator voltage vector $\bar{U}_s$, three flux linkage vectors; stator vector $\bar{\psi}_s$, rotor vector $\bar{\psi}_r$, and air gap vector $\bar{\psi}_m$, the magnetizing current vector $\bar{i}_m$, the rotor current vector $\bar{i}_r$, and the argument of the rotor position unit vector $\bar{R}$.

The process of interrelated control of the stator current phase $\epsilon_s$ and amplitude $i_s$ should be a process of interrelated control of the rotor flux linkage phase and amplitude (argument $\phi_s$ and modulus $\psi_r$ of the vector $\bar{\psi}_r$ in FIG. 1). It is to provide an optimal process of control of the magnetic field as a function of the induction motor torque in accordance with the formula (2) which is a condition to be fulfilled to reach the functional extremum which expresses dynamic, power, and efficiency criteria for the induction motor control: the stator current minimum, the power loss minimum, the induction motor heating minimum, the induction motor torque maximum, the maximum of the induction motor power output, operational speed maximum, the maximum of positioning cycle frequency, the minimum of expenses for hardware, minimum of external transducers mechanically connected to the induction motor, minimal cost of the induction motor drive. This multicriterion approach to optimal control, which also takes into account restrictions of controlled parameters (limitations concerning amplitudes $i_s$ and $U_s$ of the stator current and voltage, and the induction motor temperature), defines multi-zone optimal laws for controlling the stator current phase $\epsilon_s$. The invention, therefore, offers a plurality of methods to control the stator current phase $\epsilon_s$ and electric drives realizing these methods.

According to the invention, the optimal control condition (formula 2) is an imperative but inadequate condition for control of the stator current phase $\epsilon_s$. The adequate condition is the induction motor control condition expressed as an invariant condition of the induction motor torque control:

$$M^*(t)=M(t), \tag{4}$$

where $M^*(t)$ is the desired induction motor torque assigned by a control input in proportion with the input action, while $M(t)$ is the actual induction motor torque.

With the analog setting of the desired torque $M^*$, the invariant condition (4) means the following equation is satisfied:

$$M(t)=K_M \cdot U_M(t), \tag{5}$$

where $U_M(t)$ is the input analog voltage assigning the desired torque $M^*(t)$, and $K_M$ is the torque transfer ratio of the induction motor drive.

With any changes of the desired torque $M^*(t)$ or the input analog voltage $U_M(t)$, including abrupt or alternating changes, the invariant condition (4) or (5) is satisfied, irrespective of the load torque and rotor speed, with a minimal dynamic error $$|\Delta M_d| \leq \Delta_{min}, \tag{6}$$

where $\Delta_{min}$ is the admissible pulsation of the induction motor torque, which amounts to only a few percent of the nominal induction motor torque: $\Delta_{min} \leq 0.05 \, M_n$, where $M_n$ is the nominal induction motor torque.

Constraints imposed on control by conditions in equations (1) through (6) are given by $$\left.\begin{array}{l} i_s \leq i_{s\,max}, \\ U_s \leq U_{s\,max}, \\ \theta_s \leq \theta_{s\,max}, \end{array}\right\} \tag{7}$$

where $i_{s\,max}$ and $U_{s\,max}$ are, respectively, the maximum amplitude of the stator phase current and voltage, admissible during the control process;

$\theta_s$ is the actual temperature (°C.) of the stator winding insulation, and $\theta_{s\,max}$ is the maximum admissible temperature (°C.) of the stator winding insulation.

The optimization criterion is defined by the condition of the functional minimum $$J(M)=J_{min}, \tag{8}$$

where J(M) is a function of the induction motor torque, expressing the dependence of the stator current amplitude, power losses, or motor heating on the induction motor torque, duration of the transient process, positioning time, electric drive adjustment time.

The condition in equation (2) is the solution to the objective of optimal phase-current control, expressed by the optimization condition in equation (8) and invariant condition in equation (4). This solution is realized in a method of stator current phase control, which is based on the use of interconnections of angles and magnitudes of eight state vectors shown in FIG. 1 and solution of a system of non-linear differential equations describing electromagnetic transient process in an induction motor.

State vector angles are connected as follows $$\epsilon_s = \lambda_s + \phi_r + \epsilon_\phi; \tag{9}$$

$$\phi_s = \lambda_s + \phi_r; \tag{10}$$

$$\psi_s = \lambda_s + \phi_r + \Delta\phi; \tag{11}$$

$$\gamma_s = \lambda_s + \phi_r + \epsilon_\phi + \phi. \tag{12}$$

The air gap flux vector $\overline{\psi}_m$ is connected with the magnetizing current vector $\overline{i}_m$ and expressed via the mutual inductance $L_m$, since these vector directions coincide, i.e.

$$\overline{\psi}_m = L_m \overline{i}_m \tag{13}$$

The value of the mutual inductance $L_m$ is determined by the saturation level of the magnetic core of the induction motor through the main path of magnetic induction distribution. The relation of the mutual inductance $L_m$ and the saturation level of the magnetic core can be found from the magnetizing characteristic of an induction motor $E_{1n} = F(i_m)$ (cf., for example, Bulletin de SEV, Zürich, 1974, N 3, pp. 164–165), which can be reduced to an approximate analytical dependance of the absolute values of the vectors $\overline{\psi}_m$ and $\overline{i}_m$ $$\psi_m = \psi_k \cdot \text{arctg} \frac{i_m}{i_k}, \tag{14}$$

where $\psi_k$ and $i_k$ are constant approximated values of the induction motor magnetization curve.

It follows from the equations (13) and (14) that mutual inductance depends on the amplitude of the magnetic flux linkage in the air gap $\psi_m = |\overline{\psi}_m|$:

$$L_m = \frac{\psi_m}{i_m} = \frac{\psi_m}{i_k} \text{ctg} \frac{\psi_m}{\psi_k}. \tag{15}$$

Connection of flux linkage vectors is expressed as follows:

$$\overline{\psi}_r = \overline{\psi}_m + L_{\delta r} \overline{i}_r, \tag{16}$$

$$\overline{\psi}_s = \overline{\psi}_m + L_{\delta s} \overline{i}_s, \tag{17}$$

where $L_{\delta r}$ and $L_{\delta s}$ are leakage inductances of, respectively, the rotor and stator.

Connection of magnetizing current vectors of the stator current and rotor current is expressed as follows:

$$\overline{i}_m = \overline{i}_s + \overline{i}_r. \tag{18}$$

It follows from the equations (16)–(18) that the stator current vector $\overline{i}_s$ is connected to the stator flux linkage vector $\overline{\psi}_s$ and the rotor flux linkage vector $\overline{\psi}_r$ by the following vector equation:

$$\overline{i}_s = \frac{1}{\delta \omega_s} \overline{\psi}_s - \frac{L_m}{\delta \cdot L_s \cdot L_r} \cdot \overline{\psi}_r, \tag{19}$$

where $$\delta = 1 - \frac{L_m^2}{L_s \cdot L_r}$$

is the resulting leakage factor,
$L_s = L_m + L_{\sigma s}$ is stator inductance,
$L_r = L_m + L_{\sigma r}$ is rotor inductance.

Equations (13), (16), (17), and (19) connecting the current triangle with two flux triangles demonstrate that phase-current control of an induction motor involves a complex interrelated expansion of the vector "fan" both in angles and in magnitudes.

The rules of these connections are found from differential equations, for stator and rotor circuits, in the rotating Cartesian system of coordinates Y-X:
for the stator circuit $$\frac{d\psi_{sy}}{dt} = \omega_k \psi_{sk} + U_{sy} - R_s i_{sy}, \tag{20}$$

$$\frac{d\psi_{sx}}{dt} = -\omega_k \psi_{sy} + U_{sx} - R_s i_{sx}; \tag{21}$$

for the rotor circuit $$\frac{d\psi_{ry}}{dt} = -\frac{R_r}{L_r} \psi_{ry} + (\omega_k - \omega)\psi_{rx} + \frac{R_r}{L_r} L_m \cdot i_{sy} \tag{22}$$

$$\frac{d\psi_{rx}}{dt} = -\frac{R_r}{L_r} \psi_{rx} - (\omega_k - \omega)\psi_{ry} + \frac{R_r}{L_r} \cdot L_m \cdot i_{sx} \tag{23}$$

where $\omega_k$ is an arbitrary angular speed of the Y-X Cartesian system of coordinates, which is set in the process of control synchronization.

In known induction motor control system, the law of constant rotor flux $$\psi_r = \psi_{rn} = \text{const}, \tag{24}$$

is used in order to ensure torque control while trying to satisfy condition (4). This law simplifies connections in the rotor circuit equations, provided that the axis of the rotor flux vector $\overline{\psi}_r$ coincides with the axis Y of the Cartesian system of coordinates. It follows from equation (22) that $$\left. \begin{array}{l} \psi_r = \psi_{ry} = L_m \cdot i_{sy}, \\ \psi_{rx} = 0 \end{array} \right\} \tag{25}$$

and it follows from equation (23) that $$\psi_{rx} = 0$$

$$\Delta\omega = (\omega_k - \omega) = \frac{R_r}{L_r} L_m \frac{i_{sx}}{\psi_r} \tag{26}$$

In this case, one projection of the stator current vector onto the Y axis, which is referred to the rotor flux linkage vector, is proportional to the desired constant amplitude $\psi^*_{ro}$ of the rotor flux linkage, which is assigned by the control input $\psi^*_{ro}=\psi_{ro}$:

$$i_{sy} = \frac{\psi^*_{ro}}{L_m}. \tag{27}$$

It is not enough to meet the requirement (27) to stabilize the amplitude $\psi_{ro}$ of the rotor flux linkage. It is still necessary to additionally control the second projection $i_{sx}$ of the stator current vector $\bar{i}_s$ and the slip $\Delta\psi$ of the rotor flux linkage in relation to the rotor, which are equal to the difference in angular speeds of vector $\psi_r$ and $\bar{R}$, in accordance with the following laws:

$$i_{sx} = \frac{2L_r}{3Z_p L_m \psi^*_{ro}} \cdot M^*, \tag{28}$$

$$\Delta\omega = \omega_s - \omega = \frac{2R_r}{3Z_p(\psi^*_{ro})^2} M^*. \tag{29}$$

Equations (27)–(29) are the algorithm used to control an induction motor in synchronously rotating Cartesian coordinates with a constant rotor flux linkage. The control algorithm provides for a sequency of interrelated actions and operations involving parameters of the stator current of the induction motor as functions of two control inputs $\psi^*_{ro}$ and $M^*$ and as a function of the measured rotor speed $\omega$.

This process of subjecting the stator current phase $\epsilon_s$ and instantaneous amplitude $i_s$ to interrelated control actions characterizes the method of phase-current control.

The rotor flux slip $\Delta\omega$ is, according to equation (10), connected with the rotor flux synchronous phase $\phi_s$, because the instantaneous synchronous frequency $\omega_s$ of the rotor flux linkage, which is equal to the angular speed of the space vector $\psi_r$ of the rotor flux linkage in relation to the stator axis "a", is equal to the speed of change of the synchronous phase $\phi_s$ of the rotor flux linkage:

$$\omega_s = \frac{d\phi_s}{dt}. \tag{30}$$

Equations (10) and (30) can be used to produce an equation for the rotor flux slip $$\Delta\omega = \frac{d\phi_r}{dt} = \frac{d\phi_s}{dt} - \frac{d\lambda_s}{dt}, \tag{31}$$

where $\frac{d\lambda_s}{dt} = \omega$, is the rotor speed.

It follows from equation (31) that the rotor flux synchronous phase $\phi_s$ should advisably be controlled by sweeping (integrating) the sum of the rotor flux slip $\Delta\omega$ and rotor speed $\omega$ $$\phi_s = \int_{t_1}^{t_2} \omega_s(t)dt = \int_{t_1}^{t_2} (\omega + \Delta\omega)dt, \tag{32}$$

where $t_1$ and $t_2$ are the initial and final instants of the control process.

The rotor speed $\omega$ is controlled by means of a tachometer generator, while the rotor flux slip $\Delta\omega$ is assigned by a control input proportional to the desired induction motor torque $M^*$ in accordance with the control law (29).

In order to realize the control laws (27) and (28), conditions (25) and (26) should be realized to refer the vector $\bar{i}_s$ to the vector $\bar{\psi}_r$. These conditions (25) and (26) should advisably be realized by synchronization of control of the stator current vector $\bar{i}_s$ by the synchronizing frequency $\omega^*_s$ equal to the desired frequency of the rotor flux linkage. In this case, the synchronizing frequency $\omega^*_s$ is controlled in accordance with the following law $$\omega^*_s = \omega + \frac{2R_r}{3Z_p(\psi^*_{ro})^2} \cdot M^*, \tag{33}$$

while the synchronizing phase $\phi^*_s$ equal to the angular position of the reference axis Y of the synchronously rotating X-Y Cartesian system of coordinates in relation to the stationary axis "a" of the stator, is produced by sweeping the synchronizing frequency $\omega^*_s$:

$$\phi^*_s = \int \omega^*_s dt = \int [\omega(t) + \Delta\omega(M^*, \psi^*_r)]dt. \tag{34}$$

Since the sweep is continuous in the process of control synchronization, and the control processes for a symmetrical three-phase induction motor are independent of the initial phase of control synchronization, an indefinite integral can be used in the equation (34) for the synchronizing phase $\phi^*_s$.

The method of control synchronization, according to the invention, consists in controlling the synchronizing phase $\psi^*_s$ and the object state vector in relation to the controlled synchronizing phase.

Equations (27) and (28) describe control of the stator current time vector $\bar{i}_s$ in relation to the synchronizing phase $\phi^*_s$ controlled according to the law (34).

The stator current vector $\bar{i}_s$ is characterized, in relation to the synchronizing phase $\phi^*_s$, by a modulus $i_s$ and argument $\epsilon\phi$ FIG. 1) or two projections: of the flux-producing component of the stator current amplitude, equal to $$i_{sy} = i_s \cos \epsilon\phi, \tag{35}$$

and of the torque-producing component of the stator current amplitude, equal to $$i_{sx} = i_s \sin \epsilon\phi. \tag{36}$$

When referred to the rotor flux vector, the angle $\epsilon\phi$ is physically the angle of the phase shift between the instantaneous stator phase current in the reference stator phase winding "A" and the instantaneous rotor phase flux linkage related to the same reference phase winding "A".

Two-phase stator current $i_{s\alpha}$ and $i_{s\beta}$ which characterizes projections of the stator current vector $\bar{i}_s$ onto the axes "$\alpha$" and "$\beta$" of the stationary $\alpha$, $\beta$. Cartesian system of coordinates, which is referred by the axis "$\alpha$" in the direction of the axis "a" of the reference phase winding "A", is given by the following equations describing transformation from Y-X Cartesian coordinates into $\alpha$, $\beta$ Cartesian coordinates:

$$i_{sa} = i_{sy} \cdot \cos \phi^*_s - i_{sx} \cdot \sin \phi^*_s, \quad (37)$$

$$i_{s\beta} = i_{sy} \cdot \sin \phi^*_s + i_{sx} \cdot \cos \phi^*_s. \quad (38)$$

Three-phase stator current $i_{sa}$, $i_{sb}$, and $i_{sc}$ is produced, providing that the sum of instantaneous phase currents is equal to zero $i_{sa} + i_{sb} + i_{sc} = 0$, in accordance with the obtained two-phase stator current as follows:

$$\left. \begin{array}{l} i_{sa} = i_s\alpha \\ i_{sb} = \dfrac{\sqrt{3}}{2} \cdot i_{s\beta} - \tfrac{1}{2} \cdot i_{s\alpha} \\ i_{sc} = -\dfrac{\sqrt{3}}{2} \cdot i_{s\beta} - \tfrac{1}{2} \cdot i_{s\alpha} \end{array} \right\} \quad (39)$$

It follows from the equations (37)–(39) that, in order to unambiguously assign instantaneous stator phase currents, it is sufficient to assign the synchronizing phase $\phi^*_s$ and two quadrature components of the stator current amplitude, i.e. the torque-producing component $i_{sx}$ and the flux-producing component $i_{sy}$. In this case, the synchronizing phase should be controlled, as shown in equation (34), as a function of the reference vector slip $\Delta\omega$, whose phase coincides with the synchronizing phase.

Equations (34), (37), and (38) of control synchronization are realized, according to the invention, whatever laws are used to control the magnetic field and the induction motor torque.

Control synchronization permits realization of the algorithm of the stator current vector control without measuring the reference vector, while maintaining the linear connection of the control input M* and the actual induction motor torque M. Besides, control synchronization also permits control of the angular position of the reference vector and its module, that is the angular position and the magnetic field, in accordance with optimal laws and at each moment of time.

With the constant amplitude of the rotor flus linkage, the control algorithm expressed by equations (27), (28), and (29) is very simple, since it is realized according to proportional laws.

A non-linear control object (induction motor) assumes properties of a linear object with the establishment of linear coupling between the input and output. One of the main objectives of induction motor control, invariant control of the induction motor torque according to equation (4), is achieved by using the control algorithm (27)–(29) and introducing synchronization as in equations (34), (37), (38), and (39).

This method of control system synthesis, hereinafter referred to as a method of algorithmic linearization, is the basis of the disclosed vector control method.

The method of algorithmic linearization was used above with the control principle (24) which is the simpliest equation to realize, but which none the less cannot provide optimal power characteristics of an induction motor when the motor torque varies over a wide range $$\left| \dfrac{M}{M_n} \right| \leq \mu_{max} \quad (40)$$

where $\mu_{max}$ is the maximum factor of the induction motor torque, which is equal to the permissible dynamic torque overload and can vary from 2 to 10.

If the value of M is close to zero, a constant amplitude of the rotor flux linkage maintained at a nominal level $\psi^*_{r0} = \psi_{rn}$ according to equation (27) can result in great losses of power $\Delta P_\psi$ in the stator windings, wasted on the magnetic field excitation:

$$\Delta P_\psi = \dfrac{3}{2} R_s \left( \dfrac{\psi_{rn}}{L_m} \right)^2, \quad (41)$$

where $R_s$ is the resistance of the stator phase winding.

If the value of M is close to maximum, $M = \mu_{max} \cdot M_n$, with the nominal level of the constant amplitude of the rotor flux linkage $\psi^*_{r0} = \psi_{rn}$, the torque-producing component $i_{sx}$ of the stator current amplitude is too high, according to equation (28), due to insufficiently high rotor flux amplitude. And this leads to the stator current amplitude growing in excess of permissible levels, losses in power, and heating of the stator winding.

The stator current vector is controlled, according to the invention, with varying magnitude of the magnetic field, which is characterized by varying amplitude of the rotor flux linkage, proceeding from the condition of the minimal amplitude of stator current for a given induction motor torque M $$i_s = \sqrt{i_{sy}^2 + i_{sx}^2} = i_{s\,min} \quad (42)$$

Figure 2:
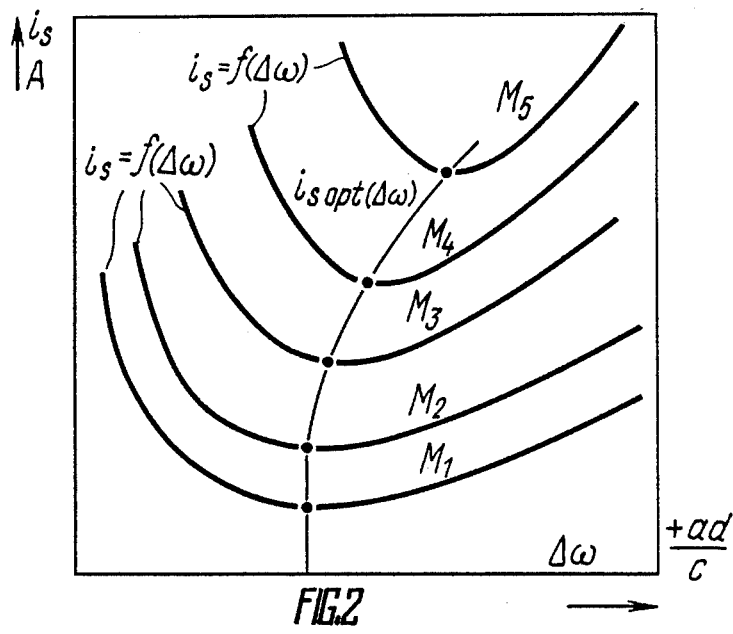
FIG. 2 shows a stator current amplitude in steady-state conditions versus the motor flux linkage slip with specific torques of an induction motor; and an optimal, in terms of minimal current, dependence of the stator current amplitude to the rotor flux linkage slip.
Figure 3:
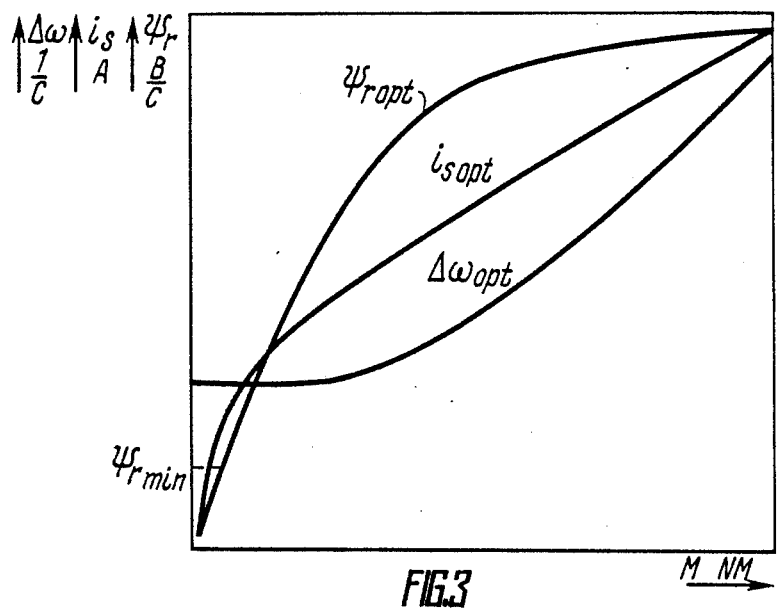
FIG. 3 shows optimal, in terms of minimal current, rotor flux linkage amplitudes, stator current amplitudes, and rotor flux linkage slip values as functions of the induction motor torque.

The method of induction motor control, based on the minimal stator current for static conditions is explained by plots of FIG. 2 illustrating stator current amplitude $i_s$ as a function of the slip $\Delta\omega$ with various torques $M_j$ (j = 1, 2, 3, ...) of the induction motor. FIG. 3 shows laws, optimized in terms of minimal current, of controlling the rotor flux linkage amplitude $\psi_{r\,opt}$, the stator current amplitude $i_{s\,opt} = i_{s\,min}$, and the rotor flux linkage slip $\Delta\omega_{opt}$ in response to variations of the induction motor torque M.

In order to produce, without delay, the initial starting torque $M_o$, a constant minimal amplitude $\psi_{r\,min}$ of the rotor flux linkage is set for the law of the rotor flux amplitude $\psi_{r\,opt}$. This is done by assigning a low initial constant value of the flux-producing component of the stator current amplitude $i_{so} = i_{sy\,min} = \psi_{r\,min}/L_m$ (not shown).

The minimal amplitude $\psi_{r\,min}$ of the rotor flux linkage is produced in accordance with two parameters. The more the maximum permissible amplitude $i_{s\,max}$ of stator current and the less the desired initial torque $M_o$ of the induction motor, the less the minimal amplitude $\psi_{r\,min}$, proceeding from the condition:

$$\sqrt{\left( \dfrac{\psi_{rmin}}{L_m} \right)^2 + \left( \dfrac{2}{3Z_p} \cdot \dfrac{L_r}{L_m} \cdot \dfrac{M_o}{\psi_{rmin}} \right)^2} \leq i_{smax} \quad (43)$$

In order to minimize the stator current $i_s \leq i_{s\,min}$ in static conditions, the desired torque M* and the actual torque M of the induction motor being kept constant in time, that is when the condition $$\frac{dM^*}{dt} = \frac{dM}{dt} = 0 \qquad (44)$$

is satisfied, the optimal, by the stator current minimum, value of the stator current slip in relation to the rotor should be set on the basis of the optimization condition $$\frac{M}{i_s} = \left(\frac{M}{i_s}\right)_{max}, \qquad (45)$$

where $(M/i_s)_{max}$ is the maximum ratio of the induction motor torque to the stator current amplitude.

To satisfy the condition (45) of optimal control based on the stator current minimum, according to the invention, symmetrical instantaneous stator phase currents are produced in accordance with equations (3). Simultaneously, the stator current phase $\epsilon_s(t)$, frequency $\omega_{is}(t)$, and amplitude $i_s(t)$ are controlled as functions of the desired induction motor torque M*.

To realize the disclosed method, an induction motor drive featuring a transvector inverter is proposed.

An electric drive, according to the invention, comprises an induction motor 1 whose stator windings are connected to outputs of a transvector inverter 2.

Figure 4:
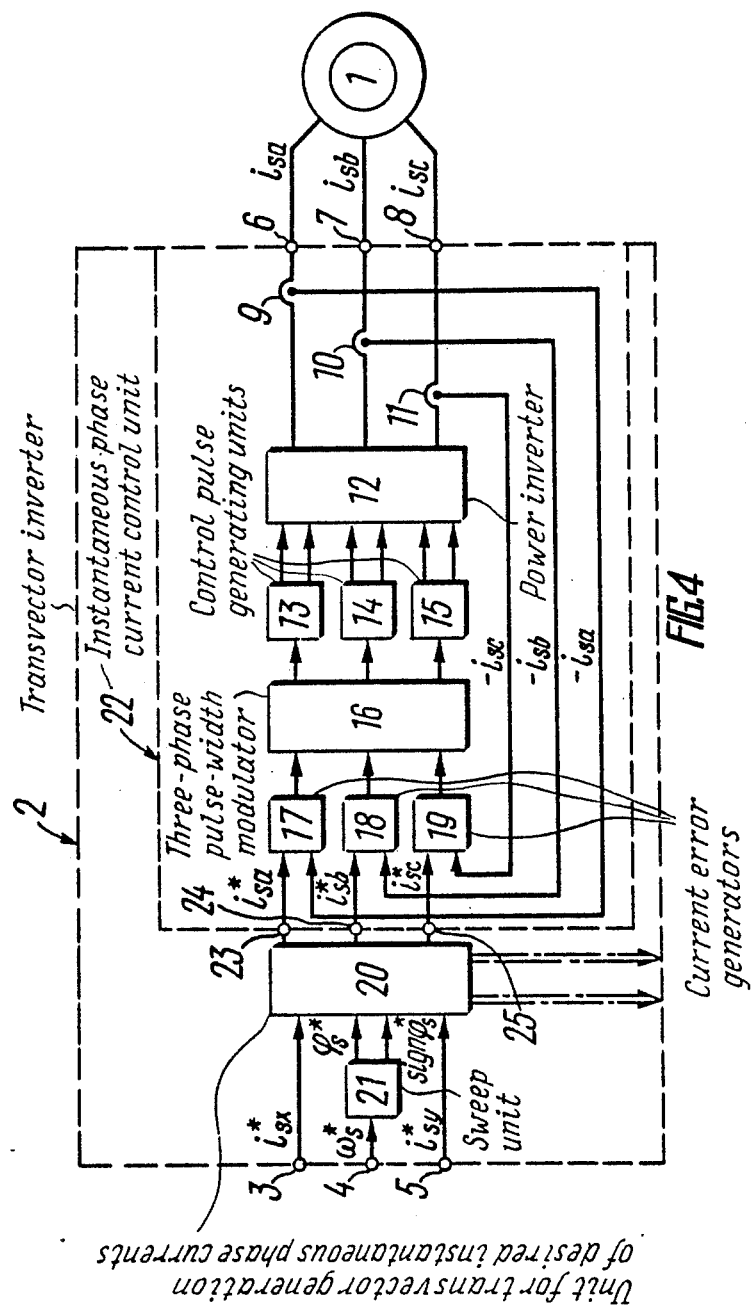
FIG. 4 shows a functional block diagram of a transvector inverter.

Referring to FIG. 4, a generalized functional block diagram shows an electric drive featuring the transvector inverter 2.

The transvector inverter 2 has three control inputs 3, 4, and 5. The number of power outputs of the transvector inverter 2 corresponds to the number of load phases. For a three-phase induction motor 1, the transvector inverter 2 is provided with three power outputs 6, 7, and 8 connected to terminals of stator phase windings of the induction motor 1. Information outputs which can be used for induction motor control devices are not shown in FIG. 4.

The three outputs 6, 7 and 8 are connected, via stator instantaneous phase current transducers 9, 10, and 11, to three outputs of a power inverter 12, which is a conventional inverter described, for example, in U.S. Pat. No. 4,384,244 IPC³ HO2P5/40, 1983.

The three-phase version of the power inverter 12 comprises six switching elements (not shown), for example, six power transistor switches, each switch having a control input which forms the control input of the power inverter 12.

Six control inputs of the power inverter 12 are connected, in pairs, to outputs of control pulse generating units 13, 14, and 15 which are built around standard circuits (cf., for example, U.S. Pat. No. 4,384,244 IPC³ HO2P 5/40, 1983). Two inputs of each unit 13, 14, and 15 are connected to control inputs of two switching elements of a respective phase of the power inverter 12.

Inputs of the control pulse generating units 13, 14, and 15 are connected to outputs of a three-phase pulse-width modulator 16 whose three inputs are connected to outputs of generators 17, 18, and 19 of current errors, which use conventional circuits (cf., for example, U.S. Pat. No. 4,384,244 IPC³ HO2P 5/40, 1983; and U.S. Pat. No. 4,418,308 IPC³ HO2P 5/34, 1983). Information outputs of the instantaneous phase current transducers 9, 10, and 11 are connected to first inputs of the current error generators 17, 18, and 19 of respective phases "a", "b", or "c". The three-phase pulse-width modulator 16 can be used on conventional circuits (cf., for example, U.S. Pat. No. 4,348,244 IPC³ HO2P 5/40, 1983; and U.S. Pat. No. 4,418,308 HO2P 5/34, 1983). Second inputs of the current error generators 17, 18, and 19 are connected to outputs of a unit 20 for transvector generation of desired instantaneous phase currents.

The unit 20 for transvector generation of desired instantaneous phase currents can be based on conventional circuits (cf., for example, USSR Inventor's Certificate No. 1,064,411 IPC³ HO2P 5/34).

A first input of the unit 20 for transvector generation of desired instantaneous phase currents constitutes the first input 3 of the transvector inverter 2. Two other inputs of the unit 20 for transvector generation of instantaneous phase currents are connected to outputs of a sweep unit 21 whose input constitutes the second input 4 of the transvector inverter 2. A fourth input of the unit 20 constitutes the third input 5 of the transvector inverter 2.

Operation of an electric drive equipped with a transvector inverter 2 is based on the following principles.

Referring to FIG. 4, the functional diagram of the transvector inverter 2 is composed of two parts. One part is inserted at the input of the transvector inverter 2 and comprises the sweep unit 21 and the unit 20 for transvector generation of desired instantaneous phase currents, which are connected in series. In this part of the transvector inverter 2 the stator current vector $\bar{i}_s$ is controlled by three control inputs $i^*_{sx}$, $\omega^*_s$, and $i^*_{sy}$. The control coordinates are not stationary, the system of coordinates is rotating, and the rotational speed of the system (synchronizing frequency $\omega^*_s$) is assigned by a control input $\omega^*_s$ supplied to the input 4 which is the input of the sweep unit 21.

The other part of the transvector inverter 2, which is connected by the inputs thereof to outputs of the unit 20 in the first part of the transvector inverter 2, is a unit 22 for controlling instantaneous phase currents, which comprises a totality of elements 9, 10, 11, 12, 13, 14, 15, 16, 17, 18, and 19.

In the instantaneous phase current control unit 22 the stator current vector $\bar{i}_s$ is controlled by three control inputs in stationary coordinates of the three-phase system "a", "b", and "c". Signals assigning instantaneous phase currents $i^*_{sa}$, $i^*_{sb}$, and $i^*_{sc}$ of the induction motor stator, whose phase $\epsilon^*_s$, frequency $\omega^*_{is}$, and amplitude $i^*_s$ can be controlled, are applied to inputs 23, 24, and 25 of the instantaneous phase current control unit 22, which are connected to the outputs of the unit 20 for transvector generation of desired instantaneous phase currents and constitute inputs of the current error generators 17, 18, and 19.

A symmetrical three-phase system of currents $i_{sa}$, $i_{sb}$, and $i_{sc}$ is provided, by pulse-width modulation control of the current in each phase, at the output of the unit 22 for controlling instantaneous phase currents. The phase $\epsilon_s$, frequency $\omega_{is}$, and amplitude $i_s$ of these currents corresponds to the assigned values $\epsilon^*_s$, $\omega^*_{is}$, and $i^*_s$ at the input of the unit 22.

Physically, autonomous control of the stator current phase $\epsilon_s$ performed by the transvector inverter 2 means purposeful modification of the shape of phase currents of the induction motor stator within each quarter period of the stator current and at each particular moment of time. In this case, the closed-loop speed control system of an induction motor automatically produces the shape of stator phase currents, which corresponds to the final objective of the induction motor control. Here, a harmonic law of phase current control can only be produced in static conditions of the induction motor 1, when the speed and load moment are on a steady-state level.

When the transvector inverter 2 (FIG. 4) is connected to the stator phase windings of the induction motor 1, it operates as follows.

In absence of control pulses applied to the inputs 3, 4, and 5, a sequence of bidirectional voltage pulses is produced at the power outputs 6, 7, and 8 with a constant frequency of the order of 2.5–4 kHz, duration of negative and positive pulses being the same. In consequence, the averaged instantaneous stator phase current (with a certain measure of pulsations) in each stator phase winding is equal to zero.

When no signal $\omega^*_s=0$ is applied to the frequency input 4, and a constant control action is applied to one of the two other inputs 3 or 5, e.g. a constant signal $i^*_{sy}=i^*_{syo}$ applied to the input 5, currents $i_{sa}$, $i_{sb}$, $i_{sc}$ are caused to flow in the stator windings of the induction motor 1 with some minor pulsations. The average magnitude of currents in each phase depends on three conditions: first, the sum of the three currents $i_{sa}+i_{sb}+i_{sc}$, allowing for their polarities, is equal to zero; second, current magnitudes and their polarities are related as in equation (3) for some arbitrary constant of the initial instantaneous phase $\epsilon_{so}$ of the stator current in the absence of phase changes $\epsilon_s(t)=0$; and, third, the stator current amplitude $i_s$ which is an element of the equation (3) is equal to the quadrature sum of the quadrature components $i^*_{sx}$ and $i^*_{sy}$ of the stator current, which are assigned at the inputs 3 and 5 of the transvector inverter 2 with $i^*_{sy}=0$ and $i_{sy}=i_{syo}$, $i_s=i_{syo}$.

These conditions for adjusting the desired currents are satisfied due to the negative feedbacks, involving phase currents $i_{sa}$, $i_{sb}$, and $i_{sc}$ of the stator, measured by means of the instantaneous phase current transducers 9, 10, and 11. The switching elements of the power inverter 12, e.g. transistors, are switched by pulses fed from the outputs of the control pulse generating units 13, 14, and 15.

These pulses are generated by the three-phase pulse-width modulator 16 individually for each phase "a", "b", and "c". The length of these pulses depends on the difference between the desired and measured instantaneous phase current.

The error signals are calculated and converted in the current error generators 17, 18, and 19 whose control inputs receive, from the outputs of the unit 20 for transvector generation of the desired instantaneous phase currents, three-phase signals for assigning the stator current, e.g. in the form of three control voltages $U_i^*_{sa}$, $U_i^*_{sb}$, and $U_i^*_{sc}$.

A three-phase signal assigning these control voltages is produced in the unit 20 as a function of control input actions supplied to the inputs 3, 4, 5 of the transvector inverter 2. The initial instantaneous phase $\epsilon_{so}=\psi_{so}$ of the three-phase signal is set in the unit 20 in an arbitrary manner, which is possible in induction motor control.

With $i^*_{sy}=i^*_{syo}$, $\omega^*_s=0$, and $i^*_{sx}=0$, when the signals prescribing control voltages $U_i^*_{sa}$, $U_i^*_{sb}$, and $U_i^*_{sc}$ are generated, the following constant currents are produced at the output of the transvector inverter 2:

$$i_{sa} = i^*_{syo} \cdot \cos \phi_{so}, \qquad (46)$$
$$i_{sb} = i^*_{syo} \cdot \cos(\phi_{so} - \tfrac{2}{3}\pi),$$
$$i_{sc} = i^*_{syo} \cdot \cos(\phi_{so} + \tfrac{2}{3}\pi),$$

where $i^*_{syo}=K_i U_i^*_{syo}$, $K_i$ is a current transfer ratio.

When the input 3 receives a constant signal prescribing another desired stator current amplitude component $i^*_{sxo}=K_i U^*_{isxo}$, the stator current phase $\epsilon_s$ undergoes an abrupt change with the control time not more than 0.0005 sec. This is due to the unit 20 calculating signals prescribing control voltages $U_i^*_{sa}$, $U_i^*_{sb}$, and $U_i^*_{sc}$ and assigning desired instantaneous phase currents $i^*_{sa}=K_i U_i^*_{sa}$, $i^*_{sb}=K_i U_i^*_{sb}$, and $i^*_{sc}=K_i U_i^*_{sc}$ according to the following equations for vector transformation from the initial Cartesian coordinates Y-X into the stationary three-axis system of coordinates "a", "b", "c".

$$\begin{aligned}
i_{sa} &= i_{sy} \cdot \cos\phi^*_s - i^*_{sx} \cdot \sin\phi^*_s; \\
i_{sb} &= \frac{\sqrt{3}}{2} \cdot i^*_{sy} \cdot \sin\phi^*_s + \frac{\sqrt{3}}{2} \cdot i^*_{sx} \cdot \cos\phi^*_s - \\
&\quad \frac{1}{2} \cdot i^*_{sy} \cdot \cos\phi^*_s + \frac{1}{2} \cdot i^*_{sx} \cdot \sin\phi^*_s; \\
i_{sc} &= -\frac{1}{2} \cdot i^*_{sy} \cdot \cos\phi^*_s + \frac{1}{2} \cdot i^*_{sx} \cdot \sin\phi^*_s - \\
&\quad \frac{\sqrt{3}}{2} \cdot i^*_{sy} \cdot \sin\phi^*_s - \frac{\sqrt{3}}{2} \cdot i^*_{sx} \cdot \cos\phi_s.
\end{aligned} \qquad (47)$$

In conformity with these equations (47), the phase shift $\epsilon_\phi=\Delta\epsilon$ of the stator current vector $\bar{i}_s$ in relation to its initial phase $\phi^*_{so}=\epsilon_{so}$ is determined by the inverse tangent function of the ratio of the control inputs applied to the inputs 3 and 5 of the transvector inverter 2:

$$\Delta\epsilon_s = \mathrm{arctg}\, \frac{U i^*_{sx}}{U i^*_{sy}} = \mathrm{arctg}\, \frac{i^*_{sx}}{i^*_{sy}}. \qquad (48)$$

Equation (48) is realized in the transvector inverter 2 by generating instantaneous stator phase currents conformably to the law (47) which characterizes the assignment of the vector $\bar{i}_s$ of the stator current by its projections $i_{sx}$ and $i_{sy}$ in the Cartesian coordinates Y-X with the initial turning angle of the axis Y relative to the reference stationary axis "a" of the reference stator phase winding "A" to the initial angle $\epsilon_{so}=\phi^*_{so}$.

And, consequently, when a second signal prescribing the current component $i^*_{sx}$ is supplied, the stator current vector $\bar{i}_s$ is abruptly shifted in the Cartesian Y-X system of coordinates from the initial phase angle $\phi^*_{so}=\epsilon_{so}$ and from the initial modulus $\bar{i}_{so}=i_{so}=i_{syo}$ to the phase angle $$\epsilon_s = \phi^*_{so} + \Delta\epsilon_s = \epsilon_{so} + \Delta\epsilon_s \qquad (49)$$

the modulus $|\bar{i}_s|$ changes by a jump:

$$i_s = \sqrt{i_{so}^2 + i_{sx}^2} \qquad (50)$$

This jump of the stator current phase $\epsilon_s$ and amplitude $i_s$ causes constant currents to flow in the phase windings of the induction motor 1 with some minor pulsations whose frequency is equal to the commutation frequency of the power switching elements of the power inverter 12.

The magnitude and polarity of these currents have changed by a step in relation to the initial ones.

Since the constant initial stator current $i_{so}$ induces a magnetic field in the induction motor 1 so that the initial vector $\psi_{ro}$ of the rotor flux linkage coincides in direction with the stator current vector $\bar{i}_{so}$, the next step of the stator current phase $\epsilon_s$ and amplitude $i_s$ leads to a step of the torque M of the induction motor 1, conformably to equation (1).

When a signal prescribing the desired synchronizing frequency $\omega^*_s$ is applied to the frequency input 4 of the transvector inverter 2, instantaneous stator phase currents in the phase stator windings of the induction motor 1 change with the frequency $$\omega_{is} = \frac{d\epsilon_s}{dt} = \omega^*_s$$

because the analog voltage $U_\omega^*_s$ supplied to the frequency input 4 of the transvector inverter 2 is fed to the input of the sweep unit 21. Pulse signals of logical "1" and "0" are supplied from two outputs of the sweep unit 21 to two synchronizing inputs of the unit 20 for transvector generation of desired instantaneous phase currents. In one of the two channels pulses are supplied with a frequency divisible by the synchronization frequency $\omega^*_s$ (synchronous frequency $\omega_s$). Each such pulse shifts the snychronous phase $\phi_s$ to one increment $\Delta\phi_s$. In this manner the signal U prescribing the synchronous frequency $\omega_s$ is swept into the synchronous phase $\phi_s$.

A logical "1" or "0" signal which corresponds to a respective sign sign $\omega^*_s$ of the voltage $U_\omega^*_s$ prescribing the synchronizing frequency $\omega^*_s$ is transmitted through the other channel from the output of the sweep unit 21. This channel is used to prescribe the direction of rotation of the Y-X Cartesian system of coordinates.

The less the increment $\Delta\phi^*_s$ to which the synchronizing phase $\phi^*_s$ is changed, the more accurate and uniform is the angular motion of the Y-X system of coordinates relative to the reference stationary axis "a" of the reference stator phase winding "A".

Adjustment of instantaneous phase currents results in that the output of the transvector inverter 2 is generated as a symmetrical system of three-phase currents changing in conformity with the law (47) when the synchronous stator current phase $\phi_{is}$ changes according to the following equation:

$$\phi_{is} = \phi^*_s = \int_{t_0}^{t_1} \omega^*_s dt + \phi^*_{so} \qquad (51)$$

where $\phi_{is}$ is the synchronous stator phase current, and $\phi^*_s$ is the synchronizing phase of the transvector inverter .2.

When one of the voltages prescribing $U_i^*_{sx}$ or $U_i^*_{sy}$ changes, the phase shift $\epsilon_s - \epsilon_{so} = \Delta\epsilon_s$ changes at the inputs 3 and 5 of the transvector inverter 2 in conformity with the equation (48).

Since the instantaneous frequency $\omega_{is}$ of instantaneous stator phase currents is defined, in this control method, as a rate of change of the stator current phase, any change of the stator current phase produces an additional component of the stator current frequency, which is additional to the stator current synchronous frequency $\omega_s$ equal to the synchronizing frequency $\omega^*_s$ of the transvector inverter 2 and is given by the equation:

$$\omega_{is} = \omega^*_s + \frac{d(\Delta\epsilon^*)}{dt} = \omega_s + \frac{d(\Delta\epsilon_s)}{dt}. \qquad (52)$$

When two voltages assigning $U_i^*_{sx}$ and $U_i^*_{sy}$ are changed simultaneously, an additional frequency component $d(\Delta\epsilon_s)/dt$ is produced at the inputs 3 and 5 of the transvector inverter 2, if voltages $U_i^*_{sx}$ and $U_i^*_{sy}$ are not charged proportionally but in a way which alters their ratio.

The use of all functional properties of the transvector inverter 2 offers the advantage of vector control of the induction motor 1 through the control of the stator current vector in conformity with any, even spasmodic, laws of changing the stator current phase, frequency, and amplitude.

To deal with abrupt changes of the ratio of input control signals $i^*_{sx}$ and $i^*_{sy}$ (the second and first quadrature components), the transvector inverter 2 is provided with a capability to autonomously control the stator current phase $\epsilon_s$ irrespectively of controlling the stator current frequency and synchronizing frequency $\omega^*_s$.

The stator current phase $\epsilon_s$ can be abruptly changed, by means of the transvector inverter 2, to any required phase angle $\Delta\epsilon_s$ within the angle range of from 0° to 360° with arbitrary, even constant, values of the stator current frequency $\omega_{is}$ and synchronizing frequency $\omega^*_s$.

The transvector inverter 2 can change the stator current phase $\epsilon_s$ to a phase angle $\Delta\epsilon_s$ from 0 to 45 within approximately 0.0002 seconds, which is at least ten times less than the time needed for changing, to the same phase angle, the synchronous phase $\phi_s$ of the rotor flux linkage of the induction motor 1.

One of the features of the transvector inverter 2 consists in synchronization of control of power conversion. The process of synchronization of control of the stator three-phase current (the space vector $\bar{i}_s$ of the stator current of the induction motor 1) is performed relative to some time vector $\bar{H}_o$ of synchronization (reference or orienting space vector).

The angular speed of rotation of the reference space vector $\bar{H}_o$ in relation to the geometrical stator axis $\alpha$ which coincides with the axis "a" of the reference phase winding "A" of the induction motor 1 is controlled in proportion with the input control action applied to the frequency input 4 of the transvector inverter 2.

The instantaneous space angular position of the vector $\bar{H}_o$ in relation to the stator axis $\alpha$ is controlled as a function of the synchronization frequency $\omega^*_s$. The instantaneous space angular position of the vector $\bar{H}_o$ has a corresponding time phase $\phi^*_s$ of synchronization. The synchronous phase $\phi_s$ is produced by sweeping the synchronization frequency $\omega^*_s$ in conformity with the equation (51).

Pulsed sweeping of the synchronizing frequency $\omega^*_s$ is effected by means of the sweep unit 21. The synchronization vector $\bar{H}_o$ is phase shifted to one increment $\pm\Delta\phi^*_s$ by each successive pulse at the output of the sweep unit 21.

The direction of the angular motion of the synchronization vector $\bar{H}_o$ is determined by the sign $\omega^*_s$ of the synchronization frequency $\omega^*_s$.

Conformably to equations (47), two vector transformations are performed in the transvector inverter 2. The first is the conversion from the synchronously rotating (with the synchronization frequency ω*$_s$) system of Cartesian coordinates Y-X into the stationary Cartesian system of coordinates α-β. The second vector transformation is from the stationary Cartesian system of coordinates into a tri-axial stationary system of coordinates a, b, c.

To summarize, the disclosed transvector inverter 2 is desied to control the processes of electric energy conversion not in a stationary system of coordinates, but in a rotating Cartesian system of coordinates Y-X. Assigning the synchronization frequency ω*$_s$ means assigning the angular speed of the motion in space of the Cartesian Y-X coordinate system relative to the stationary geometrical axis "a" of the reference phase winding "A". Control signals i*$_{sx}$ and i*$_{sy}$ applied to the inputs 3 and 5 of the transvector inverter 2 assign projections (or components) of the stator current vector of the induction motor 1 in the rotating Cartesian Y-X system of coordinates. The angular motion of the stator current vector $\bar{i}_s$ in the rotating Cartesian system of coordinates Y-X is prescribed by changing the ratio of the components i*$_{sx}$/i*$_{sy}$ of the control inputs in conformity with equations (52) and (48).

The result of this change of the ratio $$\frac{i^*_{sx}(t)}{i^*_{sy}(t)} = F(t)$$

provides control of the relative rotational speed of the stator current vector $\bar{i}_s$ about the synchronization vector $\bar{H}_o$.

When the synchronization frequency ω*$_s$ assigned at the input 4 of the transvector inverter 2 is equal to the angular rotational speed of one of the eight space state vectors of the induction motor 1, which are shown in FIG. 1, the time vector $\bar{H}_o$ of synchronization is at the same time the orientation space vector which is subjected to the spatial angular displacement relative to the stationary axis "a" of the reference stator phase winding "A" of the induction motor 1.

The space orientation of the state vectors of the induction motor in this control method is effected by way of controlling the above described process of synchronization of the transvector inverter 2.

This interconnection of space and time control processes creates differences in the physical nature and functional propertis of two control signals i*$_{sx}$ and i*$_{sy}$, and, consequently, two respective control inputs 3 and 5 of the transvector inverter 2. As can be seen from equations (47) and (48), when the input control signal (i*$_{sx}$=0) is not applied to the input 3 of the transvector inverter 2, the current in the reference phase winding "A" of the stator is determined by the synchronous phase φ$_s$ and the magnitude of the input control signal i*$_{sy}$ at the input 5 of the transvector inverter 2 as follows:

$$\left. \begin{array}{l} i_{sa}(t) = i^*_{sy}(t) \cdot \cos\phi^*_s(t) \\ i^*_{sx} = 0 \end{array} \right\} \quad (53)$$

In this case the phase ε$_s$(t) of the instantaneous phase current i$_{sa}$(t) of the stator in the reference phase winding "A" of the induction motor 1 coincides with the synchronization phase φ*$_s$:

$$\epsilon_s(t) = \phi^*_s(t) = \phi_s(t), \quad (54)$$

while the instantaneous frequency ω$_{is}$ of the instantaneous stator phase current i$_{sa}$(t) coincides with the synchronization frequency ω*$_s$:

$$\omega_{is} = \frac{d\epsilon_s(t)}{dt} = \frac{d\phi^*_s(t)}{dt} = \omega^*_s \quad (55)$$

This process of controlling the stator current vector $\bar{i}_s$ is characterized by co-phasal modification of the stator current time vector $\bar{i}_s$ and the synchronization time vector $\bar{H}_o$. The stator current space vector $\bar{i}_s$ in this case coincides, in all instances, with the direction of the space orientation vector $\bar{H}_o$ of the Y-X system of coordinates, which means that the vector $\bar{H}_o$ is identical to the vector $\bar{i}_s$:

$$\bar{H}_o = \bar{i}_s \quad (56)$$

The process of controlling the stator current vector $\bar{i}_s$, which is described by equations (53)–(56), is therefore advisable to be referred to, in the following discussion of operations to control the induction on motor, as a co-phasal control process, and the instantaneous stator phase current i$_{sa}$(t) given by the equation (53) for the reference stator phase winding "A", as a co-phasal current i$_{syn}$.

Conformably to this definition and equation (53), when the actual stator current vector $\bar{i}_s$ is reproduced $\bar{i}_s = \bar{i}^*_s$, the co-phasal current is determined by the projection i$_{sy}$ of the actual stator current vector $\bar{i}_s$ onto the axis Y of the synchronization vector $\bar{H}_o$:

$$i_{syn} = i_{sy} \cdot \cos\phi^*_s, \quad (57)$$

where φ*$_s$ is the synchronization phase of the transvector inverter 2, which is assigned by a control input applied to the input 4 of the transvector inverter 2.

The input of a unit or a device, e.g. the input 5 of the transvector inverter 2, whereto the control input proportional to the value i$_{sy}$ of the co-phasal current i$_{syn}$ is applied should advisably be referred to as a co-phasal input.

In the absence of the co-phasal current i$_{syn}$=0, the instantaneous phase current in the reference stator phase winding is determined by the value i*$_{sx}$ of the control input applied to the ortho-phasal input 3 of the transvector inverter 2:

$$\left. \begin{array}{l} i_{sa}(t) = -i^*_{sx}(t) \cdot \sin\phi^*_s(t) \\ i^*_{sy} = 0 \end{array} \right\} \quad (58)$$

In this case, the instantaneous phase current i$_{sa}$(t) is phase shifted in relation to the synchronizing phase φ*$_s$ of the synchronization vector $\bar{H}_o$ to a phase angle ±π/2. This corresponds to controlling the projection i$_{sx}$ of the stator current vector $\bar{i}_s$ onto the axis X orthogonal to the synchronization vector $\bar{H}_o$. This process is, therefore, advisable to be referred to as an ortho-phasal control process.

The instantaneous phase current in the reference stator phase winding "A", which is shifted relative to the synchronization vector $\overline{H}_o$ to a phase angle $\pm\pi/2$, should advisably be referred to as an ortho-phasal current $i_{ort}$:

$$i_{ort} = i_{sx} \cdot \sin \phi^*_s. \quad (59)$$

The input of a unit or a device, e.g. the input 3 of the transvector inverter 2, to which is applied a control input proportional to the value $i_{sx}$ of the ortho-phasal current $i_{ort}$ should advisably be referred to as an ortho-phasal input in contrast to the co-phasal input.

When control input actions are simultaneously applied to the ortho-phasal input 3 and the co-phasal input 5 of the transvector inverter 2, the instantaneous phase current $i_{sa}$ in the reference phase winding "A" of the stator is determined, in conformity with the equations (47), (57), and (59), by the difference between the co-phasal and ortho-phasal currents:

$$i_{sa} = i_{syn} - ort \quad (60)$$

The phase shift $\Delta\epsilon_s$ of the instantaneous stator phase current $i_{sa}$ in the reference phase winding "A", relative to the actual value of the synchronization on phase $\phi^*_s$ is produced in this case to a phase angle which is determined, conformably to the equation (48), by the inverse tangent function of the ratio of the ortho-phasal current $i_{sx}$ fo the co-phasal current $i_{sy}$:

$$\Delta\epsilon_s = \text{arctg}\, \frac{i_{sx}}{i_{sy}}$$

If the ortho-phasal and co-phasal currents $i_{sx}$ and $i_{sy}$ vary in time, the instantaneous stator current frequency $\omega_{is}$ defined as the rate of change of the phase of the instantaneous stator phase current $i_{sa}$ in the reference phase winding "A" differs from the synchronizing frequency $\omega^*_s$ applied to the frequency input 4 of the transvector inverter 2 by a slip frequency $\Delta\omega_{is}^{\overline{H}o}$ of the stator current vector $\bar{i}_s$ relative to the synchronization vector $\overline{H}_o$, which is equal to the speed of change of the phase shift:

$$\Delta\omega_{is}^{\overline{H}o} = \frac{d\left(\text{arctg}\,\frac{i_{sx}}{i_{sy}}\right)}{dt}.$$

In the general case, the stator current frequency $\omega_{is}$ of the induction motor 1 supplied by the transvector inverter 2 is determined by the sum of the synchronous frequency $\omega_s = \omega^*_s$ and the stator current slip frequency $\Delta\omega_{is}$ in relation to the synchronization vector $\overline{H}_o$:

$$\omega_{is} = \omega_s + \frac{d\left(\text{arctg}\,\frac{i_{sx}}{i_{sy}}\right)}{dt} \quad (61)$$

When the ortho-phasal and co-phasal currents $i_{sx}$ and $i_{sy}$ change by a jump at some moment $t_o$, the stator current phase shift occurs without any change of the stator current frequency which, in this case, is equal to the synchronous frequency $\omega_{is} = \omega_s = \omega^*_s$ since $\omega_{is}^{\overline{H}o} = 0$ when $t > t_0$. This permits individual or autonomous control of the stator current instantaneous phase $\epsilon_s$ irrespective of the stator current frequency $\omega_{is}$ and of the control channel of the synchronization frequency $\omega^*_s$.

This type of control can be defined as phase-current control.

The induction motor drive equipped with the transceiver inverter 2 (FIG. 4) employs this type of phase-current control and can be defined as an electric drive with phase-current control. Thus, for example, in the absence of the synchronization frequency $\omega^*_s (\omega_s = \omega_{is} = 0)$, an abrupt change of the value $i_{sx}$ of the ortho-phasal current $i_{ort}$ in this electric drive results in a jump of the value $i_s \cdot \sin \epsilon_\phi = i_{sx}$. With the constant rotor flux linkage $\psi_r = L_m \cdot i_{sy}$ set in advance, this ensures, conformably to equation (1), an abrupt change of the induction motor torque M. This jump in the induction motor torque M is somewhat delayed in relation to the jump in the control signal $i^*_{sx}$, which is attributed to an uncompensated fast time constant $T_i$ of the internal control loop for adjustment of instantaneous phase currents. This uncompensated time constant $T_i$ is minimized by an appropriate adjustment, e.g., by the module optimum, of the instantaneous phase current control unit 22 in order to achieve an abrupt change of the induction motor torque M within a minimal adjustment time.

The disclosed electric drive employing phase-current control (FIG. 4) can be classed, according to its operational characteristics, as a torque drive wherein the control input action $M^*$ proportional to the ortho-phasal current $i_{sx} = i^*_{sx}$ prescribes a pulse of the torque $M = M^*$ of the induction motor 1.

In order to obtain a pulse of the torque M of the induction motor 1, a constant control input signal $i^*_{sy} = i^*_{syo}$ is applied to the co-phasal input 5 of the transvector inverter 2 at the moment $t_o$, with no input control signals being applied to the frequency input 3 and 4 of the transvector inverter 2: $i^*_{sx} = 0$, $\omega^*_s = 0$.

In conformity with the equation (22), with to co-phasal current $i_{syo}$ being constant and in the absence of the synchronization frequency $\omega^*_s = \omega_k$ and the rotor speed frequency the rotor flux amplitude $\psi_r(t)$ grows according to the aperiodic law with the time constant $T_r = (L_r/R_r)$.

Within a time period longer than the time needed for the increase of the amplitude $\psi_r(t)$ of the rotor flux linkage, in other words longer than $4T_r$, the rotor flux amplitude $\psi(t)$ reaches its steady-state value $\psi_{r\infty} = \psi_{ro} = L_m \cdot i_{syo}$.

When the rotor flux linkage amplitude reaches its steady state value $\psi_{r\infty}$, the control input signal $i^*_{sx}$ is applied, at the moment $t_1 > t_o + +4T_r$, to the input 3 of the transvector inverter 2. This input control signal is proportional to the desired induction motor torque $M^*$. As has been described above, a step of the stator current phase $\Delta\epsilon_s = \epsilon_\phi$ and of the stator current amplitude $i_s = \sqrt{i_{so}^2 + i_{sx}^2}$ is produced within a time interval of approximately 0.0002-0.0004 seconds.

In conformity with the equation (1), this results in a jump of the induction motor torque M. To further maintain the torque M of the induction motor 1 on a required level, the synchronization frequency $\omega^*_s$ has to be controlled depending on the angular displacement of the rotor flux linkage vector $\overline{\psi}_r$. In the absence of the synchronization frequency $\omega^*_s$, the pulse of the induction motor torque $M = M^*$ has a drooping trailing edge. After an interval longer than $4T_r$, the induction motor torque M decreases to zero due to the angular motion of the rotor flux linkage vector $\overline{\psi}_r$ until it coincides with a new angular position of the stator current vector $\bar{i}_s$.

The above torque drive embodying an induction motor with phase-current control is the basis for the hereinbelow described methods of invariant control of the induction motor torque and optimal control of the rotor flux vector through concurrent interrelated modification of the synchronous frequency $\omega_s$ and orthophasal and co-phasal currents $i_{ort}$ and $i_{syn}$.

The rotor speed $\omega$ can be changed by changing the stator current frequency $\omega_{is}$. In the absence of the load moment, in ideal steady-state no-load conditions, the angular speed $\omega$ of the rotor is equal to the angular frequency of the stator current $$\omega = Z_p \cdot \frac{\pi \cdot n}{30} = \omega_{is} = \frac{d\epsilon_s}{dt}, \qquad (62)$$

where
- $\omega$ is the rotor speed expressed in electric radians per second;
- $Z_p$ is the number of pole pairs of the induction motor 1;
- n is the rotor rotational frequency expressed in rpm.

When the load moment grows, the rotor speed $\omega$ decreases by the value of the stator current slip $\Delta\omega_{is}$ relative to the rotor:

$$\Delta\omega_{is} = \frac{d(\phi_r + \epsilon\phi)}{dt} = \frac{d\phi_r}{dt} + \frac{d\epsilon\phi}{dt}, \qquad (63)$$

where the angle $(\phi_r + \epsilon_\phi)$, according to FIG. 1, is the stator current phase angle of the vector $\bar{i}_s$ in relation to the longitudinal rotor axis d.

Since the phase shift $\epsilon_\phi$ between the stator current vector $\bar{i}_s$ and the rotor flux linkage vector $\bar{\psi}_r$ remains unchanged in the steady-state static condition of the induction motor, the second component $d\epsilon_\phi/dt$ of the stator current slip $\Delta\omega_{is}$ is equal to zero relative to the rotor, while the relative angular rotational speeds of the vectors $\bar{i}_s$ and $\bar{\psi}_r$ are the same with respect to the rotor (axis d):

$$\left. \begin{array}{l} \Delta\omega_{is} = \Delta\omega = \dfrac{d\phi_r}{dt}, \\[6pt] \text{if } \dfrac{d\epsilon\phi}{dt} \equiv 0 \end{array} \right\} \qquad (64)$$

where
- $\phi_r$ is the phase angle of the rotor flux linkage vector $\bar{\psi}_r$ relative to the longitudinal axis of the rotor;
- $\Delta\omega$ is the slip of the rotor flux linkage vector $\bar{\psi}_r$ with respect to the rotor.

Since the amplitude $\psi_r$ of the rotor flux linkage remains unchanged in the steady-state static condition of the induction motor 1, the slip $\Delta\omega$ is of the stator current relative to the rotor is in this case, conformably to equations (29) and (64), proportional to the induction motor torque M.

Figure 5:
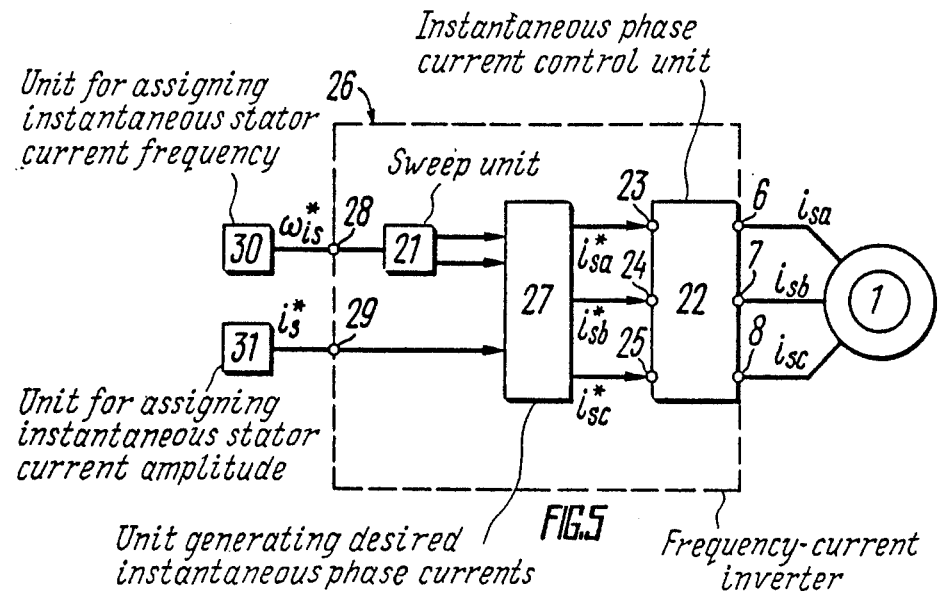
FIG. 5 shows a functional block diagram of a frequency-current inverter.

A method of controlling the rotor speed $\omega$ of the induction motor 1 through changing the stator current frequency $\omega_{is}$ is realized in an electric drive employing an induction motor with frequency-current control, whose functional diagram is shown in FIG. 5.

The electric drive, according to the invention, comprises an induction motor 1 whose stator windings are connected to outputs 6, 7, and 8 of the above described unit 22 for controlling instantaneous phase currents, featuring three control inputs 23, 24, and 25.

The outputs of the instantaneous phase current control unit 22 constitute outputs of a frequency-current inverter 26 which, in addition to the unit 22, comprises a sweep unit 21 described above and a unit 27 generating desired instantaneous phase currents. This unit 27 generating desired instantaneous phase currents can employ a prior art circuit (cf., for example, U.S. Pat. No. 4,384,244 IPC³ H02P 5/34, or U.S. Pat. No. 4,418,308 IPC³ H02P 5/34, 1983).

Three outputs of the unit 27 generating desired instantaneous phase currents are connected to control inputs 23, 24, and 25 of the instantaneous phase current control unit 22. Two pulse inputs of the unit 27 generating desired instantaneous phase currents are connected to the outputs of the sweep unit 21 whose input is a frequency input 28 of the frequency-current inverter 26.

An analog input of the unit 27 generating desired instantaneous phase currents constitutes an amplitude input 29 of the frequency-current inverter 26. The frequency input 28 of the frequency-current inverter 26 is connected to an output of a unit 30 for assigning the instantaneous stator current frequency, while an amplitude input 29 of the frequency-current inverter 26 is connected to an output of a unit 31 for assigning the instantaneous stator current amplitude.

The unit 30 for assigning the instantaneous stator current frequency and the unit 31 for assigning the instantaneous stator current amplitude can, in the simplest version, be standard potentiometers whose output voltage is manually controlled.

The electric drive employing an induction motor with frequency-current control, which uses the above described circuit (FIG. 5) operates as follows.

Instantaneous phase currents are generated in the stator windings of the induction motor 1 by the already-described process of adjustment of instantaneous phase currents as functions of errors between the desired and measured values of the stator instantaneous phase currents. The instantaneous phase currents $i_{sa}$, $i_{sb}$, and $i_{sc}$ at the outputs 6, 7, and 8 of the unit 22 for controlling instantaneous phase currents are equal, to a pulsation unit, to the desired instantaneous phase currents $i^*_{sa}$, $i^*_{sb}$, and $i^*_{sc}$ which are set at the inputs 23, 24, and 25 of the instantaneous phase current control unit 22 of the frequency-current inverter 26 by means of the unit 27 generating desired instantaneous phase currents. The frequency of the desired instantaneous phase currents $i^*_{sa}$, $i^*_{sb}$, and $i^*_{sc}$ is controlled conformably to the law (3) in proportion to the frequency of pulses fed from one of the outputs of the sweep unit 21 to the first pulse input of the unit 27 generating desired instantaneous phase currents. Logical "1" or "0" signals applied to the second pulse input of the unit 27 generating desired instantaneous phase currents from the other output of the sweep unit 21 determine the desired direction of rotation of the stator current vector depending on the polarity of the input voltage $U\omega_{is}$ of the sweep unit 21, which is the input voltage prescribing the desired frequency $\omega^*_{is}$ of the output current of the frequency-current inverter 26, which is equal to the stator current frequency $\omega_{is}$ of the induction motor 1.

When no voltage prescribing the desired stator current frequency $\omega^*_{is}$ is applied to the frequency input 28 of the frequency-current inverter 26, magnitudes of the constant stator phase currents of the induction motor 1 are determined in conformity with the equations (46) for an arbitrary initial phase $\phi_{so}$ which corresponds to the initial phase $\psi^*_{so}$ set in the unit 27 generating desired instantaneous phase currents in a manner similar to that described above for the initial state of the transvector inverter 2 (FIG. 4). In this case, the magnitudes of instantaneous phase currents depend on the magnitude of the control input applied to the amplitude input 29 (FIG. 5) of the frequency-current inverter 26. The amplitude input 29 of the frequency-current inverter 26 corresponds to the co-phasal input 5 (FIG. 4) of the transvector inverter 2 because the stator current phase $\epsilon_s$ of the induction motor 1 in the electric drive shown in FIG. 5 is equal to the synchronization on phase $\phi^*_s$ of the frequency-current inverter 26, which is controlled by scanning the synchronization frequency $\omega^*_s$ equal to the desired stator current frequency $\omega^*_{is}$. In this connection, control processes in the induction motor drive (FIG. 5) employing the frequency-current inverter 26 are characterized by a frequency-current method of control and are similar to those described above in the induction motor drive (FIG. 4) for a particular case when the transvector inverter 2 is used to control the co-phasal input 5 in the absence of the ortho-phasal current $i_{ort}=0$ and of the control signal $i^*_{sx}=0$ at the ortho-phasal input 3 of the transvector inverter 2.

When a constant control action is applied to the input 29 (FIG. 5) of the frequency-current inverter 26, the desired stator current amplitude $i^*_s$ is constant and, consequently, the stator current amplitude is constant and remains unchanged when the stator current phase $\epsilon_s(t)$ varies.

With the stator current amplitude $i_s = i_{so}$ being constant, the rotor speed $\omega$ of the induction motor 1 is controlled by changing the input control signal $\omega^*_{is}$ applied to the frequency input 28 of the frequency-current inverter 26.

With no load moment applied, the rotor speed $\omega$ is, conformably to equation (62), proportional to the magnitude of the control input signal applied to the frequency input 28 of the frequency-current inverter 26.

When the load torque on the induction motor shaft growsm the rotor speed $\omega$ drops by a quantity equal to the stator current slip $\Delta\omega_{is}$ relative to the rotor.

This type of the induction motor control can be referred to control in polar coordinates. In order to improve the accuracy of control of the rotor speed $\omega$ in polar coordinates, the unit 30 for assigning the instantaneous stator current frequency can be made as a summer of the rotor slip $\Delta\omega_{is}$ and speed $\omega$, while the unit 31 for assigning the instantaneous stator current amplitude can be made as a unit calculating the quadrature sum of two components conformably to the equation $$i_s^* = \sqrt{i_{sx}^{*2} + i_{syo}^{*2}} ,$$

where $i^*_{syo} = \psi_{ro}/L_m$.

However, achieving better performance of the induction motor drive through increasing the ratio of the induction motor torque M to the stator current amplitude $i_s$ is accompanied, as shown in the plots of FIG. 3, by an increase of the rotor flux linkage amplitude $\psi_{r\,opt}$ in response to the growing torque M of the induction motor 1.

In steady-state operational conditions of the induction motor 1 (FIG. 5), when the load moment changes as a function of the rotor speed $\omega$ in accordance with a predetermined law, control of the stator current frequency $\omega^*_{is}$ and the desired stator current amplitude $i^*_s$ in polar coordinates is combined by joining the input of the unit 30 for assigning the instantaneous stator current frequency with the input of the unit 31 for assigning the instantaneous stator current amplitude (this connection is not shown in FIG. 5).

In this case, the signal assigning the desired rotor speed $\omega^*$ is supplied to the joint input of the units 30 and 31, while the desired stator current frequency $\omega^*_{is}$ and amplitude $i^*_s$ are calculated as functions of the desired rotor speed $\omega^*$. Here the desired frequency $\omega^*_{is}$ is found according to the formula:

$$i_s^* = \sqrt{i_{sx}^{*2} + i_{syo}^{*2}} ; \tag{65}$$

$$\omega_{is}^* = \omega^* + \Delta\omega_{is}^*;$$

where $\Delta\omega^*_{is}$ is the desired stator current slip in relation to the rotor.

In order to determine the control law for the stator current slip $\Delta\omega^*_{is}$, providing optimal, in terms of minimal current, control in static conditions described by equations (44) and (45), the space vector $\bar{i}_s$ of the stator current should advisably be taken as the orientation space vector $\bar{H}_o$, because the module of the stator current vector $\bar{i}_s$ is a component of the optimization criterion (45).

The orientation condition relative to the stator current vector $\bar{i}_s$, with $H_o = \bar{i}_s$, is given by:

$$\left. \begin{array}{l} i_s = i_{sy}; \\ i_{sx} = 0; \\ \Delta\omega_{is} = \omega_k - \omega; \\ \psi_{rx} = -\psi_r \cdot \sin\epsilon\phi; \\ \psi_{ry} = \psi_r \cdot \cos\epsilon\phi; \end{array} \right\} \tag{66}$$

It follows from the equations (1), (22), and (23) and the orientation condition expressed by equations (66) for static conditions and on the basis of equation (44) that the stator current slip $\Delta\omega_{is}$ in relation to the rotor determines the interconnection between the stator current amplitude $i_s$ and the induction motor torque M in conformity with the following equation:

$$i_s^2 = \frac{2}{3Z_p} \cdot \frac{R_r^2 + L_r^2 \cdot \Delta\omega_{is}^2}{L_m^2 \cdot R_r \cdot \Delta\omega_{is}} \cdot M, \tag{67}$$

where $L_m$ is the mutual inductance whose magnitude depends on the flux amplitude $\psi_m$ in the air gap according to the equations (15);

$L_r = L_m + L_{\delta r}$ is the rotor inductance which depends on the saturation level of the magnetic core and the air gap flux linkage $\psi_m$;

$L_{\delta r}$ is the rotor leakage inductance.

It follows from the equation (67) that the maximum ratio $M/i_s$ can be achieved when $$\Delta\omega_{is/opt} = \pm \frac{R_r}{L_r}, \tag{68}$$

where "+" indicates the positive direction of the induction motor torque with $M>0$, while "−" indicates the negative direction of the induction motor torque with $M<0$.

The optimal slip $\Delta\omega_{is}|_{opt}$ is constant when the flux linkage $\psi_m$ in the air gap is low, as shown in FIGS. 2 and 3, which is due to the constant rotor inductance $L_r=L_{ro}$ for an unsaturated induction motor 1.

Since in static conditions seven state vectors, $\overline{U}_s$, $\overline{i}_s$, $\overline{\psi}_s$, $\overline{\psi}_m$, $\overline{\psi}_r$, $\overline{i}_m$, $\overline{i}_r$, but not vector $\overline{R}$, rotate with the same speed, it can be assumed that for static conditions the rotor flux linkage slip $\Delta\omega$ is equal to the stator current slip $\Delta\omega_{is}$:

$$\Delta\omega = \Delta\omega_{is} = \frac{2R_r}{3Z_p \cdot \psi_r^2} \cdot M. \quad (69)$$

When the law (68) is applied and the induction motor torque M grows conformably to equation (69), the amplitude of the rotor flux linkage increases according to the following equation:

$$\psi_{ropt} = \sqrt{\frac{2L_r}{3L_p} \cdot M} \ ; \quad (70)$$

According to equations (16), (18), (44), and (69), and given the static conditions, the increase of the rotor flux amplitude $\psi_r$ is related to the increase of the flux amplitude $\psi_m$ in the air gap in accordance with the formula:

$$\psi_m = \psi_r \cdot \sqrt{1 + \left(\frac{L_{\sigma r}}{R_r} \cdot \Delta\omega\right)^2} \quad (71)$$

It follows from equations (68), (69), and (71) that the amplitude $\psi_m$ of the flux linkage in the air gap changes, with the optimal, in terms of minimal current, control, in accordance with the law $$\psi_{mopt} = \sqrt{\frac{2L_r}{3Z_p} \cdot \left[1 + \left(\frac{L_{\sigma r}}{L_r}\right)^2\right] \cdot M} \quad (72)$$

As follows from equations (15) and (72), as the induction motor torque M grows, the mutual inductance $L_m$ is substantially reduced and, therefore, the rotor inductance $L_r$ is also reduced by a factor of 1.5–3, while the optimal stator current slip $\Delta\omega_{is}$ grows conformably to the law (68) as shown in FIGS. 2 and 3.

For some types of industrial units, e.g. the traction motor for a robot loader, wherein the load torque varies with the rotor speed $\omega$ in accordance with a specifc law, the desired torque M* of the induction motor 1 is connected, in static conditions, with the desired rotor speed $\omega^*$ by a law M* ($\omega^*$) which is determined by the type of this industrial unit.

In this case, the desired rotor speed $\omega^*$ is assigned by applying signals to the input of the unit 30 for assigning the instantaneous stator current frequency and the input of the unit 31 for assigning the instantaneous stator current amplitude. These units 30 and 31 can in this case employ either standard analog circuits featuring conventional operational amplifiers, or a microprocessor (cf., for example, S. V. Yakubovsky, Analog and Digital Integrated Microcircuits, Moscow, Radio i Svyaz Publ., 1985, pp. 223–231, 240, 241, 262, 263, or Stromag catalog, D782, 6.84.5000, MIKROSYN 3000, pp. 2–7). In the unit 30 for assigning the instantaneous stator current frequency, the stator current slip $\omega^*_{is}$ is calculated conformably to the above equations (15), (65), (68), and (72) for the desired torque M* of the induction motor 1, which is equal to the actual torque M of the induction motor 1, and for each input value of the desired rotor speed $\omega^*$, the "speed-torque" relation being set for a particular type of an industrial unit.

The value $i^*_s$ is calculated in the unit 31 for assigning the instantaneous stator current amplitude in conformity with the equation (67) and subject to the equations (15), (68), and (72) and the relation M* ($\omega^*$).

The disclosed method of control in polar coordinates provides for changing the control input proportional to the desired rotor speed $\omega^*$ in order to change the stator current instantaneous frequency $\omega_{is}$ and the stator current instantaneous amplitude $i_s$, subject to two conditions: the actual rotor speed $\omega$ is equal to the desired rotor speed $\omega^*$; and the instantaneous stator current amplitude is minimal for the prescribed rotor speed $\omega$ and induction motor torque M, because the ratio $M/i_s$ is to be maximized in accordance with the equation (45).

This type of cntrol can be classed as optimal control of steady-state conditions by the minimum of the stator current. This permits longer service life of an electric drive operated from a storage battery.

But for fast-response servo drives of robots and machine tools the induction motor torque and rotor speed have to be changed much faster than the period required for the rotor flux amplitude $\psi_r$ to change from the initial optimal value $\psi_{r\,opt}$ to the desired final value $\psi_{r\infty}$. This brings about a situation where complex electromagnetic transient processes of producing magnetic fields and rotor fluxes are superimposed upon the high-speed mechanical and electromechanical transient processes in the induction motor drive.

Besides, the equation (1) demonstrates that in order to provide an inertia-free reversal of the induction motor torque M, e.g. when switching from driving to braking by the negative torque ($-M$) of the induction motor, it becomes necessary to change the angle of the stator current phase shift $\epsilon_\phi$ by a jump relative to the rotor flux linkage. This cannot be done by control in polar coordinates, using the frequency-current inverter 22 (FIG. 5), since the stator current phase $\epsilon_s$ in this case is unambiguously dependent on the synchronization phase $\phi^*_s$, or, in other words, it is produced, conformably to the equation (51), by scanning the desired stator current frequency $\omega_{is}=\omega^*_s$.

The disclosed control method consists in that dynamic processes in an induction motor are controlled by autonomous control of the stator current phase and the phase shift of the stator current vector in relation to the rotor flux linkage, the phase-current control being effected by means of a transvector inverter. Here, optimal characteristics of the induction motor are generated concurrently, and, to this end, the rotor flux amplitude is controlled by interrelated control of the co-phasal and ortho-phasal currents and the synchronization frequency of the transvector inverter in order to produce an optimal, in terms of the stator current minimum, angle of the phase shift of the stator current vector in relation to the rotor flux linkage vector.

Figure 6:
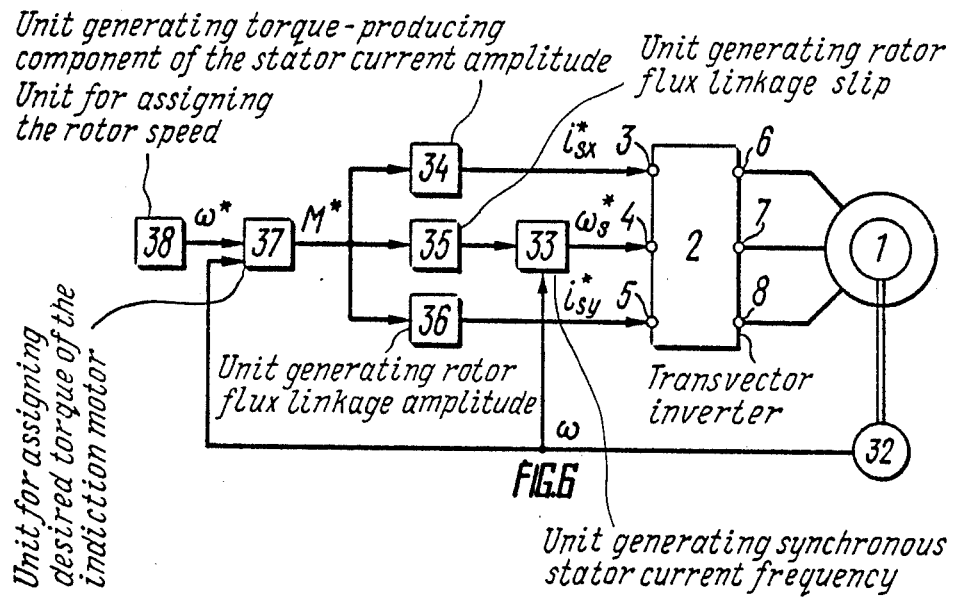
FIG. 6 shows a functional block diagram of a variable-speed induction motor drive having a phase-current control system in Cartesian coordinates and with variable rotor flux amplitude.

Let us deal with the circuit of an electric drive featuring a transvector inverter, realizing the disclosed method of control. The functional block diagram of the electric drive is shown in FIG. 6.

An induction motor 1 is connected to power outputs of a transvector inverter 2 comprising three control inputs 3, 4, and 5. Three power outputs 6, 7, and 8 of the transvector inverter 2 are connected to stator windings of the induction motor 1. The shaft of the induction motor 1 is connected to a rotor speed transducer 32 which can be a conventional tachometer generator. The control input 4 of the transvector inverter 2, which constitutes the frequency input of the transvector inverter 2, is connected to an output of a unit 33 generating the stator current synchronous frequency, whose first input is connected to an output of the rotor speed transducer 32.

The unit 33 generating the stator current synchronous frequency can be made as a standard summing operational amplifier.

The control input 3 of the transvector inverter 2, which constitutes the ortho-phasal input of the transvector inverter 2, is connected to an output of a unit 34 generating the torque-producing component of the stator current amplitude. A second input of the unit 33 generating the synchronous frequency of the stator current is connected to an output of a unit 33 generating the rotor flux linkage slip.

The control input 5 of the transvector inverter 2, which constitutes the co-phasal input of the transvector inverter 2, is connected to an output of a unit 36 generating the rotor flux linkage amplitude. The units 34, 35, and 36 can be operational amplifiers featuring diodes at the inputs thereof and in the feedback loops (cf., for example, B. K. Nesterenko, Integrated Operational Amplifiers. Guidebook Moscow, Energy Publ., 1982, p. 70).

The joint inputs of the units 34, 35, and 36 are connected to an output of a unit 37 for assigning the desired torque of the induction motor 1.

The unit 37 for assigning the desired torque of the induction motor can be made as a proportional-plus-integral speed controller employing a conventional operational amplifier (cf., for example, F. Fröhr, F. Ortenburger, Introduction to Electronic Control Equipment, translated from German, Moscow, Energia Publ., 1973, p. 78).

One of the inputs of the unit 37 for assigning the desired induction motor torque is connected to an output of a unit 38 for assigning the rotor speed, which can be made as a conventional potentiometer.

A second input of the unit 37 is connected to an output of the rotor speed transducer 32.

The electric drive (FIG. 6) operates as follows.

Instantaneous stator phase current $i_{sa}$, $i_{sb}$, and $i_{sc}$ are produced in the stator windings of the induction motor 1 by the transvector inverter 2 and their phase $\epsilon_s$, frequency $\omega_{is}$, and amplitude $i_s$ are controlled by the foregoing method as functions of input control signals $i^*_{sx}$, $\omega^*_s$, and $i^*_{sy}$ of the transvector inverter 2, which are supplied, respectively, to the ortho-phasal, frequency, and co-phasal inputs 3, 4, and 5 of said inverter 2.

The synchronization frequency $\omega^*_s$ of the transvector inverter 2, which is applied to the frequency input 4 of this transvector inverter 2 in the absence of the desired torque $M^*$ of the induction motor 1 ($M^*=0$), is equal to the angular speed $\omega$ of the rotor due to the positive speed feedback fed from the output of the rotor speed transducer 32 (tachometer generator) to the first input of the unit 33 generating the stator current synchronous frequency.

In this mode of operation, there is no ortho-phasal current $i_{ort}=0$ whose magnitude is assigned by the output signal of the unit 34 generating the torque-producing component of the stator current amplitude, said signal being applied to the ortho-phasal input 3 of the transvector inverter 2.

The output voltage of the unit 35 generating the rotor flux linkage slip is also equal to zero.

The co-phasal current $i_{syn}$ is equal to the initial exciting current which is given, subject to the inequality (43), by the following equation:

$$i_{sy}^* = i_{symin} = \frac{\psi_{rmin}}{L_m}. \tag{73}$$

The initial rotor flux linkage amplitude $\psi_{r\ min}$ is assigned by the initial setting of the input voltage of the unit 36 generating the rotor flux linkage amplitude.

Constant currents flowing in the stator windings of the induction motor 1 establish an initial magnetic flux whose value is equal to the value $\psi_{r\ min}$ of the vector $\overline{\psi}_r$ min of the rotor flux linkage. In this case, the vector $\overline{\psi}_r$ min direction coincides with the direction of the stator current vector $\bar{i}_{s\ min}=\bar{i}_{so}$, there is no phase shift $\epsilon_\phi$ between the vectors $\overline{\psi}_{r\ min}$ and $\bar{i}_{s\ min}$, there is no torque of the induction motor 1, and the rotor speed $\omega$ is zero.

When an external active moment is applied to the shaft of the induction motor 1, e.g. when a load is taken hold of by a gripping device of a robot, a certain initial increment in rotor speed $\omega$ is produced and, consequently, the output volage of the rotor speed transducer 32 starts growing. Initially, the input voltage applied to the first input of the unit 33 generating the stator current synchronous frequency and the output voltage thereof start growing due to the positive velocity feedback. If no input voltages are applied to the second input of the unit 33, the synchronization frequency $\omega^{*'}_s$ of the transvector inverter 2 is generated and starts growing. In the absence of the ortho-phasal current $i_{ort}=0$, the stator current vector $\bar{i}_s$ is therefore, turned in the direction of rotation of the shaft of the induction motor 1 when an active load is applied thereto. This process of the stator current vector $\bar{i}_s$ following the rotor position vector $\overline{R}$ produces no counter-torque M of the induction motor 1.

The torque M of the induction motor 1, which acts in opposition to the active load moment, is produced by voltages generated simultaneously at the outputs of the unit 34 generating the torque-producing component of the stator current amplitude, the unit 35 generating the rotor flux linkage slip, and the unit 36 generating the rotor flux linkage amplitude. These signals are caused by the growing value of the desired torque M* at the output of the unit 37 for assigning the desired induction motor torque, which is due to the negative rotor speed feedback fed from the output of the rotor speed transducer 32 to the first input of the unit 37. A negative voltage proportional to the measured rotor speed $\omega$ is supplied to the first input (negative feedback input) of the unit 37 for assigning the desired induction motor torque. As in the initial state of the electric drive there is no control signal to assign the desired rotor speed $\omega^*$ applied to the second input (control input) of the unit 37 for assigning the desired induction motor torque from the output of the rotor speed assigning unit 38, the output voltage of the unit 37 for assigning the desired induction motor torque M* starts growing. The sign of the desired torque M* is the opposite of the load torque sign, and, consequently, the desired magnitude of the ortho-phasal current $i_{ort}$ increases in the direction opposite to the applied load moment. As the output signal M* of the unit 37 for assigning the desired induction motor torque builds up, the minor increment of the rotor speed $\omega$ in one direction results in an abrupt increase of the signal at the input and output of the unit 34 generating the torque-producing component of the stator current. This leads to a jump in the stator current phase in the direction opposite to the direction of the load moment. In consequence, the phase shift $\epsilon_\phi$ of the stator current vector $\bar{i}_s$ relative to the rotor flux linkage vector $\psi_r$ is produced practically by a jump, and, according to the equation (1), the induction motor torque opposing the load moment increases by a jump. The rotor speed $\omega$ is restored within several milliseconds to a zero level in conformity with the assigned zero value of the desired rotor speed $\omega^*$.

When the assigned rotor speed $\omega^*$ is other than zero, astatic adjustment of the rotor speed $\omega$ is performed in a similar manner due to the proportional-plus-integral law realized in the unit 37 for assigning the desired induction motor torque.

When the sign of the signal assigning the desired rotor speed $\omega^*$ is reversed, the sign of the signal assigning the desired induction motor torque M* is also reversed and this leads to the reversal of the sign of the signal assigning the desired value of the ortho-phasal current and inertia-free reversal of the direction of the induction motor torque M.

Optimal power-generating processes disclosed in this invention are achieved by that adjustment of the ortho-phasal current whose magnitude depends on the desired torque M* is accompanied by simultaneous adjustment of the rotor flux linkage slip $\Delta\omega$, the stator current synchronous frequency $\omega_s$ which is in this case equal to the rotor flux linkage frequency, and the co-phasal current with due consideration of the saturation of the magnetic core of the induction motor and variations of the mutual inductance thereof.

To this end, the desired rotor speed signal applied to the input of the unit 33 generating the stator current synchronous frequency is adjusted by an optimal slip $\Delta\omega_{isopt} = \Delta\omega_{opt}$ which is controlled by the unit 35 generating the rotor flux linkage slip as a function of the control input proportional to the desired torque M* of the induction motor 1 in accordance with the law:

$$\omega_s^* = \omega^* \pm \frac{R_r}{L_m(M^*) + L_{\sigma r}}, \quad (74)$$

wherein the function $L_m(M^*)$ is found from the equations (15) and (72), subject to $M = M^*$.

Simultaneously, a control action is applied to the ortho-phasal input 3 of the transvector inverter 2. This control input is proportional to the desired torque-producing component $i_{sx}$ of the stator current amplitude, which is optimized in terms of minimal current and, according to equations (28) and (70), is adjusted to follow the desired torque M* in conformity with the law:

$$i_{sxopt}^* = \pm \frac{1}{L_m(M^*)} \sqrt{\frac{2}{3Z_p}[L_m(M^*) + L_{\sigma r}]M^*}. \quad (75)$$

The equation (75) is realized by means of the unit 34 generating the torque-producing component of the stator current amplitude.

Simultaneously, a control action is applied to the co-phasal input 5 of the transvector inverter 2. This control input is proportional to the desired, optimized by the minimal current, torque-producing component $i^*_{sy\ opt}$ of the stator current amplitude, which is controlled according to the equations (27) and (70) as a function of the desired optimal amplitude $\psi^*_{r\ opt}$ of the rotor flux linkage in conformity with the law:

$$i_{syopt}^* = \frac{\psi_{ropt}^*}{L_m(\psi_{ropt}^*)}, \quad (76)$$

where the function $L_m(\psi^*_{r\ opt})$ is given by:

$$\left.\begin{array}{l} L_m = \dfrac{\psi_m}{i_{mk}} \cdot ctg\dfrac{\psi_m}{\psi_{mk}}, \\[2mm] \psi_m = \psi_{ropt}\sqrt{1 + \left(\dfrac{L_{\sigma r}}{L_r}\right)^2}. \end{array}\right\} \quad (77)$$

The desired torque-producing quadrature component $i^*_{sy}$ of the stator current amplitude, which is a non-linear function of the desired torque M* of the induction motor 1, can be found from the equations (70), (76), and (77). This non-linear relationship $i^*_{sy}(M^*)$ is realized by the unit 36 generating the rotor flux linkage amplitude.

When three control actions are changed by the transvector inverter 2 at the inputs 3, 4, and 5 according to the laws (74)–(77), the phase shift $\epsilon_\phi$ of the stator current in relation to the rotor flux linkage is formed according to the following law:

$$\epsilon\phi = \arctan\frac{i_{sxopt}^*}{i_{syopt}^*}, \quad (78)$$

The stator current instantaneous frequency $\omega_{is}$ is produced as a sum of the synchronous frequency $\omega_s = \omega^*_s$ and the rate of change of the phase shift $\epsilon\phi$:

$$\omega_{is} = \omega_s^* + \frac{d\epsilon\phi}{dt} \quad (79)$$

while the stator current phase $\epsilon\phi$ is changed in accordance with the law:

$$\epsilon_s = \phi^*_s + \epsilon_\phi \quad (80)$$

In this case, the minimal instantaneous stator current amplitude equal to the minimal value of the stator current vector $\bar{i}_s$ is produced by the transvector inverter 2 as a function of the desired torque M* of the induction motor 1 in accordance with the control actions applied to the ortho-phasal and co-phasal inputs of the transvector inverter 2, which change according to the laws (75) and (76).

The minimal amplitude in this case is given by:

$$i_{smin} = \sqrt{(i_{sxopt}^*)^2 + (i_{syopt}^*)^2} \quad (81)$$

To summarize, the control method according to the present invention consists in that the stator current phase $\epsilon_s$ is controlled as a sum of the synchronous phase $\phi_s$ generated by scanning the synchronization frequency $\omega^*_s$ which is calculated as a function of the rotor speed $\omega$ and as a function of the desired torque $M^*$ of the induction motor, subject to the equality of the stator current synchronous frequency $\omega_s = \omega^*_s$ and the rotor flux linkage frequency $\omega_s$:

$$\phi_s = \phi^*_s = \int \omega^*_s(t)dt = \int \omega_s(t)dt, \qquad (82)$$

and the phase shift $\epsilon_\phi$ which is controlled in accordance with the equation (78) as an inverse tangent of the ratio of the desired torque-producing and flux-producing components $i^*_{sx}$ and $i^*_{sy}$ of the stator current amplitude. It is important that the torque-producing component and the flux-producing component of the stator current amplitude are controlled simultaneously in conformity with the equations (75) and (76), while the desired amplitude $\psi_r$ of the rotor flux linkage is controlled conformably to the equation (70) as a function of the square root of the desired torque $M^*$ of the induction motor 1, which is prescribed by the control signal $M^*$ applied to the input of the torque drive employing an induction motor.

By a torque induction motor drive is meant an induction motor drive whose control input is a signal assigning a desired torque $M^*$ of the induction motor which produces an actual torque M equal to the desired one. For example, the part of the speed-adjustable induction motor drive of FIG. 6, whose input is the output of the unit 37 for assigning the desired induction motor torque, relates to the torque induction motor drive.

The foregoing unit 36 generating the amplitude of the rotor flux linkage prescribes, in the induction motor 1, an optimal, in terms of the stator current minimum, amplitude of the rotor flux linkage in accordance with the equation (70). But, as follows from the equation (22), the rotor flux linkage amplitude $\psi_r$ which changes with time t is coupled, subject to the orientation condition (25), with the input control signal $i^*_{sy}$ applied to the co-phasal input 5 of the transvector inverter 2 by the following differential equation:

$$\frac{L_r}{R_r} \cdot \frac{d\psi_r}{dt} + \psi_r = L_m \cdot i_{sy}^*. \qquad (83)$$

Since the synchronization frequency $\omega^*_s$ is assigned, in the electric drive employing the circuit of FIG. 6, equal to the synchronous frequency $\omega_s$ of the rotor flux linkage, the orientation condition (25) is used in this drive to control the stator current vector, and, consequently, the co-phasal current $i_{syn}$ is equal, in dynamic conditions, to the actual value of the flux-producing quadrature component $i_{sy}$ of the stator current amplitude, which is the function of the projection of the actual stator current vector $\bar{i}_s$ of the induction motor 1 relative to the actual vector $\bar{\psi}_r$ of the rotor flux linkage only when additional adjustments are made of the values $i^*_{sx}(t)$ and $\Delta\omega^*(t)$ as function of time. This makes it necessary to introduce corrections in the dynamic processes of controlling the ortho-phasal current and the synchronization frequency.

In order to form the electromagnetic transient process of interrelated change of the rotor flux amplitude, the ortho-phasal current, and the synchronization frequency, the dependence of the actual amplitude $\psi_r$ of the rotor flux linkage on time t according to equation (83) should be taken into account, given the inertia-free assignment of the co-phasal current $i_{syn}$ as a function of the desired torque $M^*$ of the induction motor.

The method of interrelated control of the ortho-phasal current and synchronization frequency as a function of the actual value of the desired rotor flux amplitude $\psi^*_r(t)$, in accordance with the equation (83), is realized in the electric drive whose circuit is shown in FIG. 7.

The electric drive (FIG. 7) comprises an induction motor 1 whose stator windings are connected to outputs 6, 7, and 8 of a transvector inverter 2, while the rotor thereof is connected to a rotor speed transducer 32. A unit 37 for assigning the desired induction motor torque is installed at the input of the electric drive and the output of said unit 37 is connected to an input of a unit 36 generating the rotor flux linkage amplitude.

The output of the unit 37 for assigning the desired induction motor torque is connected to a dividend input of a first division device 39 whose output is connected to a dividend input of a second division device 40 and to the ortho-phasal input 3 of the transvector inverter 2. The output of the second division device 40 and the output of the speed transducer 32 are connected to inputs of a summer 41 whose output is connected to the frequency input 4 of the transvector inverter 2.

The output of the unit 37 for assigning the desired induction motor torque is connected to the input of the unit 36 generating the rotor flux linkage amplitude. The output of the unit 36 for generating the rotor flux linkage amplitude is connected to the joint inputs of an aperiodic circuit 42 and a unit 43 for assigning the flux-producing component of the stator current amplitude. The output of the aperiodic circuit 42 is connected to the dividend inputs of the first and second division devices 39 and 40. The output of the unit 43 for assigning the flux-producing component of the stator current amplitude is connected to the cophasal input of the transvector inverter 2.

The aperiodic circuit 42 can be a standard operational amplifier whose feedback circuit time constant is equal to the electromagnetic time constant T of the rotor of the induction motor 1 (cf., for example, F. Fröhr, F. Ortenburger, Introduction of Electronic Generation Techniques, Moscow, Energia Publ., 1973, p. 99).

The division devices 39 and 40 can employ a standard divider circuit based on standard commercially available multipliers (cf., for example, S. V. Yakubovsky, Analog and Digital Integrated Microcircuits, Moscow, Radio i Svyaz Publ., 1985, pp. 320–322).

The electric drive shown in FIG. 7, according to the invention, operates as follows.

When the desired torque $M^*$ of the induction motor 1 is constant, control processes in the electric drive are analogous to those described above for the electric drive of FIG. 6.

When the desired torque $M^*(t)$ of the induction motor 1 changes, the desired steady-state amplitude $\psi^*_{r\infty}$ of the rotor flux linkage is to be produced at the output of the unit 36 for generating the rotor flux linkage amplitude in accordance with the equation (70) as a function of the actual induction motor torque $M^*(t)$ which is to be produced at the output of the unit 37 for assigning the desired induction motor torque. The actual value of the desired amplitude $\psi^*_r(t)$ of the rotor flux linkage is prescribed as a function of the desired amplitude $\psi^*_{r\infty}$ by means of the aperiodic circuit 42, while the value $i^*_{sy}(\psi^*_{r\infty})$, subject to saturation, is calculated according to the equations (76) and (77) by means of the unit 43 for assigning the flux-producing component of the statro current amplitude.

In this case, the phase, frequency, and amplitude of the stator current can be controlled by two methods, selection of a particular method being dependent on the fact whether or not the assigned torque M* exceeds the boundary value of the desired torque M*$_g$ of the induction motor 1.

The boundary value of the desired torque M*$_g$ of the induction motor 1 is produced in the electric drive due to the assignment of the constant initial level of the desired amplitude $\psi^*_{r\,min}$ of the rotor flux linkage and describes the value of the desired induction motor torque for which the initial level of the desired amplitude $\psi^*_{r\,min}$ of the rotor flux linkage is optimal in terms of the minimal current and corresponds to the optimal, in terms of the stator current minimum, condition expressed by the equation (70), that is, the boundary value of the desired torque of the induction motor 1 is equal to:

$$M_g^* = \frac{3}{2} L_p \cdot L_r (\psi_{rmin}^*)^2 \tag{84}$$

In case the desired initial torque M*$_o$ of the induction motor 1 is less than the boundary value M*$_g$, the phase, frequency, and amplitude of the stator current are controlled with the rotor flux linkage amplitude $\psi^*_{r\,min} = \psi_{r\,min}$ being constant and less by several orders of magnitude (at least twice) than the nominal amplitude $\psi_{rn}$ of the rotor flux linkage, that is, subject to (43), the following condition is satisfied:

$$\psi_{r\,min} \leq 0.5 \psi_{rn} \tag{85}$$

The minor value of the rotor flux linkage amplitude $\psi_{r\,min}$ permits, in accordance with the equations (41) and condition (62), at least a fourfold reduction of losses in power $\Delta P_{104}$ in the stator windings for setting up the magnetic field.

In this field of control of the torque M of the induction motor 1, the stator current phase $\epsilon_s$ is adjusted as a function of the desired torque M* and measured rotor speed $\omega$ in accordance with the equations (9), (29), (31), and (32) and the following law:

$$\epsilon_s = \int \left( \omega - \frac{2R_r}{3Z_p(\psi_{rmin}^*)^2} \cdot M^* \right) dt + \arctan \frac{2R_r}{3Z_p(\psi_{rmin}^*)^2} \cdot M^*. \tag{86}$$

In this relationship, the stator current phase shift relative to the rotor flux linkage is given by the inverse tangent function of the desired torque M* of the induction motor 1, which corresponds to conversion of the Cartesian coordinates as in equations (37) and (38).

In case the desired torque M* of the induction motor 1 exceeds the boundary torque M*$_g$, the stator current phase $\epsilon_s$ is adjusted, according to the equations (50), (53), (54), (55), and (57), by another method which consists in controlling the rotor flux linkage amplitude as a function of the desired torque of the induction motor 1. In this case, the stator current phase is prescribed by means of the transvector inverter 2 in accordance with the law:

$$\epsilon_s = \int \left( \omega \pm \frac{R_r}{L_m(M^*)} \right) dt + \tag{87}$$

$$\arctan \frac{\sqrt{\frac{2}{3Z_p}[L_m(M^*) + L_{\sigma r}]M^*}}{\psi^*_{r\,opt}}.$$

When the desired torque M*(t) of the induction motor 1 is rapidly changing, the rigid feedback between the required amplitude $\psi^*_r$ of the rotor flux linkage and the desired torque M*(t) of the induction motor 1, which is assigned by the control input according to the equations (22) and (23), results in delayed change of the amplitude $\psi_r(t)$ relative to the desired amplitude $\psi^*_r(t)$ of the rotor flux linkage, which is contrary to the conditions (4), (5), and (6) of invariant control of the induction motor 1.

In dynamic conditions it becomes necessary, therefore, to either form changes of the actual amplitude $\psi_r(t)$ of the rotor flux linkage or introduce a dynamic delay for the changes in the actual magnitude of the desired amplitude $\psi^*_r(t)$ of the rotor flux linkage, relative to the changes of the desired torque M*(t).

According to the method realized in the electric drive (FIG. 7) the second technique is used in dynamic conditions to provide invariant control.

In steady-state conditions, the minimal stator current mode of operation is employed in the electric drive (FIG. 7), that is $i_s = i_{s\,min}$, for a given shaft load of the induction motor 1 and a constant load torque M. The higher the load torque M, the larger the amplitude $\psi_{r\,opt}(M)$ of the rotor flux linkage.

To this end, in the electric drive (FIG. 7) the unit 36 for generating the rotor flux linkage amplitude is used to prescribe the magnitude of the desired rotor flux linkage amplitude in accordance with the characteristic curve $\psi_{r\,opt}(M)$ shown in FIG. 3.

Then, the unit 43 for assigning the flux-producing component of the stator current amplitude is used to prescribe the desired flux-producing quadrature component i*$_{sy\,opt}$ of the stator current amplitude as a function of the quantity $\psi_{r\infty} = \psi_{r\,opt}$ in accordance with the equations (55) and (56).

The signal prescribing the desired flux-producing quadrature component i*$_{sy\,opt}$ is applied to the co-phasal input 5 of the transvector inverter 2 (FIG. 7).

The flux-producing quadrature component i$_{sy}$ of the stator current amplitude is generated as a result of the adjustment of the instantaneous stator phase currents of the induction motor 1, and in this case i$_{sy}$=i*$_{sy\,opt}$.

An aperiodic process of changing the amplitude $\psi_r$ of the rotor flux linkage is effected in the induction motor 1 in accordance with the equation (83). In this case, the time constant of the aperiodic process is determined by equation (71).

This permits the use of the aperiodic function with the time constant T$_r$ to calculate, by means of the aperiodic circuit 42, the actual magnitude of the desired amplitude $\psi_r(t)$ of the rotor flux linkage according to the invention:

$$\psi^*_r(t) = \left( 1 - e^{-\frac{t}{t_r}} \right) \psi_{r\,\infty}. \tag{88}$$

The equation (88) is realized by means of the aperiodic circuit 42.

Then, the division device 39 is used to change, conformably, to the equation (28), the torque-producing quadrature component $i_{sx}$ of the stator current amplitude in accordance with the law:

$$i_{sx}(t) = i^*{}_{sx}(t) = \frac{2}{3L_p} \cdot \frac{L_r}{L_m} \cdot \frac{M^*}{\psi^*{}_r(t)} \quad (90)$$

while the synchronous frequency component characterizing the rotor flux linkage slip $\Delta\omega$ is changed by means of the second division device 40 in accordance with the law:

$$\Delta\omega = \Delta\omega^* = \frac{R_r}{L_r} \cdot L_m \cdot \frac{i^*{}_{sx}}{\psi^*{}_r(t)} \quad (90)$$

In this case, the dynamic frequency $\omega^*{}_{sd}(t)$ of control synchronization, which is equal to the dynamic frequency $\omega_{sd}(t)$ of the rotor flux linkage, is changed in relation to the steady-state synchronization frequency $\omega^*{}_s$ which is determined in steady-state conditions according to the equation (74) by additionally changing the slip $\Delta\omega$ according to the law (90).

The stator current phase control method used here consists in that the stator current phase $\epsilon_s(t)$ is additionally changed by additionally changing the phase $\psi^*{}_s = \phi_s$ as a function of time t of the electromagnetic transient process in accordance with the equation:

$$\phi^*{}_s = \phi_s = \int \left( \omega(t) + \frac{R_r}{L_r} \cdot L_m \frac{i^*{}_{sx}}{\psi^*{}_r(t)} \right) dt, \quad (91)$$

and by changing the phase shift $\epsilon_\phi$ of the stator current vector $\bar{i}_s$ relative to the rotor flux linkage vector $\bar{\psi}_r$ to a phase angle dependent on time t of the electromagnetic transient process in conformity with the equation:

$$\epsilon_\phi = \operatorname{arctg} \frac{i_{sx}(t)}{i^*{}_{sy\,opt}(M^*)}, \quad (92)$$

where $i^*{}_{sx}$ (t) is determined by the relationship (89), while the value $i^*{}_{sy\,opt}(M^*)$ is assigned according to the equations (70), (76), and (77).

As follows from the equation (88), in this method the invariant control of the torque $M(t) = = M^*(t)$ is effected by introducing a dynamic delay in the change of the actual value of the desired amplitude $\psi^*{}_r(t)$ of the rotor flux linkage, and, consequently, the actual amplitude $\psi_r(t)$ of the rotor flux linkage in response to the change of the torque M of the induction motor 1.

In slow electromechanical transient processes of changing the rotor speed $\omega(t)$ and the torque $M(t)$ of the induction motor 1, whose duration exceeds the electromagnetic time constant $T_r$ of the rotor circuit, as well as in lengthy steady-state conditions, this method of control of the induction motor 1 makes it possible to lower the rms value of the stator current for one cycle of the electric drive operation and reduce the heating of the induction motor 1 by minimization of the stator current amplitude in steady-state conditions and lowering the stator current amplitude in dynamic conditions with restricted acceleration of the electric drive.

However, during momentary response to execute minor displacements and restoration of the desired rotor speed, when the load torque increases, this control method can on the contrary lead to greater rms stator current value because the rotor flux amplitude has no time to change to an optimal amplitude in terms of the stator current minimum. In such cases, the initial amplitude $\psi_{ro}$ of the rotor flux linkage is increasd for the given electric drive in order to make the control of the induction motor 1 closer to control conditions where the rotor flux linkage amplitude is constant, which is advisable for industrial devices in which the steady-state torque of the idle run is high.

For some industrial applications, e.g. for some types of industrial robots where the torque range of the induction motor is narrow, particularly when backlash and elastic vibrations are a serious problem, changing the torque of the induction motor by jumps is not always advantageous. Maximum torque and acceleration are also not always advisable. In such cases, an induction motor drive can be used, in which the frequency-current control is effected in accordance with the law of constant amplitude of the rotor flux linkage. The diagram of this drive is shown in FIG. 8.

The electric drive comprises an induction motor 1 (FIG. 8) whose stator windings are connected to outputs 6', 7', and 8' of a frequency-current inverter 26 comprising two control inputs, a frequency input 28 and an amplitude input 29. The rotor of the induction motor 1 is connected with a speed transducer 32 whose output is connected, via a first summer 41, to the frequency input 28 of the frequency-current inverter 26. The speed transducer 32 can be made as a standard tachometer generator, as described in the electric drive above (FIG. 7).

The output of the speed transducer 32 (FIG. 8) is also connected to an input of a second summer 44 whose second input is connected to an output of a rotor speed setting unit 38. The output of the second summer 44 is connected to an input of a proportional-plus-integral speed controller 45. The output of the proportional-plus-integral speed controlled 45 is connected to joint inputs of a phase shift angle setting unit 46, a proportional circuit 47, a quadrature sum calculating unit 48. A second input of the quadrature sum calculating unit 48 is connected to an output of a unit 49 for assigning a constant amplitude of the rotor flux linkage. An output of the phase shift angle setting unit 46 is connected to an input of a unit 50 calculating the dynamic component of the stator current frequency.

The output of the proportional circuit 47 is connected to a second input of the first summer 41. An output of the unit 50 calculating the dynamic component of the stator current frequency is connected to a third input of the first summer 41.

Units 38, 47, 49 and summers 41 and 44 can employ conventional operational amplifiers (cf., for example, B. K. Nesterenko, Integrated Operational Amplifiers. Guidebook, Moscow, Energia Publ., 1982, in Russian, p. 107).

The phase shift angle setting unit 46 is a unit of inverse tangent non-linearity, which can employ a circuit based on an operational amplifier using diodes at the input thereof and in the feedback loop (cf., for example, B. K. Nesterenko, Integrated Operational Amplifiers. Guidebook, Moscow, Energia Publ., 1982, in Russian, p. 70).

The unit 48 calculating the quadrature sum is a nonlinearity unit which can employ a conventional operational amplifier using a circuit similar to that of the phase shift angle setting unit 46.

The unit 50 calculating the dynamic component of the stator current frequency is a differentiating circuit using a conventional operational amplifier featuring an input capacitor (cf., for example, F. Fröhr, F. Ortenburger, Introduction to Electronic Adjustment Technique, Tr. from German, Moscow, Energia Publ., 1973, p. 82).

This electric drive operates as follows.

In the absence of the required torque $M^* = 0$, constant currents are flowing in the stator windings of the induction motor 1 and a magnetic field is established with a constant amplitude $\psi_{ro}$ of the rotor flux linkage.

The instantaneous phase currents at the outputs 6', 7', and 8' of the frequency-current inverter 26 are constant to a minor pulsation determined by the switching frequency of the frequency-current inverter 26, because no frequency $\omega^*_{is}$ of the stator current is assigned at the frequency input 28 of the inverter 26.

The magnitude of the constant instantaneous phase currents is determined by an arbitrary initial phase $\epsilon_{so}$ of the frequency-current inverter 26 and by the initial setting of the desired stator current amplitude $i^*_s$ equal to the constant desired magnitude of the flux-producing quadrature component $i^*_{syo}$ of the stator current amplitude, which is assigned at the amplitude input 29 of the transvector inverter 26.

Since there is no stator current phase shift $\epsilon_\phi$ in relation to the rotor flux linkage, the torque of the induction motor 1 is equal to zero, the rotor speed is zero, the output voltage of the speed transducer 32 is zero.

Since there is no voltage at the output of the rotor speed setting unit 38, the output voltages of the summers 41 and 44 are equal to zero. The output voltages of the units 45, 46, and 47 are also equal to zero. The output voltage of the unit 48 calculating the quadrature sum is constant and corresponds to the constant desired magnitude of the flux-producing quadrature component $i^*_{syo}$ of the stator current, which is set by the constant voltage $U_{i^*_{syo}}$ at the output of the unit 49 for assigning the rotor flux linkage constant amplitude, said voltage being proportional to the desired constant amplitude $\psi^*_{ro}$ of the rotor flux linkage.

Since the output voltage of the phase shift angle setting unit 46 is equal to zero, there is no voltage at the output of the unit 50 calculating the dynamic component of the stator current frequency.

When an active load moment is applied to the shaft of the induction motor 1, or when a desired, other than zero, rotor speed $\omega^*$ is assigned proportional to the output voltage of the rotor speed setting unit 38, there is an electromechanical transient process initiated to restore the rotor speed $\omega$ to the desired speed $\omega^*$ set at the control input of the summer 44. As soon as an error signal $\omega^* - \omega$ indicating the discrepancy between the desired and measured rotor speeds is applied to the input of the proportional-plus-integral speed controller 45, the output thereof changes abruptly and the voltage assigning the desired torque $M^*$ of the induction motor 1 starts increasing. This results in a jump and increase of the output voltage of the quadrature sum calculating unit 48 which calculates the voltage assigning the desired amplitude $i^*_s$ of the stator current in accordance with the equation:

$$i_s = \sqrt{[i_{sx}(M^*)]^2 + i^{*2}_{syo}} \tag{93}$$

where the magnitude of the desired torque-producing stator current component $i^*_{sx}(M^*)$ is modified in accordance with the equation (28) proportionally to the desired torque $M^*$ of the induction motor 1.

In conformity with the equation (1), the jump and increase of the stator current amplitude $i_s$ leads to no jump and increase of the induction motor torque M until the stator current phase shift $\epsilon_\phi$ in relation to the rotor is effected.

According to the invention, the stator current phase shift $\epsilon_\phi$ in relation to the rotor flux linkage is effected, in the frequency-current control in polar coordinates, by forcing the rate of change of the stator current phase $\epsilon_s$ relative to the rate of change of the synchronous phase $\psi_s$ of the rotor flux linkage in accordance with the rate of change of the desired torque $M^*$ of the induction motor 1 ($dM^*/dt$).

To this end, the proportional circuit 47 is used to calculate, according to the equation (29), the required motor flux linkage slip $\Delta\omega^*$ relative to the rotor, which is proportional to the desired torque $M^*$ of the induction motor 1. The sum of the two voltages supplied from the outputs of the proportional circuit 47 and the speed transducer 32 to the inputs of the summer 41 is proportional to the required frequency of the rotor flux linkage, which is calculated by the summer 41 according to the equation (33).

The stator current synchronous phase $\phi_s$ equal to the rotor flux linkage phase is produced by sweeping the synchronous frequency $\omega_s = \omega^*_s$ in accordance with the expression (32).

As the magnitude of the desired torque $M^*$ grows, so does the output voltage of the unit 46 for assigning the angle of the phase shift $\epsilon^*_\phi$, wherein the non-linear dependence is realized of the output voltage $U_{\epsilon\phi}$ assigning the desired angle of the phase shift $\epsilon^*_\phi$, as a function of the input voltage $U_{M^*}$ proportional to the desired torque $M^*$ of the induction motor 1 according to the formula (48), subject to the expressions (27) and (28), that is in accordance with the equation:

$$\epsilon^*_\phi = arctg \frac{i^*_{sx}}{i^*_{syo}} = arctg \frac{2L_r}{3Z_p \cdot \psi^{*2}_{ro}} \cdot M^*. \tag{94}$$

The increasing signal assigning the desired angle of the phase shift $\epsilon^*_\phi$ results in voltage produced at the output of the unit 50 calculating the dynamic component of the stator current frequency. This voltage is proportional to the rate $d\epsilon^*_\phi/dt$ of change of the desired angle of the phase shift $\epsilon^*_\phi$.

The rate $d\epsilon_\phi/dt$ of change of the angle of the phase shift $\epsilon_\phi = \epsilon^*_\phi$ is the third dynamic component $\Delta\omega_d$ of the stator current frequency, which is equal to the relative rotational speed of the stator current vector relative to the rotor flux linkage vector.

This means that the rate of change of the stator current phase $\epsilon_s$, equal to the instantaneous frequency $\omega_{is}$ of the stator current, differs from the synchronous frequency $\omega_s$ of the stator current, equal to the rate of change of the synchronous phase $\phi_s$ of the rotor flux linkage, by the magnitude of the dynamic component $\Delta\omega_d$ of the stator current frequency, proportional to the output voltage of the unit 50 and determined by means of the formula:

$$\Delta\omega_d = \frac{d\left(\text{arctg}\frac{2L_r}{3Z_p\psi^{*2}_{ro}} \cdot M^*\right)}{dt}. \quad (95)$$

Here the stator current frequency changes according to the law:

$$\frac{d\epsilon_\phi}{dt} = W_{is} = \omega + \Delta\omega + \Delta\omega_d, \quad (96)$$

while the stator current phase is formed equal to the sum of three angles $$\epsilon_s = \lambda_s + \phi_u + \epsilon_\phi \quad (97)$$

The third dynamic component $\Delta\omega_d$ of the stator current frequency, leads to the increase of the phase shift $\epsilon_\phi$ with the time of the sweep. This produces a growing torque M of the induction motor 1 until the desired and measured rotor speed are completely equalized, $\omega=\omega^*$ due to the $^a$static speed adjustment by means of the proportional-plus-integral speed controller 45.

In this electric drive, the control method consists in controlling the rate $d\epsilon_s/dt$ of change of the stator current phase, which is equal to the instantaneous stator current frequency $\omega_{is}$, as a sum of the rotor speed $\omega$, the rate $d\phi_r/dt$ of change of the rotor flux linkage relative to the rotor, and the rate $$\frac{d\epsilon_\phi}{dt}$$

of the stator current phase shift relative to the rotor flux linkage. In this case, the rate of the phase displacement or shift is determined by the rate of change of the input action M* of the torque drive.

When the range of change of the desired torque M* of the induction motor 1 is narrow and the desired amplitude $\psi^*_{ro}$ of the rotor flux linkage is high and close to the nominal rotor flux linkage amplitude $\psi_{rn}$, the inverse tangent dependence (94) of the desired angle of the phase shift $\epsilon^*_\phi$ on the desired torque M* of the induction motor 1 becomes close to the proportional relationship $\epsilon_\phi^* = K_{\epsilon\phi} \cdot M^*$, where K is a constant coefficient. In this case, the unit 46 for assigning the phase shift angle can be made as a proportional amplifier having a constant gain factor equal to $K_{\epsilon\phi}$. The dynamic component $\Delta\omega_d$ of the stator current frequency is changed in proportion to the rate of change of the desired torque M* of the induction motor 1, which is proportional to the control input of the torque induction motor drive according to the formula:

$$\Delta\omega_d = K_{\epsilon\phi}\frac{dM^*}{dt}. \quad (98)$$

In this control method realized in the electric drive of FIG. 8, the rate of change of the torque of the induction motor 1 is limited since an abrupt change of the control input proportional to the desired torque M* of the induction motor cannot bring about a similar change of the actual torque M of the induction motor because the unit 50 calculating the dynamic component of the stator current frequency is saturated and its output voltage is limited, and this output voltage limits the third dynamic component of the stator current frequency to a specific maximum value $\Delta\omega_{d\,max}$ $$\Delta\omega_d \leq \Delta\omega_{dmax}$$

The frequency-current control in polar coordinates does not provide invariant control of the induction motor torque when it is changed abruptly or by a jump.

Since the instantaneous stator phase currents of an induction motor cannot be changed without some lag caused by limited capabilities of the power inverter operating with an inductive load, the speed of response to a jump in the stator current phase, which is physically an abrupt change of phase currents, is also limited by the capabilities of the power inverter, i.e. the maximum output voltage, and load parameters. But the stator current vector control adds to this lag due to the technique by which signals assigning the instantaneous phase current are produced and the circuitry of power conversion.

If the above method described for electric drives using frequency-current control (FIGS. 5 and 8) is employed here to produce signals assigning instantaneous phase currents i*$_{sa}$, i*$_{sb}$, and i*$_{sc}$, the rate of change of the stator current phase $\epsilon_s$ can be raised to a maximum limited only by the power capabilities of the power inverter. This is achieved by the induction motor control method whereby the stator phase windings are supplied with a system of two currents: a symmetrical three-phase system of co-phasal currents i$_{syn\,a}$, i$_{syn\,b}$, i$_{syn\,c}$ and a symmetrical three-phase system of ortho-phasal currents i$_{ort\,a}$, i$_{ort\,b}$, i$_{ort\,c}$, which are produced using the frequency-current control method and six single-phase frequency-current inverters. In this case, each of the six single-phase frequency-current inverters is controlled via two channels as described above for the electric drive of FIG. 5 with the frequency-current control system. One channel is used to control the current frequency, and the other to control the current amplitude.

An embodiment of an electric drive using this control method is given in FIG. 9 for one phase winding of the stator.

The electric drive comprises an induction motor 1 (FIG. 9) whose each phase winding (A.B,C) is connected to outputs of two-single-phase frequency-current inverters 51 and 52. Two first joint outputs 53 and 54 of the single-phase frequency-current inverters 51 and 52 are connected to one input of the stator phase winding A of the induction motor 1. Two other joint outputs 55 and 56 of the single-phase frequency-current inverters 51 and 52 are connected to the other input of the stator winding A of the induction motor 1. The joint frequency inputs 28 and 57 of the frequency-current inverters 51 and 52 are connected to the output of the unit 30 for assigning the instantaneous stator current frequency. The windings B and C of the induction motor 1 are connected in a similar manner.

The amplitude input 29 of the frequency-current inverter 51 is connected to the output of the unit 31 for assigning the instantaneous stator current amplitude, which constitutes a unit for assigning the co-phasal current amplitude.

An amplitude input 58 of the second single-phase frequency-current inverter 52 is connected to an output of another unit 59 for assigning the amplitude of the ortho-phasal current. An output of an ortho-phasal current reversing unit 60 is connected to one of the pulse inputs of a unit 61 generating desired instantaneous phase currents (FIG. 5) of the single-phase frequency-current inverter 52 (FIG. 9).

Three pairs of the single-phase frequency-current inverters 51 and 52 constitute a phase-current converter 62 whose outputs are connected to the three phase windings A, B, and C of the induction motor stator.

The frequency-current inverters 51 and 52 can employ the circuit (FIG. 5) described above, using one phase of the unit 22 for adjusting instantaneous phase currents.

The unit 61 generating desired instantaneous phase currents of the frequency-current inverter 51 can be made as in the electric drive of FIG. 5.

The unit 30 for assigning the stator current frequency can be made as described above for the electric drive featuring a frequency-current inverter (FIG. 5).

The units 31 and 59 can be made as described above for the electric drive of FIG. 5.

The ortho-phasal current reversing unit 60 can be made as a conventional comparator (cf., for example, Analog and Digital Integrated Microcircuits, Handbook, Ed. S. V. Yakubovky, Moscow, Radio i Svyaz Publ., 1985, in Russian, pp. 312–313).

The phase-current converter 62 can be made as shown in FIG. 9 employing six single-phase frequency-current inverters.

The electric drive of FIG. 9 operates as follows.

Each of the stator windings A, B, and C of the induction motor 1 is supplied by current from two independent sources: one source is the single-phase frequency-current inverter 51, and the other source is the frequency-current inverter 52. The unit 61 generating desired instantaneous phase currents of the single-phase frequency-current inverter 52 produces a signal assigning the instantaneous phase current with a phase shift of ±90 electrical degrees relative to the signal assigning the instantaneous phase current, which is produced by the unit 27 (FIG. 5) generating the desired instantaneous phase currents of the single-phase frequency-current inverter 51 (FIGS. 5 and 9).

The signal assigning the desired synchronous stator current frequency $\omega^*_s$ is applied to the joint frequency inputs 28 and 57 of the single-phase frequency-current inverters 51 and 52. This signal prescribes the stator current instantaneous frequency $\omega_{is}$ in steady-state conditions of the induction motor 1, the input signal assigning the amplitude of the ortho-phasal and co-phasal currents being constant.

The signal assigning the co-phasal current amplitude $i_{syn}$ is applied to the amplitude input 29 of the single-phase frequency-current inverter 51 from the output of the unit 31 for assigning the instantaneous stator current amplitude. Cosinusoidal periodic instantaneous phase current $i_{sa}=i_{syn}\cos\phi_s$ flows in the stator winding of the induction motor 1. This current produces the co-phasal current $i_{syn}$ whose amplitude is proportional to the output signal of the unit 31 for assigning the instantaneous stator current amplitude. The synchronous phase $\phi_s$ is produced by sweeping the synchronous frequency $\omega_s=\omega^*_s$ proportional to the output signal of the unit 30.

When there is no output signal of the unit 31 for assigning the instantaneous stator current amplitude, no co-phasal current is produced $i_{syn}=0$. In these conditions, when the signal assigning the amplitude $i_{ort}$ of the ortho-phasal current is applied to the amplitude input 29 of the single-phase frequency-current inverter 51 from the output of the unit 59 for assigning the amplitude of the stator ortho-phasal current, sinusoidal periodic instantaneous phase current $i_{sa}=I_{ort}\sin\phi_s$ flows in the stator winding of the induction motor 1. This current produces the ortho-phasal current $i_{ort}$ whose amplitude is proportional to the output signal of the unit 59 for assigning the amplitude of the stator ortho-phasal current.

When two inputs are applied simultaneously from the outputs of the units 31 and 59, the instantaneous value of the current flowing in the phase winding A of the induction motor 1 is determined by the difference between the co-phasal and ortho-phasal currents according to the formula:

$$i_{sa}=I_{syn}\cos\phi_s-I_{ort}\sin\phi_s. \tag{99}$$

The direction of the ortho-phasal current depends on the direction of counting pulses fed to the pulse input of the unit 61.

The direction of the ortho-phasal current can be selected by means of a logic signal taken from the output of the ortho-phasal current reversing unit 60.

Analogous processes occur in the phases "b" and "c", but with a phase shift of ±120 electrical degrees relative to the phase "a" since the phase-current converter 62 is a three-phase arrangement.

By virtue of the formation of the symmetrical system of instantaneous stator phase currents $i_{sa}$, $i_{sb}$, and $i_{sc}$ of the induction motor 1, the stator current vector $\bar{i}_s$ is controlled in Cartesian coordinates Y-X rotating about the axis "α" of the reference phase winding A of the induction motor with the synchronization frequency $\omega^*_s$, this control process being analogous to that of the transvector inverter 2 (FIG. 4).

The control processes of the induction motor of the electric drive of FIG. 9 are analogous to those described above for the electric drive of FIG. 4.

The magnetic field is established in the induction motor 1 with the amplitude of the rotor flux linkage, proportional to the amplitude of the co-phasal current, by prescribing the constant co-phasal current amplitude $i_{syn}$ with the zero synchronization frequency $\omega^*_s$.

By further changing the ortho-phasal current amplitude $I_{ort}$, the instantaneous amplitude of the instantaneous phase current is simultaneously increased according to the formula:

$$i_s=\sqrt{I^2_{syn}+I^2_{ort}}, \tag{100}$$

and the stator current phase $\epsilon_s$ is shifted relative to the initial synchronous phase $\phi_{so}$ to a phase angle whose magnitude and direction are determined by the inverse tangent function of the ratio of the amplitudes $I_{ort}$ and $I_{syn}$ of the ortho-phasal and co-phasal currents in accordance with the formula:

$$\epsilon_s=\phi_{so}+\text{arcltg}\frac{I_{ort}}{I_{syn}}, \tag{101}$$

The torque M of the induction motor 1 is the result of the shift of the stator current phase $\epsilon_s$ in relation to the initial synchronous phase $\phi_{so}$ of the rotor flux linkage. This torque M is proportional to the ortho-phasal current amplitude $I_{ort}$, and the rotor speed $\omega$, consequently, increases. In order to maintain the torque M of the induction motor 1 at the same level with variations of the rotor speed ω, it is necessary to change the synchronous frequency which is prescribed by a signal produced at the output of the unit 30 for assigning the instantaneous stator current frequency.

If the assignment of the desired synchronization frequency $\omega^*_s(t)$ does not agree with the actual rotor flux linkage frequency $\omega_s(t) = d\phi_s(t)/dt$, the actual torque M of the induction motor 1 is not under the invariant control and varies irrespective of the ortho-phasal current amplitude $I_{ort}$ and the control input.

When calculating, in the unit 30, the desired synchronization frequency $\omega^*_s(t)$ equal to the actual frequency $\omega_s(t)$ of the actual rotor flux linkage, the co-phasal current $I_{syn}$ is equal to the flux-producing component $i_{sy}$ of the stator current amplitude, while the ortho-phasal current amplitude $I_{ort}$ is equal to the torque-producing component of the stator current amplitude $i_{sx}$.

In this case, the phase shift $\epsilon_\phi$ of the stator current, relative to the rotor flux linkage, is determined by the following formula:

$$\epsilon_\phi = \operatorname{arctg} \frac{I_{ort}}{I_{syn}}. \tag{102}$$

In this method which can be identically realized in electric drives shown in FIGS. 4, 6, 7, and 9, the instantaneous phase current in the reference stator phase winding "A" is produced equal to the difference between the co-phasal and orthophasal current, according to the formula:

$$i_{sa} = i_{syn} - i_{ort}, \tag{103}$$

control of the phase current $i_{syn}$ being synchronized by the synchronization frequency $\omega^*_s$ equal to the synchronous rotor flux linkage frequency $\omega_s$ which is obtained equal to the sum of two frequencies $\omega + \Delta\omega$. One of the frequency components (the rotor speed ω) is measured by means of the speed transducer 32 as shown in FIGS. 6 and 7.

The other frequency component (the rotor flux linkage slip Δω relative to the rotor) is calculated from the differential equation (23) and equation (1) as a function of the desired torque $M^* = M$ of the induction motor 1.

When control is effected in the Cartesian coordinates by means of the transvector inverter 2 (FIG. 4) or the phase-current converter 62 (FIG. 9), the stator current slip $\Delta\omega_{i\Gamma}$ in relation to the rotor flux linkage may not be calculated additionally because with transvector power conversion this third dynamic component $\Delta\omega_d = \Delta\omega_{i\Gamma}$ of the stator current frequency is not produced by an individual control channel, as described in the frequency-current controlled electric drive of FIG. 8, but directly by the transvector power conversion, as shown in FIGS. 4 and 7. The third dynamic component $\Delta\omega_d$ of the frequency is produced, in the phase-current control employing transvector power conversion, as a result of changes of the ratio of the ortho-phasal and co-phasal currents, assigned by control inputs, according to the following equation:

$$\Delta\omega_d = \Delta\omega_{i\Gamma} = \frac{d\left(\operatorname{arctg} \frac{I_{opt}}{I_{syn}}\right)}{dt}. \tag{104}$$

This angle displacement of the stator current vector $\vec{i}_s$ in relation to the rotor flux linkage vector $\vec{\Gamma}_r$ results in that the stator current phase $\epsilon_s(t)$ changes for the transvector inverter 2 (FIG. 4) and for the phase-current converter 62 (FIG. 9) according to the same law:

$$\epsilon_s(t) = \phi_{s0} + \int_0^\infty \Delta\omega(t)dt + \operatorname{arctg}\frac{I_{opt}(t)}{I_{syn}(t)}. \tag{105}$$

Phase-current control according to the laws (100) and (105) provides autonomous control, conformably to any, including abruptly changing laws, of the module (of the amplitude $i_s$) and argument (of the phase $\epsilon_s$) of the stator current vector $\vec{i}_s$.

Autonomous control of the module (of the amplitude $i_s$), irrespective of the argument (phases $\epsilon_s$), is effected by simultaneous proportional control of the ortho-phasal and co-phasal currents $I_{ort}(t) = K_{ort} I_{syn}(t)$, where $K_{ort}$ is a fixed coefficient.

Then, according to the equation (105), the argument (phases $\epsilon_s$) is not controlled as a function of the amplitudes $I_{ort}$ and $I_{syn}$, while the module (amplitudes $i_s$) is controlled in proportion to the ortho-phasal and co-phasal currents according to the formula:

$$i_s(t) = I_{syn}(t) \cdot \sqrt{1 K_{ort}^2} \tag{106}$$

Autonomous control of the argument (phases $\epsilon_s$), irrespective of the module (amplitudes $i_s$), is effected by simultaneous control of the ortho-phasal and co-phasal currents according to the law:

$$I_{ort}(t) = \sqrt{i_{so}^2 - I_{syn}^2(t)}, \tag{107}$$

where $i_{so}$ is the constant module of the vector $\vec{i}_s$.

When the co-phasal current is constant $I_{syn} = I_{syn\,o}$, the module (amplitudes $i_s$) and argument (phases $\epsilon_s$) of the stator current vector $\vec{i}_s$ are controlled together as functions of the ortho-phasal current amplitude $I_{ort}(t)$.

Given these distinguishing features of the phase-current control method, the transvector inverter 2 (FIG. 4) and phase-current converter 62 (FIG. 9) have one property in common, which is complete controllability of the stator current vector $\vec{i}_s$, and are in this respect all-purpose converters which can be used to control AC motors.

Since control functions are similar for the transvector inverter 2 (FIG. 4) and the phase-current converter 62 (FIG. 9) and the number of power switches is four times less in the transvector inverter 2 (FIG. 4) than in the phase-current converter 62 (FIG. 9), it is the transvector inverter 2 (FIG. 4) that is used in the electric drives discussed below. In some embodiments of electric drives, it can be replaced by the phase-current converter 62 (FIG. 9) described above.

According to the invention, simultaneous invariant and optimal control of dynamic, power, and thermal processes in an induction motor is attained by complete vector control of the stator current, using transvector power conversion, and interrelated control of all stator current vector parameters with due regard for their dynamic connections with parameters of other state vectors of the induction motor, which are shown in FIG. 1.

For this purpose, synchronization of control is used, as described above, so that phase-vector control can be effected, whereby the phase shift between the state vectors of an induction motor is controlled according to optimal laws. At the same time, the second part of optimization is also made use of, this is the optimization of the speed of response, or, in other words, minimization of the duration $t = t_{min}$ of the electromagnetic transient process of bringing the rotor flux linkage amplitude $\psi_r(t)$ from one optimal steady-state condition $\psi_{r\,opt}(M_o)$ to another optimal steady-state condition $\psi_{r\,opt}(M_1)$ while the induction motor changes over from one torque $M_o$ to another torque $M_1$.

Time optimal control of an induction motor can be expressed in terms of minimal time $T_\omega$ of the electromechanical transient process of transferring from the initial rotor speed $\omega_o$ to the assigned final rotor speed $\omega_1$:

$$T_\omega = T_{\omega min}$$

The fundamental constraint is the limitation of the maximum stator current amplitude:

$$i_s \leq i_{s\,max},$$

where $i_{s\,max}$ is the permissible output current of the power inverter.

If the permissible output current of the power inverter is substantially higher than the amplitude of the rated starting current of the induction motor stator during direct-on-line starting, the main constraint is the limitation of the heating of the insulation of the stator winding in an induction motor, which is given by:

$$Q = K_Q \int_0^{T_\omega} i_s^2(t)dt \leq Q_{max}, \qquad (108)$$

where
- Q is the amount of heat produced in the stator winding during the period $T_\omega$ of the electromechanical transient process;
- $Q_{max}$ is the maximum amount of heat permissible in the stator winding at a permissible heating level of the stator winding insulation;
- $K_Q$ is the proportionality factor.

The electromechanical transient process of changing the rotor speed $\omega(t)$ and the induction motor torque $M(t)$ is running concurrently with the electromagnetic transient process of establishing and changing the magnetic field and amplitude $\psi_r(t)$ of the rotor flux linkage. Both processes, electromechanical and electromagnetic, are inseparable. This is manifested in that, on the one hand, parameters of the stator current vector $\bar{i}$ change according to the law common to both transient processes and, on the other hand, the induction motor torque M changes similarly in both processes.

According to the invention, the disclosed control method provides simultaneous response speed optimization of both the electromechanical and electromagnetic transient processes, subject to the above limitations and to the conditions of minimization of the current in steady-state conditions.

The method makes use of the process of stator current vector control, which are determined according to the method of algorithmic linearization for an induction motor as a multi-dimensional non-linear control object which is described by non-linear equations (1), (19), (20)–(23) and the equation of motion:

$$M - M_c = \frac{I}{Z_p} \cdot \frac{d\omega}{dt}, \qquad (109)$$

where
- $M_c$ is the load steady-state moment;
- I is the moment of inertia, referred to the induction motor shaft;
- $Z_p$ is the number of pole pairs of the induction motor.

The method of algorithmic linearization consists in that the linearity of the "input-output" connection of a multi-dimensional non-linear control object having several state vectors, one of which is a power state vector, e.g. the stator current vector, is achieved through the implementation of algorithms of the non-linear interrelated control of all parameters of the power state vector. These parameters are connected by algorithm via differential equations and parameters of the other state vectors of the control object subject to additional conditions for optimization of the control process and for synchronization of the power state vector control in the corrdinates of another orientation state vector. In this case, parameters of the orientation state vector should be a part of both the functional associated with the optimal control criterion and the equation for the output variable of the control object condition, which in this instance is the induction motor torque M.

The non-linear control algorithm found in accordance with the algorithmic linearization method if the "mirror image" of the non-linear connections in the control object, which should be achieved subject to the law of optimal control and to the condition that output variable of the control object condition is assigned and equal to the desired quantity prescribed at the input of the object control system.

This method reduces the order in non-linear differential equations used to find a control algorithm and particularly the most advisable Cartesian system of corrdinates, in which the simplest non-linear algorithm is implemented to control parameters of the power state vector.

The key concept of the method of algorithmic linearization is the control law introduced as an indispensable condition for finding the control algorithm.

The relationship between the output variable of the torque M and the power state vector of the stator current vector $\bar{i}_s$ is given by the equation (1) which also includes another state vector, the rotor flux linkage vector $\bar{\psi}_r$, which may be inserted into the limiting condition (108) and taken as the orientation vector $\bar{H}_o$.

The condition of the control synchronization relative to the orientation vector $\bar{H}_o = \bar{\psi}_r$ has the following form:

$$\left.\begin{array}{l}\psi_{ry} = \psi_r, \\ \psi_{rx} = 0, \\ \omega_K = \omega_s = \omega_s^*, \\ \omega_K - \omega = \Delta\omega, \\ i_{sx} = i_s \cdot \sin \epsilon_\phi, \\ i_{sy} = i_s \cdot \cos \epsilon_\phi, \end{array}\right\} \quad (110)$$

The control law providing for invariant control of the torque $M^*(t)=M(t)$ subject to $T_\omega=T_{\omega min}$ and to the constraint of the equation (108) follows from the differential equations (22) and (23) for an induction motor, which are transformed from the control synchronization condition in accordance with the equations (110):

$$\frac{L_r}{R_r} \cdot \frac{d\psi_r}{dt} + \psi_r = L_m \cdot i_{sy}, \quad (111)$$

$$\frac{R_r}{L_r} \cdot L_m \cdot i_{sx} - \Delta\omega \cdot \psi_r = 0, \quad (112)$$

$$M = \frac{3}{2} \cdot Z_p \cdot \frac{L_m}{L_r} \cdot \psi_r \cdot i_{sx}, \quad (113)$$

The equation (111) describes an electromagnetic transient process of controlling the rotor flux linkage amplitude $\psi_r(t)$. It follows from this equation (111) that an abrupt increment of the flux-producing component $i_{sx}$ of the stator current amplitude, which is equal, subject to the condition (110), to the co-phasal current amplitude $I_{syn}$, results in sluggish change of the rotor flux linkage amplitude $\psi_r$ according to the aperiodic law with a time constant equal to the electromagnetic time constant $T_r$ of the rotor circuit, which is given by the formula:

$$T_r = \frac{L_r}{R_r} = \frac{L_m + L_{\sigma r}}{R_r}. \quad (114)$$

It follows from the equation (109) that the minimal time T of the electromagnetic transient process with a specific static load torque $M_s$ is achieved when the induction motor torque is maximized, $M(t)=M_{max}(t)$, in each point of the trajectory from the initial rotor speed $\omega_o$ to the final rotor speed $\omega_1$.

At the same time, constraints concerning stator current and heating of the insulation should be satisfied.

This means that the indispensable condition for optimization of the speed of response is the condition that the maximum ratio should be attained between the actual torque $M(t)$ of an induction motor and the quadrature value of the stator current actual amplitude $i_s(t)$:

$$\frac{M(t)}{i_s^2(t)} = K_Q = K_{Qmax} \quad (115)$$

where $K_Q$, $K_{Qmax}$ is the ratio of the induction motor torque to the square of the stator current amplitude, with the stator winding insulation heating being limited.

The condition (115) is indispensable when the stator current amplitude $i_s=i_{s\;max}$ is limited.

The indispensable condition (115) of optimality of the electromechanical transient process $\omega(t)$ of an induction motor is the adequate condition of optimality for the electromagnetic transient process of control of the rotor flux linkage amplitude $\psi_r(t)$, which can be inferred from the fact that the stator current vector is controlled according to the common laws in both processes.

It follows from the electromagnetic process equation (111) that the transfer function for the rotor flux vector module to the stator current vector module depends on the angle of the phase shift $\epsilon_\phi$ in accordance with the equation:

$$W_\psi(S) = \frac{\psi_r(S)}{i_s(S)} = \frac{L_m \cdot \cos \epsilon_\phi}{T_r \cdot S + 1}. \quad (116)$$

The response time during current control in the transvector inverter 2 (FIG. 4), which is characterized by the control time $T_i$ of the instantaneous stator phase current, is less, by a factor of more than ten, than the response time during control of the rotor flux vector module (rotor flux amplitude $\psi_4$) because $T_i<<0.1T_r$.

According to the equation (1), the induction motor torque M is determined by the product of three control parameters $i_s$, $\psi_r$, and $\epsilon_\phi$ in three control channels: channel for control of the module of the stator current vector (stator current amplitude $i_s$), channel for control of the module of the rotor flux linkage vector (rotor flux linkage amplitude $\psi_r$), and channel for control of the sine of the angle of the phase shift.

As follows from the equations (111)–(113), the one feature these three channels have in common is their independence of the phase shift angle $\epsilon_\phi$. The induction motor control law is, therefore, advisable to define as an assignement of angle of the phase shift $\epsilon_\phi$, which possesses the fastest response.

In this case, the speed of response and invariance of control of the induction motor torque are dictated by the speed of response and interconnection of two fast-response control channels dealing with parameters $i_s$ and $\epsilon_\phi$. The third channel is used to control the third parameter $\psi_4$, which corresponds to the optimal, in terms of the condition (115) law for controlling the angle of the phase shift $\epsilon_\phi$, subject to the invariant control condition.

The maximum ratio of the induction motor torque M to the stator current amplitude $i_s$ and the maximum speed of response, with the stator winding insulation heating being restricted according to the criterion given by the formula (115), can be achieved in the course of the electromagnetic transient process of controlling the rotor flux linkage amplitude $\psi_r(t)$ if the generalized, for three control channels, transfer ratio of the induction motor, which connects, according to the equations (1), (113), and (116), the induction motor torque M at each moment of time $t_2$ with the square of the stator current amplitude $i_s^2$, reaches its maximum (utmost) value:

$$K_{Mi} = \frac{3}{2} Z_p \frac{L_m}{L_p} \cdot \cos\epsilon_\phi \cdot \sin\epsilon_\phi = K_{Mi}|max, \quad (117)$$

where
$K_{Mi}$ is the generalised transfer torque ratio of an induction motor;
and $K_{Mi/max}$ is the maximum generalized transfer torque ratio of an induction motor with the assigned square stator current amplitude.

To meet the condition (117) maximum torque in the process of control, the stator current phase $\epsilon_s$ should be controlled with an angle of the phase shift $\epsilon_{100}$, which permits the following condition of the maximum $K_{Mi}=K_{Mimax}$ to be observed:

$$\frac{d(\cos\epsilon_\phi \cdot \sin\epsilon_\phi)}{d\,\epsilon_\phi} = 0 \qquad (118)$$

The synchronization condition given by the equation (110) provides that the values $\alpha_r$ and $i_{sy}$ are positive at all times. The condition $$\cos\epsilon_\phi \geqq 0; \qquad (119)$$

is, therefore, valid.

The equations (118) and (119) form the basis for the optimal, in terms of the maximum torque, control law for an induction motor:

$$\epsilon_{\phi opt} = \pm \frac{\pi}{4} \qquad (120)$$

The sign "+" in the expression (120) corresponds to the positive direction of the induction motor torque $+M$, the phase shift of the stator current vector $\bar{i}_s$ is directed counterclockwise relative to the rotor flux linkage vector $\bar{\psi}_r$ as shown in FIG. 1 by a full line.

The sign "−" in the expression (120) corresponds to the negative direction of the induction motor torque $-M$, the phase shift being directed clockwise as shown in FIG. 1 by a dash line for the stator current vector $\bar{i}_s$.

The optimal induction motor control law (120) means that the phase shift of $\pm 45$ electrical degrees relative to the synchronization phase $\phi^*_s$ of the stator current control, provided the synchronization phase $\phi^*_s$ is equal to the rotor flux linkage synchronous phase $\phi_s$, ensures the maximum of the induction motor torque with any stator current amplitude.

When the direction of the induction motor torque M is reversed, the optimal control law according to the equation (120) means that the stator current phase $\epsilon_s$ should be abruptly changed to a phase angle of 90 electrical degrees because the optimal control of the stator current phase $\epsilon_s$ is effected conformably to the law:

$$\epsilon_{s\,opt} = \phi_{s\,opt} \pm \frac{\pi}{4} \qquad (121)$$

where $\phi_{s\,opt}$ is the rotor flux linkage phase when control is implemented according to the law (120).

The stator current phase $\epsilon_s$ can be changed by a jump in accordance with the law (121) only by means of the transvector inverter 2 (FIG. 4) or the phase-current converter 62 (FIG. 9) subject to the following control synchronization condition:

$$\phi^*_{s\,opt} = \int_o^{t_1} \omega^*_{s\,opt}\,dt + \phi^*_{so} = \phi_{s\,opt} \qquad (125)$$

where $\phi^*_{so}$ is the initial synchronization phase;
$\phi_s$ is the synchronous phase of the rotor flux linkage.

When conditions of the equations (121) and (122) are met, the optimal control law (120) can be observed by controlling the co-phasal and ortho-phasal currents in accordance with the laws:

$$i_{syn} = i_{syopt} = \frac{i_s}{\sqrt{2}}, \qquad (123)$$

$$I_{ort} = i_{sxopt} = \pm I_{syn} = \pm i_{syopt} = \pm \frac{i_s}{\sqrt{2}}, \qquad (124)$$

where
$i_{syopt}$ and $i_{sx\,opt}$ are optimal values of the torque-producing and flux-producing components of the stator current amplitude;
$i_s = \bar{i}_s$ is the stator current vector module equal to the stator phase current amplitude;
$I_{syn}$ and $I_{ort}$ are amplitudes of the co-phasal and ortho-phasal currents.

For steady-state conditions and periodic stator current, the value $$\frac{i_s}{\sqrt{2}}$$

characterizes the actual stator phase current $I_s$:

$$\frac{i_s}{\sqrt{2}} = I_s$$

In consequence, the optimal control according to the law (123) means that the ortho-phasal and co-phasal currents are equal to each other and to the actual phase current of the stator:

$$I_{syn} = I_s \qquad (125)$$

$$I_{opt} = \pm I_s \qquad (126)$$

In the optimal control according to the law (120), the instantaneous phase current $i_{sa}$ in the reference phase winding "A" of the stator changes in conformity with the following law:

$$i_{sa}(t) = \frac{i_s}{\sqrt{2}}(\cos\phi_{sopt}(t) \pm \sin\phi_{sopt}(t)). \qquad (127)$$

The sign "−" in the expression (127) corresponds to the positive direction of the induction motor torque $+M$, while the sign "+" corresponds to the negative direction of the induction motor torque $-M$.

Since the angle of the stator current phase shift $\epsilon_\phi$ relative to the rotor flux linkage is constant, the stator current slip $\Delta\omega_{i\psi}$ relative to the rotor flux linkage is absent when control is effected according to the law (120)

$$\Delta\omega_{i\psi} = 0, \qquad (128)$$

while the stator current frequency $\omega_{is/opt}$ is equal to the rotor flux linkage frequency $\omega_{s\,opt}$:

$$\omega_{is/opt} = \omega_{s\,opt} = \omega + \Delta\omega_{opt}, \qquad (129)$$

where $\Delta\omega_{opt}$ is the optimal slip of the rotor flux linkage relative to the rotor with control according to the law (120).

According to the equations (112), (122), (129), the optimal slip $\Delta\omega_{opt}$ of the rotor flux linkage, relative to the rotor and equal to the optimal slip of the stator current relative to the rotor, is changed in proportion to the ratio of the ortho-phasal current equal to the torque-producing component $i_{sx/opt}$ of the stator current amplitude to the actual amplitude $\psi_{r/opt}(t)$ of the rotor flux linkage:

$$\Delta\omega_{opt} = \frac{R_r}{L_r} \cdot L_m \cdot \frac{i_{sx/opt}(t)}{\psi_{r/opt}(t)}. \tag{130}$$

The law of the optimal control of the ortho-phasal current amplitude $I_{ort}$ equal to the torque-producing component of the stator current amplitude is given by the following relationship:

$$I_{ort} = i_{sx/opt} = \frac{2}{3L_p} \cdot \frac{L_r}{L_m} \cdot \frac{M(t)}{\psi_{r/opt}(t)}. \tag{131}$$

The flux-producing component $i_{sy/opt}$ of the stator current amplitude, when controlled according to the law (120), is modified in conformity with the absolute value of the induction motor torque $|M|$ in accordance with the law:

$$I_{syn} = i_{sy/opt} = \frac{2}{3Z_p} \cdot \frac{L_p}{L_m \cdot \psi_{r/opt}} \cdot |M(t)|. \tag{132}$$

As follows from the equations (121), (129), (131), and (132), all parameters of the stator current vector during the optimal, in terms of the maximum torque, control, depend on the process of changing of the actual rotor flux linkage amplitude $\psi_{r/opt}(t)$.

By placing the expression for the flux-producing component $i_{sy/opt}$ of the stator current amplitude from the equation (132) into the initial equation (111), the law of controlling the actual rotor flux linkage amplitude ($\psi_{r/opt}(t)$) as a function of the induction motor torque $M(t)$ can be found according to the following differential equation:

$$\frac{L_r}{R_r} \cdot \frac{d\psi_r(t)}{dt} + \psi_r(t) = \frac{2L_r}{3\,Z_p} \cdot \frac{|M(t)|}{\psi_r(t)}. \tag{133}$$

By multiplying the right and left parts of the equation (133) by the function $\psi_r(t)$, subject to the equality $$\frac{d\psi_r(t)}{dt} \cdot \psi_r(t) = \frac{1}{2} \cdot \frac{d\psi_r^2(t)}{dt}, \tag{134}$$

the law can be found for optimal, in terms of the maximum torque, control of the amplitude $\psi_{r/opt}(t)$ of the rotor flux linkage as a function of the induction motor torque $M(t)$, expressed by the differential equation:

$$\frac{L_r}{2\,R_r} \cdot \frac{d\psi_r^2(t)}{dt} + \psi_r^2(t) = \frac{2L_r}{3Z_p} \cdot |M(t)|. \tag{135}$$

It follows from the equation (135) that, when optimal control is according to the law (120), the elecromagnetic transient process of changing the rotor flux linkage amplitude is twice as fast as before in the electric drive of FIG. 7. The time constant $T_\psi$ of the electromagnetic transient process of producing the optimal, in terms of the maximum torque, square amplitude of the rotor flux linkage, and, consequently, the optimal amplitude $\psi_{r\,opt}(t)$ of the rotor flux linkage is less by half than the electromagnetic time constant $T_r$ of the rotor circuit:

$$T_\psi = \frac{T_r}{2} = \frac{L_r}{2R_r} \tag{136}$$

In this case, the process of producing the amplitude of the rotor flux linkage according to the equation (135) is independent of the direction of the induction motor torque and remains unchanged when the sign of the induction motor torque $\pm M$ changes. This process is unambiguously defined by the law according to which the absolute value $M(t)$ of the induction motor torque changes.

Joint solution of the equations (130), (131), (132) and (135) determines the optimal process of executing interrelated actions over the parameters of the power state vector of the induction motor (stator current vector $\bar{i}_s$) as a function of the control input of the torque electric drive equipped with an induction motor, which is proportional to the desired induction motor torque $M^*$ subject to the invariant control condition $M^*(t)=M(t)$.

Figure 10:
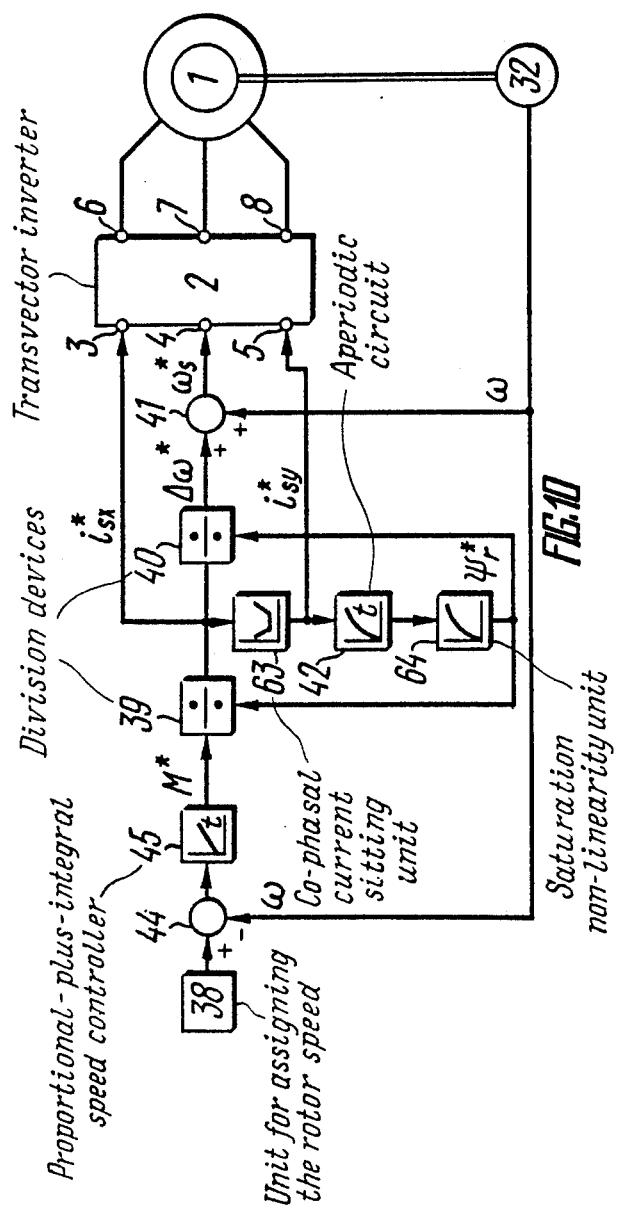
FIG. 10 shows a functional block diagram of a variable-speed induction motor drive having optimal two-zone phase-current control based on the saturation of the magnetic core of the induction motor.

This method of optimal invariant control of an induction motor, according to the invention, is realized in an electric drive whose diagram is shown in FIG. 10.

The electric drive realizing this method comprises an induction motor 1 (FIG. 10) whose stator windings are connected to outputs 6, 7, and 8 of a transvector inverter 2 whose control inputs 3, 4, and 5 are, respectively, the ortho-phasal, frequency, and co-phasal inputs of the transvector inverter 2. The rotor of the induction motor 1 is connected to a speed transducer 32, e.g. tachometer generator.

The frequency input 4 of the transvector inverter 4 is connected to an output of a series-connected circuit comprising a rotor speed setting unit 38, a first summer 44, a proportional-plus-integral speed controller 45, first and second division devices 39 and 40, and a second summer 41 whose output is directly connected to the frequency input 4 of the transvector inverter 2. Second inputs of the summers 41 and 44 are connected to the output of the speed transducer 32. The output of the first division device 39 is directly connected to the ortho-phasal input 3 and, via a co-phasal current setting unit 63, to the co-phasal input 5 of the transvector inverter 2. The output of the co-phasal current setting unit 63 is connected, via an aperiodic circuit 42, to the input of a unit 64 of saturation non-linearity, whose output is connected to the inputs of the first and second division devices 39 and 40.

Units 38, 39, 40, 41, 42, 44, and 45 may be made similarly to those described above in the electric drive of FIG. 7.

The co-phasal current setting unit 63 can employ a conventional operational amplifier similar to the module isolation unit (cf., for example, V. P. Shilo, Functional Analog Integrated Circuits, Moscow, Radio i Svyaz Publ., 1979, in Russian, p. 184, and F. Fröhr, F. Orttenburger, Basic Units of Adjustable-Speed DC Drive, Tr. from German, Moscow, Energia Publ., 1977, pp. 178–179).

The saturation non-linearity unit 64 can employ a conventional operational amplifier using a non-linear element circuit (cf., for example, B. K. Nesterenko, Integrated Operational Amplifiers, Handbook, Moscow, Energia Publ., 1982, in Russian, p. 70).

The electric drive of FIG. 10 operates as follows.

Initially, the stator windings of the induction motor 1 are energized by constant instantaneous phase currents $i_{sa}(O)$, $i_{sb}(O)$, $i_{sc}(O)$ which are adjusted by the pulse-width modulation method using the transvector inverter 2 as described above. No signals are applied to the control inputs 3 and 4 of the transvector inverter 2, while the signal $i^*_{syo}$ assigning the initial value of the co-phasal current amplitude $I_{syno}$ equal to the initial flux-producing component $i_{syo}$ of the stator current amplitude is applied to the co-phasal input 5 of the transvector inverter 5.

In this case, the initial value of the stator current flux-producing amplitude $i_{syo}$ is at least half of the nominal value $i_{syn}$ of the stator current amplitude which corresponds to the nominal amplitude $\psi_{rn}$ of the rotor flux linkage:

$$i_{syo} = i^*_{syo} = \frac{\psi_{ro}}{L_{mo}} \leq 0.5 \frac{\psi_{rn}}{L_{mn}} \quad (137)$$

where
- $\psi_{rn}$ is the nominal amplitude of the rotor phase flux linkage in nominal conditions of the induction motor, with $M = M_n$;
- $L_{mn}$ is the nominal value of the mutual inductance in nominal conditions of the induction motor, with $M = M_n$;
- $L_{mo}$ is the initial value of the mutual inductance, when the rotor flux amplitude $\psi_r$ is low and less than $0.5 \psi_{rn}$ Constant currents at the outputs 6, 7, and 8 of the transvector inverter 2 establish, in the induction motor 1, a constant magnetic field and the rotor flux linkage characterized by the initial vector $\overline{\psi}_{ro}$ with the initial synchronous phase $\phi_{so}$ relative to the axis "a" of the reference stator phase winding "A" of the induction motor 1, the initial synchronous phase $\phi_{so}$ of the rotor flux linkage being equal to the initial stator current phase $\epsilon_{so}$.

In this condition, there is no induction motor torque M, the rotor speed is equal to zero, and no output signal is produced by the speed transducer 32. Since no output signal assigning the desired rotor speed $\omega^*$ is produced by the rotor speed setting unit 38, the output signal assigning the desired rrotor flux linkage frequency $\omega^*_s$ of the summer 41 is zero, the synchronization phase $\phi^*_s$ of the transvector inverter 2 remains unchanged and equal to the initial phase $\phi^*hd so = \phi_{so} = \epsilon_{so}$.

An output signal is produced by the first summer 44 when any disturbance is applied to the shaft of the induction motor 1 by the load or the rotor speed setting unit 38 generates an output signal. In this case, the proportional-plus-integral speed controller 45 produces an output signal which changes with time and prescribes the desired torque $M^*$ (t) of the induction motor 1.

The units 39, 40, 42, 63, and 64 are used to calculate optimal parameters of the stator current vector as a function of the desired torque $M^*(t) = = M(t)$ in accordance with the control algorithm described by the non-linear differential equation (135) and equations (135) and equations (130), (131) and (132). The output signal produced by the first division device 39 prescribes the ortho-phasal current amplitude $I_{ort}$ which is equal to the desired torque-producing quadrature component $i^*_{sx}$ of the stator current amplitude.

Initially, at the primary moment of time $t = 0$ of the electromagnetic transient process, the signal assigning the desired amplitude $\psi^*_{r/t=0}$ of the rotor flux linkage, which is applied to the input of the first division device 39, corresponds to the initial amplitude $\psi_{ro}$ of the rotor flux linkage determined according to the formula (137):

$$\psi^*_{r/t=0} = \psi_{ro}.$$

This is achieved by assigning a constant component of the output signal of the co-phasal current setting unit 63, which is proportional to the initial desired value of the flux-producing quadrature component $i^*_{syo}$ of the stator current amplitude, determined according to the formula (137). Since in the initial condition, when $t = 0$, the steady-state output signal of the aperiodic circuit 42 is equal to the input signal thereof, which is the constant component of the output signal of the co-phasal current setting unit 63, the initial output signal of the aperiodic circuit 42 is proportional to the initial desired value of the flux-producing quadrature component $i^*_{syo}$ of the stator current amplitude. Since the input of the aperiodic circuit 42 is connected to the co-phasal input 5 of the transvector inverter 2, the initial output signal $i^*_{syo}$ of the aperiodic circuit 42 characterizes the co-phasal current amplitude $I_{syn} = i^*_{syo}$ of the transvector inverter 2.

The saturation non-linearity unit 64 is described by the equation (14) and has a variable transfer ratio $L_m$ characterizing the ratio of the output signal to the input signal of the unit 64:

$$L_m = \frac{\psi^*_r}{i_{sy}} \approx \frac{\psi_m}{i_m} \quad (138)$$

When the initial value of the input signal $i^*_{syo}$ of the saturation non-linearity unit 64 is low, the transfer ratio $L_m$ remains unchanged according to the equation (15) and is equal to the maximum mutual inductance $L_{mo}$ of the unsaturated induction motor 1.

In consequence, at the initial moment of time $t = 0$, the output signal of the saturation non-linearity 64 is proportional to the initial value of the desired rotor flux linkage amplitude $\psi^*_{ro}$.

With the unit transfer ratio of the aperiodic circuit 42 and the initial transfer ratio of the saturation non-linearity unit 64, which corresponds to the maximum mutual inductantce $L_m$, the initial co-phasal current $i_{syn}$ establishes, in the induction motor 1, the constant rotor flux linkage ($\psi_{ro} = = \psi^*_{ro}$) which corresponds to the output signal of the saturation non-linearity unit 64.

The desired induction motor torque $M^*(t)$ is divided by the initial desired aplitude $\psi^*_{ro}$ of the rotor flux linkage, and the first division device 39 produces, according to the equation (131), an output signal proportional to the desired torque-producing component $i_{sx/opt}$ of the stator current amplitude, which is supplied to the ortho-phasal input 3 of the transvector inverter 2.

The resulting jump and abrupt change of the ortho-phasal current amplitude $I_{opt}$ produces, according to the equation (131), the torque M of the induction motor 1, which is equal to the desired torque $M^*$ of the induction motor 1.

Simultaneously, the output signal $i_{sx/opt}$ is supplied from the output of the first division device 39 to two inputs, to the input of the second division device 40 and to the input of the co-phasal current setting unit 63.

Since the output signal $\psi^*_{ro}$ of the saturation non-linearity unit 64 is applied to the second input (divident input) of the second division device 40, the output of this second division device 40 is, according to the equation (130), a signal assigning the desired slip $\Delta\omega^*_{opt}$ of the rotor flux linkage in relation to the rotor.

The torque M of the induction motor 1, produced in this manner, results in development of the rotor speed $\omega$ and generation of the output signal by the speed transducer 32. The output signal of the second division device 40, which prescribes the slip $\Delta\Omega^*_{opt}$, is added, by means of the second summer 41, to the signal of the measured rotor speed $\omega$, subject to polarities of the signals $\Delta\omega^*_{opt}$ and $\omega$.

The output signal of the second summer 41, which characterizes the synchronization frequency $\omega^*_s$ of the transvector inverter 2, is supplied to the frequency input 4 of this transvector inverter 2.

Since the stator current vector $\bar{i}_s$ is shifted, when the ortho-phasal current $i_{ort}$ is produced, to an angle of the phase shift $\epsilon_\phi$ in relation to its initial angular position $\epsilon_{so}=\phi_{so}=\phi^*_{so}$, the vector $\bar{\psi}_{ro}$ of the rotor flux linkage in the induction motor 1 is also subjected to the angular displacement $\phi_s(t)$ following the stator current vector $\bar{i}_s$. According to the differential equations (20)–(23) and equations (111)–(112), the physical processes of establishing the magnetic field in the induction motor 1 are such that the vector $\bar{\psi}_r$ of the rotor flux linkage tends to assume, with a delay due to the electromagnetic inertia, the angular position of the stator current vector $\bar{i}_s$ and reduce to zero the phase shift $\epsilon_\phi$ and the torque M of the induction motor 1. In order to maintain, for some period, the desired torque M=M* of the induction motor 1, it is necessary to keep a specific desired angle of the phase shift and displace continuously the stator current vector $\bar{i}_s$ in synchronism with the vector $\psi_r$ of the rotor flux linkage, thus maintaining the desired phase shift $\epsilon_\phi$. This synchronous displacement of the stator current vector $\bar{i}_s$ is provided by producing a component of the stator current synchronous frequency $\omega_s$, which is equal to the frequency of the rotor flux linkage, through generating and changing the signal applied to the frequency input 4 of the transvector inverter 2 by means of the second division device 40 and the second summer 41.

The output signal $i^*_{sx}$ of the first division device 39 applied to the input of the co-phasal current setting unit 63 can have different effect on the amplitude $I_{syn}$ of the co-phasal current, depending on the actual magnitude of this output signal $i^*_{sx}(t)$.

If the actual value of the torque-producing component $i^*_{sx}(t)$ is less than the initial co-phasal current amplitude $I_{syn}=i^*_{syo}$ set by the co-phasal current setting unit 63, the input and output signals of the aperiodic circuit 42 remain unchanged with the arrival and variations of the output signal $i^*_{sx}(t)$ of the first division device 39.

In this case, the inducation motor 1 operates in conditions of constant amplitude of the rotor flux linkage, according to the law:

$$\left.\begin{array}{l}\psi_r = \psi_{ro} = \psi^*_{ro} = i^*_{syo}, L_{mo} \\ i_{sx} \leq i^*_{syo}\end{array}\right\} \quad (139)$$

This condition survives within a narrow range of variations of the desired torque M*(t) of the induction motor 1 till it reaches the boundary torque value M*$_g$ determined in accordance with the equation (84) by the condition:

$$\left.\begin{array}{l}M^*(t) \leq M^*_g, \\ M^*_g = \frac{3}{2} \cdot Z_p \cdot L_r \cdot (\psi^*_{ro})^2\end{array}\right\} \quad (140)$$

In this zone of control of the torque M of the induction motor 1, the co-phasal current amplitude $I_{syn}$ is constant, the ortho-phasal current amplitude $I_{ort}$ and the slip are proportional to the desired torque M* of the induction motor 1 because a stable signal $\psi^*_{ro}$ is supplied from the output of the saturation non-linearity unit 64 to the inputs of the division devices 39 and 40.

In this case, the stator current phase $\epsilon_s$ changes in accordance with the law given by the equation (86), subject to the condition $\psi^*_{r/min} = = \psi^*_{ro}$.

This condition has been described for the electric drive shown in FIG. 7.

The operational condition where the rotor flux linkage amplitude is constant according to the equations (139), (140), and (86) is characteristic for the electric drive of FIG. 10 when the induction motor 1 is steadily running idle without any load applied to its shaft.

In dynamic conditions of the electric drive, the output signal of the proportional-plus-integral speed controller 45 (FIG. 10) exceeds the boundary torque M*$_g$ and the output signal $i^*_{sx}$ of the first division device 39, which is applied to the input of the co-phasal current setting unit 63, exceeds the initial setting $i^*_{syo}$ of the unit 63. In this case, the output signal $i^*_{sy}$ of the co-phasal current setting unit 63 is equal to the input signal $i^*_{sx}$ thereof, and the electric drive operates in the mode given by the following equations:

$$\left.\begin{array}{l}|M^*| > M^*_g \\ |i^*_{sx}| > i^*_{syo}\end{array}\right\} \quad (141)$$

$$i^*_{sy} = |i^*_{sx}| \quad (142)$$

The equations (141) and (142) determine the second zone of control of the torque M of the induction motor 1, which is the zone of the maximum-optimal torque and speed-optimal control according to the law (120).

The amplitude $I_{syn}$ of the co-phasal current is made equal to the absolute value of the ortho-phasal current amplitude $I_{ort}$ in this operating condition by applying equal in magnitude control signals $i^*_{sx}(t)$ and $i^*_{sy}(t)=i^*_{sx}(t)$ to the ortho-phasal input 3 and to the co-phasal input 5 of the transvector inverter 2, respectively. This operating condition is given by the law (120) if the frequency input 4 of the transvector inverter 2 receives a signal assigning the synchronization on frequency $\omega^*_s$ equal to the actual synchronous frequency $\omega_s$ of the rotor flux linkage:

$$\omega_s^* = \omega_s = \frac{d\phi_s}{dt} = \omega + \Delta\omega_{opt}, \quad (143)$$

where the optimal slip $\Delta\omega_{opt}$ is determined according to the equation (130) subject to the condition expressed by the differential equation (135).

Conditions (143), (130), and (135) have to be jointly satisfied in order to attain the maximum speed of response and to fulfill the control law (120), since the synchronization condition according to the equations (110), which is the basis of the deduced laws (120), (130), (131), and (132), is met conformably to the method of algorithmic linearization only when the synchronization frequency $\omega^*_s$ is made equal to the actual effective synchronous frequency $\omega_s$ of the rotor flux linkage, that is the angular speed of rotation of the orientation vector $\overline{H}_o = \overline{\psi}_r$.

This synchronization condition is satisfied when a signal prescribing the desired optimal amplitude $\psi^*_{r\ opt}(t)$ of the rotor flux linkage is applied to the divisor inputs of the first and second division devices 39 and 40. This signal is measured as a function of time t of the electromagnetic transient process and is approximately equal to the effective amplitude $\psi_{r\ opt}(t)$ of the rotor flux linkage, which is changed in the induction motor 1 because the co-phasal current amplitude $I_{syn}(t)$ is changed when the signals $i^*_{sx}(t)$ and $i^*_{sy}(t)$ are changed.

According to the equation (111), the actual amplitude $\psi_r(t)$ of the rotor flux linkage changes when the value $i_{sy}(t)$ changes in conformity with the aperiodic law with the time constant $T_r$. The linear differential equation (111) of the induction motor 1 is solved using the aperiodic circuit 42 having a time constant equal to the electromagnetic time constant $T_r$ of the rotor circuit. In this case, the transfer ratio $L_m$ in the equation solved by means of the aperiodic circuit 42 is taken to be constant within the range of variation of the signal $i^*_{sy}(t)$, which corresponds to the linear portion of the magnetizing curve $\psi_m(i_m)$ of the induction motor 1. The transfer ratio $L_m$ equal to the actual mutual inductance $L_m(\psi_r)$ drops when the signal $i^*_{sy}(t)$ is high by means of the non-linear portion of the non-linear function $\psi^*_r(i^*_{sy})$ realized by the saturation non-linearity unit 64. This results in gradual reduction of the increment of the output signal of the saturation non-linearity unit 64 in relation to the increment of the output signal of the aperiodic circuit 42, which corresponds to the real process of saturation of the magnetic core of the induction motor 1 with the increase of the magnetizing current $i_m$ and the flux-producing component $i_{sy}$ of the stator current amplitude.

The result of simulation of dynamic processes related to control of the amplitude $\psi_r(t)$ of the rotor flux linkage of the induction motor 1 by means of the aperiodic circuit 42 and the saturation non-linearity unit 64 consists in that the operations of division by the signal $\psi^*_r(t) = =\psi_r(t)$, performed by the division devices 39 and 40, correspond to the real physical process of interaction between the stator current and the rotor flux linkage in accordance with the equations (130), (131), and (132) and are, in fact, the "mirror image" of this interaction in the induction motor 1 when the values of the synchronous frequency $\omega_s = \omega^*_s$ of the stator current, the ortho-phasal current $i_{ort} = i^*_{ort}$, and co-phasal current $i_{syn} = i^*_{syn}$ are assigned.

This representation of the processes of control of the stator current vector $\bar{i}_s$ results in the electric drive synchronization conditions according to the equations (111), (129), (130), and (143) are satisfied alongside with the optimal condition according to the law (120), and the condition of invariant control of the induction motor torque $M(t) = M^*(t)$.

When starting the induction motor 1, the magnitude of the desired torque $M^*$ of the induction motor 1 jumps up and goes on increasing till it reaches the maximum torque $M^*_{max}$ determined by the saturation of the proportional-plus-integral speed controller 45. Since the signal prescribing the desired amplitude $\psi^*_r$ of the rotor flux linkage cannot be abruptly increased at the inputs of the division devices 39 and 40 due to the lag of the aperiodic circuit 42, the output signal $i^*_{sx}$ of the first division device 39 jumps to the maximum value $i^*_{sx/max}$ when dividing the maximum value of the desired torque $M_{max}$ of the induction motor 1 by the minimal value of the desired amplitude $\psi^*_{ro} = \psi^*_{r/min}$ of the rotor flux linkage. This maximum value $i^*_{sx/max}$ is determined from the limitation condition of the maximum amplitude $i_{s/max}$ of the stator current according to the equation:

$$I^*_{sx|max} = I_{sx|max} = \pm \frac{i_{s\ max}}{\sqrt{2}} \quad (144)$$

The output signal of the co-phasal current setting unit 63 also jumps from the minimal initial value $i^*_{syo}$ to the maximum value given by the equation:

$$i^*_{sy|max} = |i^*_{sy|max}| = \frac{i_{s\ max}}{\sqrt{2}} . \quad (145)$$

Assignment of maximum and equal in magnitude projections of the stator current vector $\bar{i}_s$ in accordance with the equations (144) and (145) makes the angle of the phase shift $\epsilon_\phi$ of the stator current vector $\bar{i}_s$ change by a jump relative to the initial position of the rotor flux linkage vector $\overline{\psi}_{ro}$ to an optimal value $\pm \pi/4$ in conformity with the optimal control law (120).

The optimal control law (120) further dictates that a jump is to be made in the magnitude of the slip $\Delta \omega_{max}$ of the rotor flux linkage in relation to the rotor, involving the assignment of the maximum torque-producing quadrature component $i^*_{sx/max}$ of the stator current amplitude, accompanied by a jump in the signal prescribing the desired slip $\Delta \omega^*_{max}$ which is supplied from the output of the second division device 40 to the input of the second summer 41. In this case, the maximum value of the signal $\Delta \omega^*_{max}$ and its polarity are dictated by the maximum value and polarity of the output signal of the first division device 39 in accordance with the formula:

$$\Delta \omega^*_{max} = \Delta \omega_{max} = \frac{R_r}{L_r} \cdot L_m \cdot \frac{i_{sx|max}}{\psi^*_{r\ min}} = \frac{R_r}{L_r} L_m \frac{i_{s\ max}}{\sqrt{2}\ \psi_{ro}} . \quad (146)$$

This jump in the value of the slip $\Delta \omega_{max}$ results in the instantaneous frequency of the stator current jumping at the first moment of time t=0 to some substantial value $\omega_{is} = \omega_s = \omega^*_s = = \Delta \omega^*_{max}$ despite initially, when t=0, there is no signal of the actual rotor speed $\omega = 0$.

This is followed by the electromagnetic process of changing the amplitude $\psi_r(t)$ of the rotor flux linkage, which is described by the differential equation (135). Since the signal $i^*_{sy}$ at the input of the aperiodic circuit 42 has jumped, with t=0, to the maximum value $i^*_{sy/max}$ from the minimal value $i^*_{sy/min} = i^*_{syo}$, the output signal of the aperiodic circuit 42 starts growing according to the aperiodic law with a time constant $T_r$ until it reaches a new steady-state value $$i^*_{sy/max} = \frac{i_{s\ max}}{\sqrt{2}} .$$

If the maximum stator current amplitude $i_{s/max}$ is much greater than the desired optimal steady-state stator current amplitude $i_{sopt} = \sqrt{i_{sx/opt}^2 + i_{sy/opt}^2}$ for a given induction motor torque $M^*_{max}$, the signal assigning the desired rotor flux linkage amplitude $\psi^*_r(t)$ at the output of the saturation non-linearity unit 64 is initially forced and increases sharply. Further on, as the steady-state optimal amplitude $\psi^*_{r\ opt}$ of the rotor flux linkage is approached, the rate of change of the desired rotor flux linkage amplitude $\psi^*_r(t)$ declines due to three simultaneous control processes: the increase in the output signal of the aperiodic circuit 42 results in displacement of the operating point on the "input-output" curve of the saturation non-linearity unit 64 to the saturation zone having a low transfer ratio corresponding to the low mutual inductance $L_m(\psi_m)$ of the induction motor 1 when its magnetic core is saturated; the increase in the actual desired amplitude $\psi^*_r(t)$ of the rotor flux linkage results in a sharp build-up of signals at the divisor inputs of the division devices 39 and 40, which leads to a sharp drop of the required values of the torque-producing and flux-producing components of the stator current amplitude and, consequently, of the input signal of the aperiodic circuit 42; the rate of change of the output signal of the aperiodic circuit 42 slows down as the steady-state value is approached.

As a result of these control processes and respective electromagnetic processes in the induction motor 1, the maximum torque $M_{max} = M^*_{max}$ of the induction motor 1 is formed and maintained on a constant level so that the heating of the stator winding insulation is minimal for a given induction motor torque $M_{max}$. In other words, the speed-optimal control of the induction motor 1 is achieved.

As the desired and measured rotor speeds approach each other $\omega = \omega^*$, the output signal of the proportional-plus-integral speed controller 45 diminishes to the value $M^* = M_s$ which corresponds to the steady-state load torque $M_s$.

Initially, this brings the signal $i^*_{sx}(t)$ at the output of the first division device 39 below the value $i_{sx}(M^*)$ corresponding to the load moment $M_s$. But the torque M of the induction motor 1 is produced equal to the desired torque $M^* = M_s$ because the rotor flux linkage amplitude $\psi_{r\ max}$ achieved during the starting process is high. Later on, the rotor flux linkage amplitude $\psi_r(t)$ declines to the optimal steady-state value given by the equation:

$$\psi_{ropt|\infty} = \sqrt{\frac{2L_r}{3Z_p} \cdot M_s} \qquad (147)$$

where $M_s = M_\infty$ is the static load moment equal to the steady-state torque $M_\infty$ of the induction motor 1.

The steady-state value $\psi_{r\ opt|\infty}$ of the rotor flux linkage is achieved by reducing the output signal $i^*_{sy}(t)$ of the co-phasal current setting unit 63 below its steady-state value $i^*_{sy|\infty}$, which produces the steady-state amplitude $\psi_{ropt|\infty}$ of the rotor flux linkage.

To summarize, electromagnetic transient processes of changing the amplitude $\psi_r(t)$ of the rotor flux linkage occur during the period of the electromechanical transient process of changing the rotor speed to the desired value $\omega^*$ in the electric drive of FIG. 10. At first, a minor magnetic flux ($\psi_{r\ min}$) is established, affording at least a four-fold cut in the losses of power for excitation and initial heating of stator windings. Then, the amplitude of the rotor flux linkage is forced until it exceeds the nominal amplitude $\psi_{r\ n}$ of the rotor flux linkage by 20-35%, the induction motor 1 running, very briefly, into the zone of deep saturation of the magnetic core. The higher the permissible stator current amplitude $i_{s\ max}$ and the greater the desired torque $M^*_{max}$ of the induction motor 1, the greater the degree of saturation of the magnetic core. In this case, the minimal integral of the RMS stator current is achieved for the period the desired maximum torque $M^*_{max} = M_{max}$ of the induction motor 1 is maintained, which is the speed-optimal control condition.

Then follows the reverse process of reducing the amplitude of the rotor flux linkage to a value required for a steady-state operational condition of the induction motor 1 with a given static load moment. During this transient process, the heating of the stator winding and the stator current amplitude are less than the minimal values for a steady-state condition with a steady-state rotor flux linkage amplitude.

With this type of control the induction motor 1 operates in steady-state conditions with the minimal steady-state stator current amplitude $i_{s/min}$ for a given induction motor torque M, which minimizes the insulation heating of the stator winding and provides an operational mode close to a condition where the total power losses in the induction motor 1 are brought to a minimum.

The stator current frequency, in this type of control, is equal to the rotor flux linkage frequency. The rotor flux is forced at the beginning of the electromagnetic transient process, as the desired torque of the induction motor 1 grows, and then is brought down as the effective required amplitude $\psi^*_r(t)$ of the rotor flux linkage builds up, and then grows again as the rotor speed increases.

To summarize, the electric drive of FIG. 10 provides a method for control of an induction motor, wherein control of the induction motor torque is effected in rather ambiguous and non-rigorous conditions of varying amplitude and frequency of the stator current and the amplitude of the rotor flux linkage. The same induction motor torque can be produced with substantially different amplitudes of the stator current and rotor flux linkage. The same torque and speed of the induction motor rotor can be achieved in this electric drive with substantially different stator current frequencies. All stator current vectors are dictated, in this control method, not only by the magnitude and type of variation of the induction motor torque, but also depend of the past history of the electromagnetic transient process, the actual state of the magnetic system of the induction motor, or, in other words, depend on the time t of the electromagnetic transient process as an independent control parameter.

According to the invention, the induction motor optimal control method realized in the electric drive of FIG. 10 consists in that, with a step increment of the desired induction motor torque $M^*$ in relation to the initial steady-state value of the desired induction motor torque $M^*_o$ and with the initial steady-state rotor flux amplitude $\psi_{ro}$ proportional to the square root of the initial value of the desired induction motor torque $M^*_o$:

$$\psi_{ro} = \sqrt{\frac{2L_r}{3Z_p}} \cdot M^*_o \quad (148)$$

the square value $\psi_r^2$ of the actual rotor flux linkage amplitude $\psi_r(t)$ is controlled as a function of time t of the electromagnetic transient process according to the aperiodic law with a time constant equal to a half of the electromagnetic time constant $T_r$ of the rotor circuit in conformity with the law:

$$\psi_r^2(t) = \frac{2L_r}{3Z_p}\left[M^* + (M^*_o - M^*)e^{-\frac{2t}{T_r}}\right] \quad (149)$$

where

M*—is the final value of the desired induction motor torque;

$M^*_o$—is the initial value of the desired induction motor torque;

t—is the duration of the electromagnetic transient process, starting from the moment when the desired induction motor torque has made a step change from $M^*_o$ to M*, or from the moment the control input of the torque induction motor drive has begun to change.

The equation (149) is the solution of the differential equation (135) when optimal control is effected in accordance with the law (120).

The forced change of the rotor flux amplitude within the minimal period of the electromagnetic transient process is achieved by interaction control of parameters of the stator current of the induction motor 1 according to the laws (131) and (132) subject to the equation (149) so that the stator current amplitude proportional to the torque-producing and flux-producing components of the stator current amplitude is controlled according to the law:

$$i_s = \frac{2 \cdot \sqrt{\frac{L_r}{3Z_p}}}{L_m} \cdot \frac{M^*}{\sqrt{M^* + (M^*_o - M^*) \cdot e^{-\frac{2t}{T_r}}}} \quad (150)$$

while the stator current frequency $\omega_{is}$ equal to the rotor flux linkage frequency $\omega_s$ is controlled according to the law:

$$\omega_{is} = \omega_s = \omega + \frac{R_r}{L_r} \cdot \frac{M^*}{M^* + (M_o^* - M^*)e^{-\frac{2t}{T_r}}} \quad (151)$$

where $\omega$ is the measured speed of the induction motor rotor.

Control laws (150) and (151) have been obtained by the joint solution of the equations (130), (131), and (132) subject to the equation (149). They are realized in the electric drive of FIG. 10, as described above, during automatic control of the desired amplitude $\psi^*_r(t) = \psi_r(t)$ of the rotor flux linkage according to the law (149). This control of the variable amplitude $\psi_r(M^*, t)$ of the rotor flux linkage is realized by the already described non-linear dynamic feedback placed around the first division device 39 and, also, by controlling the amplitude as a function of the output signal of the division device 39 by means of three control input signals $i^*_{sx}$, $\omega^*_s$ and $i^*_{sy}$ of the transvector inverter 2, which are applied to the phase, frequency, and cophasal inputs 3, 4, and 5, respectively.

Since control parameters of the units 39, 40, 42, 63, and 64 cannot be practically adjusted to counicde precisely to respective electric and electromagnetic parameters of the induction motor 1, there is inevitably some discrepancy between the control algorithms in conformity with the above equations and the actual electromagnetic processes in the induction motor 1. In the electric drives shown in FIGS. 6, 7, and 8, and featuring several autonomous channels for control of the torque of the induction motor 1 as a function of a control input proportional to the desired induction motor torque M*, this discrepancy of the control algorithm leads to fluctuations of the actual induction motor torque M. The electric drive of FIG. 10 has only one channel connected to the input thereof for controlling the induction motor torque, which is separated into three channels to control the stator current vector $i_s$ only after the main algorithm is implemented. This, in practical terms, means that fluctuations of the actual induction motor torque M are eliminated due to astatic speed control and certain oscillations of the ortho-phasal and co-phasal currents and the synchronization frequency in such a manner that the averaged control parameters correspond to the actual parameters of the state vectors of the induction motor 1 producing the torque M equal to the desired torque M*.

This correspondence is observed in the electric drive of FIG. 10 until the stator voltage and current vector parameters reach their extreme values involving power restrictions of the power inverter 12 (FIG. 4) of the transvector inverter 2.

In dynamic conditions and in case of multiple overload of the induction motor 1 in respect to the torque M, the magnetic field and the rotor flux amplitude in the electric drive of FIG. 10 can, as described above, reach levels exceeding by 20-35% their nominal ratings. Simultaneously, this is accompanied by a multiple overload in respect to the stator current. When the rotor speed $\omega$ and the stator current frequency $\omega_{is}$ grow in excess of boundary levels, formation of an optimal amplitude of the rotor flux linkage in conditions of simultaneous excessive amplitude of the stator current becomes impossible due to the limitation of the maximum output voltage of the transvector inverter 2. In this case, the control processes at the input of the transvector inverter 2 become substantially different from the real electromagnetic transient processes in the induction motor 1, which leads to serious fluctuations both of the control parameters in the control device of the electric drive and of the effective torque M of the induction motor 1. The electric drive can even lose its stability. To preserve the "mirror image" of the real processes involving changes of actual state vectors of the induction motor 1, when reaching the power boundary of the permissible control field, it becomes imperative, according to the above method of algorithmic linearization, that the control algorithm and the structure of the electric drive be altered in order to ensure the principle of structure-power conformity.

According to this principle of structure-and-power conformity, the algorithmic linearization of a non-linear control object can be attained if, on the one hand, when reaching the boundary of the permissible control field, the control algorithm and the structure of the control device are altered and conform to the new dynamic model of a control object, the equality of the power state vector of the control object to its maximum value being selected as a new control law, and, on the other hand, when the condition providing that all parameters of the state vector can be realized with the available power at the boundary of the permissible control field, restricted by limitations of some parameters of the power state vectors (stator current and voltage vectors), is satisfied for a given control algorithm and implemented structure of the control device.

In the electric drive of FIG. 10, the principle of structure and power conformity is implemented, with the signal $i_s = i_{s\,max}$, by means of the co-phasal current setting unit 63. When the ortho-phasal current setting signal $i^*_{sx}$ is low ($i^*_{sx}\,i^*_{syo}$) and the output signal $i^*_{sy}$ of the first division device 39 changes, the output signal $i^*_{sy}$ of the co-phasal current setting unit 63 is in no way dependent on the input signal $i^*_{sy}$ and is equal to a constant quantity ($i^*_{sy} = i^*_{syo}$).

This is necessary to provide a step invariant change of the initial torque $M|_{t=0} = M^*|_{t=0}$ of the induction motor 1.

The steady-state maximum torque $M_{max} = M_{max}$ of the induction motor 1 for a maximum stator current amplitude $i_{s\,max}$ exceeds the initial maximum torque $M_{max/t=0}$, but invariant control $M(t) = M^*(t)$ is still provided in the electric drive of FIG. 10 if the maximum required torque $M^*_{max}$ of the induction motor 1 is assigned to be less than the initial torque $M^*_{max} \leq M_{max/t=0}$.

The torque $M_{max/t=0}$ of the induction motor 1 cannot be formed in the absence of the initial co-phasal current ($I_{syo} = i^*_{syo}$) with the permissible stator current amplitude $i_{s\,max}$ until the electromagnetic transient process of producing the rotor flux amplitude $\psi_{r\,min}$ is completed. This violates the condition of torque invariant control for the period of said electromagnetic transient process.

In order to achieve invariant control of the torque $M(t) = M^*(t)$ of the induction motor 1, the electric drive of FIG. 10 is configured for two-zone control of the stator current phase. Transition from one stator current phase control zone to another is effected by altering the laws of interrelated control of ortho-phasal and co-phasal current and the slip of the rotor flux linkage relative to the rotor, which is coupled with the synchronization phase.

When the rotor speed $\omega$ is high, the electric drive switchess to a condition where the stator voltage maximum amplitude $U_{s\,max}$ is limited. The more the induction motor torque M and the higher the rotor flux amplitude $\psi_r$, the less the boundary level of the rotor speed $\omega_g$ where the stator voltage limitation becomes effective.

Figure 11:
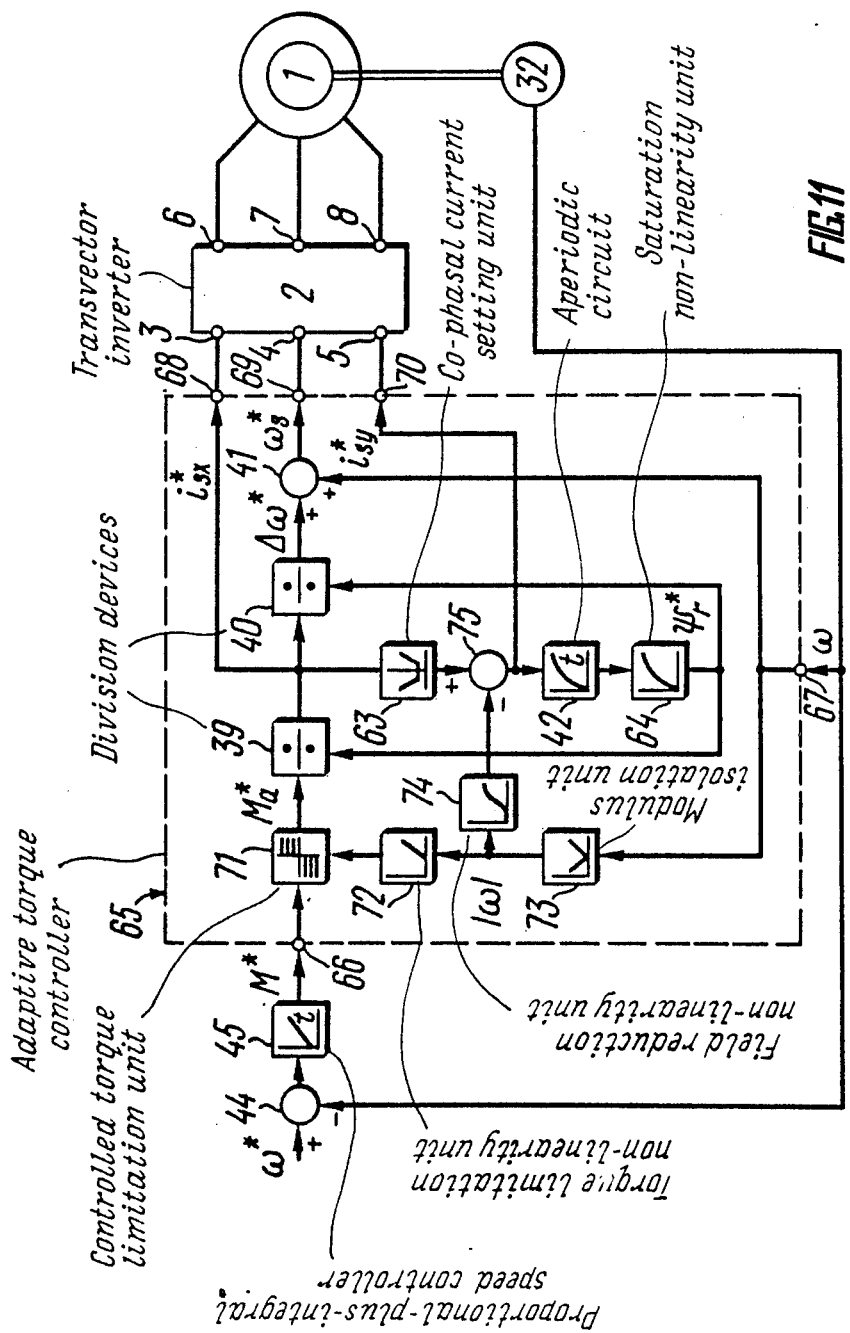
FIG. 11 shows a functional block diagram of a variable-speed induction motor drive having adaptive three-zone phase-current control.

In this case, the electric drive should have a variable structure and adaptive three-zone phase-current control. This embodiment of an electric drive is shown in FIG. 11.

The electric drive comprises an induction motor 1 whose stator windings are connected to power outputs of a transvector inverter 2 featuring three control inputs 3, 4, and 5 and three power outputs 6, 7, and 8 connected to the stator windings of the induction motor 1.

The shaft of the induction motor 1 is connected to a speed transducer 32 whose output is connected, via a first summer 44, to an input of the proportional-plus-integral speed controller 45.

An adaptive torque controller 65 is inserted between the proportional-plus-integral speed controller 45 and the transvector inverter 2.

A first input 66 of the adaptive torque controller 65 is connected to the output of the proportional-plus-integral speed controller 45. A second input 67 of the adaptive torque controller 65 is connected to the output of the speed transducer 32 and to the input of the first summer 44.

An ortho-phasal output 68 of the adaptive torque controller 65 is connected to the ortho-phasal input 3 of the transvector inverter 2.

A frequency output 69 of the adaptive torque controller 65 is connected to the frequency input 4 of the transvector inverter 2.

A co-phasal output 70 of the adaptive torque controller 65 is connected to the co-phasal input 5 of the transvector inverter 2.

The adaptive torque controller 65 comprises a first division device 39 whose output, constituting the ortho-phasal output 68 of the adaptive torque controller 65, is connected to the first input of the second division device 40. The output of the second division device 40 is connected to the first input of the second summer 41 whose output is the frequency output 69 of the adaptive torque controller 65.

The first input of the first division device 39 is connected to an output of a controlled torque limitation unit 71 whose first input constitutes the first input 66 of the adaptive torque controller 65.

The second input of the controlled torque limitation unit 71 is connected to an output of a torque limitation non-linearity unit 72 whose input is connected to an output of a modulus isolation unit 73.

The second input 67 of the adaptive torque controller 65 is connected to the input of the module isolation unit 73 and to the second input of the second summer 41.

The output of the modulus isolation unit 73 is connected to an input of a field reduction nonlinearity unit 74.

The output of the first division device 39, which is the ortho-phasal output 68 of the adaptive torque controller 65, is connected to the input of a co-phasal current setting unit 63 whose output is connected to the first input of a third summer 75. The second input of the third summer 75 is connected to an output of the field feduction non-linearity unit 74.

The output of the third summer 75, which is the co-phasal output 70 of the adaptive torque controller 65, is connected to an input of an aperiodic circuit 42.

The output of the aperiodic circuit 42 is connected to an input of a saturation non-linearity unit 64.

The output of the saturation non-linearity unit 64 is connected to the second inputs of the first and second division devices 39 and 40.

Units 1, 2, 32, 39, 40, 41, 42, 44, 45, 63, and 64 are made like those in the electric drive of FIG. 10.

Units 71, 72, 73, and 74 (FIG. 11) can employ standard operational amplifiers (cf., for example, V. L. Shilo, Functional Analog Integrated Microcircuits, Moscow, Radio i Svyaz Publ., 1979, in Russian, p. 184; and F. Fröhr, F. Orttenburger, Basic Units of Adjustable DC Drive, Tr. from German, Moscow, Energia Publ., 1979, pp. 164–167).

The electric drive of FIG. 11 operates as follows.

The electric drive operates like that of FIG. 10 when the rotor speed $\omega$ is controlled up to some boundary speed $\omega_g$. When the desired torque is low $M^* \leq M_g$, the stator current phase $\epsilon_s$ is controlled as a sum of the synchronous phase $\phi_s$ which is produced by sweeping the sum of the rotor speed $\omega$ and the slip $\Delta\omega$ of the rotor flux linkage, proportional to the desired induction motor torque M*, and the angle of the phase shift $\epsilon\phi$ which is changed as an inverse tangent function of the desired induction motor torque M*.

When the desired induction motor torque exceeds the previous value M*>$M_g$, the stator current phase is controlled by sweeping the synchronous frequency $\omega_s$ with a constant phase shift having a constant angle of the phase shift $$\epsilon_\phi = \pm \frac{\pi}{4}.$$

When the rotor speed $\omega$ grows according to the equations (19), (20), (21), (22), (23), the stator voltage amplitude $U_s$ starts increasing, said amplitude $U_s$ being equal to the quadrature sum of two projections $U_{sx}$ and $U_{sy}$ in the Cartesian system of coordinates Y-X, having its Y axis oriented along the rotor flux linkage vector $\overline{\psi}_r$ $$U_s = \sqrt{U_{sx}^2 + U_{sy}^2} \tag{152}$$

The maximum permissible amplitude $U_{s/max}$ of the stator voltage is limited by the input power dc voltage $U_d$ supplied to the power inputs of the power inverter 12 (FIG. 4) of the transvector inverter 2.

If the maximum amplitude $U_{s\,max}$ is attained in the electric drive of FIG. 11, any further increase of the rotor speed $\omega$ is possible only if the induction motor torque M is reduced, which is realized in the electric drive by sequential reduction of the desired torque M* of the induction motor 1 as a function of the measured rotor speed $\omega$ starting from some boundary rotor speed $\omega_g$ subject to the new control law:

$$\left.\begin{array}{l} U_s = U_{s\,max} \\ |\epsilon_\phi| > \dfrac{\pi}{4} \end{array}\right\} \tag{153}$$

Control law (153) should be supplemented by a law for the reduction of the desired torque M of the induction motor in case the rotor speed $\omega$ increases.

In main drives of NC machine tools, this principle of reducing the induction motor torque M is dictated by the technological requirement of keeping the output power $P_2$ of the induction motor 1 constant with the rotor speed $\omega$ going beyond the boundary value $\omega_g$ which is given by the equation:

$$\left.\begin{array}{l} P_2 = M \cdot \omega = P_{2g} \\ |\omega| \geqq \omega_g \end{array}\right\} \tag{154}$$

where $P_{2g}$ is a constant boundary mechanical power on the shaft of the induction motor 1 in the upper rotor speed control range.

Operation of the electric drive in conformity with the law (153), subject to constant mechanical power according to the equation (154), is realized by changing the control laws and structural connections between the amplitudes $I_{ort}$ and $I_{syn}$ of the ortho-phasal and co-phasal currents. The control is made to adapt by changing the control structure in the electric drive by means of the adaptive torque controller 65.

The control laws are changed at the outputs 68, 69, 70 by signals $I_{ort}$, $\omega_s$, and $I_{syn}$, respectively, as functions of the signal assigning the desired torque M* of the inductions motor 1, supplied to the first input 66 of the adaptive torque controller 65, and of the signal of the measured rotor speed $\omega$, which is supplied to the second input 67 of the adaptive torque controller 65. This control adaptation results in that the induction motor 1 produces the torque M equal to the desired adaptive torque M*$_a$ of the induction motor 1, which is prescribed proportionally to the output signal of the controlled torque limitation unit 71, the signal assigning the desired induction motor torque M* being applied to the input of said unit 71, which is the first input 66 of the adaptive torque controller 65.

The maximum value of the adaptive desired torque M*$_a$ of the induction motor 1 declines with the increase of the measured rotor speed $\omega$ with $|\omega|>\omega_g$ due to the controlled limitation of the output signal of the controlled torque limitation unit 71 as a function of the output signal of the torque limitation non-linearity unit 72. The output signal of the torque limitation non-linearity unit 72 is controlled as a function of the absolute value of the measured rotor speed $|\omega|$ because the signal of the measured rotor speed $|\omega|$ is supplied from the output of the speed transducer 32, via the second input 67 of the adaptive torque controller 65, to the input of the modulus isolation unit 73.

The output signal $|\omega|$ of the modulus isolation unit 73 is at the same time supplied to the input of the torque limitation non-linearity unit 72 and to the input of the field reduction non-linearity unit 74.

Figure 12A:
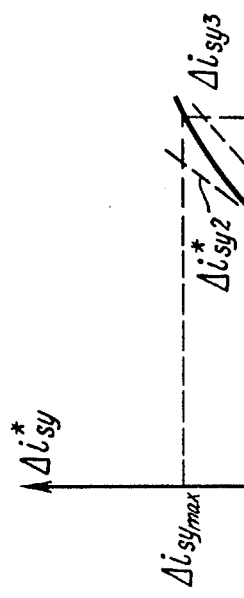
FIGS. 12a, b, c, d show characteristic curves of non-linearity units of an induction motor drive having adaptive three-zone phase-current control.

Characteristic "input-output" curves of the four units 63, 64, 72, and 74 are shown in FIGS. 12a, b, c, and d. Non-linear relationships realized by the saturation non-linearity unit 64 (FIG. 12a) and the field reduction non-linearity unit 74 (FIG. 12b) can be approximated by three or four linear portions having breakpoints indicated.

According to the "input-output" curve of the torque limitation non-linearity unit 72 (FIG. 12c), the torque limiting signal $\Delta M^*$ supplied to the limiting input of the controlled torque limitation unit 71 appears and starts growing with the increase of the rotor speed, starting from some value ($\omega_g$) of the absolute rotor speed $|\omega|$.

The "input-output" curve of the co-phasal current setting unit 63 (FIG. 12d) corresponds to the law employed to control the signal prescribing the co-phasal current $I^*_{syn}=i^*_{sy}$ in control zones I and 11.

The signal M* is supplied from the output of the proportional-plus-integral speed controller 45 to the control input of the controlled torque limitation unit 71. The output of the controlled torque limitation unit 71 is a signal assigning the adaptive desired torque M*$_a$ of the induction motor 1, which is given by $$\left.\begin{array}{l} M_a^* = M^*, \text{ if } |\omega| < \omega_g \\ M_a^* = M^* - \Delta M^*(|\omega|), \text{ if } |\omega| \geqq \omega_g \end{array}\right\} \tag{155}$$

The function $\Delta M^*(|\omega|)$ has, subject to the mechanical power $P_2$ of the induction motor 1 being kept constant according to the equation (154), the following form $\Delta M^* = K\Delta|\omega|$ where $K\Delta$ is a constant coefficient.

When the rotor speed ω grows beyond the boundary value of the speed $\omega_g$ and the desired induction motor torque M* is brought down to a value ΔM*, the ortho-phasal current amplitude $I_{ort}=i^*_{sx}$ declines due to the decrease of the output signal $i^*_{sx}$ of the first division device 39, which is supplied via the ortho-phasal output 68 of the adaptive torque controller 65 to the ortho-phasal input 3 of the transvector inverter 2.

Figure 12B:
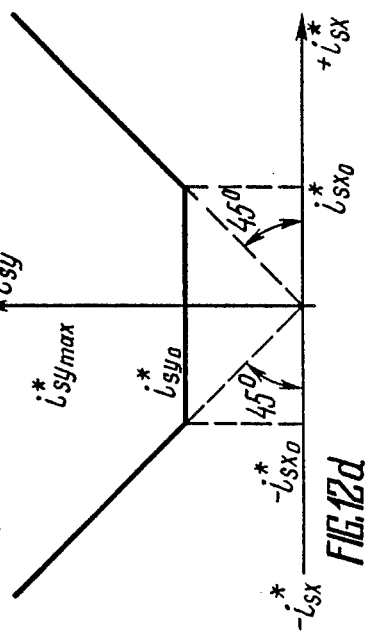
Figure 12C:
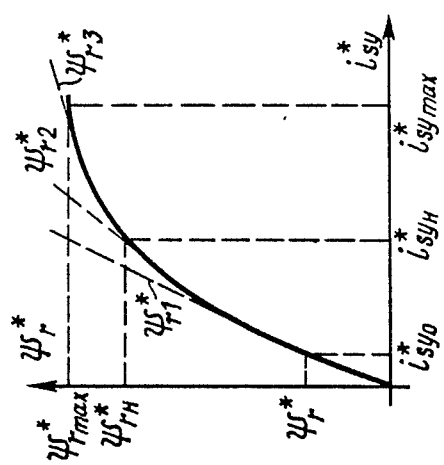
Figure 12D:
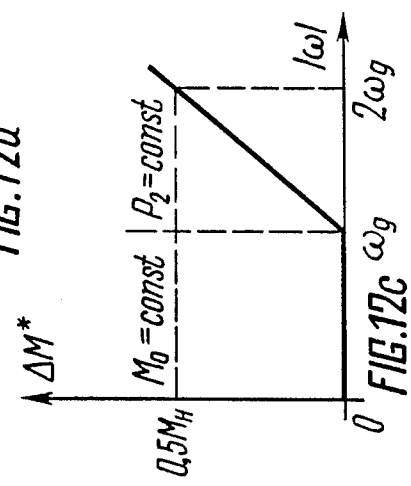

When the electric drive operates under load and in dynamic conditions, the induction motor torque M exceeds the boundary value of the torque $M_g$ and the operating point on the input-output curve of the co-phasal current setting unit 63 (FIG. 12d) is situated higher than the value $i^*_{syo}$ on the axis $i^*_{sy}$, which corresponds to the control zone II wherein the equality $i^*_{sy}=|i^*_{sx}|$ is valid as shown in FIG. 12d.

In consequence, the co-phasal current amplitude $I_{syn}$ also decreases due to the reduction of the input signal $i^*_{sx}$ of the co-phasal current setting unit 63 (FIG. 11), supplied from the output of the first division device 39.

The co-phasal current amplitude $I_{syn}$ declines more intensively with the increase of the modulus of the rotor speed $\omega > \omega_g$, as compared to the decline of the ortho-phasal current amplitude $I_{ort}$, because the summer 75 additionally reduces the signal $i^*_{sy}$ assigning the co-phasal current amplitude $I_{syn}$. The output signal of the field reduction non-linearity unit 74 grows with the increase of the absolute rotor speed according to the curve shown in FIG. 12b. The summer 75 (FIG. 11) subtracts the output signal $\Delta i^*_{sy}$ of the field reduction non-linearity unit 74 from the signal $i^*_{sy}$ supplied from the output of to co-phasal current setting unit 63. The output signal $(i^*_{sy}-\Delta i^*_{sy})$ of the summer 75 is equal to the difference between two input unipolar signals and is supplied to the co-phasal input 5 of the transvector inverter 2 via the co-phasal output 70 of the adaptive torque controller 65.

Simultaneously, the output signal $(i^*_{sy}-\Delta i^*_{sy})$ of the summer 75 is supplied to the input of the aperiodic circuit 42 whose output signal diminishes with the growth of the rotor speed $|\omega|$ according to the aperiodic law with a time constant equal to the electromagnetic time constant $T_r$ of the rotor circuit of the induction motor.

Since the output signal of the aperiodic circuit 42 decreases, so does the signal setting the desired amplitude $\psi^*_r$ of the rotor flux linkage, which is supplied from the output of the saturation non-linearity unit 64 to the divisor input of the first and second division devices 39 and 40. As the desired amplitude $\psi^*_r(t)$ of the rotor flux linkage declines with time t of the electromagnetic transient process, the ortho-phasal current amplitude $I_{ort}$ grows due to certain build-up of the output signal $i^*_{sx}$ of the first division device 39. This results in a substantial increase of the slip Δω of the rotor flux linkage relative to the rotor due to the growing signal $i^*_{sx}$ at the dividend input of the second division device 40 and, consequently, in a decrease of the signal $\psi^*_r$ at the divisor input thereof.

The increase of the output signal Δω* of the second division device 40 leads to increase of the signal $\omega^*_s$ at the frequency output 69 of the adaptive torque controller 65, supplied to the frequency input 4 of the transvector inverter 2.

This operational mode of the electric drive according to the law (153) is characterized, as contrasted to the operational mode according to the law (120), by interrelated process of reducing the torque M of the induction motor 1, reducing the rotor flux linkage amplitude $\psi_r$, and increasing the phase shift $|\epsilon_\phi| > (\pi/4)$ of the stator current relative the rotor flux linkage, when the rotor speed ω exceeds the boundary value $\omega_g$ of the rotor speed.

Adaptive interaction control of the induction motor torque and rotor flux amplitude is effected by means of the adaptive torque controller 65 to satisfy the condition of invariant control of the induction motor torque M:

$$M(t)=M^*_a(t) \tag{156}$$

where $M^*_a(t)$ is the adaptive desired torque of the induction motor, proportional to the output signal of the controlled torque limitation unit 71.

When the conditions of the invariant control are met in accordance with the equation (156), the range of control of the rotor speed ω can be made broader, even beyond the boundary rotor speed $\omega_g$, while maintaining astatic speed control within the zone of limited stator voltage.

According to the invention, this electric drive of FIG. 11 realizes a method of adaptive phase-current control of an induction motor, whereby the stator current phase is formed differently in three rotor torque and speed control zones as an independent and main parameter of induction motor control in order to simultaneously form and control, in an optimal manner, dynamic, power, and thermal processes in the induction motor.

Here, the laws of stator current phase control are automatically changed in the adaptive (self-adjusting) control system with the aid of the adaptive torque controller 65 coupled to the input of the transvector inverter 2.

According to the method of adaptive phase-current control, the stator current phase is controlled, as shown in FIG. 13, in zone I (FIG. 13a) by setting a constant flux-producing component $i_{syo}$ of the stator current amplitude and by changing, proportionally to the desired induction motor torque M*, the torque-producing component $i_{sx}$ of the stator current amplitude. Fixed values of the controlled torque-producing component $i_{sx1}$, $i_{sx2}$, $i_{sx3}$, $i_{sx4}$ of the stator current amplitude and respective angular positions of the stator current vector $i_s$ are shown in FIG. 13, diagram a.

In the control zone I for adjustment of the induction motor torque and rotor speed, the induction motor control law is influenced by the magnitude of the permissible stator current amplitude $i_{s\ max}$. The actual induction motor torque M(t) and the effective rotor speed ω(t) are less than their respective boundary values $M_g$ and $\omega_g$, while the amplitude $\psi_r$ of the rotor flux linkage is constant and equal to the initial value $\psi_{ro}=\psi_{r\ 1,\ 2,\ 3,\ 4}$. When the actual desired torque $M^*_g=M_g$, but the actual rotor speed ω remains less than its boundary value $\omega_g$, the stator current phase is controlled according to another law (zone II in FIG. 13b).

In the main control zone II the induction motor control law is unaffected by the power limitations of the control field, related to stator current and voltage amplitudes. The operational mode of the induction motor is dictated by the conditions of optimal usage of the active components of the induction motor in terms of maximum torque and speed of response in dynamic conditions and minimal stator current and power losses in steady state conditions, the heating of the stator winding insulation being limited in namic conditions and brought to a minimum in steady state conditions. Control law (120) is effective in the control zone II and it is implemented by simultaneous and equal in magnitude change of the torque-producing and flux-producing components $i_{sy}=|i_{sx}|$ of the stator current amplitude. Fixed values $i_{sx5}$, $i_{sx6}$, $i_{sx7}$, $i_{sx8}$, $i_{sx9}$, $i_{sx10}$ of the varying torque-producing component of the stator current amplitude and respective angular positions of the stator current vector $\bar{i}_s$ are shown in FIG. 13b. Steady-state amplitudes $\psi_{r\infty}$ of the rotor flux linkage and positions of the rotor flux linkage vector $\bar{\psi}_{r\infty}$ for respective operational modes and values $i_{sx5}-i_{sx10}$ are shown in the same diagram of FIG. 13b.

When the rotor speed $\omega$ exceeds the boundary value $\omega_g$, the induction motor control law is subjected to the limitation of the stator voltage amplitude. The induction motor 1 is automatically transferred to the control zone III (FIG. 13c) where the magnetic field and the rotor flux linkage amplitude are reduced due to the reduction of the flux-producing component $i_{sy}$ of the stator current amplitude.

FIG. 13c also illustrates fixed values of the declining flux-producing components $i_{sy11}$, $i_{sy12}$, $i_{sy13}$ of the stator current amplitude and respective positions of the stator current vector $\bar{i}_s$ and the steady-state position of the rotor flux linkage vector $\bar{\psi}_{r\infty}$.

Referring to FIG. 13c, the phase shift of the stator current vector $\bar{i}_s$ relative to the rotor flux linkage vector in the control zone III grows in excess of the angle $|\pi/4|$ in inverse propotion to the flux-producing component $i_{sy}$ of the stator current amplitude, that is in direct proportion to the rotor speed $\omega$.

Modifications of the control laws related to the stator current phase in the control zones I, II, III related to adjustment of the induction motor torque and rotor speed, the amplitude $\psi_r$ of the rotor flux linkage changes differently as a function of the induction motor torque and rotor speed, as shown by charts in FIGS. 13d, e, f.

In the control zone I (FIG. 13d), the amplitude of the rotor flux linkage is independent of the induction motor torque M and is equal to the initial amplitude $\psi_{ro}$ of the rotor flux linkage, required for fast-response generation of the starting moment $M_{max}$ of the induction motor, while the stator current amplitude $i_{s\,max}$ is limited.

In the control zone II (FIG. 13e), when $|M|>M_g$, the steady-state amplitude $\psi_{r\infty}$ of the rotor flux linkage increases according to the optimal law $\psi_{r\,opt}(M)$ with the increase of the induction motor torque M according to the non-linear relattionship. The magnetic core of the induction motor is the more saturated the high the induction motor moment M.

When the induction motor torque M exceeds the two-fold nominal torque $M_n$, the rate of increase of the amplitude $\psi_{r\,opt}$ of the rotor flux linkage drops considerably due to saturation of the magnetic core, sharp drop (two-three-fold) of the mutual inductance $L_m$, and the increasing increment of the producing component $\Delta i_{sy}$ of the stator current amplitude, which is connected to the above processes and is aimed to produce the increment to the amplitude $\Delta\psi_{r\,opt}$ of the rotor flux linkage.

This process of declining rate of increase of the amplitude $\psi hd r\,opt$ of the rotor flux linkage corresponds to the moment when the operating point on the "input-output" curve of the saturation non-linearity. unit 64 (FIG. 11), which is illustrated in FIG. 12a, enters the portion $\psi^*_{r3}$ with a minor increment to the output signal $\Delta\psi^*_r$ during the assignment of the increment to the input signal $\Delta i^*_{sy}$.

When the rotor speed $\omega$ grows higher than the boundary speed $\omega_g$, the electric drive of FIG. 11 operates in the control zone III for adjustment of the induction motor torque and rotor speed, where the steady-state amplitude $\psi_{r\infty}$ of the rotor flux linkage tends to decline as shown in FIG. 13f.

The higher the rotor speed $|\omega|$ the less the maximum induction motor torque $M_{max}$ and the less the steady-state amplitude $\psi_{r\infty}$ of the rotor flux linkage—which is shown in FIG. 13f by fixed values $\psi_{r11}$, $\psi_{r12}$, $\psi_{r13}$ for fixed values of the induction motor torque $M_{11}$, $M_{12}$, $M_{13}$ produced with respective fixed positions $\bar{i}_{s11}$, $\bar{i}_{s12}$, $\bar{i}_{s13}$ of the stator current vector $\bar{i}_s$.

According to this method of control, transition from one control zone to an adjacent zone is performed without any step changes in any control parameter or state vector parameter in the transition point from one zone to another. If the desired induction motor torque M* is equal to the boundary torque value $M^*_g=M_g$, an induction motor control mode is organized, wherein all control parameters correspond to the control law in the control zone I (FIG. 13) and to the control law in the control zone II, that is the point $M^*=M^*_g=M_g$ of the control mode is common for both control zones I and II.

When the absolute value of the measured rotor speed $\omega$ is equal to the boundary rotor speed $\omega_g$, the control mode point $|\omega|=\omega_g$ is common for control zones II and III.

This condition for matching control laws is ensured in the electric drive of FIG. 11 by the totality of units 39, 40 42, 63, and 64 which are a simulator of electromagnetic transient processes in the induction motor 1. This simulating model is used to effect adaptive control of the stator current vector parameters in three zones of the phase-current control.

This control method realized in the electric drive shown in FIG. 11 is characterized by that the instantaneous stator phase current $i_{sa}(t)$ in the reference stator phase winding is controlled according to the following laws:

$$i_{sa}(t) = \frac{\psi_{ro}^*}{L_{mo}} \cdot \cos\left[\phi_{so} + \int\left(\omega + \frac{2R_r}{3L_p \cdot \psi_{ro}^{*2}} \cdot M^*\right)dt\right] - \frac{2L_r}{3L_p \cdot L_m \psi_{ro}^*} \cdot M^* \cdot \sin\left[\phi_{so} + \int\left(\omega + \frac{2R_r}{3L_p \psi_{ro}^{*2}} \cdot M^*\right)dt\right] \quad (157)$$

in case $|(M^*)| \leq M_g$;

$$i_{su}(t) = \frac{2\sqrt{\frac{L_r}{3Z_p}}}{L_m} \cdot \frac{M^*}{\sqrt{M^* + (M_o^* - M^*)\cdot e^{-\frac{2t}{T_r}}}} \cdot \left\{\cos\left[\phi_{so} + \int\left(\omega + \frac{R_r}{L_r} \cdot \frac{M^*}{M^*(M_o^* - M^*)\cdot e^{-\frac{2t}{T_r}}}\right)dt\right] - \sin\left[\phi_{so} + \right.\right. \quad (158)$$

$$\int \left( \omega + \frac{R_r}{L_r} \cdot \frac{M^*}{M^* + (M_o^* - M^*) \cdot e^{-\frac{2t}{T_r}}} \right) dt \right] \right\}$$

if $|M^*| > M_g$ and $|\omega| \leq \omega_g$, $$i_{ssa}(t) = \frac{2}{3} \left\{ Z_p \frac{L_r}{L_m \cdot \psi_r^*(t)} \cdot |M_a^*| - K_{1,2,3}(|\omega| - \omega_g) \right\} \cos \cdot \tag{159}$$

$$\left[ \phi_{so} + \int \left( \omega + \frac{2R_r}{3Z_p} \cdot \frac{M_a^*}{(\psi_r^*(t))^2} \right) dt \right] -$$

$$\left\{ \frac{2}{3} Z_p \frac{L_r}{L_m} \cdot \frac{M_a^*(t)}{\psi_r^*(t)} \right\} \cdot$$

$$\sin \left[ \phi_{so} + \int \left( \omega + \frac{2R_r}{3Z_p} \cdot \frac{M_a^*}{(\psi_r^*(t))^2} \right) dt \right],$$

if $|\omega| > \omega_g$.

In the equation (159) the proportionality factor $K_{1, 2, 3}$ is constant at certain stages of control of the rotor speed $\omega$ as shown in FIG. 12*b* on the "input-output" curve for the field reduction unit 74 (FIG. 11). The magnitude of the adaptive desired torque $M^*_a$ of the induction motor is determined in the equation (159) according to the equation (155), subject to condition $|\omega| > \omega_g$.

The actual value of the desired amplitude $\omega^*_r(t)$ of the rotor flux linkage in the equation (159) is controlled according to the equation (111) in response to changes of the flux-producing component $i_{sx}$ of the stator current amplitude as a function of the value of the desired adaptive torque $M^*_a$ of the induction motor 1 and the absolute value of the measured speed $|\omega|$:

$$\frac{L_r}{R_r} \cdot \frac{d\psi_r^*(t)}{dt} + \psi_r^*(t) = \tag{160}$$

$$\frac{2}{3} Z_p \frac{L_r}{\psi_r^*(t)} \cdot |M^*| - K_{1,2,3} \cdot L_m(|\omega| - \omega_g).$$

In the equations (158)–(160), the transmission factor $L_m$ equal to the mutual inductance declines in relation to the maximum value $L_{mo} = \psi_{ro}|i_{syo}$ with the increase of the desired amplitude $\psi_r > \psi_{ro}$ of the rotor flux linkage according to the equation (15) which can be approximately expressed by the following relationship:

$$L_m(t) \approx \frac{\psi_r^*(t)}{I_k} \cdot \text{Ctg} \frac{\psi_r^*(t)}{\psi_k} \tag{161}$$

where values $i_k$ and $\psi_k$ are constant during the periods of approximation of the magnetizing characteristic of the induction motor 1, which is given by the relationship $\psi_m(i_m)$ and can be transformed according to the above equation (138) into the ratio $\psi_r = F(i_{sy})$.

A more precise relationship $\psi_r(i_{sy})$ for adjustment of the saturation non-linearity unit 64 (FIG. 11) can be determined from the above equations (16), (17), and (18).

Permissible errors of approximation of the magnetizing characteristic of the induction motor 1 by the characteristic $\psi_r(i_{sy})$ of the saturation non-linearity unit 64 are related to the required accuracy of extreme power performance of the induction motor 1 and may amount to +3-5%.

Even though the cited mathematical relations of the input control signals M and $\psi^*_r$ with the output stator current parameters given by the equations (157)–(161) seem rather complicated, the adaptive phase-current control employed in the electric drive of FIG. 11 is implemented by comparatively unsophisticated hardware components comprised by the adaptive torque controller 65.

This control method can also be realized in an electric drive featuring a microprocessor adaptive torque controller using the circuit of FIG. 11 and a microprocessor set (cf., for example, Analog and Digital Integrated Microcircuits, Handbook, Ed. by S. V. Yakubovsky, Moscow, Radio i Svyaz Publ., 1985, in Russian, pp. 223-225).

In case of violent disturbances introduced by the load of the induction motor, the desired rotor speed can be restored within a minimal period by forcing, within several milliseconds, the induction motor moment in excess of the nominal torque $M_n$ of the induction motor.

An abrupt, though very brief, boosting of the induction motor torque to extreme levels, exceeding the nominal torque by a factor of 8 or even 10, may become necessary for positioning actuators of robots in order to reduce the positioning error to zero within a minimal period of time.

In the electric drive of FIG. 11, the maximum torque $M_{max}$ of the induction motor 1 can be brought up in the control zone II to a value exceeding the nominal torque $M_n$ by a factor of 6 or 7, while the magnetic core is saturated and the permissible-stator current amplitude is five times more than the nominal stator current amplitude $i_{sn}$, since this amplitude is usually taken as a permissible maximum starting current. But such forcing of the torque $M = (6-7)M$ of the induction motor 1 is possible only in two cases.

First, this torque forcing is possible in case the permissible output current of the power inverter substantially exceeds the maximum stator current amplitude $5 \cdot i_{sn}$. Moreover, the less the actual rotor flux linkage amplitude $\psi_r(t)$ prior to the forcing process, the higher should be the permissible current reserve of the power inverter in order provide a momentary, several milliseconds, forcing of the stator current amplitude according to the equation (158) in excess of the value $5 \cdot i_{sn}$ to produce a 6-7-fold torque of the induction motor. As the rotor flux amplitude $\psi_r(t)$ is rapidly increasing, the stator current amplitude $i_s(t)$ drops sharply within several milliseconds, while the 6-7-fold torque of the induction motor is retained due to the high amplitude $\psi_r$ of the rotor flux linkage. But, power switches of the power inverter in the transvector inverter 2 (FIG. 11) should be rated for a substantial increase of the permissible current, which makes the electric drive of FIG. 11 much more expensive, the power inverter much larger, and the electric drive much less reliable.

Second, the induction motor torque $M_{max}$ can be forced in case the induction motor torque M(t) grows gradually, while the maximum amplitude $i_{smax}$ of the stator current is permanently limited and equal to the permissible starting current of the induction motor, $i_s$ $max = 5 \cdot i_{sn}$. In this case, at the beginning of the forcing process, when $\psi_r = \psi_{ro} \approx 0.5 \cdot \psi_{rn}$, the induction motor torque M cannot reach its maximum value $M_{max}$, and for the period of the electromagnetic transient process, which is approximately equal to a double electromagnetic time constant $2T_r$ of the rotor circuit, the amplitude $\psi_r(t)$ of the rotor flux linkage approaches, according to the equation (149), the desired optimal value, and the maximum torque $M_{max}$ of the induction motor is produced.

The rise time of the torque $M(t)$ to the maximum value $M_{max}$ varies inversely with the initial amplitude $\psi_{ro}$ of the rotor flux linkage, which existed prior to the beginning of the process of forcing the torque of the induction motor.

In operating conditions of the induction motor, the amplitude $\psi_r$ of the rotor flux linkage in the electric drive of FIG. 11 varies within a range close to the nominal amplitude $\psi_{rn}$ of the rotor flux linkage. The rise time of the induction motor torque $M(t)$ to the maximum value $M_{max}$ amounts in this case to about 5-15 milliseconds.

In order to achieve the fastest possible response to the forcing of the induction motor torque with the limited stator current amplitude, according to the invention, a method of control of an induction motor is provided whereby the stator current phase is abruptly shifted to an angle corresponding to the maximum angle of the stator current shift relative to the rotor flux linkage, which is equal to one-fourth of the period of the actual synchronous frequency of the stator current, that is to the angle $\pm\pi/2$ in relation to the synchronization phase $\phi_{s/t=0}$ at the moment $t=0$ the induction motor torque is started to be forced.

Figure 14:
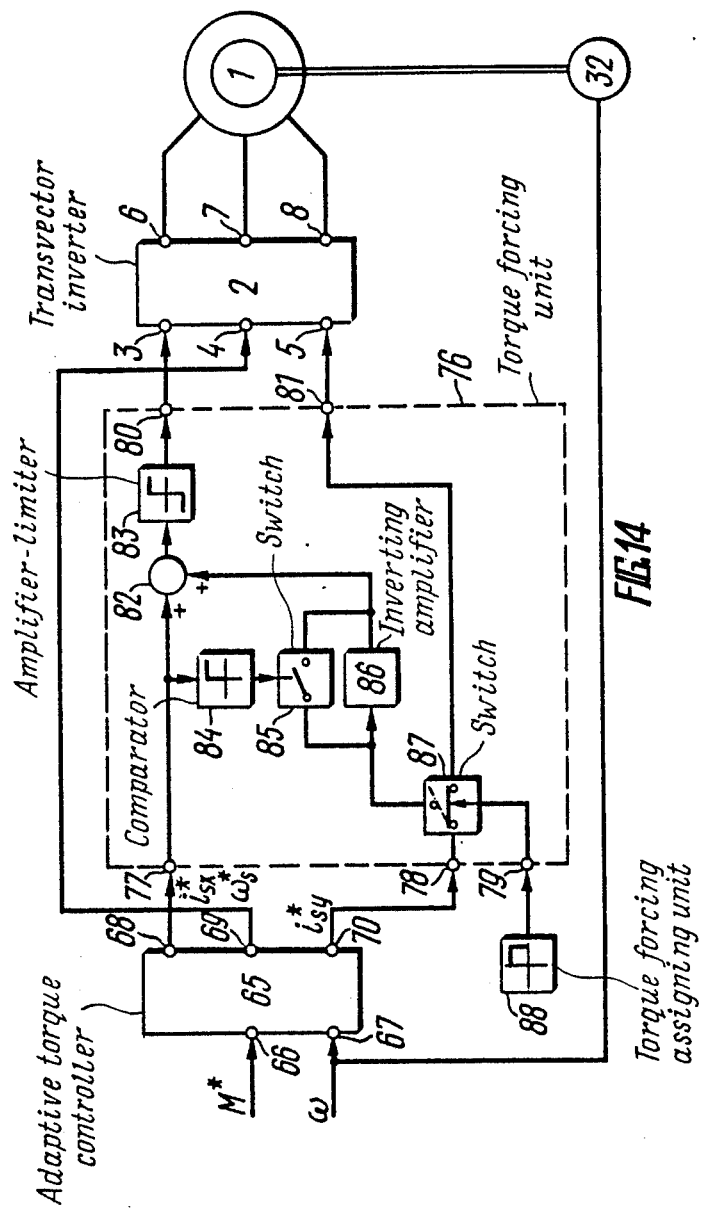
FIG. 14 shows a functional block diagram of a torque induction motor drive having phase-current forcing of the induction motor torque.

The electric drive realizing this control method is shown in FIG. 14.

This electric drive comprises an induction motor 1 (FIG. 14) and a transvector inverter 2 having an ortho-phasal input 3, a frequency input 4, and a co-phasal input 5. Outputs 6, 7, and 8 of the transvector inverter 2 are connected to the stator windings of the induction motor 1.

The shaft of the induction motor 1 is connected to an input of an adaptive torque controller 65.

A first input 66 of the adaptive torque controller 65 constitutes an input for assigning the desired torque M* of the induction motor 1.

A second input 67 of the adaptive torque controller 65 is connected to an output of the speed transducer 32.

The adaptive torque controller 65 comprising an orthophasal output 68, a frequency output 69, and a co-phasal outut 70 has the frequency output 69 connected to the frequency input 4 of the transvector inverter 2. A torque forcing unit 76 having three inputs 77, 78, 79 and two outputs 80 and 81 is inserted between the ortho-phasal and co-phasal outputs 68 and 70 of the adaptive torque controller 65 and the orthophasal and co-phasal inputs 3 and 5 of the transvector inverter 2.

The first input 77 of the torque forcing unit 76, which constitutes the ortho-phasal input of the unit 76, is connected to the ortho-phasal output 68 of the adaptive torque controller 65.

The second input 78 of the torque forcing unit 76, which constitutes the co-phasal input of the torque forcing unit 76, is connected to the co-phasal output 70 of the adaptive torque controller 65.

The third input 79 of the torque forcing unit 76 constitutes a control input of the unit 76.

The first output 80 of the torque forcing unit 76, which constitutes the ortho-phasal output of the torque forcing unit 76, is connected to the orthophasal input 3 of the transvector inverter 2.

The second output 81 of the torque forcing unit 76, which constitutes the co-phasal output of the torque forcing unit 76, is connected to the co-phasal input 5 of the transvector inverter 2.

The torque forcing unit 76 comprises a summer 82 whose first input constitutes the ortho-phasal input 77 of the torque forcing unit 76.

The output of the summer 82 is connected to an input of an amplifier-limiter 83. The output of the amplifier-limiter 83 is connected to the ortho-phasal output 80 of the torque forcing unit 76.

The ortho-phasal input 77 of the torque forcing unit 76 is also connected to an input of a comparator 84 whose output is connected to a control input of a switch 85.

The switchable input of the switch 85 is connected to an input of an inverting amplifier 86 whose output is joined with the output of the switch 85 and connected to the second input of the summer 82.

The input of the inverting amplifier 86 is connected to a first output of a switch 87 of the torque forcing unit 76, whose switchable input is connected to the co-phasal input 78 of the torque forcing unit 76.

The second output of the switch 87 is connected to the co-phasal output 81 of the torque forcing unit 76.

The control input of the switch 87, which constitutes the control input 79 of the torque forcing unit, is connected to an output of a torque forcing assigning unit 88.

The transvector inverter 2 and the adaptive torque controller 65 ae similar to those in the electric drive shown in FIG. 11.

The summer 82 (FIG. 14), the limiter-amplifier 83, and the inverter amplifier 86 can employ conventional operational amplifiers (cf., for example, B. K. Nesterenko, Integrated Operational Amplifiers, Handbood, Moscow, Energia Publ., 1982, in Russian, p. 107).

The switch 85 and switch 87 can employ conventional microcircuits of multichannel switches (cf., for example, V. L. Shilo, Functional Analog Integrated Microcircuits, Moscow, Radio i Svyaz Publ., 1979, in Russian, pp. 321, 326, 327).

The comparator 84 and the torque forcing assigning unit 88 can employ conventional comparator microcircuits (cf., for example, B. K. Nesterenko, Integrated Operational Amplifiers, Handbook, Moscow, Energia Publ., 1982, in Russian, pp. 114, 115).

The electric drive of FIG. 14 operates as follows.

The stator windings of the induction motor 1 are supplied with instantaneous phase currents $i_{sa}$, $i_{sb}$, $i_{sc}$ whose instantaneous values are controlled by means of the transvector inverter 2 in relation to phase $\delta_s$, frequency $\omega_{is}$, and instantaneous amplitude $i_s$ as functions of three control input signals $I^*_{ort}$, $\omega^*_s$, $I^*_{syn}$ supplied to the ortho-phasal, frequency, and co-phasal inputs 3, 4, and 5, respectively.

The effective instantaneous phase currents $i_{sa}(t)$, $i_{sb}(t)$, $i_{sc}(t)$ of the stator, which are produced at the outputs 6, 7, and 8 of the transvector inverter 2, are practically instantly changed by the step change of the ratio of the amplitudes $I_{ort}/I_{syn}=I^*_{ort}/I^*_{syn}$ of the ortho-phasal and co-phasal currents, as described above.

In this case, the instantaneous stator current amplitude $i_s$ is equal to the quadrature sum of the ortho-phasal and cophasal currents according to the formula:

$$i_s = \sqrt{I_{ort}^2 + I_{syn}^2} = \sqrt{I^{*2}_{ort} + I^{*2}_{syn}} \quad (162)$$

where $I^*_{ort}$ is the desired ortho-phasal current amplitude proportional to the control input applied to the ortho-phasal input 3 of the transvector inverter 2:

$I^*_{syn}$ is the desired co-phasal current amplitude proportional to the control input applied to the co-phasal input 5 of the transvector inverter 2.

The stator current phase $\epsilon_s$ equal to the instantaneous phase of the instantaneous stator phase current $i_{sa}(t)$ in the reference stator phase winding "A" is produced equal to the sum of the synchronization phase $\phi^*_s$ and the angle of the phase shift $\epsilon_\phi$ according to the expression:

$$\epsilon_s = \phi_{so}^* + \phi_s^*(t) + \arctg \frac{I_{opt}^*}{I_{syn}^*} \quad (163)$$

where $$\arctg \frac{I_{ort}^*}{I_{syn}^*} = \epsilon_\phi \quad (164)$$

The phase shift $\epsilon_\phi$ of the stator current vector $\bar{i}_s$ is measured in angular radians of displacement of the vector $\bar{i}_s$ in relation to the actual synchronization phase $\phi^*_s$ equal to the synchronous stator current phase:

$$\phi_s(t) = \phi^*_{so} + \phi^*_s(t). \quad (165)$$

In this case the synchronous stator current frequency $\omega_s$ is equal to the rate of change of the stator current synchronous phase:

$$\omega_s(t) = \frac{d\phi_s(t)}{dt} = \frac{d\phi_s^*(t)}{dt}. \quad (166)$$

In this connection, the phase shift $\epsilon_\phi$ of the stator current vector is characterized by the phase angle inside the actual synchronous period $T_s$ of the stator current, which is the reverse function of the actual synchronous frequency $\omega_s$ of the stator current:

$$T_s(t) = \frac{2\pi}{\omega_s(t)}. \quad (167)$$

In the electric drive shown in FIG. 14, the stator current synchronous frequency $\omega_s$ is produced identically to the electric drive of FIG. 11 by assigning the synchronization frequency $\omega^*_s$ at the frequency input 4 (FIG. 14) of the transvector inverter 2 and varies with the measured rotor speed which is measured by the speed transducer 32 and with the desired slip $\Delta\omega^*$ of the rotor flux linkage in relation to the rotor.

The synchronization frequency $\omega^*_s$ is produced by the adaptive torque controller 65 whose first input 66 receives a signal assigning the desired torque M* of the induction motor 1, while the second input 67 receives a signal of the measured rotor speed $\omega$ supplied from the output of the speed transducer 32. Operational modes of the adaptive torque controller 65 have been described above with reference to the operational modes of the electric drive of FIG. 11.

A signal assigning the desired torque-producing quadrature component $i^*_{sx}$ of the stator current amplitude is produced at the ortho-phasal output 68 (FIG. 14) of the adaptive torque controller 65.

A signal assigning the desired synchronization frequency $\omega^*_s$ of the rotor flux linkage is produced at the frequency output 69 of the adaptive torque controller 65 and is applied to the frequency input 4 of the transvector inverter 4.

Since the signal assigning the desired synchronization frequency $\omega^*_s$ of the rotor flux linkage synchronizes control of the transvector inverter 2 in the Cartesian Y-X system of coordinates, in which the projections of the stator current vector $\bar{i}_s$ are assigned on the ortho-phasal and co-phasal inputs 3 and 5 of the transvector inverter 2, the signal assigning the desired synchronization frequency $\omega^*_s$ is equal to the synchronization frequency of the stator current vector control and the stator current synchronous frequency $\omega_s$ is equal to the desired synchronization frequency $\omega^*_s$ of the rotor flux linkage.

A signal assigning the desired flux-producing quadrature component $i^*_{sy}$ of the stator current amplitude is produced at the co-phasal output 70 of the adaptive torque controller 65, said component being equal to the desired projection of the stator current vector $\bar{i}_s$ onto the "Y" axis whose direction coincides with that of the axis of the vector $\bar{\psi}_r$ of the rotor flux linkage.

In the initial state, the torque forcing unit 76 lets the signals assigning the torque-producing and flux-producing quadrature components $i^*_{sx}$ and $i^*_{sy}$ of the stator current amplitude pass without change from the outputs 68 and 70 of the adaptive torque controller 65 to respective inputs 3 and 5 of the transvector inverter 2.

In this case, the signal assigning the desired torque-producing component $i^*_{sx}$ of the stator current amplitude is supplied to the ortho-phasal input 77 of the torque forcing unit 76 from the ortho-phasal output 68 of the torque adaptive controller 65, while the signal assigning the desired flux-producing component $i^*_{sy}$ of the stator current amplitude is supplied to the co-phasal input 78 of the torque forcing unit 76 from the co-phasal output 70 of the adaptive torque controller 65.

No signal is applied to the control input 79 of the torque forcing unit 76 in the initial state (prior to the start of the torque forcing process).

In this case, the signal assigning the torque-producing qudrature component $i_{sx}$ of the stator current empitude on the ortho-phasal input 77 of the torque forcing unit 76 is euqal to the output signal on the ortho-phasal output 80 of the torque forcing unit 76, while the signal $i^*_{sy}$ on the co-phasal input 78 of the torque forcing unit 76 is equal to the output signal on the co-phasal output 81 of the torque forcing unit 76.

This equality of the input and output signals of the torque forcing unit 76 in the initial condition is based on that the signal $i^*_{sx}$ is supplied from the ortho-phasal input 77 of the torque forcing unit 76 to the first input of the summer 82 which has no signal, in the initial condition, applied to the second input thereof.

The output signal of the summer 82, which in this case is equal to the signal assigning the desired torque-producing quadrature component $i^*_{sx}$ of the stator current amplitude, is supplied, via the amplifier-limiter 83 having a unit amplification factor to the ortho-phasal output 80 of the torque forcing unit 76.

Irrespective of the state of the comparator 84 and the switch 85, the output signal of the inverting amplifier 86 is equal to zero in the initial state since the switch 87 in the initial state, when no signal is applied to the control input thereof, is placed in the original position wherein the switchable input of the switch 87 is disconnected from the first input thereof, which is joined with the input of the inverting amplifier 86.

With the zero signal at the control input 79 of the torque forcing unit 76, the switch 87 disconnects the input of the inverting amplifier 86 from the co-phasal input 78 of the torque forcing unit 76.

Simultaneously, with the zero signal at the control input 79 of the torque forcing unit 76, the switch 87 connects the co-phasal input 78 of the torque forcing unit 76 with the co-phasal output 81 of the torque forcing unit 76, as indicated in FIG. 14 by a solid line connecting the input and output of the switch 87. In consequence, the signal assigning the desired flux-producing quadrature component $i^*_{sy}$ of the stator current amplitude is supplied from the co-phasal input 78 to the co-phasal output 81 of the torque forcing unit 76.

In this initial state, no signal is produced at the output of the torque forcing assigning unit 88, and the electric drive of FIG. 14 is identical to the electric drive of FIG. 11. The method of induction motor control and operational conditions of the electric drive of FIG. 14 are, in this case, given by the above equations (157)–(160).

When a control signal is supplied from the output of the torque forcing assigning unit 88 (FIG. 14) to the control input 79 of the torque forcing unit 76, the switch 87 disconnects the co-phasal input 78 of the torque forcing unit 76 from the co-phasal output 81 of the unit 76.

Simultaneously, the co-phasal input 78 of the torque forcing unit 76 is connected by the switch 87 to the input of the inverting amplifier 86.

The sign of the output signal of the inverting amplifier 86 is dictated by the state of the comparator 84 and the switch 85.

If the signal assigning the torque-producing quadrature component $i^*_{sx}$ of the stator current amplitude, which is supplied from the ortho-phasal input 77 of the torque forcing unit 76 to the input of the comparator 84, has a positive polarity, the comparator 84 produces an output voltage supplied to the control input of the switch 85.

The switchable input of the switch 85 is, therefore, connected to the output thereof, the input and output of the inverting amplifier 86 are connected through the switch 85, and the signal assigning the desired flux-producing quadrature component $i^*_{sy}$ of the stator current amplitude is supplied from the co-phasal input 78 of the torque forcing unit 76, via the switch 85, to the second input of the summer 82.

Since the signal $i^*_{sy}$ is positive at all times, the output of the summer 82 is the inverted sum of two input signals $+i^*_{sx}+K_F i^*_{sy}$, where $K_F$ is a constant forcing coefficient set on the second input of the summer 82.

Since the gain factor of the amplifier-limiter 83 is equal to one, the sum of the input signals of the summer 82 is supplied from the output of the amplifier-limiter 83, which constitutes the ortho-phasal output 80 of the torque forcing unit 76, to the ortho-phasal input 3 of the transvector inverter 2 with a certain forcing coefficient $K_F$ for the signal $i^*_{sy}$.

Double inversion of the sum of the signals $I^*_{xs}$ and $K_F i^*_{sy}$ at the output of the summer 82 and at the output of the amplifier-limiter 83 results in that, when a control signal is supplied from the output of the torque forcing assigning unit 88 to the control input 79 of the torque forcing unit 76, the ortho-phasal current amplitude $I_{ort}$ increases by a step from the initial positive amplitude $I_{ort/t=0}=+i^*_{sx}$ to the value given by the following formula:

$$I_{ort/t>0}=I^*_{ort/t>0}=i^*_{sx}+K_F i^*_{sy} \quad (168)$$

In this case the co-phasal current amplitude $I_{syn}$ drops from the initial value $I_{syn/t=0}=+i^*_{sy}$ to zero:

$$I_{syn/t>0}=0 \quad (169)$$

If at the moment $t=0$, when a control signal is applied to the control input 79 of the torque forcing unit 76, the signal assigning the torque-producing quadrature component $i^*_{sx}$ of the stator current amplitude, which is supplied to the orthophasal input 77 of the torque forcing unit 76 had negative polarity $(-i^*_{sx})$, the output voltage of the comparator 84 is equal to zero, and the switch 85 disconnects the input and output of the inverting amplifier 86. In consequence, the signal assigning the flux-producing quadrature component $+i^*_{sy}$ of the stator current amplitude, which is supplied from the cophasal input 78 of the torque forcing unit 76 via the switch 87 to the input of the inverting amplifier 86, is inverted at the output of the inverting amplifier 86 and is supplied to the second input of the summer 82 with the same negative polarity as the signal $-i^*_{sx}$.

In this case, the negative initial value of the orthophasal current amplitude $I_{ort/t=0}=-i^*_{sx}$ at the orthophasal input 3 of the transvector inverter 2 is changed by a step to a new negative value determined by the formula:

$$I_{ort/t>0}=I^*_{ort/t>0}=-(i^*_{sx}+K_F i^*_{sy}). \quad (170)$$

As the co-phasal current is disconnected, the stator current phase $\epsilon_s$ is shifted by a step to a phase angle $\Delta \epsilon_\phi$ which depends on the initial ratio of the ortho-phasal and co-phasal currents.

Prior to the supply of the control signal to the control input 79 of the torque forcing unit 76, the phase shift of stator current vector $\bar{i}_s$ relative to the vector $\psi_r$ of the rotor flux linkage amounted to the phase shift equal to:

$$\epsilon\phi_o = \arctg \frac{i^*_{sx}}{i^*_{sy}} = \arctg \frac{I_{ort/t=0}}{I_{syn/t=0}} \quad (171)$$

After the control signal is applied to the control input 79 of the torque forcing unit 76, the phase shift $\epsilon_\phi$ grows by a step to the value:

$$\epsilon\phi = \pm \frac{\pi}{2}. \quad (172)$$

In this case the step of the stator current phase $\Delta \epsilon_s$ is dictated by the difference between the angles of the phase shifts $$\Delta \epsilon_s = \frac{\pi}{2} - \epsilon\phi_o.$$

In the reference phase winding "A" of the stator, the instantaneous phase stator current $i_{sa}$ changed by a step from the initial value with $t=0$:

$$i_{sa/t=o}=i_{sy}.\cos \phi_{s/t=0}-i_{sx}.\sin \phi_{s/t=o} \quad (173)$$

to the value given by the expression:

$$i_{sa/t>0} = -i_{sx} \sin \phi_{s/t=0} \quad (174)$$

The direction of the phase shift step is dictated by the polarity of the signal $i^*_{sx}$ with $t>0$.

This condition is characterized by the absence of the projection of the stator current vector $\bar{i}_s$ on the "Y" axis whose direction coincides with that of the rotor flux linkage vector $\bar{\psi}_r$. It is also characterized by the stator current amplitude $i_s$ being equal to the magnitude of the projection of the stator current vector $\bar{i}_s$ on the orthogonal axis "X".

Since the sine of the phase shift angle is at its maximum and equal to $\pm 1$, the induction motor torque grows by a step, according to the equation (1), to its maximum value:

$$M_{max} = \pm \frac{3}{2} L_p \cdot \frac{L_m}{L_r} \cdot \psi_{r/t=0} \cdot i_s, \quad (175)$$

where the stator current amplitude $i_s$ is determined according to the formula:

$$i_s = i_{sx} + K_F i_{sy}, \quad (176)$$

When the induction motor 1 is controlled according to the equation (158), in the control zone II with $\epsilon_\phi = \pm(\pi/4)$ the induction motor torque, prior to the moment a control signal is applied to the control input 78 of the torque forcing unit 76, is equal to:

$$M_0 = \pm \frac{3}{2 \cdot \sqrt{2}} \cdot \frac{L_m}{L_r} \cdot \psi_{r/t=0} \cdot i_{s/t=0} \quad (177)$$

If, after a control signal is applied to the control input 78 of the torque forcing unit 76, the stator current amplitude $i_s$ remains unchanged, the comparison of the equations (175) and (177) testifies to the fact that the disconnection of the co-phasal current and the increase of the ortho-phasal current to the level of the initial stator current amplitude $i_{s/t=0}$ resulted in a step increase of the induction motor torque M by a factor of $\sqrt{2}$, that is more than 40% in relation to the induction motor torque $M_o$ prior to the beginning of the torque forcing and without any increase in the stator current amplitude.

In this case the forcing factor $K_F$ should, in order to keep the stator current amplitude $i_s$ constant, be equal to $$K_F = \sqrt{2} - 1 \quad (178)$$

When a maximum desired value of the torque $M^*_{max}$ is assigned at the input 66 of the adaptive torque controller 65 the stator current amplitude $i_s$ in the control zone II reaches the maximum permissible value $i_{s\,max}$. If a control signal is supplied from the output of the unit 88 for assigning the torque forcing to the control input 79 of the torque forcing unit 76 when the rotor flux linkage amplitude $\psi_r(t)$ reaches the steady-state optimal amplitude $\psi_{r\,opt}$, the maximum torque $M_{max}$ of the induction motor 1 makes a step increase to the ultimate value $M = \max M_{max}$ which is greater by a factor of $\sqrt{2}$ than that determined according to the formula (177).

With a five-fold permissible stator current amplitude $i_{s\,max} = 5 \cdot i_{sn}$, the maximum torque $M_{max}$ of the induction motor 1 reaches the values of $M_{max} = (6-7)M_n$; and, when the torque is forced by means of the torque forcing unit 76, the extreme torque value $\max M_{max}$ of the induction motor 1, with the same five-fold amplitude $i_{s\,max} = 5 \cdot i_{sn}$, reaches the value of $M = \max M_{max} = (8-10)M_n$.

If the permissible output current of the transvector inverter 2 exceeds the value $i_{s\,max} = 5 \cdot i_{sn}$, a ten-fold torque forcing in the induction motor 1 is effected practically instantly because the forcing coefficient $K_F$ is set at the second input of the summer 82 higher than the value determined according to the formula (178). In this case, limitation of the output signal of the amplifier-limiter 83 is set on the condition that the stator current maximum amplitude $i_{s\,max}$ is limited, for the period of torque forcing, and remains equal to the permissible output current of the transvector inverter 2.

According to the invention, this method of induction motor control realized in the electric drive of FIG. 14 in order to step up the speed of response of this electric drive is characterized in that a momentary torque forcing in the induction motor is achieved by a step change of the stator current phase to a phase shift angle $\pm\pi/2$ relative to the synchronization phase, which amounts to a quarter of the period of the stator current synchronous frequency at the initial moment of the torque forcing process in the induction motor, and, to this end, co-phasal current is disconnected and, simultaneously, ortho-phasal current is stepped up to a quantity proportional to the magnitude of the disconnected co-phasal current.

In combination with the earlier described three control zones for control of the induction motor torque and rotor speed, realized in the electric drives of FIG. 11 and FIG. 14 by means of the adaptive torque controller 65, this control method involving the process of forcing the induction motor torque in the electric drive of FIG. 14, implemented by means of the torque forcing unit 76, characterizes a fourth control zone related to phase-current control of the induction motor torque and rotor speed.

This adaptive four-zone phase-current control realizes in the electric drive of FIG. 14 provides that the phase shift $\epsilon_\phi$ of the stator current vector $\bar{i}_s$ relative to the rotor flux linkage vector $\bar{\psi}_r$ is controlled, depending on the control zone, according to the following laws:

$$\left.\begin{array}{ll} \text{zone I} & |\epsilon_\phi| < \frac{\pi}{4}, \text{ if } |M^*| \leq M^*_g \\ \text{zone II} & |\epsilon_\phi| = \frac{\pi}{4}, \text{ if } |M^*| > M^*_g \\ & |\omega| \leq \omega_g \\ \text{zone III} & |\epsilon_\phi| > \frac{\pi}{4}, \text{ if } |\omega| > \omega_g \\ \text{zone IV} & |\epsilon_\phi| = \frac{\pi}{4}, \text{ if } I_{syn} = 0 \end{array}\right\} \quad (179)$$

The laws (179) used to control the stator current phase provide for complete exploitation of the active parts of the induction motor 1 in dynamic and steady-state conditions with limitations imposed on the temperature level, stator current magnitude, and stator voltage magnitude.

Control of the induction motor 1 in the zone IV with $\epsilon_\phi = \pm \pi/2$ cannot last long because, when co-phasal current is disconnected and the flux-producing component $i_{sy}$ of the stator current amplitude is equal to zero $i_{sy}=0$, the amplitude $\psi_r$ of the rotor flux linkage drops to zero according to the aperiodic law with a time constant equal to the electromagnetic time constant $T_r$ of the rotor circuit in conformity with the equation:

$$\frac{L_r}{R_r} \cdot \frac{d\psi_r}{dt} + \psi_r = 0. \tag{180}$$

The ultimate value of the induction motor torque during forcing also declines according to the aperiodic law. In this connection, effective forcing of the induction motor torque by means of the torque forcing unit 76 is only advisable for a period shorter than the electromagnetic time constant $T_r$ of the rotor circuit, which may vary from ten milliseconds to several tens of milliseconds. When this forcing time expires, the output signal of the torque forcing assigning unit 88 is again disconnected and the induction motor control is transferred to one of the first three control zones in accordance with the control laws described in the system of equations (179).

Optimization of dynamic and steady-state operational conditions of an induction motor requires, as follows from the above circuits of the electric drives of FIG. 11 and FIG. 14, additional costs and can only be achieved through a complicated process of adjustment of the adaptive torque controller and torque forcing unit.

Figure 15:
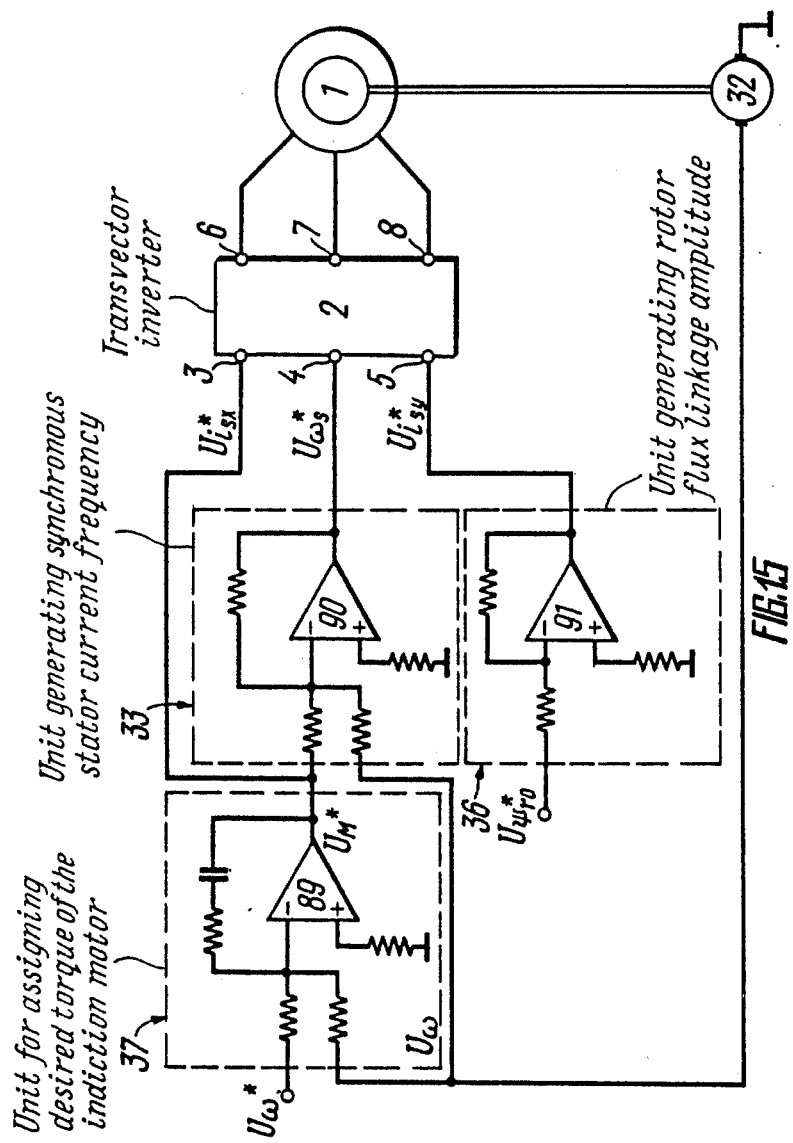
FIG. 15 shows a functional block diagram of a primitive variable speed induction motor drive during phase-current control.

When the objective is to simplify the control of an induction motor, to minimize the hardware cost and the size of the control device, and additionally simplify the process of adjustment of controllers and other units, it is advisable that the electric drive shown in FIG. 15 should be used.

This electric drive comprises an induction motor 1 (FIG. 15) and a transvector inverter 2 featuring control inputs 3, 4, 5 and power outputs 6, 7, 8 connected to stator windings of the induction motor 1.

The shaft of the induction motor 1 is connected to a speed transducer 32 which is a tachometer generator. The ortho-phasal input 3 of the transvector inverter 2 is connected to an output of an operational amplifier 89 of a unit 37 for assigning the desired torque of the induction motor 1, while the frequency input 4 of the transvector inverter 2 is connected to a first input of a second operational amplifier 90 of a unit 33 generating the synchronous frequency of stator current.

The co-phasal input 5 of the transvector inverter 2 is connected to an output of a third operational amplifier 91 of a unit 36 generating rotor flux linkage amplitude, whose input is connected to a dc voltage source (not shown in FIG. 15).

The first input of the operational amplifier 89 is connected to an output of a rotor speed setting unit 38 (not shown in FIG. 15).

Joint second inputs of the first and second operational amplifiers 89 and 90 are connected to the output of the speed transducer 32 (tachometer generator).

The transvector inverter can be made as described above for electric drives of FIGS. 4, 7, 10, 11, and 14.

The speed transducer 32 (tachogenerator) can employ a standard dc tachometer generator, as described above for the electric drives of FIGS. 7 and 8.

Operational amplifiers 89, 90, and 91 can employ conventional integrated operational amplifiers (cf., for example, B. K. Kostenko, Integrated Operational Amplifiers, Handbook, Moscow, Energia Publ., 1982, in Russian, p. 107).

The electric drive of FIG. 15 operates as follows.

In the initial state, the rotor of the induction motor 1 is motionless. Constant currents flow in the stator windings of the induction motor 1, which are connected to the outputs of the transvector inverter 2, and set up a rotor flux linkage with a constant amplitude $\psi_{ro}$ which is close to the nominal amplitude $\psi_{rn}$ of the rotor flux linkage of the induction motor 1.

Voltages assigning ortho-phasal current, stator current synchronous frequency, and co-phasal current are produced, respectively, at the control inputs 3, 4, and 5 of the transvector inverter 2.

Initially, the voltage $U^*_{isx}$ assigning the ortho-phasal current at the ortho-phasal input 3 of the transvector inverter 2 is equal to zero. The voltage $U^*_{\omega s}$ assigning the synchronous stator current frequency at the frequency input 4 of the transvector inverter 2 is also equal to zero. The voltage $U^*_{isy}$ assigning the co-phasal current at the co-phasal input 5 of the transvector inverter 2 is equal to a constant quantity which corresponds to the desired constant amplitude $\psi^*_{ro}$ the rotor flux linkage and is given by the formula:

$$U^*_{isyo} = \frac{i_{syo}}{K_i} = \frac{\psi^*_{ro}}{K_i \cdot L_{mo}}, \tag{181}$$

where $K_i$ is a current transfer ratio of the transvector inverter 2;

$i_{syo}$ is a constant flux-producing component of the stator current amplitude, equal to $I_{syn}$;

$\psi^*_{ro}$ is a constant desired amplitude of the rotor flux linkage;

$L_{mo}$ is mutual inductance corresponding to the constant amplitude $\psi_{ro}=\psi^*_{ro}$ of the rotor flux linkage.

The initial stator current phase $\epsilon_{so}=\phi_{so}$ is equal to the initial phase $\phi_{so}$ of the rotor flux linkage because the instantaneous phase currents at the outputs 6, 7, and 8 of the transvector inverter 2 are constant, while the magnitude of the constant phase current $i_{sao}$ in the reference phase winding "A" of the induction motor stator is determined according to the formula:

$$i_{sao} = i_{syo} \cdot \cos\phi_{so} = \frac{\psi^*_{ro}}{L_{mo}} \cdot \cos\phi_{so} \tag{182}$$

where $\phi_{so}$ is an arbitrary initial synchronization phase of the transvector inverter 2.

In this initial condition, the stator current vector $\bar{i}_s$ coincides in direction with the vector $\bar{\psi}_{ro}$ of the rotor flux linkage, there is no phase shift $\epsilon_\phi$ between these vectors, the torque M of the induction motor 1 is, according to the equation (1), equal to zero.

If no disturbance is introduced by the load of the induction motor 1, the rotor speed $\omega$ is equal to zero, the voltage $U_\omega$ at the output of the speed transducer 32 (tachometer generator) is equal to zero because the voltage $U_\omega$ is determined according to the formula:

$$u_\omega = K_\omega \cdot \omega = \frac{30 \cdot Z_p \cdot K_n}{\pi} \cdot \omega, \tag{183}$$

where $K_\omega$ is the speed transfer ratio of the feedback;

$K_n$ is the slope of the characteristic curve of the speed transducer 32 (tachometer generator) in volts per revolution per minute (V/rpm);

$\omega$ is the rotor speed in electrical radians per sec.

Initially, voltages at the inputs and output of the first two operational amplifiers 89 and 90 are equal to zero. A constant voltage $U^*_{\omega ro}$ assigning the desired amplitude $\psi^*_{ro}$ of the rotor flux linkage is applied to the input of the third operational amplifier 91. The output of the third operational amplifier 91 is a constant voltage equal to the voltage $U^*_{isy}$ assigning the desired flux-producing quadrature component $i^*_{syo}$ of the stator current amplitude.

When the voltage $U^*_\omega$ assigning the desired rotor speed $\omega^*$ is applied to the first input of the first operational amplifier 89, the output voltage $U^*_M$ of this operational amplifier 89 changes in a step because, according to the proportional-plus-integral controller arrangement, the feedback circuit of the first operational amplifier 89 comprises a resistor and a capacitor connected in series, as shown in FIG. 15.

The output voltage $U^*_M$ of the first operational amplifier 89 which forms the proportional-plus-integral speed controller is equal to the voltage assigning the desired torque $M^*$ of the induction motor 1 and is given by the following formula:

$$U_{M^*} = \frac{M^*}{K_M}, \tag{184}$$

where $K_M$ is a constant torque transfer ratio of the electric drive.

The step in voltage $U^*_M$ results in a step increase of the ortho-phasal amplitude $I_{ort}$ because the voltage $U^*_M$ is supplied to the ortho-phasal input 3 of the transvector inverter 2 and, therefore, is equal to the voltage assigning the ortho-phasal current $I_{ort}$:

$$U^*_{i\,sx} = \frac{I_{ort}}{K_i} = U_M^* \tag{185}$$

The jump in the ortho-phasal current makes the transvector inverter 2 produce the phase shift of the stator current vector $\bar{i}_s$ relative to the original position of the rotor flux linkage vector $\bar{\psi}_{ro}$:

$$\epsilon_\phi = \text{arctg}\, \frac{U^*_{i\,sx}}{U^*_{i\,syo}} = \text{arctg}\, \frac{2L_r}{3Z_p\psi^{*2}_{ro}} M^* \tag{186}$$

This results in a step increase of the torque M of the induction motor 1. In this case, $M = M^* = = U_M K_M$.

Further on, three simultaneous processes occur: the rapid increase of the voltage $U^*_M$ assigning the desired torque $M^*$ of the induction motor 1 due to the operation of the integrating portion of the proportional-plus-integral speed controller; modification of the synchronization phase $\phi^*_s$ of the transvector inverter 2 due to the sweep of the synchronization frequency $\omega^*_s$ increasing with the growth of the voltage $U^*_M$ assigning the desired torque of the induction motor 1; and the process of increase in the rotor speed and the output voltage $U^*_M$ of the speed transducer 32 (tachometer generator) due to generation and modification of the torque M of the induction motor 1.

The first process results in the voltage $U^*_M$ rapidly reaching the maximum value $U^*_{M\,max}$ equal to the maximum output voltage of the first operational amplifier 89, which corresponds to the assignment of the maximum desired torque $M^*_{max}$ of the induction motor 1.

The second process characterizes the change in the angular position of the rotor flux linkage vector $\bar{\psi}_r$ in the induction motor, which proceeds as follows.

The actual voltage $U^*_M$ assigning the desired torque $M^*$ of the induction motor 1 is supplied from the output of the first operational amplifier 89 to the first input of the second operational amplifier 90.

The resistance in the feedback circuit of the second operational amplifier 90 exceeds the resistance coupled to the first input of the second operational amplifier 90 by a factor by which the signal assigning the desired torque $M^*$ of the induction motor 1 has to be reduced in order to obtain the signal $U^*_{\Delta\omega}$ assigning the desired slip $\Delta\omega^*$ of the rotor flux linkage relative to the rotor, according to equation (29):

$$U_{\Delta\omega}^* = \frac{\Delta\omega^*}{K_{\omega s}} = \frac{2R_r \cdot K_M^*}{3L_p \cdot \psi_{ro}^{*2} K_{\omega s}} \cdot U_M^*, \tag{187}$$

where $K_{\omega S}$ is a frequency transfer ratio of the transvector inverter 2 (control channel on the frequency input 4 of the transvector inverter 2).

With zero rotor speed, the output voltage $U^*_{\omega S}$ of the second operational amplifier 90 is completely dictated by the voltage $U^*_M$ assigning the desired torque of the induction motor 1.

This voltage proportional to the desired slip $\Delta\omega^*$ of the rotor flux linkage relative to the rotor is supplied to the frequency input 4 of the transvector inverter 2.

In the transvector inverter 2, the signal $\Delta\omega^*$ assigning the slip $\Delta\omega$ of the rotor flux linkage relative to the rotor by sweeping is converted into the desired phase $\phi^*_r$ of the rotor flux linkage relative to the rotor:

$$\phi_r^* = K_{\omega s} \cdot \int_0^\infty U_{\Delta\omega}^* \, dt. \tag{188}$$

When the rotor speed $\omega$ is zero, the phase $\phi^*_r$ is the synchronization phase $\phi^*_s$ of the transvector inverter 2:

$$\phi^*_s = \phi^*_r + \phi_{so} \tag{189}$$

The cophasal current $i_{syn} = I^*_{syn} \cdot \cos \phi^*_s$ and orthophasal current $i_{ort} = I^*_{ort} \cdot \sin \phi^*_s$ are formed relative to this synchronization phase $\phi^*_s$.

The first two processes result in that the instantaneous phase current in the reference stator phase winding "A" is produced according to the law:

$$i_{sa} = \frac{\psi_{ro}^*}{L_{mo}} \cdot \cos \int_0^\infty \frac{2R_r}{3Z_p\psi_{ro}^{*2}} \cdot M \, dt - \tag{190}$$

$$\frac{2L}{3Z_pL_m\psi_{ro}^*} \cdot M^* \cdot \sin \int_0^\infty \frac{2R_r}{3Z_p \cdot \psi_{ro}^{*2}} \cdot M^* dt.$$

The third process is characterized by changes of the rotor speed $\omega$ and output voltage $U_\omega$ of the speed transducer 32 which is a tachometer generator.

The output voltage $U_\omega$ of the speed transducer 32 (tachometer generator) is supplied simultaneously to the second inputs and the first and second operational amplifiers 89 and 90.

The voltage $U_\omega$ proportional to the measured rotor speed is applied to the second input of the first operational amplifier 89 and, as the rotor speed $\omega$ grows, reduces the desired torque $M^*$ of the induction motor 1, since its polarity is the opposite of the volage $U_{\omega^*}$ assigning the desired rotor speed $\omega^*$, which amounts to the negative speed feedback.

The output voltage $U_\omega$ of the speed transducer 32 (tachometer generator) being applied to the second input of the second operational amplifier 90 increases the output voltage $U_\omega{}^*_s$ of the second operational amplifier 90 because in the driving condition of the induction motor 1 polarities of the output voltage $U_M{}^*$ of the first operational amplifier 89 and the output voltage $U_\omega$ of the speed transducer 32 (tachometer generator) are identical, which is the positive speed feedback.

The result of the simultaneous action of the negative and positive rotor speed feedbacks is astatic control of the rotor speed, wherein in the steady-state condition the desired and actual rotor speed are equal: $\omega=\omega^*$.

In this case, the output of the operational amplifier 90 is the voltage $U_\omega{}^*_s$ assigning the desired synchronization frequency $\omega^*_s$ of the rotor flux linkage as a sum of two voltages:

$$U_\omega{}^*_s = U_\omega + U_{\Delta\omega}{}^* \qquad (191)$$

This voltage is supplied to the frequency input 4 of the transvector inverter 2 and is the voltage assigning the desired synchronization frequency $\omega^*_s$ of the transvector inverter 2.

The synchronization frequency $\omega^*_s$ of the transvector inverter 2 characterizes the synchronous frequency $\omega_s$ of the stator current, which is equal to the rotor flux linkage frequency:

$$\omega_s = \omega^*_s = (U_\omega + U_{\Delta\omega}{}^*)\cdot K_{\omega s}. \qquad (192)$$

As a result of the combined effect of the above control processes, the instantaneous phase current $i_{sa}(t)$ in the reference stator phase winding "A" of the induction motor 1 changes according to the earlier described equation (157) subject to the condition that the constant desired amplitude $\omega^*_{ro}$ of the rotor flux linkage is assigned close to the nominal amplitude $\psi_{rn}$ of the rotor flux linkage throughout the control range of the desired torque $M^*$ of the induction motor 1 from zero to $\pm M^*_{max}$ and throughout the control range of the rotor speed $\omega$ from zero to $\pm\omega_{max}$.

In this case, permissible values of the stator current and voltage amplitudes in the electric drive of FIG. 15 exceed respective actual values of the stator current and voltage amplitudes throughout the control range of the torque M of the induction motor 1 and rotor speed $\omega$, that is control is kept within the permissible range.

The above method of phase-current control in the Cartesian coordinates is realized in the electric drive of FIG. 15 by means of the transvector inverter 2. In order to provide invariant control of the induction motor torque and astatic speed control, the stator current phase in the electric drive of FIG. 15 is controlled according to the equations (181)–(192) as a function of two inputs control actions assigning the desired value of the torque $M^*$ of the induction motor 1 and the amplitude $\psi^*_{ro}$ of the motor flux linkage and, also, as a function of the measured rotor speed $\omega$ in accordance with the law:

$$\epsilon_s = \phi_{so} + \int_0^\infty \left(\omega + \frac{2R_r}{3Z_p\cdot\psi_{ro}{}^{*2}}\cdot M^*\right)dt + \arctan\frac{2L_r}{3Z_p\cdot\psi_{ro}{}^{*2}}\cdot M^*. \qquad (193)$$

The control device and adjustment in the electric drive of FIG. 15 are made simple through the use of only three operational amplifiers 89, 90, and 91 coupled to the input of the transvector inverter 2. Adjustment of the torque electric drive of FIG. 15 is reduced to selection of only two input resistors at the two inputs of the second operational amplifier 90, the output voltage of the third operational amplifier 91 being set.

Despite its simplicity, the electric drive of FIG. 15 provides a high speed of response of the speed control circuit: when a harmonic signal $U_\omega{}^*$ assigning the desired rotor speed according to the law $U_\omega{}^* = 0.01\cdot U_\omega{}^*_{max}$, sin $2\pi f_\omega$ is applied to the first input of the first operational amplifier 89. In this expression, $U_{\omega max} = 10$ V is the maximum voltage assigning the desired rotor speed $\omega^*$, $f_\omega$ is the frequency of the harmonic signal $U_\omega{}^*$ assigning the desired rotor speed, the shaft of the induction motor 1 follows the change of the rotor speed $\omega$, which is asigned at the input, according to the harmonic law until the harmonic signal frequency $f_\omega = 400$ Hz is reached, when the amplitude of the actual rotor speed is reproduced at a level of 70% of the amplitude of the assigned rotor speed $\omega^*$. The phase shift 90° between the harmonic voltages $U_\omega{}^*$ and $U_\omega$, which are the assigned and actual rotor speeds, is attained when the frequency $f_\omega$ of the harmonic speed change reaches 250 Hz.

In steady-state conditions, the rotor speed control range with the required minor speed deviations amounts to about 1:10,000, which is the ratio of the minimal rotor speed with $U_\omega{}^*_{min}$ to its maximum value with $U_\omega{}^*_{max}$.

Any further expansion of the rotor speed control range and improvement of the rigor of mechanical characteristics of the induction motor 1 is restricted by the phase shift $\phi_r(t)$ of the rotor flux linkage with respect to the rotor axis, which is related to the phase shift $\epsilon_\phi$ of the stator current with respect to the rotor flux linkage, in the electric drive of FIG. 15, as well as in the electric drives of FIGS. 4, 5, t 6, 7, 8, 9, 10, 11, and 14, is produced by sweeping the sum of two voltages, one voltage being proportional to the rate of change of the phase shift $\phi_r(t)$ of the rotor flux linkage relative to the rotor axis, while the other voltage is proportional to the rotor speed $\Delta\omega$ equal to the rate of change of the phase shift $\lambda$ of the rotor axis relative to the stator axis (FIG. 1).

But summation of these voltages results in arrors due to both inaccuracy of the ratio of the summands, which is set at the input of the summer (second operational amplifier 90 in FIG. 15) by resistors, and inaccuracy of measurement of the rotor speed by the speed transducer 32.

Substituting the value of the torque M of the induction motor 1 according to the equation (1) to the expression (29) for the slip $\Delta\omega$ of the rotor flux linkage relative to the rotor, an analytical form of the connection between the phase shift $\phi_r$ of the rotor flux linkage relative to the rotor axis and the phase shift $\epsilon_\phi$ of the stator current relative to the rotor flux linkage can be obtained with the steady-state value of the rotor flux amplitude $\psi_r$:

$$\frac{d\phi_r}{dt} = \Delta\omega = \frac{R_r}{L_r} \cdot L_m \cdot \frac{i_{sx}}{\psi_r} = \frac{R_r}{L_\psi} \cdot \frac{I_{sx}}{i_{sy}} \quad (194)$$

It follows from the equation (194) that the rate of change of the phase shift $\phi_r$ of the rotor flux linkage relative to the rotor axis, which is equal to the slip $\Delta\omega$ of the rotor flux linkage relative to the rotor, with the steady state amplitude $\psi_r$ of the rotor flux linkage, is proportional to the tangent of the angle of the phase shift $\epsilon_{100}$ of the stator current relative to the rotor flux linkage:

$$\frac{d\phi_r}{dt} = \frac{R_r}{L_r} \cdot tg^\epsilon \phi. \quad (195)$$

The error in assignment of the rotor flux linkage slip relative to the rotor, which is due to the analog summation of two voltages $U_\omega + U_{\Delta\omega}$, leads, according to the equation (195), to an error in assignment of the angle of the phase shift $\epsilon_\phi$ of the stator current relative to the rotor flux linkage and to a certain error of control of the torque M of the induction motor 1.

Figure 16:
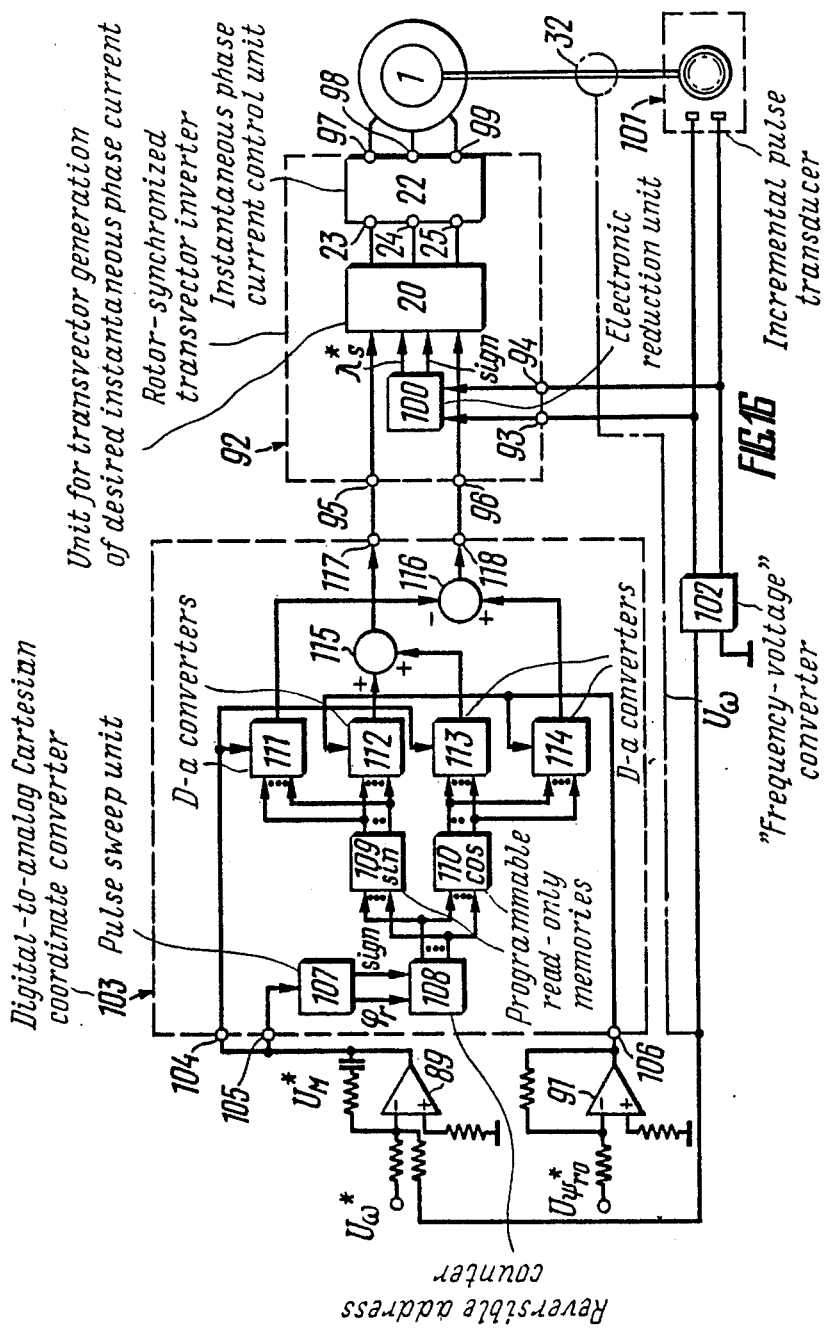
FIG. 16 shows a functional block diagram of a variable-speed inductor motor drive featuring one incremental (pulse) transducer installed on the shaft of the induction motor for phase-vector control in the Cartesian coordinates.

The accuracy of control of the stator current phase and rotor speed can be improved in an electric drive of FIG. 16 through improving the accuracy of control of the phase shift $\phi_r$ of the rotor flux linkage relative to the rotor.

This electric drive comprises an induction motor 1 (FIG. 16) and a transvector inverter 92 synchronized by the rotor. The rotor-synchronized transvector inverter 92 comprises two pulse inputs 93 and 94, an ortho-phasal input 95, nd a cophasal input 96.

The rotor-synchronized transvector inverter 92 also comprises an instantaneous phase current control unit 22 whose outputs constitute outputs 97, 98, and 99 of the transvector inverter 92 synchronized by the rotor, which are connected to the stator windings of the induction motor 1.

Three control inputs 23, 24, and 25 of the instantaneous phase current control unit 22 are connected to outputs of a unit 20 for transvector generation of desired instantaneous phase currents, whose ortho-phasal input constitutes the ortho-phasal input 95 of the rotor-synchronized transvector inverter 92, while the co-phasal input thereof is the co-phasal input 96 of the rotor-synchronized transvector inverter 92.

Pulse inputs of the unit 20 for transvector generation of desired instantaneous phase currents are connected to pulse outputs of an electronic reduction unit 100. Two pulse inputs of the electronic reduction unit 100 constitute the pulse inputs 93 and 94 of the rotor-synchronized transvector inverter 92.

The rotor of the induction motor 1 is connected with an incremental (pulse) transducer 101 whose two pulse outputs are connected to the pulse inputs 93 and 94 of the rotor-synchronized transvector inverter 92.

Pulse outputs of the incremental (pulse) transducer 101 are also connected to two pulse inputs of a "frequency-voltage" converter 102 whose output is connected to one of the two inputs of the operational amplifier 89 whose second input is connected to an output of a rotor speed setting unit (not shown in FIG. 16). The first operational amplifier 89 forms a proportional-plus-integral speed controller.

The input of the second operational amplifier 91 is connected to an output of a rotor amplitude setting unit (not shown in FIG. 16). The second operational amplifier 91 forms an inverting amplifier.

A digital-to-analog Cartesian coordinates converter 103 is connected between the outputs of the first and second operational amplifiers 89 and 91 and between the ortho-phasal and co-phasal inputs 95 and 96 of the rotor-synchronized transvector inverter 92.

The D/A Cartesian coordinates converter 103 comprises three inputs: an ortho-phasal input 104, a frequency input 105, and a co-phasal input 106. The ortho-phasal and frequency inputs 104 and 105 of the D/A Cartesian coordinales converter 103 are connected to the output of the first operational amplifier 89 which is a proportional-plus-integral speed controller.

The co-phasal input 106 of the D/A Cartesian coordinates converter 103 is connected to the output of the second operational amplifier 91.

The D/A Cartesian coordinates converter 103 also comprises a pulse sweep unit 107 whose input is the frequency input 105 of the digital-to-analog Cartesian coordinate converter 103, while two outputs thereof are connected to two inputs of a reversible address counter 108. Digital outputs of the reversible address counter 108 are connected to digital inputs of two programmable read-only memories 109 and 110. The first programmable read-only memory 109 is programmed as a sine function storage, while the second programmable read-only memory 110 is programmed as a cosine function storage.

Digital outputs of the first programmable read-only memoy 109 are connected to digital inputs of first and second digital-to-analog converters 111 and 112. Digital outputs of the second programmable read-only memory 110 are connected to digital inputs of third and fourth digital-to-analog converters 113 and 114.

Joint analog inputs of the first and third digital-to-analog converter 111 and 113 constitute the ortho-phasal input 104 of the D/A Cartesian coordinate converter 103.

Joint analog inputs of the second and fourth digital-to-analog converters 112 and 114 constitute the co-phasal input 106 of the D/A Cartesian coordinale converter 103.

Outputs of the second and third digital-to-analog converters 112 and 113 are connected to inputs of a first adder 115, while outputs of the first and fourth digital-to-analog converters 111 and 114 are connected to inputs of a second adder 116.

The output of the first adder 115 is an orthophasal output 117 of the digital-to-analog Cartesiian coordinate converter 103.

he output of the second adder 116 is a co-phasal output 118 of the D/A Cartesian coordinate converter 103.

The instantaneous phase current control unit 22 and the unit 20 for transvector generation of the desired instantaneous phase currents may be designed as described above for the electric drive of FIG. 4.

The electronic reduction unit 100 may employ conventional reversible counters (cf., for example, Analog and Digital Integrated Microcircuits, Handbook, Ed. by S. V. Yakubovsky, Moscow, Radio i Svyaz Publ., in Russian, 1985, p. 81).

The incremental (pulse) transducer 101 can employ a conventional incremental photoelectric displacement transducer (cf., for example, Catalog 67-040E-Q, Karl Zeiss Yena, Incremental Rotational Transducer, pp. 2-6).

The "frequency-voltage" converter 102 can also employ a conventional circuit (cf., for example, V. A. Yakubovsky Analog and Digital Integrated Microcircuits, Handbook, Moscow, Radio i Svyaz Publ., 1985, in Russian, pp. 368-369).

The operational amplifiers 89 and 91 can be designed as described above for the electric drive of FIG. 15, employing conventional operational amplifiers.

The adder 115 is a standard operational amplifier using a summing amplifier circuit (cf., for example, B. K. Nesterenko, Integrated Operational Amplifiers, Manual, Moscow, Energia Publ., 1982, in Russian, p. 107).

The adder 116 is a standard operational amplifier using difference amplifier circuit (cf., for example, B. K. Nesterenko, Integrated Operational Amplifiers, Handbook, Moscow, Energia Publ., 1982, in Russian, p. 107).

The pulse sweep unit 107 can be made like the sweep unit 21 described above for the electric drive of FIG. 4.

The reversible address counter 108 can employ conventional reversible counters (cf., for example, Analog and Digital Integrated Microcircuits, Handbook, Ed. by S. V. Yakubovsky, Moscow, Radio i Svyaz., Publ., 1985, in Russian, pp. 80 and 90).

The programmable read-only memories 109 and 110 can employ conventional integrated microcircuits of programmable read-only memories (cf., for example, ibid., pp. 263, 268, 269).

The digital-to-analog converters 111, 112, 113, and 114 can employ conventional integrated microcircuits of digital-to-analog converters (cf., for example, V. L. Shilo, Analog Integrated Circuits in Radioelectronic Devices, Moscow, Radio i Svyaz Publ., 1979, in Russian, pp. 344-345).

The electric drive shown in FIG. 16 operates as follows.

Symmetrical instantaneous phase currents $i_{sa}$, $i_{sb}$, and $i_{sc}$ are produced in the stator windings of the induction motor 1 by means of the rotor-synchronized transvector inverter 92. These currents are controlled in the Cartesian system of coordinates d and q (FIG. 1), which is oriented by the rotor position vector $\bar{R}$.

Control of the rotor-synchronized transvector inverter 92 (FIG. 16) is synchronized by pulses supplied to two pulse inputs 93 and 94 of the transvector inverter 92. Each pair of pulses applied to the inputs 93 and 94 shifts the synchronization phase $\lambda^*_s$ to one increment $\pm\Delta\lambda^*_s$.

The signal $U^*_{isq}$ assigning the desired projection $i^*_{sq}$ of the stator current vector $\bar{i}_s$ onto the transverse axis "q" (FIG. 1) orthogonal to the logitudinal axis "d" which coincides with the axis of the rotor position vector $\bar{R}$ is supplied to the ortho-phasal input 95 (FIG. 16) of the transvector inverter 92.

This signal $U^*_{isq}$ controls the amplitude $I_{ort}$ of the ortho-phasal current $i_{ort}$:

$$i_{ort} = I_{ort} \cdot \sin\lambda_s^* = i_{sg}^* \cdot \sin\lambda_s^* = \qquad (196)$$
$$= K_i \cdot u_{isg}^* \cdot \sin\lambda_s^*,$$

where
$\lambda^*_s$ is the synchronization phase;

$i^*_{sq}$ is the desired projection of the stator current vector on the transverse axis "q" orthogonal to the rotor position vector $\bar{R}$.

$K_i$ is the current transfer ratio.

The signal $U^*_{isq}$ assigning the desired projection $i^*_{sd}$ of the stator current vector $\bar{i}_s$ on the longitudinal axis "d" (FIG. 1) coinciding in direction with the rotor position vector $\bar{R}$ is supplied to the co-phasal input 96 of the rotor-synchronized transvector inverter 92.

The signal $U^*_{isd}$ produces co-phasal current $i_{syn}$;

$$i_{syn} = I_{syn} \cdot \cos\lambda^*_s = i^*_{sd} \cdot \cos\lambda^*_s = K_i \cdot U^*_{isd} \cdot \cos\lambda^*_s \qquad (197)$$

When signals $U^*_{isq}$ and $U^*_{isd}$ are applied simultaneously to the inputs 95 and 96 (FIG. 16), instantaneous phase currents are produced at the outputs 97, 98, and 99 of the rotor synchronized transvector inverter 92, the amplitude of these output currents being proportional to the square sum of the input signals:

$$i_s = K_i \cdot \sqrt{U_{isy}^{*2} + U_{isd}^{*2}} \qquad (198)$$

and the instantaneous phase current $i_{sa}$ in the reference phase winding "A" of the induction motor stator is the function of the difference between the co-phasal and ortho-phasal currents according to the equation:

$$i_{sa} = i_{syn} - i^*_{sd} \cdot \cos\lambda^*_s - i^*_{sg} \cdot \sin\lambda^*_s \qquad (199)$$

According to the invention, the synchronization phase $\lambda^*_s$ of the rotor-synchronized transvector inverter 92 in the electric drive of FIG. 16 is prescribed by discrete pulses supplied from the output of the incremental (pulse) transducer 101 driven by the angular displacement of the rotor of the induction motor 1.

The incremental (pulse) transducer 101 produces, in response to the angular displacement of the rotor of the induction motor 1, two pulse sequences shifted in phase by 90 electrical degrees.

Each pair of pulses supplied from two outputs of the incremental (pulse) transducer 101 to the pulse inputs 93 and 94 of the transvector inverter 92 synchronized by the rotor characterizes one discrete element $\Delta\lambda_s$ of the mechanical angular displacement of the rotor of the induction motor 1, this increment being expressed in mechanical radians according to the equation:

$$\Delta\lambda_{sm} = \frac{2\pi}{N_z}, \qquad (200)$$

where $N_z$ is the number of pulses per one revolution of the incrmental (pulse) transducer 101 at one of the outputs thereof.

Thus, for example, the number $N_z$ of pulses per-one revolution can be $N_z = 1024$.

The unit 20 for transvector generation of the desired instantaneous phase currents discretely changes the stator current phase $\epsilon_s$. The number $N_\epsilon$ of increments $\epsilon_s$ for one stator current period depends on the length of codes generated in the unit 20 for transvector generation of the instantaneous phase currents, when a pulse train is applied to the pulse input thereof.

Thus, for example, when an eight-digit code is used, the number $N_\epsilon$ of increments $\Delta\epsilon_s$ of the stator current phase $\epsilon_s$ reaches $2^8 = 256$.

The value of an increment $\Delta\epsilon_s$ of the stator current phase in electrical radians is given by the formula:

$$\Delta \epsilon_s = \frac{2\pi}{N_\epsilon}. \qquad (201)$$

In order to synchronize changes in the stator current phase $\epsilon_s$ and the rotor angular displacement $\lambda_s$(t), the value of the increment $\Delta\lambda_{sm}$ of the rotor mechanical angular displacement should be transformed into the value of the discrete element $\Delta\lambda^*_s$ of the synchronization phase $\lambda^*_s$, which is expressed in electrical radians according to the following formula:

$$\Delta\lambda^*_s = Z_p \cdot \Delta\lambda_{sm} \qquad (202)$$

where $Z_p$ is the number of pole pairs of the induction motor 1.

This transformation of the discrete element $\Delta\lambda_{sm}$ of the mechanical rotor turning angle into the increment $\lambda^*_s$ of the synchronization phase in conformity with the equation (202) is performed by the electronic reduction unit 100 whose input receives pulses from the output of the incremental (pulse) transducer 101.

The direction sign $\lambda^*_s$ of change of the synchronization phase $\lambda^*_s$ depends on which of the two pulse trains delivered from the output of the incremental (pulse) transducer 101 lags by 90° behind the other pulse train.

With no torque M developed by the induction motor 1 and with no load applied to the shaft of the induction motor 1, this induction motor 1 is running idle in the ideal free running condition wherein the stator current frequency $\omega_{is}$ is equal to the stator current synchronous frequency $\omega_s$, while the rotor rotates with an angular speed $\omega = Z_p\omega_m$ equal to the angular speed of rotation of the stator current vector $\bar{i}_s$.

In this case, each synchronization increment $\Delta\lambda^*_s$ produced by the arrival of the next pulse from the output of the electronic reduction unit 100 to the pulse input of the unit 20 for transvector generation of the desired instantaneous phase currents shifts the stator current phase to one increment $\Delta\epsilon_s = \Delta\lambda^*_s$. Control, therefore, can be synchronized according to the equations (200)–(202) by satisfying the condition:

$$\Delta \lambda_s^* = \frac{2\pi}{N_\epsilon} = \frac{2\pi \cdot Z_p}{N_z} \qquad (203)$$

It follows from the equation (203) that the number $N_\epsilon$ of increments $\Delta\epsilon_s$ for one stator current period and the number of increments $\Delta\lambda_m$ of the incremental (pulse) transducer 101 for one revolution in the electric drive of FIG. 16 should comply with the equation:

$$N_z = K_z Z_p N_\epsilon, \qquad (204)$$

where $K_z = 1, 2, 3, \ldots$ is the natural series;

$Z_p$ is the number of pole pairs of the induction motor 1;

$N_\epsilon$ is the number of discrete elements of the stator current phase for a stator current period.

The product of coefficient $K_z$ by the number of pole pairs of the induction motor 1 is the transfer ratio $i_z$ of the electronic reduction unit 100

$$i_z = K_z Z_p. \qquad (205)$$

The coefficient $K_z$ should be maximum for given conditions, for example, $K_z = 4$ for a given size of the incremental (pulse) transducer 101 because the higher the coefficient $K_z$ the more accurate the conversion of the frequency $f_z$ of pulses at the output of the incremental (pulse) transducer 101 into the analog voltage $U_\omega$ proporrional to the rotor speed $\omega$ by means of the "frequency-voltage" converter 102.

The voltage $U_\omega$ proportional to the rotor speed $\omega$, which is produced by conversion of two pulse trains supplied from the output of the incremental (pulse) transducer 101 to the inputs of the "frequency-voltage" converter 102, is delivered from the output of the "frequency-voltage" converter 102 to the input of the first operational amplifier 89 which constitutes a proportional-plus-integral speed controller because the feedback circuit comprises the first operational amplifier 89 and the series-connected resistor and capacitor. The voltage $U_{108}^*$ assigning the desired rotor speed is applied to the second input of the first operational amplifier.

In the initial condition of the electric drive, the voltage $U_{\psi^*ro}$ assigning the desired constant amplitude $\psi^*_{ro}$ of the rotor flux linkage is applied to the input of the second operational amplifier 91. The output of the second operational amplifier 91 is the voltage $U_i^*_{sy}$ assigning the flux-producing quadrature component $i^*_{sy}$ of the stator current amplitude $i_s$.

Initially, there are no input voltages $U_\omega^*$ and $U_\omega$ applied to the first operational amplifier 89 and no voltage $U_M^*$ assigning the desired torque $M^*$ of the induction motor 1. The digital-to-analog Cartesian coordinate converter 103 is set in the initial state with an arbitraty initial synchronization phase $\phi^*_{ro}$.

Since $U_m^* = 0$, no voltage is applied from the output of the first operational amplifier 89 to the ortho-phasal input 104 and the frequency input 105 of the digital-to-analog Cartesian coordinate converter 103 in the initial condition.

The voltage $U_i^*_{syo}$ assigning the desired constant flux-producing quadrature component $i^*_{syo}$ of the stator current amplitude is supplied to the co-phasal input 106 of the D/A Cartesian coordinate converter 103.

Since no voltage is supplied from the frequency input 105 of the digital-to-analog Cartesian coordinate converter 103 to the input of the pulse sweep unit 107, the reversible address counter 108 sets the programmable read-only memories 109 and 110 to a stationary initial synchronization phase $\phi^*_{ro}$. A permanent digital code of the value $\sin \phi^*_{ro}$ is produced at the output of the first programmable read-only memory 109, while the permanent digital code of the value $\cos \phi^*_{ro}$ is produced at the output of the second programmable read-only memory 110.

Since the voltage $U_M^*$ is not applied to the analog inputs of the first and third digital-to-analog converters 111 and 113, the output voltages thereof are equal to zero. The outputs of two other digital-to-analog converters 112 and 114 are voltages proportional to the product of the value set by the digital code by the value set at the analog input of each digital-to-analog converters 112 and 114.

In consequence, the output of the first adder 115 is the voltage $U_i^*_{sq}$ given by the formula:

$$U_i^*_{sg} = U_i^*_{syo} \cdot \sin \phi^*_{ro} \qquad (206)$$

while the output of the second adder 116 is the voltage $U_i^*_{sd}$ given by the formula:

$$U_i^*_{sd} = U_i^*_{syo} \cos \phi^*_{ro} \qquad (207)$$

The voltage $U_i^*_{sq}$ is supplied from the output of the first adder 115 to the ortho-phasal output 117 of the digital-to-analog Cartesian coordinate converter 103 and characterizes the desired transverse projection $i^*_{sq}$ of the stator current vector $\bar{i}_s$ (FIG. 1) relative to the original direction of the vector $\bar{R}_o$ of the initial position of the induction motor rotor (FIG. 16).

The voltage $U_i^*_{sd}$ is supplied from the output of the second adder 116 to the co-phasal output 118 of the digital-to-analog Cartesian coordinate converter 103 and characterizes the desired longitudinal projection $i^*_{sd}$ of the stator current vector $\bar{i}_s$ (FIG. 1) onto the axis of the vector $\bar{R}_o$ of the initial position of the induction motor rotor (FIG. 16).

The voltage $U_i^*_{sq}$ assigning the desired transverse projection of the stator current vector is supplied from the output 117 of the digital-to-analog Cartesian coordinate converter 103 to the ortho-phasal input 95 of the tranvector inverter 92 synchronized by the rotor.

The voltge $U_i^*_{sd}$ assigning the desired longitudinal projection of the stator current vector is supplied from the cophasal output 118 of the digital-to-analog Cartesian coordinate converter 103 to the co-phasal input 96 of the transvector inverter 92.

According to the equations (196)–(199), constant phase currents are produced at the outputs 97, 98, and 99 of the rotor synchronized transvector inverter 92. The ratio of these constant phase currents in the stator phase windings A, B, C of the induction motor 1 is controlled by the initial synchronization phase $\phi^*_{ro}$ of the digital-to-analog Cartesian coordinate converter 103 and the initial synchronization phase $\lambda^*_{so}$ of the rotor synchronized transvector inverter 92. According to equations (196), (197), (206), (207):

$$i_{orto} = i^*_{syo} \cdot \sin \phi^*_{ro} \cdot \sin \lambda^*_{so}. \tag{208}$$

$$i_{syno} = i^*_{syo} \cdot \cos \phi^*_{ro} \cdot \cos \lambda^*_{so}. \tag{209}$$

The initial constant phase current $i_{sao}$ in the reference stator phase winding "A" of the induction motor 1 is produced according to the equation (199), subject to equations (208) and (209), and is given by the formula:

$$i_{sao} = i^*_{syo} \cdot \cos \phi^*_{ro} \cdot \cos \lambda^*_{so} - i^*_{syo} \cdot \sin \phi^*_{ro} \cdot \sin \phi^*_{so}. \tag{210}$$

Since in the equation (210) the difference between the product of cosine functions of two angles and the product of sine functions of the same angles is a consine function of the sum of the two angles, flowing in the reference stator phase winding "A" is constant current $i_{say}$ equal to:

$$i_{sao} = i_{syo} \cdot \cos (\phi^*_{ro} + \lambda^*_{so}). \tag{211}$$

The sum of the two angles is, according to the equation (10), the initial phase angle of the rotor flux linkage vector $\bar{\psi}_r$ (FIG. 1) relative to the stator axis $\alpha$.

This means that the initial stator current phase $\epsilon_{so}$ which coincides with the initial synchronous phase $\phi_{so}$ of the rotor flux linkage, is given by:

$$\epsilon_{so} = \phi_{so} = \phi^*_{ro} + \lambda^*_{so}, \tag{212}$$

while constant phase currents $i_{sao}$, $i_{sBo}$, $i_{sco}$ in the stator phase windings, A, B, C of the induction motor 1 (FIG. 16) can be expressed by a system of equations (46).

When the voltage $U_\omega^*$ assigning the desired rotor speed $\omega^*$ is applied to the second input of the first operational amplifier 89 which is the proportional-plus-integral speed controller, or when an active load moment is applied to the shaft of the induction motor 1, a voltage $U_M^*$ is produced the output of the first operational amplifier 89, which prescribes the desired torque $M^*$ of the induction motor 1. This voltage is applied to the ortho-phasal input 104 and the frequency input 105 of the digital-to-analog Cartesian coordinate converter 103.

The voltage $U_M^*$ assigning the desired torque $M^*$ of the induction motor 1 is supplied, via the ortho-phasal input 104, to the analog inputs of the first and third digital-to-analog converters 111 and 113. Instant values of the voltages at the inputs of the adders 115 and 116 depend on the actual synchronization phase $\phi^*_r(t)$ of the digital-to-analog Cartesian coordinate converter 103, which changes when the output codes are switched in the programmable read-only memories 109 and 110.

The voltage $U_M^*$ assigning the desired torque $M^*$ of the induction motor 1 is supplied, via the frequency input 105, to the input of the pulse sweep unit 107 and transformed into a sequence of sweep pulses whose frequency $f^*_r$ is proportional to the actual value of the voltage $U_M^*$ assigning the desired torque $M^*$ of the induction motor 1.

The sweep pulse frequency $f^*_r$ is the multiple of the desired frequency $f_r$ of the slip of the rotor flux linkage relative to the rotor, which, according to the equation (29), is given by the formula:

$$f_r = \frac{\Delta \omega}{2\pi} = \frac{R_r}{3 Z_p \cdot \pi \cdot \psi_{ro}^*} \cdot M^* \tag{213}$$

The ratio $N_f$ of the sweep pulse frequency $f^*_r$ depends on the length of the digital codes of the sine and cosine functions, supplied to the inputs of the digital-to-analog converters 11, 112, 113, and 114. Thus, for example, with an eight-digit code the number of discrete elements of the sine and cosine functions for one period is $N_f = 256$.

In this case, the sweep pulse frequency $f^*_r$ is given by the formula:

$$f^*_r = N_f f_r = 256 f_r \tag{214}$$

A logical "1" or "0" signal, depending on the polarity of the voltage $U_M^*$ dictating the direction of the desired torque $M^*$ of the induction motor 1, is produced at the second output of the pulse sweep unit 107.

As the next sweep pulse is fed from the output of the pulse sweep unit 107, the reversible address counter 108 displaces the synchronization phase $\phi^*_r$ of the digital-to-analog Cartesian coordinate converter 103 to one discrete element $\Delta\phi^*_r$ in the direction dictated by the logical "1" or "0" signal applied to the second input of the reversible address counter 108.

The number of increments $\Delta\phi^*_r$ in one period the frequency $f_r$ of the rotor flux linkage slip relative to the rotor is the number $N_f$.

As sweep pulses are fed continously to the input of the reversible address counter 108, the synchronization phase $\phi^*_r$ of the digital-to-analog Cartesian coordinate converter 103 changes according to the law:

$$\phi^*_r = \phi_{ro} + Z_f \Delta \phi^*_r, \tag{215}$$

where $Z_f$ is the number of sweep pulses in the positive direction (with $+Z_f$) and in the negative direction (with $-Z_f$).

Changes of the synchronization phase $\phi^*_r$ at the ortho-phasal output 117 and co-phasal output 118 of the digital-to-analog Cartesian coordinate converter 103 lead to changes of the voltages according to the laws:

$$U_i^*{}_{sq} = U_i^*{}_{sy} \cdot \sin \phi^*_r + U^*_{isx} \cdot \cos \phi^*_r, \quad (216)$$

$$U_i^*{}_{sd} = U^*_{isy} \cdot \cos \phi^*_r - U^*_{isy} \cdot \sin \phi^*_r \quad (217)$$

The voltage $U_i^*{}_{sq}$ given by the equation (216) is supplied, via the ortho-phasal output 117 of the digital-to-analog Cartesian coordinate converter 103, to the ortho-phasal input 95 of the rotor-synchronized transvector inverter 92.

The voltage $U_i^*{}_{sd}$ given by the equation (217) is supplied, via the co-phasal output 118 of the digital-to-analog Cartesian coordinate converter 103, to the co-phasal input 96 of the transvector inverter 92.

The phase shift $\epsilon_\phi$ of the stator current relative to the rotor flux linkage produces the torque M of the induction motor 1, which results in the angular displacement of the rotor of the induction motor 1. Two pulse sequences are produced at the outputs of the incremental (pulse) transducer 101, which shift the synchronization phase $\lambda^*_s$ of the rotor-synchronized transvector inverter 92 in the direction dictated by the direction of the angular displacement of the rotor of the induction motor 1.

During the angular displacement of the rotor of the induction motor 1, the synchronization phase $\lambda^*_s$ of the transvector inverter 92 synchronized by the rotor changes according to the law:

$$\lambda_s = \lambda^*_{so} + Z_\lambda \cdot \Delta\lambda^*_s \quad (218)$$

where $Z_\lambda$ is the number of pulses fed from the output of the electronic reduction unit 100 to the pulse input of the unit 20 for transvector generation of the desired instantaneous phase currents.

The number $Z_\lambda$ of increments is positive when the angular displacement of the induction motor rotor is positive, the rotor position vector $\overline{R}$ being counterclockwise as shown in FIG. 1.

The number $Z_\lambda$ of increments is negative when the angular displacement of the induction motor rotor is negative, the rotor position vector $\overline{R}$ being displaced clockwise.

According to the equations (199), (216), and (217), the instantaneous phase current control unit 22 (FIG. 16) is used to produce, in the induction motor 1, symmetrical instantaneous stator phase currents $i_{sa}(t)$, $i_{sb}(t)$, and $i_{sc}(t)$ whose phase, frequency, and amplitude are controlled so that the instantaneous phase current $i_{sa;l}(t)$ in the reference stator phase winding "A" change according to the law:

$$i_{sa}(t) = \frac{\psi_{ro}^*}{L_{mo}} \cdot \cos\psi_r^* \cdot \cos\lambda_s - \frac{2L_r}{3Z_p \cdot L_m \cdot \psi_{ro}^*} \cdot M^* \cdot \sin\phi_r^* \cdot \quad (219)$$

$$\cos\lambda_s - \frac{\psi_{ro}^*}{L_{mo}} \cdot \sin\phi_r^* \cdot \sin\lambda_s - \frac{2L_r}{3Z_p \cdot L_m \cdot \psi_{ro}^*} \cdot M^* \cdot \cos\phi_r \cdot \sin\lambda_s,$$

where the synchronization on phase $\phi^*_r$ is controlled as a function of the desired torque M* of the induction motor 1 according to the law:

$$\phi_r^* = \phi_{ro}^* + \int_0^\infty \left( \frac{2L_r}{3Z_p \cdot L_{mo} \cdot \psi_{ro}^{*2}} \right) \cdot M^* dt. \quad (220)$$

The electric drive of FIG. 16 realizes a method of phase-vector control of an induction motor, which comprises a two-stage vector control of the stator current in Cartesian coordinates Y-X (FIG. 1) synchronized relative to the first orientation vector $\overline{H}_{01}$, the rotor flux linkage vector $\overline{\psi}_{ro}$, and in the Cartesian coordinates d-q synchronized by the induction motor rotor relative to the second orientation vector $\overline{H}_{02}$, the rotor position vector $\overline{R}$.

Separate control of the stator current vector parameters in two systems of Cartesian coordinates, with $\overline{H}_{01} = \overline{\psi}_r$ and $\overline{H}_{02} = \overline{R}$, permits control according to the law (219) and higher accuracy of the phase shift $\epsilon_\phi$ of the stator current in the electric drive of FIG. 16 relative to the rotor flux linkage. This higher accuracy can be achieved through establishment of a rigid unambiguous connection of the synchronization phase of the transvector inverter with the rotor angular position. Separate control also permits higher accuracy of induction motor torque control and more accurate speed control due to more accurate control of both the stator current phase and the rotor flux linkage phase.

Any further improvement in the accuracy of speed control in the electric drive of FIG. 16 involves the use of an analog speed transducer, for example, a tachometer generator 32 shown by dash-and-dot lines in FIG. 16.

In this case, two transducers are mounted on the shaft of the induction motor 1 (FIG. 16): an incremental (pulse) transducer 101 and a speed transducer 32 (tachometer generator).

The "frequency-voltage" converter 102 is eliminated, and the output of the speed transducer 32 (tachometer generator) is connected to the first input of the first operational amplifier 89, as shown by a dash-and-dot line in FIG. 16.

With the angular displacement of the induction motor rotor (FIG. 16), the output pulses of the incremental pulse transducer 101 synchronize control using the rotor position vector $\overline{R}$ as described above, while the output voltage $U_\omega$ of the speed transducer 32 (FIG. 16) is compared with the voltage U* assigning the desired rotor speed $\omega^*$ to become 125 whose two other inputs are connected to the second and third inputs of the mode setting unit 120.

The speed transducer 32 can be made as described above for the electric drives of FIGS. 11 and 14.

The incremental (pulse) transducer 101 can be made as described above for the electric drive of FIG. 16.

The rotor-synchronized transvector inverter 92 and the digital-to-analog Cartesian coordinate converter 103 can be made as described above for the electric drive of FIG. 16.

The torque forcing unit 76 can be made as described above for the electric drive of FIG. 14.

The adaptive torque controller 65 can be made as described above for the electric drive of FIG. 11.

The operational amplifier 89 can be made as described above for the electric drive of FIG. 16.

The mode setting unit 121 can employ a conventional two-channel switch (cf., for example, V. P. Shilo, Functional Analog Integrated Microcircuits, Moscow, Radio i Svyaz, 1979, in Russian, pp. 326–327; and S. V.

Yakubovsky, Analog and Digital Integrated Microcircuits, Handbook, Moscow, Radio i Svyaz Publ., 1985, in Russian, p. 375).

The digital-to-analog converter 122 can be a conventional digital-to-analog converter microcircuit (cf., for example, V. P. Shilo, Linear Integrated Circuits in Radioelectronic Equipment, Sovetskoe Radio Publ., Moscow, 1979, in Russian, pp. 344–345).

The digital rotor position controller 123 can employ a conventional circuit (cf., for example, The code error unit 124 can employ conventional microcircuits (cf., for example, S. V. Yakubovsky, Analog and Digital Integrated Microcircuits.

The stator windings of the induction motor 1 are connected to outputs 97, 98, and 99, of the rotor-synchronized transvector inverter 92 whose pulse inputs 93 and 94 are connected to outputs of the incremental (pulse) transducer 101.

The ortho-phasal input 95 of the rotor-synchronized transvector inverter 92 is connected to the ortho-phasal output 117 of the digital-to-analog Cartesian coordinate converter 103.

The co-phasal input 96 of the rotor-synchronized transvector inverter 92 is connected to the co-phasal output 118 of the D/A Cartesian coordinate converter 103.

The ortho-phasal input 104 of the digital-to-analog Cartesian coordinate converter 103 is connected to the ortho-phasal output 80 of the torque forcing unit 76.

The co-phasal input 106 of the digital-to-analog Cartesian coordinate converter 103 is connected to the co-phasal output 81 of the torque forcing unit 76.

The frequency input 105 of the digital-to-analog Cartesian coordinate converter 103 is connected to the frequency output 119 of the adaptive torque controller 65, which is the output of the division device 40 of the adaptive torque controller 65, whose input is connected to the output of the other division device 39 of this adaptive torque controller 65.

The ortho-phasal input 77 of the torque forcing unit 76 is connected to the ortho-phasal output 68 of the adaptive torque controller 65, while the co-phasal input 78 of the torque forcing unit 76 is connected to the co-phasal output 70 of the adaptive torque controller 65.

The first input 66 of the adaptive torque controller 65 is connected to the output of the operational amplifier 89.

The second input 67 of the adaptive torque controller 65 is connected to the output of the speed transducer 32.

The output of the speed transducer 32 is also connected to the first input of the operational amplifier 89.

The adaptive torque controller 65, the torque forcing unit 76, and the digital-to-analog Cartesian coordinate converter 103 together form an adaptive phase-vector control processor 120 whose first and second inputs are the first and second inputs 66 and 67 of the adaptive torque controller 65. The third input of the adaptive phase-vector control processor 120 is the control input 79 of the torque forcing unit 76. The ortho-phasal output 117 of the digital-to-analog Cartesian coordinate converter 103 constitutes the ortho-phasal output of the adaptive phase-vector control processor 120, while the co-phasal output 118 of the digital-to-analog Cartesian coordinate converter 103 constitutes the co-phasal output of the adaptive phase-vector control processor 120.

The second input of the operational amplifier 89 is connected to the output of a mode setting unit 121 whose input is connected to an output of a digital-to-analog converter 122. The input of the digital-to-analog converter 122 is connected to digital outputs of a rotor position controller 123 whose pulse output is connected to the control input 79 of the torque forcing unit 76.

Digital inputs of the rotor position controller 123 are connected to digital outputs of a code error unit 124 whose pulse inputs are connected to the outputs of the incremental (pulse) transducer 101, while the digital inputs thereof are connected to digital outputs of a robot control processor the negative rotor speed feedback for astatic control of the rotor speed, as described above for the electric drive of FIG. 15. This makes the instantaneous rotor speed more stable in the lower speed control range and at a rotor speed close to zero in the electric drive of FIG. 16.

Industrial robots equipped with positioning and contouring control require that both speed and position of actuators are controlled extremely accurately to achieve high accuracy of positioning and repeatability irrespective of the load moments and inertia moments with a minimal dynamic error in the position of the actuator, the weight and size of the actuator motor being minimal for a given load-lifting capacity of the robot.

When an induction motor is used as an actuator motor for robot tools, the weight of the induction motor should be minimized. To this end, the active parts of the induction motor should be exploited completely both in steady-state and dynamic conditions, subject to constraints concerning the heating of the induction motor and output currents and voltages of the power inverter. Simultaneously, the rotor angular position should be controlled with minimal static and dynamic errors. To this end, the torque of the induction motor whose weight is minimal should be as high as possible. And, finally, all this should not impair the reliability of the servo drive equipped with this induction motor capable of prolonged operation.

Figure 17:
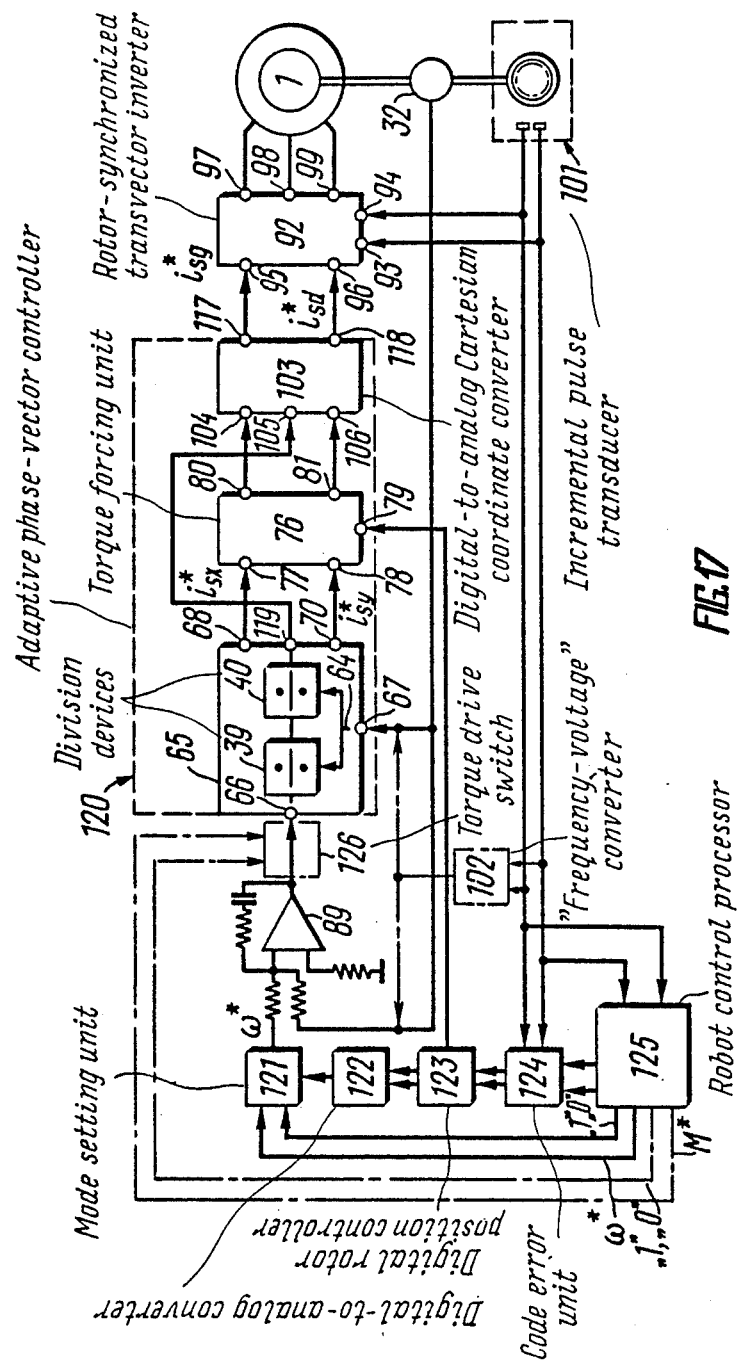
FIG. 17 shows a functional block diagram of a servo drive (for a robot) using an induction motor having two shaft-mounted transducers and an adaptive phase-vector control processor.

An electric drive (induction motor servo-drive) of a robot, which meets the above conditions, is shown in FIG. 17.

The electric drive (induction motor servo-drive) of a robot comprises an induction motor 1 whose shaft is connected to a speed transducer 32 and an incremental (pulse) transducer 101. Handbook, Moscow, Radio i Svyaz Publ., 1985, in Russian, p. 150).

The robot control processor 125 can also use a known configuration (cf., for example, UPM-772 Numerical Control Device, Booklet, pp. 1–5).

The electric drive of FIG. 17 operates as follows.

Instantaneous stator phase currents $i_{sa}$, $i_{sb}$, $i_{sc}$ of the induction motor 1 equipped with the speed transducer 32 and incremental (pulse) transducer 101 installed on the shaft thereof are controlled as functions of a signal assigning the ortho-phasal current amplitudes $I^*_{ort}$ and co-phasal current amplitudes $I^*_{syn}$ by means of the transvector inverter 92 synchronized by the rotor and the digital-to-analog Cartesian coordinate converter 103 as described above for the electric drive of FIG. 16.

The signal $U_{\Delta\omega}$ assigning the desired slip $\Delta\omega$ of the rotor flux linkage relative to the rotor, which is produced at the frequency output 119 of the adaptive torque controller 65, is applied to the frequency input 105 (FIG. 17) of the D/A converter 103.

Due to the conversion of the Cartesian coordinates Y-X to d-q, described above for the electric drive of FIG. 16, the signal $U_{\Delta\omega}^*$ assigning the rotor flux slip relative to the rotor is converted by sweeping in the electric drive of FIG. 17 into the synchronization phase $\phi^*_r$ of the stator current vector $\bar{i}_s$ by means of the D/A Cartesian coordinate converter 103.

Since the rotor-synchronized transvector inverter 2 is connected via the pulse inputs 93 and 94 to the outputs of the incremental (pulse) transducer 101 rigidly secured to the shaft of the induction motor 1, the signal supplied from the ortho-phasal output 117 of the digital-to-analog Cartesian coordinate converter 103 to the ortho-phasal input 95 of the transvector inverter 92 synchronized by the rotor produces a signal $U_{is^*q}$ assigning the projection $i_{sq}$ (FIG. 1) of the space vector $\bar{i}_s$ of the stator current onto the orthogonal axis "q" relative to the rotor axis vector R of the induction motor 1 (FIG. 17).

The signal supplied from the co-phasal output 118 of the digital-to-analog Cartesian coordinate converter 103 to the co-phasal input 96 of the rotor-synchronized transvector inverter 92 produces a signal $U_{is^*d}$ assigning the projection $i_{sd}$ (FIG. 1) of the stator current space vector $\bar{i}_s$ onto the longitudinal axis "d" of the rotor, which coincides with the rotor position axis vector R of the induction motor 1 (FIG. 17).

The signal $U_{\Delta\omega^*}$ delivered from the frequency output 119 of the adaptive torque controller to the frequency input 105 of the digital-to-analog Cartesian coordinate converter 103 is produced by the second division device 40 of the torque adaptive controller 65 so that its actual value $U_{\Delta\omega^*}(t)$ is proportional to the actual value of the effective slip $\Delta\omega(t)$ of the rotor flux linkage in relation to the rotor.

In consequence, the synchronization phase $\phi^*_r$ of the digital-to-analog Cartesian coordinate converter 103 is equal to the solid angle $\phi_r$ (FIG. 1) of the space vector $\bar{\psi}_r$ of the rotor flux linkage in relation to the axis "d" of the rotor position vector $\bar{R}$.

As described above for the electric drive of FIG. 14, when no control signal is applied to the control input 79 (FIG. 17) of the torque forcing unit 76, the ortho-phasal output 68 of the adaptive torque controller 65 is connected, via the ortho-phasal input 77 and ortho-phasal output 80 of the torque forcing unit 76, to the ortho-phasal input 104 of the digital-to-analog Cartesian coordinate converter 103, while the co-phasal output 70 of the adaptive torque controller 65 is connected, via the co-phasal input 78 and co-phasal output 81 of the torque forcing unit 76, to the co-phasal input of the D/A Cartesian coordinate converter 103.

The solid angle $\phi_s$ (FIG. 1) of the space vector $\bar{\psi}_r$ of the rotor flux linkage in relation to the stationary stator axis $\alpha$ which coincides with the axis "a" of the reference stator phase winding "A" of the induction motor 1 is determined by the sum of the solid angle $\lambda_s$ of the rotor position vector $\bar{R}$ (axis d) in relation to the stationary stator axis $\alpha$ and the solid angle $\phi_r$ of the space vector $\bar{\psi}_r$ of the rotor flux linkage in relation to the rotor position vector $\bar{R}$ (axis d).

The digital-to-analog Cartesian coordinate converter 103 (FIG. 17) connected in series with the rotor-synchronized transvector inverter 92 form, therefore, a two-stage converter of Cartesian coordinates in conformity with the convecsion sequence: Y-X→d-q→$\alpha,\beta$(-FIG. 1). The adaptive torque controller 65 (FIG. 17) is used to control the stator current vector $\bar{i}_s$ (FIG. 1) in the Cartesian coordinates Y-X oriented by the axis "Y" according to the rotor flux linkage vector $\bar{\psi}_r$.

The projection of the stator current vector $\bar{i}_s$, which is equal to the torque-producing component of the stator current amplitude $i_s$, is controlled as a function of the signal $U_{is^*x}$ assigning the desired torque-producing quadrature component $i^*_{sx}$ of the stator current amplitude $i^*_s$, which is produced at the ortho-phasal output 68 of the adaptive torque controller 65 (FIG. 17), as described above for the electric drive of FIG. 11.

A signal $U_{is^*y}$ assigning the desired flux-producing quadrature component $i^*_{sy}$ of the desired stator current amplitude $i^*_s$ is produced at the co-phasal output 70 (FIG. 17) of the adaptive torque controller 65, as described above for the electric drive of FIG. 11.

The adaptive phase-vector control processor 120 produces, at the ortho-phasal and co-phasal outputs 117 and 118 respectively, signals assigning the desired instantaneous amplitudes $I^*_{ort}(t)$ and $I^*_{syn}(t)$ of the ortho-phasal and co-phasal currents, which are controlled according to the laws:

$$I^*_{ort} = i^*_{sy} \cdot \sin\phi^*_r + i^*_{sx} \cdot \cos\phi^*_r \qquad (221)$$

$$I^*_{syn} = i^*_{sy} \cdot \cos\phi^*_r - i^*_{sx} \cdot \sin\phi^*_r \qquad (222)$$

where $\phi^*_r$ is the synchronization phase of the digital-to-analog Cartesian coordinate converter 103 of the adaptive phase-vector control processor 120.

The synchronization phase $\phi^*_r$ is produced in conformity with the law:

$$\phi_r^* = \phi_{ro}^* + \int_0^\infty \left( \frac{R_r}{L_r} L_m \cdot \frac{i_{sx}^*}{\psi_r^*} \right) dt \qquad (223)$$

where $\psi^*_r$ is the desired amplitude of the rotor flux linkage.

This synchronization phase $\phi^*_r$ is generated by two series connected division devices 39 and 40 of the adaptive torque controller 65, as described above for the electric drive of FIG. 11. The desired slip $\Delta\omega^*$ of the rotor flux linkage relative to the rotor is produced at the output of the second division device 40 (FIG. 17) according to the law:

$$\Delta\omega^* = \frac{R_r}{L_r} L_m \cdot \frac{i_{sx}^*}{\psi_r^*} \qquad (224)$$

and in the first control zone of the adaptive torque controller 65 (zone 1 in FIGS. 13a and 13d) is proportional to the desired torque M* of the induction motor 1 (FIG. 17), which is assigned at the first input of the adaptive phase-vector control processor 120, which is the first input 66 of the adaptive torque controller 65, according to the law:

$$\Delta\omega_I = \frac{2 R_r}{3 Z_p (\psi_{ro}^*)^2} \cdot M^* \qquad (225)$$

where $\Delta\omega^*$ is the desired slip of the rotor flux linkage in relation to the rotor in the control zone I;

$\psi^*_{ro} \leq \psi_{rn}$ is the initial rotor flux amplitude established as described above for the electric drive of FIG. 11.

In control zones II, III and IV (FIG. 13), the desired slip $\Delta\omega_{II}$, $\Delta\omega_{III}$, $\Delta\omega_{IV}$ is controlled according to the law (224) subject to different laws controlling the desired torque-producing components $i^*_{sx}$ of the stator current amplitude and the rotor flux linkage amplitude $\Delta\psi^*_r(t)$, as described above for the electric drives of FIGS. 11 and 14.

When no control signal is applied to the third input of the adaptive phase-vector control processor (FIG. 17), which is the control input 79 of the torque forcing unit 76, the instantaneous phase current $i_{sa}(t)$ in the reference stator phase winding "A" is controlled according to the laws (157), (158), and (159) depending on the ratio of the actual values of the desired torque M* of the induction motor 1 and the measured speed $\omega$ to their boundary values $M^*_g$ and $\omega_g$.

Initially, no signals are applied to the two control inputs of the mode setting unit 121, and the input of the mode setting unit 121, which is coupled with the output of the digital-to-analog converter 122, is connected to the output of this mode setting unit 121. The signal assigning the desired rotor speed $\omega^*$ is, therefore, supplied from the output of the digital-to-analog converter 122 to the control input of the operational amplifier 89.

The electric drive operates in this initial state as a servo drive.

When the induction motor 1 operates as a servo drive, the digital code assigning the desired rotor speed $\omega^*$ is fed to the digital inputs of the digital-to-analog converter 122 from the outputs of the digital rotor position controller 123 whose inputs receive error codes $\Delta\lambda_s = \lambda^*_s - \lambda_s$ of the assigned and actual angular positions of the rotor, which are taken from the outputs of the code error unit 124.

Output pulses of the incremental (pulse) transducer 101 rigidly connected with the shaft of the induction motor 1 are supplied to two inputs of the code error unit 124 where two pulse sequences are converted into a digital code of the actual angular position $\lambda_s$ of the induction motor rotor. The length of this code depends on the length of codes assigning the desired angular rotor displacement $\lambda^*_s$. Thus, for example, with the 16-digit assignment code ($\lambda^*_s$) the code error unit 124 produces a 16-digit code of the actual angular position $\lambda_s$ of the rotor.

Codes assigning the desired angular rotor position $\lambda^*_s$ are supplied from the digital outputs of the robot control processor 125 to the digital inputs of the code error unit 124.

In the robot teaching mode, output pulses of the incremental (pulse) transducer 101 are also supplied to the two inputs of the robot control processor 125. The robot teaching mode is set from the robot control console (not shown in FIG. 17) whose outputs are connected to the control inputs of the processor 125.

In the robot automatic operation mode, the robot execution program loaded during the teach-in period to the robot control processor 125 should change the digital codes assigning the desired angular rotor position $\lambda^*_s$, which are supplied from the output of the robot control processor 125 to the digital inputs of the code error unit 124.

During robot positioning control, the error expressed in increments of the rotor angular position $\Delta\lambda_s$ at the output of the code error unit 124 is initially stepped up to a maximum value equal to $\Delta\lambda_{smax} = \lambda^*_s$ and then gradually diminishes as the shaft of the induction motor 1 moves to assume the angular position $\lambda_s = \lambda^*_s$ During contouring robot control, for example in welding or assembly robots, the code error in the increments of the angular rotor position $\Delta\lambda_s$ at the output of the unit 124 is kept minimal $\Delta\lambda_{s\ min}$ and equal to the permissible cumulative dynamic error of the follow-up electric drive. This permissible cumulative error in the increments of the rotor angular position $\Delta\lambda_{s\ min}$ is dictated by the desired accuracy of the contouring control of the robot grip coordinate and may vary from one to several increments to the angular rotor position $\Delta\lambda_s$ of the incremental (pulse) transducer 101.

The actual angular rotor position $\lambda_s$ may depart from the assigned angular rotor position $\lambda^*_s$ to an angular position increment $\Delta\lambda_s$ greater than the permissible positioning error in response to sudden changes of the induction motor load torque or of the reduced moment of inertia in a given robot displacement coordinate during continuous-path control, or when holding the robot actuator in a positioning point during point-to-point control. This is due to the limitations of the acceleration and torque of the induction motor 1 in the control zone II (FIG. 13).

A logical "1" signal is produced at the pulse output of the digital rotor position controller 123 in order to improve the accuracy of robot positioning when the code error in increments of the rotor angular position $\Delta\lambda_s$ increases at the input of the digital rotor position controller 123 to a value close to the permissible positioning error. This logical "1" signal is supplied to the control input of the adaptive phase-vector control processor 120, which is the control input 79 of the torque forcing unit 76.

In consequence, as has been described above for the electric drive of FIG. 14, the signal assigning the desired flux-producing quadrature component $i^*_{sy}$ of the stator current amplitude is readdressed and is supplied from the input 78 (FIG. 17) of the torque forcing unit 76 to the ortho-phasal output 80 of the torque forcing unit 76 with a certain coefficient of proportionality $K_F$ determined, for example, by the equation (178) if prior to readdressing the stator current amplitude $i_s$ had already reached its maximum value ($i_{s\ max}$). which is given, in the control zone II (FIG. 13), by the equality $i_{s\ max} = \sqrt{2}\ i_{sx^*max}$.

In this case, the desired amplitude $I^*_{ort}$ of the ortho-phasal current, which had been equal, prior to the readdressing, to the desired co-phasal current amplitude $I^*_{syn}$ and given by the equation (221) according to the formula:

$$i^*_{ort} = i^*_{sx\ max} \cdot \sin \phi_{ro},$$

increases by a step, when the logical "1" signal is applied to the control output of the rotor position digital controller 123 (FIG. 17), to a value:

$$i^*_{ort}|_{t>0} = i^*_{sx\ max} \cdot \sin \phi_{ro} + K_F i^*_{sy\ max} \cdot \cos \phi_{ro}.$$

Since prior to the co-phasal current readdressing, when t=0, the following condition was satisfied in the control zone II (FIG. 13):

$$|i_{sx\ max}^*| = i_{sy\ max}^* = \frac{i_{s\ max}}{\sqrt{2}}$$

the equation (224) right after the readdressing, when t=has the following form:

$$i^*_{ort}|_{t>o} = i^*_{s\ max} \cdot (\sin \phi_{ro} + K_F \cos \phi_{ro}) \qquad (225)$$

where $i_{s\ max}$ is the stator current maximum amplitude.

Prior to readdressing, when t=0, in the control zone II the instantaneous phase current $i_{sao}$ in the reference stator phase winding "A" is determined, when the operational amplifier 89 (FIG. 17) is saturated and the signal assigning the maximum desired torque $M^*_{max}>0$ of the induction motor 1 at the first input 66 of the adaptive torque controller 65 reaches its maximum ($U_{M^*max}$), by the maximum permissible stator current amplitude $i_{s\,max}$ in conformity with the following equation:

$$i_{sao} = \frac{i_{s\,max}}{\sqrt{2}} (\cos\phi_{ro} \cdot \cos\lambda_{so} - \sin\phi_{ro} \cdot \cos\lambda_{so} - \sin\phi_{ro} \cdot \sin\lambda_{so} - \cos\phi_{ro} \cdot \sin\lambda_{so}), \quad (226)$$

where
  $\phi_{ro}$ is the initial angle of the ohase shift of the rotor flux linkage in relation to the rotor axis;
  and $\lambda_{so}$ is the initial angular position of the rotor relative to the stator axis.

After the co-phasal current is switched over and the proportionality coefficient (forcing coefficient) K is equal to $K_F=\sqrt{2}-1$, the stator current amplitude $i_s$ remains the same, since $i_{sx|t0}=i_{sx0}++K_F i_{syo}$, wherefrom the equality follows:

$$i_{s|t>0} = \sqrt{i^2_{sx|t>0} + i^2_{sy|t>0}} = \sqrt{\left[\left(\frac{i_{smax}}{\sqrt{2}} + (\sqrt{2}-1)\frac{i_{smax}}{\sqrt{2}}\right)\right]^2} = i_{smax} \quad (227)$$

With the stator current amplitude $i_{s\,max}$ being unchanged, and when the signal $U_{is^*y}$ is removed from the co-phasal input 106 of the digital-to-analog Cartesian coordinate converter 103, the stator current phase at the output of the rotor synchronized transvector inverter 92 makes aa step change because the instantaneous phase current $i_{sa}$ in the reference stator phase winding "A" is produced according to the following law:

$$i_{sa|t>0} = -i_{s\,max} (\sin\phi_{ro}^* \cdot \cos\lambda_{so} + \cos\phi_{ro}^* \cdot \sin\lambda_{so}) = \quad (228)$$
$$-i_{s\,max} \cdot \sin(\phi_{ro}^* + \lambda_{so}) = -i_{s\,max} \cdot \sin\phi_{so}$$

where $\phi_{so}$ is the angular position of the rotor flux linkage vector $\overline{\psi}_r$ in relation to the stator axis "a" at the moment of switching-over.

It follows from the equations (226)–(228) that the generation of a logical "1" signal to the control output of the digital rotor position controller 123 causes a step change of the stator current phase $\epsilon_s$ to an angle $\pm\pi/2$ relative to the axis "Y" (FIG. 1) of the rotor flux linkage vector. This, according to the equation (1), results in a step increase of the induction motor torque $M_{max}$ to the utmost value max $M_{max}$:

$$\max M_{max} = K_F \cdot M_{max} = (\sqrt{2}-1) M_{max} \quad (229)$$

This forcing of the induction motor torque permits acceleration of the rotor and minimization of the dynamic error of the angular position $\lambda_s$ of the rotor of the induction motor 1 (FIG. 17), in the angular position increments $\Delta\lambda_s$.

After the dynamic error in increments of the angular rotor position $\Delta\lambda_s$ is brought to a value required by the accuracy of the rotor position follow-up conditions, a logical "0" signal is produced at the control output of the digital rotor position controller 123, and the torque forcing unit 76 has its circuit reversed to the original state. The torque of the induction motor 1 is dictated by the control mode in the control zone II (FIG. 13).

When a logical "1" signal is applied to the control input of the mode setting unit 121 (FIG. 17) from the first control output of the robot control processor 125, the mode setting unit 121 disconnects the control input of the operational amplifier 89 from the output of the digital-to-analog converter 122 and connects this control input of the operational amplifier 89 to the programmed speed setting output of the robot control processor 125.

In this case, the electric drive operates as an adjustable-speed electric drive wherein the desired rotor speed $\omega^*$ is assigned according to the program loaded to the robot control processor 125, e.g. for robot painters and welders whose grip operational speed can be programmed.

The stator instantaneous phase currents are controlled in this case according to the laws (157), (158), and (159) described above for the control zones I, II, III (FIG. 13), while the stator current phase shift is controlled according to the laws determined by the ratio of the actual torque $M^*$ of the induction motor 1 and the measured rotor speed $\omega$.

The output voltage $U_\omega$ of the speed transducer 32 (tachometer generator) (FIG. 17), which is proportional to the measured rotor speed $\omega$, is supplied to the input of the operational amplifier 89 and to the second input 67 of the adaptive torque controller 65. The desired rotor speed $\omega^*$ and the measured rotor speed $\omega$ are compared, and the rotor speed of the induction motor 1 is controlled astatically at the output of the operational amplifier 89 according to a predetermined program.

The law used to control the current phase in the control zone III (FIG. 13) according to the equation (159) is changed as a function of the signal $U_\omega$ applied to the second input 67 of the adaptive torque controller 65.

When a logical "0" signal is supplied from the first control output of the robot control processor 125 (FIG. 17) to the control input of the mode setting unit 121, the adjustable speed electric drive is disconnected from the programmed speed setting output of the robot control processor 125 and connected, via the digital-to-analog converter 122, to the output of the digital rotor position controller 123. In this case the electric drive starts operating as a servo drive as described above.

For some operational modes of assembly and welding robots, the torque of the induction motor has to be controlled according to an independent program directly by the robot control processor 125, (e.g. screw-in operations during assemblying, or removal or burrs).

To provide independent programmed control of the induction motor torque in the electric drive of FIG. 17, a torque drive switch 126 may be inserted between the output of the operational amplifier 89 and the first input 66 of the adaptive torque controller 65. This switch 126 is shown in FIG. 17 by dash-and-dot lines and has its control input connected to the second control output of the torque control processor 125, while the second torque programmed setting input is connected to the torque programmed setting output of the torque control processor 125. These connections are also indicated by dash-and-dot lines in FIG. 17.

The third input of the torque drive switch 126 is connected to the output of the operational amplifier 89, while the output thereof is connected to the first input 66 of the adaptive torque controller 65.

When a logical "1" signal is supplied from the second control output of the robot control processor 125 to the control input of the torque drive switch 126, the first input 66 of the adaptive torque controller 65 is disconnected from the output of the operational amplifier 89. The first input 66 of the adaptive torque controller 65 is connected to the torque programmed setting output of the robot control processor 125.

The program loaded to the robot control processor 125 provides invariant control of the torque M(t) of the induction motor 1 in conformity with the control law used to control the desired torque M*(t) of the induction motor 1, which is prescribed by the program for the torque drive.

When a logical "0" signal is supplied from the second control input of the robot control processor 125 to the control input of the torque drive switch 126, the torque drive equipped with an induction motor is disconnected from the torque programmed setting output of the robot control processor 125, the first input 66 of the adaptive torque controller 65 is connected to the output of the operational amplifier 89. In this configuration, the induction motor drive operates as described above as a servo drive or an adjustable-speed electric drive.

The four-zone phase-vector control of the induction motor 1, which is realized by means of the adaptive phase-vector control processor 120 and the rotor-synchronized transvector inverter 92 makes it possible to minimize the weight and size of an actuator induction motor 1 with specific load lifting capacity and accuracy of robot operation. This requires that the weight and size of transducers arranged together with the induction motor be reduced.

In order to reduce the weight and size of a robot induction motor driven electromechanical module equipped with transducers on the shaft of the induction motor, the incremental (pulse) transducer 101 should be used not only as a rotor angular displacement sensor but also as a speed sensor. In this case, the speed transducer 32 (tachometer generator) can be removed from the shaft of the induction motor 1 and a "frequency-voltage" converter 102 (shown by dash-and-dot lines in FIG. 17) can be inserted between the input of the operational amplifier 89, which is joined with the second input 67 of the adaptive torque controller 65, and the outputs of the incremental (pulse) transducer 101. The output signal $U_\omega$ of the converter 102 is used as a speed feedback as described above for the electric drive of FIG. 16.

Functions of a robot induction motor drive of FIG. 17 are universally applicable and it can be employed to improve the economy, efficiency, and accuracy of a robot.

In this case, the adaptive phase-vector control processor 120 can be made as a specialized programmable microprocessor realizing all above methods of four-zone control of the stator current phase according to the above equations. The microprocessor to control an induction motor can be conventional (cf., for example, MICROSYN 3000, Catalog by Stromag Co., Drukschrift Nr. D182, 6.84. 5000, pp. 2-7).

The efficiency of adjustable flexible production systems is often dependent on the frequency of working cycles of its components including industrial robots, machining centers, transport systems equipped with electric drives.

The higher the frequency of operation cycles the higher the heating of motors. The higher the ratio $M_{max}/M_H$ of the induction motor torque during start-stop operation, the faster the induction motor is overheated. But, when the initial ratio $M_{max}/M_H$ of the induction motor torque is reduced to "1" during adjustment of the electric drive of FIG. 17 and the increasing cycle frequency results in no overheating of the induction motor beyond a permissible limit for a lengthy nominal operational mode of the induction motor, the positioning time also increases because the acceleration is much more sluggish and the start-stop periods become much longer. The permissible cycle frequency is reduced alongside with the efficiency of the motor.

In order to provide maximum efficiency of flexible production systems and industrial robots, the maximum motor moment should be provided for any operation cycle of the possible operation cycles of a flexible production complex with limitations imposed on overheating of induction motors. The optimal maximum induction motor torque $M_{max}$ and the optimal frequency of operation cycles depend, therefore, on the heating temperature of an induction motor, which can be measured by a temperature-sensitive element built into each induction motor.

Besides, the above four-zone control of the stator current phase $\epsilon_s$ is realized by means of the adaptive phase-vector control processor 120 (FIG. 17) subject to the condition of equality of the desired slip $\Delta\omega^*(t)$ of the rotor flux linkage relative to the rotor, which is prescribed by the signal $U_{\Delta\omega^*}$ at the frequency output 119 of the adaptive torque controller 65 and the frequency input 105 of the digital-to-analog Cartesian coordinate converter 103, and the actual slip $\Delta\omega(t)=d\phi_r(t)/dt$ of the rotor flux linkage relative to the rotor for the induction motor 1.

In the electric drive of FIG. 17, the signal $U_{\Delta\omega^*}$ assigning the desired rotor flux linkage slip $U_{\Delta\omega^*}$ relative to the rotor is produced as a function of the selected estimated constant resistance $R_r$ of the rotor according to the formulae (146), (151), and (225).

When the rotor temperature of the induction motor 1 changes in the process of operation of the servo drive of FIG. 17, the actual resistance $R_r^o$ of the induction motor rotor also changes, in response to the change of the specific conductance of the rotor cores, as a function of the temperature $\theta_r$ of the rotorcores according to the formula $$R_r^o = R_{ro}[1+\alpha(\theta_r-20°)], \qquad (230)$$

where $R_r^o$ is the actual rotor resistance varying with the temperature of the rotor cores;

$R_{ro}$ is the rotor resistance at 20° C.;

$\alpha$ is a temperature coefficient approximately equal to $\alpha \approx 0.004$ for copper and aluminum; is the actual temperature of rotor cores in degrees Centigrade (°C.);

$(\theta_r-20°)$ is the rotor overheat temperature relative to the rated ambient temperature +20° C.

An error in the stator current phase control accumulates in the electric drive of FIG. 17 over long operational periods of the induction motor 1 due to the difference between the actual rotor resistance $R_r^o$ controlled according to the equation (230) and the estimated constant rotor resistance $R_r$ used to adjust the second division device 40 of the adaptive torque controller 65 in the adaptive phase-vector control processor 120.

Since the rotor speed in the induction motor 1 is controlled astatically in the electric drive of FIG. 17, the accuracy of the rotor speed control and invariant control of the induction motor torque are provided with higher values of the stator current amplitude which increases due to the increase of the torque-producing component $i_{sx}$ of the stator current amplitude, which is caused by the rotor heating and increase of the actual slip $\Delta\omega_o$ of the rotor flux linkage relative to the rotor in conformity with the equations (146), (151), (225) and (230) according to the formula $$\Delta\omega(\theta_r) = \Delta\omega_o[1 + \alpha(\theta_r - 20°)], \qquad (231)$$

where $\Delta\omega(\theta_r)$ is the actual value of the effective slip of the rotor flux linkage relative to the rotor in response to changes of the rotor core temperature;

$\Delta\omega_o$ is the rotor flux linkage slip relative to the rotor when the rotor core temperature is +20° C.

In order to minimize the stator current amplitude with an assigned induction motor torque, when the rotor is heated, the stator current phase control laws should be modified as functions of the induction motor temperature.

Figure 18:
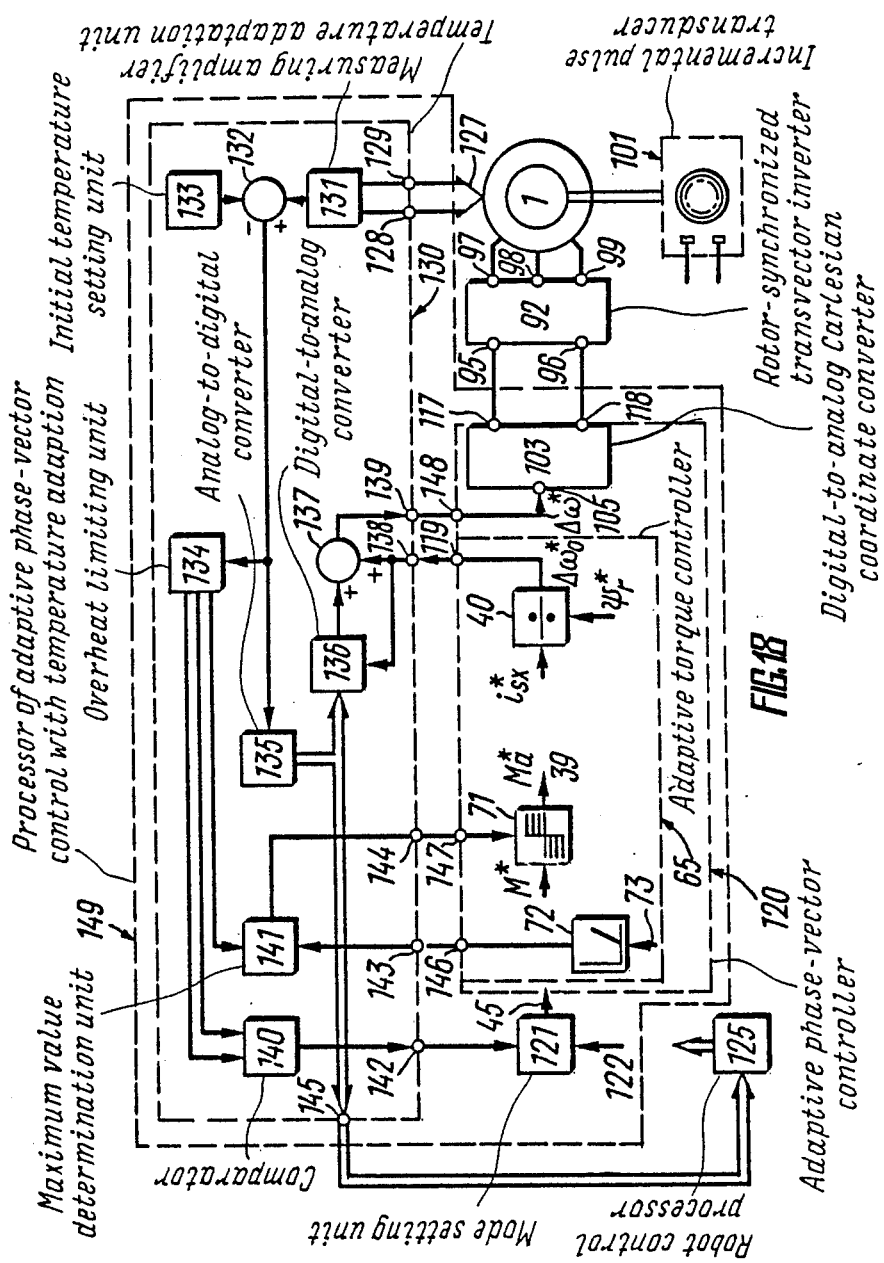
FIG. 18 shows a functional block diagram of an induction motor servo drive for a robot, featuring one pulse transducer and an adaptive phase-vector temperature-adapted control processor.

To achieve maximum efficiency of motors and devices, and flexible production systems as a whole, it is advisable to realize temperature adaptive control of an induction motor as shown in FIG. 18 for a temperature adapted servo drive.

An induction motor temperature-adaptive drive comprises an induction motor 1 whose rotor is connected to an incremental (pulse) transducer 101. A temperature sensitive element 127 is installed on the internal surface of the stator of the induction motor 1.

The stator windings of the induction motor 1 are connected to a transvector inverter 92 synchronized by the rotor, which features are ortho-phasal input 95 and a co-phasal input 96 connected, respectively, to ortho-phasal and co-phasal outputs 117 and 118 of an adaptive phase-vector control processor 120 whose input is electrically connected to outputs of a robot control processor 125.

Outputs of the temperature-sensitive element 127 are connected to measuring inputs 128 and 129 of a temperature adaptation unit 130, which are inputs of a measuring amplifier 131 of the temperature adaptation unit 130.

The output of the measuring amplifier 131 of the temperature adaptation unit 130 is connected to one of the inputs of a comparison circuit 132 of the temperature adaptation unit 130, whose second input is connected to an output of an initial temperature setting unit 133 of the temperature adaptation unit 130.

In the temperature adaptation unit 130, the output of the comparison circuit 132 is connected to an input of an overheat limiting unit 134 and to an input of an analog-to-digital converter 135 whose outputs are connected to digital inputs of a digital-to-analog converter 136.

The output of the digital-to-analog converter 136 is connected to one of the inputs of an adder 137 of the temperature adaptation unit 130.

The second input of the adder 137 is joined with the analog input of the digital-to-analog converter 136 to form a frequency input 138 of the temperature adaptation unit 130, while the output of the adder 137 is a frequency output 139 of the unit 130.

In the temperature adaptation unit 130, the first output of the overheat limiting unit 134, is connected to a first input of a comparator 140 and to a first input of a maximum value determination unit 141.

A second output of the overheat limiting unit 134 is connected to a second input of the comparator 140 whose output is a thermal interlock output 142 of the temperature adaptation unit 130.

The input of the maximum value determination unit 141 is a torque limiting input 143 of the temperature adaptation unit 130, while the output thereof is a torque limiting output 144 of the unit 130.

Digital outputs of the analog-to-digital converter 135 are digital outputs 145 of the temperature adaptation unit 130, which are connected to digital inputs of the robot control processor 125.

The torque limiting input 143 of the temperature adaptation unit 130 is connnected to a torque limiting output 146 of the torque adaptive controller 65, which is the output of the torque limitation non-linearity unit 72 of the torque adaptive controller 65.

The torque limiting output 144 of the temperature adaptation unit 130 is connected to a torque limiting input 147 of the adaptive torque controller 65, which is the limiting input of the controlled torque limitation unit 71 of the adaptive torque controller 65.

The frequency input 138 of the temperature adaptation unit 130 is connected to the frequency output 119 of the adaptive torque controller 65, which is the output of the second division deivce 40 of the adaptive torque controller 65.

The frequency output 139 of the temperature adaptation unit 130 is connected to a frequency input 148 of the adaptive phase-vector control processor 120, which is the frequency input 105 of the digital-to-analog Cartesian coordinate converter 103 of the processor 120.

The adaptive phase-vector control processor 120 is equipped with a torque forcing unit 76 (not shown in FIG. 18) having the same connections as in the electric drive shown in FIG. 17.

The temperature-sensitive element 127 (FIG. 18) and measuring amplifier 131 can be made conventionally (cf., for example, V. P. Shilo, Linear Integrated Circuits in Radioelectronic Devices, Moscow, Sovetskoe Radio, 1979, in Russian, pp. 166–169).

The adaptive phase-vector control processor 120 and the temperature adaptation unit 130 form a processor 140 of adaptive phase-vector control with temperature adaptation.

The comparison circuit 132 and the initial temperature setting unit 133 can employ conventional microcircuits of integrated operational amplifiers (cf., for example, B. K. Nesterenko, Integrated Operational Amplifiers, Handbook, Moscow, Energia Publ., 1982, p. 107).

The overheat limiting unit 134 can employ two operational amplifiers using standard integrated operational amplifiers like those in units 132 and 133, one of the two operational amplifiers being made as an aperiodic circuit whose output is connected, via a diode, to the input of the second operational amplifier.

The analog-to-digital converter 135 and the digital-to-analog converter 136 employ conventional microcircuits (cf., for example, S. V. Yakubovsky, Analog and Digital Integrated Microcircuits, Handbook, Moscow, Radio i Svyaz Publ., 1985, pp. 355-359, in Russian).

The adder 137 can employ a conventional operational amplifier like that in the comparison circuit 132.

The comparator 140 can be a standard two-input comparator (cf., for example, B. K. Nesterenko, Integrated Operational Amplifiers, Handbook, Moscow, Energia, Publ., 1982, in Russian, pp. 114-115).

The maximum value determination unit 140 can employ two conventional operational amplifiers (cf., for example, F. Fröhr, F. Orttenburger, Basic Units of Adjustable DC Drive, transl. from German, Moscow, Energia, Publ., 1977, pp. 175-176).

The electric drive shown in FIG. 18 operates as follows.

With the steady-state initial temperature of the induction motor 1, e.g. +20° C., the induction motor drive shown in FIG. 18 operates as described above for the electric drive of FIG. 17.

This is due to the fact that control voltages at the torque limiting output 146 and torque limiting input 147 of the adaptive torque controller 65 are equal, as are voltages $U_{\Delta\omega}*$ assigning the rotor flux linkage slip relative to the rotor at the frequency output 119 of the adaptive torque controller 65 and at the frequency input 148 of the adaptive phase-vector control processor 120.

In consequence, instantaneous phase currents are produced by means of the rotor-synchronized transvector inverter 92 in the stator windings of the induction motor 1 in accordance with the foregoing laws in control zones I, II, III, IV (FIG. 13) and with the operational mode of the robot servo drive prescribed by the robot control processor 125 shown in FIG. 17.

In this case, all parameters of components of the processor 120 are adjusted according to the foregoing equations and the rotor resistance $R_{ro}$ which corresponds to a specific steady-state initial temperature of the induction motor, which is equal, for example, to +20° C.

The temperature of the induction motor 1 increases in the process of operation, which results in modigication of control of the stator current phase $\epsilon_s$ as a function of the temperature of the induction motor 1. The temperature-sensitive element 127 is installed on the inside surface of the stator and, for induction motors having a relatively narrow air gap, the temperature $\theta_s$ of stator winding insulation and of the temperature sensitive element 127 is approximately equal to the actual temperature $\theta_r$ of the rotor cores of the induction motor 1.

When the temperature $\theta_r$ of the rotor cores and the temperature $\theta_s$ of the stator winding insulation of the induction motor 1 (FIG. 18) change, the physical properties of the temperature-sensitive transducer also change so that, when the outputs of this temperature-sensitive element 127 are connected with the measuring inputs 128 and 129 of the temperature adaptation unit 130, the measuring amplifier 131 produces a voltage $U_\theta$ approximately proportional to the actual temperature $\theta_r$ of the rotor cores of the induction motor 1 and the actual temperature $\theta_s$ of the stator winding insulation.

This voltage $U_\theta$ is supplied to the input of the comparison circuit 132 to be compared with the constant voltage $U_{\theta o}$ assigning the initial temperature $\theta_o = +20°$ C., which is supplied from the output of the initial temperature setting unit 133 to the second input of the comparison circuit 132.

The difference between voltages $(U_\theta - U_{\theta o}) = U_{\Delta\theta}$ which is proportional to the actual overheat temperature $\Delta\theta$ of the induction motor 1, is supplied from the output of the comparison circuit 132 to the input of the overheat limiting unit 134 and to the input of the analog-to-digital converter 135.

The analog voltage $U_{\Delta\theta}$ is converted by the A/D converter 135 into a digital code of the actual overheat temperature $\Delta\theta$ of the induction motor 1, which is delivered to the digital inputs of the digital-to-analog converter 136.

The output voltage of the digital-to-analog converter 136 is fed to one of the inputs of the adder 137, while the other input thereof receives the voltage $U_{\Delta\omega}*$ assigning the desired slip $\Delta\omega*$ of the rotor flux linkage in relation to the rotor, which is supplied from the frequency input 138 of the unit 130.

Simultaneously, the voltage $U_{\Delta\omega}*$ assigning the desired slip $\Delta\omega*$ of the rotor flux linkage in relation to the rotor is supplied from the frequency input of the temperature adaptation unit 130 to the analog input of the digital-to-analog converter 136 which performs the function of a digital-analog multiplier of the digital code of the actual overheat temperature $\Delta\theta$ of the induction motor 1 by the voltage $U_{\Delta\omega}*$ assigning the desired slip $\Delta\omega*$ of the rotor flux linkage relative to the rotor.

Multiplication of the input values results in that the output voltage of the digital-to-analog converter 136 is proportional to the product $[\alpha \cdot (\Delta\omega*_o \cdot \Delta\theta)]$, while the output voltage of the adder 137 is proportional to the sum of two values $$\Delta\omega*_o + \alpha \cdot (\Delta\omega*_o \cdot \Delta\theta_r).$$

The output voltage of the adder 137 is delivered to the frequency output 139 of the temperature adaptation unit 130, and this output 139 produces a voltage $U_{\Delta\omega}*$ assigning the actual value of the desired slip $\Delta\omega* (\theta_r)$ of the rotor flux linkage in relation to the rotor, subject to the rotor core temperature $\theta_r$ of the induction motor 1:

$$\Delta\omega*(\theta_r) = \Delta\omega*_o + \alpha \cdot \alpha\omega*_o(\theta_r - 20°) = \Delta\omega*_o \cdot [1 + \alpha(\theta_r - 20°)] \quad (232)$$

Simultaneously, constant voltage $U_{(\Delta\theta)max}$ assigning the maximum overheat level $\Delta\theta_{max}$ of the induction motor 1 is supplied from the output of the overheat limiting unit 134 to one of the inputs of the comparator 140. The overheat limiting voltage $U_\theta$ supplied to the second input of the comparator 140 is dictated by the input voltage $U_{\Delta\theta}$ of the overheat limiting unit 134 in conformity with the aperiodic law $$T_\theta \frac{dU_\theta}{dt} + U_\theta = U_{\Delta\theta} \quad (233)$$

where $T_\theta$ is the time constant of the permissible dynamic overheating of the induction motor 1.

When $U_\theta < U_{(\Delta\theta)max}$, no voltage is produced at the output of the comparator 140.

Simultaneously, the overheat limiting voltage $U_\theta$ is compared, in the overheat limiting unit 134, with the critical overheat voltage $U_{\Delta g}$. When $U_\theta < U_{\Delta\theta g}$, no voltage is applied to the first input of the unit 141 from the third output of the overheat limiting unit 134.

The critical overheat voltage $U_{\Delta\theta g}$ characterizes the critical level of the overheat temperature $\Delta\theta_g$ of he induction motor 1, at which the electric drive cannot go on operating at the former start-and-stop frequency using the maximum torque $M_{max}$ prescribed by the adaptive torque controller 65 in the control zone II (FIG. 13) with a maximum permissible stator current amplitude $i_{s\,max}$ in order to prevent inadmissible overheating of the induction motor 1.

The critical level of the overheat temperature $\Delta\theta_g$ of the induction motor 1 (FIG. 8) is set, during adjustment of the unit 134, to be below the maximum permissible temperature $\Delta\theta_{max}$ which is dictated by the standard permissible overheat temperature for a specific type of insulation of the induction motor stator.

The critical temperature $\Delta\theta_g$ is given by the following formula:

$$\Delta\theta_g = K_\theta \cdot \Delta\theta_{max}, \qquad (234)$$

where $K_\theta$ is the utilization factor of the induction motor 1, which is dependent on the overheat margin of he induction motor 1 and is selected within a range of $K_\theta \approx 0.75 - 0.9$.

While the actual overheat temperature of the induction motor 1 varies within the range from the critical overheat temperature $\Delta\theta_g$ to the maximum permissible overheat temperature $\Delta\theta_{max}$, the electric drive goes on functioning in one of the four control zones determined by the adaptive phase-vector control processor 120, the maximum torque of the induction motor 1 being restricted in start-stop operations and, consequently, the maximum stator current amplitude $i_{s\,max}$ is also restricted. The electric drive operates in this condition until the actual overheat temperature $\Delta\theta$ of the induction motor 1 reaches the extreme level $\Delta\theta_{r\,max}$ where a thermal interlock voltage is produced at the output of the comparator 140 to be supplied to the thermal interlock output 142 of the temperature adaptation unit 130 in order to interlock the electric drive and bring the rotor speed to zero.

If the actual limiting voltage $U_\theta$ does not reach the maximum value $[U_{(\Delta\theta r)max}]$, the electric drive goes on operating in the mode set by the processor 125.

As soon as the overheatlimiting voltage $U_\theta$ reaches the critical overheat voltage $U_{\theta g}$, a voltage $U_{\Delta M2}$ limiting the maximum torque of the induction motor 1 is delivered from the third output of the overheat limiting unit 134 to the first input of the maximum value determination unit 141.

This maximum torque limiting voltage is compared, in the unit 141, with the maximum torque limiting voltage $U_{\Delta M1}$ supplied to the second input of the unit 141 when the electric drive operates in the control zone III (FIG. 13).

The maximum voltage $U_{\Delta M\,max}$ limiting the maximum torque of he induction motor 1 is produced at the output of the maximum value determination unit 141 (FIG. 18) to be supplied to the torque limiting output 144 of the temperature adaptation unit 130.

The higher the output voltage of the unit 141 the less the maximum torque of the induction motor 1 and the less the maximum stator current amplitude $i_{s\,max}$ and, consequently, the higher the positioning frequency which can be achieved by the electric drive until it reaches some positioning frequency which is restricted by the increasing time of starting and stopping the induction motor 1.

To make the rotor reach its maximum efficiency with the maximum frequency of positioning cycles, the digital code of the actual induction motor overheat temperature is supplied from the output of the analog-to-digital converter 135, via the digital output 145 of the temperature adaptation unit 130, to the digital input of the robot control processor 125.

In the robot teaching mode or when resetting a flexible production system in which this robot operates, the robot control processor 125 is used to program the maximum permissible frequency of positioning cycles for each degree of mobility of the robot equipped with the above induction motor drive.

In this case, the input of the mode setting unit 121, which is connected to the thermal interlock output 142 of the temperature adaptation unit 130, is used to disconnect the adaptive phase-vector control processor 120 from the robot control processor 125 when the induction motor overheat temperature reaches the maximum permissible overheat temperature set for a particular type of insulation of this induction motor 1. When the thermal blocking system operates, the voltage $U_\omega^*$ assigning the desired rotor speed disappears from the output of the mode setting unit 121 and the induction motor 1 is slowed down and kept immobile irrespective of the load moment of he induction motor 1 until the robot control processor 125 generates an emergency condition command.

When the overheat temperature of the induction motor 1 is within the permissible range, no torque limiting voltage is supplied from the output of the torque limitation non-linearity unit 72 via the torque limiting output 146 of the adaptive phase-vector control processor 120 to the torque limiting input 147 in the above described control zones I, II and IV (FIG. 13). The maximum torque limiting voltage $U_{\Delta M2}$ is supplied from the third output of the overheat limiting unit 134 (FIG. 18), via the maximum value determination unit 141, to the torque limiting output 144 of the temperature adaptation unit 130 and, via the torque limiting input 147 of the processor 120, to the torque limiting input of the controlled torque limitation unit 71 of the adaptive torque controller 65.

According to the invention, the above additional interrelated operations are performed to modify the stator current phase and amplitude as functions of the measured temperature of the induction motor overheat by means of the processor 149 comprising the temperature adaptation unit 130. These operations include correction of the synchronous phase of the stator current, which is equal to the rotor flux linkage phase, as a function of the actual rotor resistance determined on the basis of the measured temperature of the induction motor 1 according to the equation (230) and in conformity with the formula:

$$\phi_s = \phi_{so} + \int_o^\infty \left( \omega \frac{2R_{ro}[1 + \alpha(\phi_s - 20°)]}{3Z_p \cdot \psi_{ro}^{*2}} \cdot M^* \right) dt. \qquad (235)$$

In this case, the maximum induction motor torque and acceleration, the maximum stator current amplitude, and dissipation losses are automatically controlled on the basis of the measured overheat temperature of the induction motor 1, when the measured overheat temperature exceeds a specific critical level.

In this manner the electric drive is made adaptive to the environmental conditions, including amobient temperature, and frequency of positioning cycles, duration of start-stop modes, operational hours, and the thermal state of the induction motor. This makes it possible to provide maximum efficiency of a robot or a flexible production system by raising the frequency of positioning cycles, boosting up motor acceleration, improving the accuracy of the servo drive, its reliability, and prolonging the service life of the induction motor by limiting its overheating.

When the robot has many degrees of mobility, up to 6 or even 9, this adaptive phase-vector control with temperature adaptation, provided for each degree of mobility of the robot, can impart these temperature adaptive properties to the bot and, therefore, to a robot-manned complex as a whole. In this way, adaptive optimal control is provided in terms of maximum efficiency and adequate reliability, for robot-manned lines and complexes.

With the assigned maximum lead lifting capacity of the robot and known maximum speed and rate of positioning cycles, which is limited by permissible dynamic load of the robot, this adaptive phase-vector control with temperature adaptation helps minimize the weight and size of the actuator induction motors by making full use of their active parts in all feasible operational conditions. This also results in making robot complexes and flexible production systems more economical and efficient.

The above processor 149 for adaptive phase-vector temperature-adapted control forms a hybrid special-purpose computer featuring both analog and digital components whose combination can be altered in relation to the foregoing operations by expanding the digital portion, particularly for the adaptive torque controller 65, position and speed controllers. The processor 149 for adaptive phase-vector temperature-adapted control can be fully built around microprocessors. The foregoing methods and equations are the basis for configuring a microcontroller for an induction motor drive.

A squirrel-cage induction motor is contactless, cheap, and uncomplicated. These advantages, as contrasted to other known types of electric motors, make its use extremely advisable. In many cases, operational, economic, and technological advantages of inductions motors used in adjustable-speed electric drives are most evident when no transducers connected to the induction motor are employed, if the speed control range, stability of rotation, steady-state and dynamic rigidity of mechanical characteristics, and the speed transmission band are close to those of closed-loop DC and AC electric drives.

This transducer-free induction motor should be preferably used in many main drives of NC machine tools, electric spindles including high-speed electric spindles rated for 20,000 rpm and more, for adjustable drives operating in chemically active zones and in abrasive media, for welding drives, such as semiautomatic and automatic arc-welding machines, and for drives of plasma metal deposition devices, such as plasma generators.

The above-mentioned induction motor drives employ the principle of subordinate speed control, whereby an internal loop for vector control of the induction motor torque is provided, this loop being subordinated to the closed-loop speed control. This makes it obligatory to introduce speed feedback and install a transducer on the shaft of the induction motor. It is for this reason that the above method of induction motor control is based on vector control of the induction motor torque. When invariant control of the inductionmotor is achieved, the problem of accurate rotor speed control is not difficult to realize, as shown above, in a closed-loop speed control system.

In an open-loop speed control system of an induction motor drive, it is technically difficult to provide accurate rotor speed control when the load torque applied to the shaft of the induction motor is arbitrarily assigned or varies unpredictably, including step changes, and this is a common occurrence in almost all applications of an adjustable-speed induction motor drive.

In dynamic conditions of an open-loop induction motor drive, unknown parameters are both the desired induction motor torque M* and the actual torque M of this induction motor. In addition, the dynamic connection of the synchronization frequency (phase) and the frequency (phase) of the orientation state vector $\overline{H}_o$ of the induction motor, e. e.g. the rotor flux linkage vector $\overline{\psi}_r$, becomes hard to define and the principle of control synchronization, set forth above, is difficult to realize because co-phasal and ortho-phasal currents have to be controlled independently.

According to the invention, a control method for an induction motor without a transducer installed on the shaft thereof consists in that the rotor speed is controlled independently of the load moment of the induction motor through synchronization of two-phase current control and two-phase rotor flux linkage control with the synchronization phase signed by a control input proportional to the desired rotor speed and additionally controlled as a function of the measured ortho-phasal current.

Figure 19:
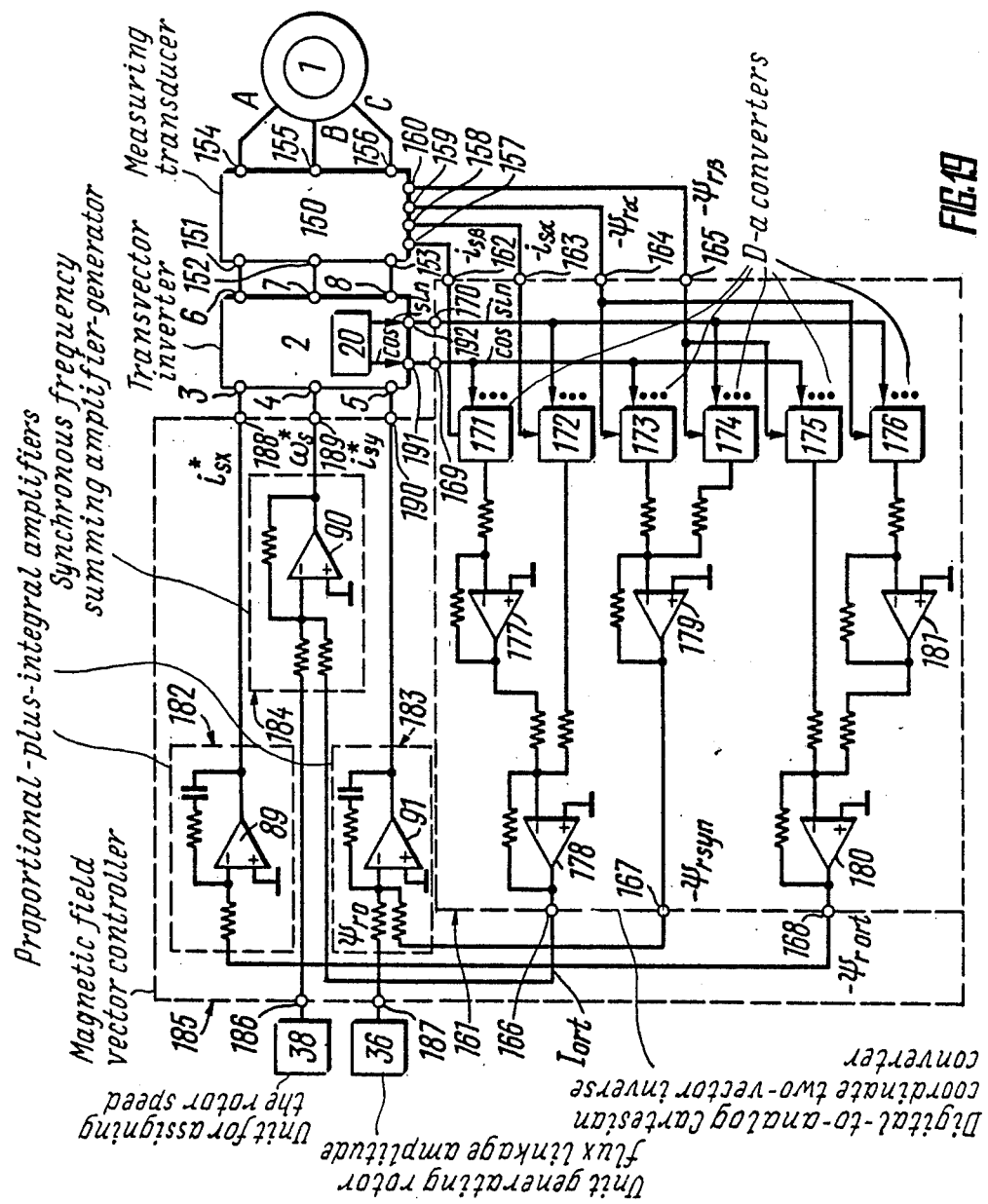
FIG. 19 shows a sensor-less variable-speed induction motor drive having a magnetic field vector controller.

An electric drive realizing this method is shown in FIG. 19 and comprises an induction motor 1 whose stator windings are connected to outputs of a transvector inverter 2 via a measuring transducer 150 whose three power inputs 151, 152, and 153 are connected to three power outputs 6, 7, and 8 of the transvector inverter 2, while power outputs 154, 155, and 156 of the measuring transducer 150 are connected to stator windings of the induction motor 1.

Measuring outputs 157, 158, 159, and 160 of the measuring transducer 150 are connected to a digital-to-analog Cartesian coordinate two-vector inverse converter 161. Two first measuring outputs 157 and 158 of the measuring transducer 150, which constitute two-phase stator current measuring outputs are connected to two first inputs 162 and 163 of the inverse converter 161.

The third and fourth measuring outputs 159 and 160 of the measuring transducer 150, which constitute two-phase rotor flux linkage measuring outputs, are connected to the third and fourth inputs 164 and 165 of the digital-to-analog Cartesian coordinate two-vector inverse converter 161.

The inverse converter 161 comprises three outputs 166, 167, and 168. The output 166 is the output of an ortho-phasal current measuring circuit, the second output 167 is the output of a co-phasal rotor flux linkage measuring circuit, while the third output 168 is the output of an ortho-phasal rotor flux linkage measuring circuit.

The inverse converter 161 also comprises two digital inputs 169 and 170 which are, respectively, the measurement synchronization sine input 169 and the measurement synchronization cosine input 170, which are connected to digital inputs of six digital-to-analog converters 171, 172, 173, 174, 175, and 176 of the digital-to-analog Cartesian coordinate two-vector inverse converter 161.

The sine digital synchronizing input 169 is connected to digital inputs of the first, third, and fifth digital-to-analog converters 171, 173, and 175, while the cosine digital synchronizing input 170 is connected to digital inputs of the second, fourth, and sixth digital-to-analog converters 172, 174, and 176.

The analog inputs of the first and second digital-to-analog converters 171 and 172 are connected, respectively, to the first and second inputs 162 and 163 of the inverse converter 161.

The joint analog inputs of the third and sixth digital-to-analog converters 173 adn 176 are connected to the third input 164 of the inverse converter 161.

The joint analog inputs of the fourth and fifth digital-to-analog converters 174 and 175 are connected to the fourth input 165 of the inverse converter 161.

The output of the first digital-to-analog converter 171 is connected, via an inverting amplifier 177, to an input of a first summing amplifier 178. The output of the second digital-to-analog converter 172 is directly connected to another input of the first summing amplifier 178 whose output is the output 166 of the ortho-phasal current measuring circuit.

The outputs of the third and fourth digital-to-analog converters 173 and 174 are connected to two inputs of a second summing amplifier 179 whose output constitutes the output 167 of the co-phasal rotor flux linkage measuring circuit of the inverse converter 161.

The output of the fifth digital-to-analog converter 175 is directly connected to an input of a third summing amplifier 180, while the output of the sixth digital-to-analog converter 176 is connected to another input of this third summing amplifier via an inverting amplifier 181. The output of the third summing amplifier 180 is the output 168 of the ortho-phasal rotor flux linkage measuring circuit of the digital-to-analog Cartesian coordinate two-vectorinverse converter 161, which is connected to the input of a first proportional-plus-integral controller 182 which is a floating controller of the ortho-phasal rotor flux linkage.

The output 167 of the co-phasal rotor flux linkage measuring circuit is connected to a first input of a second proportional-plus-integral controller 183 which is a floating controller of the co-phasal rotor flux linkage.

The output 166 of the ortho-phasal current measuring circuit is connected to a first input of a synchronous frequency summing amplifier-generator 184.

The combination of the digital-to-analog Cartesian coordinate tw-vector inverse converter 161, the integral-action controller 182 of the ortho-phasal rotor flux linkage, the integral-action controller 183 of the co-phasal rotor flux linkage, and the synchronous frequency amplifier 184 is a vector magnetic field controller 185 featuring four measuring inputs 162, 163, 164, and 165, two control inputs 186 and 187, and three outputs 188, 189, and 190.

The first control input 186 of the magnetic field vector controller 185 is connected to the second input of the summing synchronous frequency amplifier 184 and to the output of the rotor speed setting unit 38.

The second control input 187 of the magnetic field vector controller 185, which is coupled to the second input of the integral-action controller 183 of the co-phasal rotor flux linkage, is connected to the output of the unit 36 assigning the rotor flux linkage amplitude.

The output of the integral-action controller 182 of the ortho-phasal rotor flux linkage, which is the ortho-phasal output 188 of the magnetic field vector controller 185, is connected to the ortho-phasal input 3 of the transvector inverter 2.

The output of the summing synchronous frequency amplifier 184, which is the frequency output 189 of the magnetic field vector controller 185, is connected to the frequency input 4 of the transvector inverter 2.

The output of the proportional-plus-integral controller 183 of the co-phasal rotor flux linkage, which is the co-phasal output 190 of the magnetic field vector controller 185, is connected to the co-phasal input 5 of the transvector inverter 2.

The digital inputs 169 and 170 of the digital-to-analog Cartesian coordinate two-vector inverse converter 161, which form digital inputs of the magnetic field controller 185, are connected to digital outputs 191 and 192 of the transvector inverter 2, which are the digital cosine and sine outputs of the unit 20 for transvector generation of desired instantaneous phase currents.

The digital output 191 of the transvector inverter 2 is the digital cosine output, while the digital output 192 is the digital sine output of said transvector inverter 2, which are connected, respectively, to the digital cosine input 169 and the digital sine input 170 of the magnetic field vector controller 185.

The transvector inverter 2 has its output connected to a power inverter 12 (FIG. 20) featuring six power switches 193, 194, 195, 196, 197, and 198 (FIG. 20) joined in a three-phase bridge circuit.

Midpoints a, b, and c of each branch of the power inverter 12, composed of two series-connected power switches 193 and 194, 195 and 196, 197 and 198, are connected, respectively, to phase current transducers 199, 200, and 201 of the power inverter 12.

Figure 20:
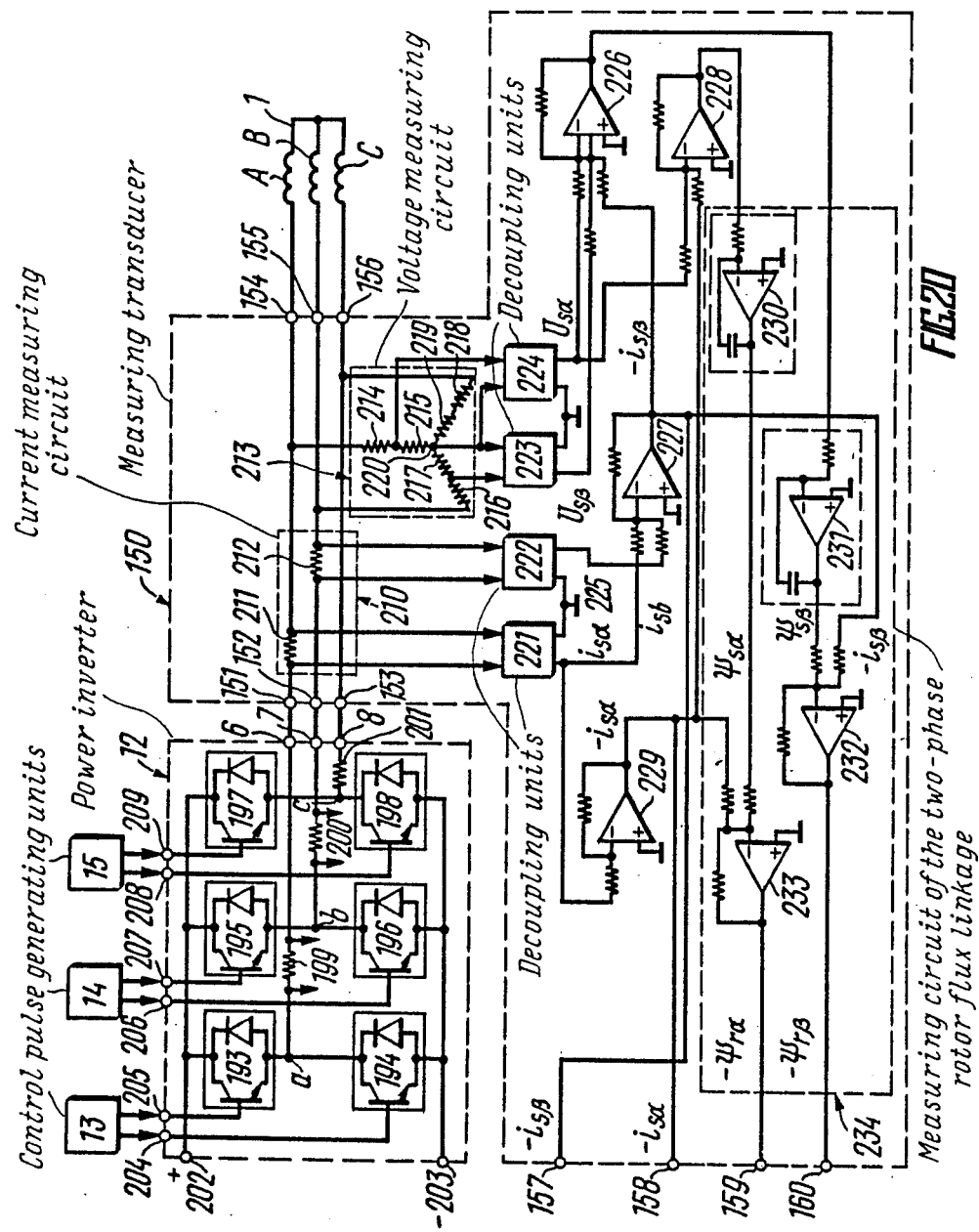

Two power inputs 202 and 203 of the power inverter 12 are connected to a constant voltage source (not shown in FIG. 20).

Six control inputs 204, 205, 206, 207, 208, and 209 of the power inverter 12, which are coupled with the control inputs of respective power switches 193, 194, 195, 196, 197, and 198 of the power inverter 12, are connected, in pairs, to outputs of three control pulse generating units 13, 14, and 15 of the transvector inverter 2.

The power output 6 of the power inverter 12, which is connected via the phase current transducer 199 of the power inverter 12 to the common node of the power switches 193 and 194 of the phase "a" of the power inverter 12, is coupled to the first input 151 of the measuring transducer 150.

Two other power outputs 7 and 8 of the power inverter 12, which are coupled via the respective phase current transducers 200 and 201 to respective common nodes of the power switches 195 and 196, 197 and 198, are connected, respectively, to the second and third power inputs 152 and 153 of the measuring transducer 150.

The measuring transducer 150 also comprises a current measuring circuit 210 made up of two phase current transducers 211 and 212 and a voltage measuring circuit 213 made up of three pairs of series-connected resistors 214 and 215, 216 and 217, 218 and 219 which are joined in a "double star" circuit featuring a zero point 220.

The phase current transducer 211 of the current measuring circuit 210 of the measuring transducer 150 is inserted between the first power input 151 and the first power output 154.

The first power output 154 of the measuring transducer 150, to which the resistor 214 of be voltage measuring circuit 213 is connected, is coupled to the stator phase winding "A" of the induction motor 1 whose stator phase windings are connected in a star circuit.

The second phase current transducer 212 of the current measuring circuit 210 is inserted between the second power input 152 and the second power output 155 of the measuring transducer 150.

The second power output 155 of the measuring transducer 150, which is coupled with the resistor 216 of the voltage measuring circuit 213, is connected to the phase winding "B" of the induction motor stator.

The power input 153 and power output 156 of the measuring transducer 150 are joint together and connected to the resistor 218 of the voltage measuring circuit 213 and to the phase winding "C" of the induction motor stator.

The output terminals of three other resistors 215, and 219 of the voltage measuring circuit 213 are joined together to form the midpoint 220.

The outputs of the phase current transducers 211 and 213 of the current measuring circuit 210 are connected to inputs of respective first and second decoupling units 221 and 222. The output of the resistor 216 is joined with the input of the resistor 217 of the voltage measuring circuit 213 and connected to the first input of a third decoupling unit 223.

The output of the resistor 214 is joined with the input of the resistor 215 of the voltage measuring circuit 213 and connected to the first input of a fourth decoupling unit 224.

The midpoint 220 of the voltage measuring circuit 213 is connected to the joint second inputs of the third and fourth decoupling units 223 and 224.

The first outputs of the four decoupling units 221, 222, 223, and 224 are joined together to form a zero bus 225 of the transducer 150.

The second outputs of the third and fourth decoupling units 223 and 224 are connected to inputs of a first adder 226 of the measuring transducer 150. The third input of the first adder 226 is connected to an output of a second adder 227 whose inputs are connected to the second outputs the first and second decoupling units 221 and 222.

The second output of the fourth decoupling unit 224 is connected to a first input of a third adder 228 whose second input is connected, via an inverting amplifier 229, to the second output of the first decoupling unit 221.

The output of the third adder 228 is connected to an input of a first integrator 230, while the output of the first adder 226 is connected to an input of a second integrator 231 whose output is connected to the first input of a fourth adder 232. The second input of the fourth adder 232 is connected to the output of the second adder 227.

The output of the first integrator 230 is connected to a first input of a fifth adder 233 whose second input is joined with the second input of the third adder 228 and connected to the output of the inverting amplifier 229.

The output of the second adder 227 is the first measuring output 157 of the measuring transducer 150, which is the first output for measuring the stator two-phase current.

The output of the inverting amplifier 229 is the second measuring output 158 of the measuring transducer 150, which is a second output for measuring the two-phase stator current.

The combination of the first and second integrators 230 and 231, the fourth and fifth adders 232 and 233 forms a measuring circuit 234 for the two-phase rotor flux linkage. The outputs 159 and 160 of this measuring circuit 234 are the outputs of the fifth and fourth adders 233 and 232, respectively.

The output of the fourth adder 232 is connected to the fourth measuring output 160 of the measuring transducer 150, which is the second output for measuring the two-phase rotor flux linkage.

The induction motor 1, transvector inverter 2, the rotor speed setting unit 38, and the unit 36 for assigning the amplitude of the rotor flux linkage can be made as bescribed above for the electric drive of FIG. 6.

The digital-to-analog converters 171–176 (FIG. 19) can employ conventional integrated microcircuits as described above for the electric drive of FIG. 16.

Inverting and summing amplifiers 177–181 (FIG. 19), proportional-plus-integral controllers 182 and 183 (integral-action controllers), the summing amplifier-synchronous frequency generator 184, the inverting amplifier 229 (FIG. 20), adders 226, 227, 228, 232, 233, and integrators 230 and 231 can employ conventional integrated operational amplifiers (cf., for example, B. K. Nesterenko, Integrated Operational Amplifiers, Reference book, Moscow, Energia Publ., in Russian 1982, p. 107).

Power switches 193–198 can also use known circuits (cf., for example, U.S. Pat. No. 4,384,244, May 15, 1983)

Phase current transducers 199, 200, 201, 211, 212 and decoupling units 221–224 can employ conventional arrangements (cf., for example, F. Fröhr, F. Orttenburger, Basic Units of Adjustable DC Drive, Translated from German, Moscow, Energia Publ., 1977, pp. 143–149).

The electric drive shown in FIGS. 19 and 20 operates as follows.

Instantaneous phase currents are produced in the stator winding of the induction motor 1 (FIG. 19) by means of the transvector inverter 2. The phase, frequency, and amplitude of the instantaneous phase currents are controlled as functions of the control inputs applied to the ortho-phasal input 3, the frequency input 4, and the co-phasal input 5 of the transvector inverter 2 as described for the electric drive shown in FIG. 4.

The measuring transducer 140 (FIG. 19) coupled to the outputs 6, 7, and 8 of the transvector inverter 2 measures the actual instantaneous stator phase currents $i_{sa}$ and $i_{sb}$ and actual instantaneous stator phase voltages $U_{sa}$ and $U_{sb}$ of the induction motor 1. Inverted signals $-i_s$ and $-i_s$ of the measured two-phase stator current are generated at the measuring outputs 157 and 158 of the measuring transducer 150. They are characterized by two currents shifted by 90 electrical degrees, one current $i_s$ being equal to the measured instantaneous phase current $i_{sa}$ in the reference stator phase winding "A" of the induction motor 1:

$$i_{s\alpha} = i_{sa}, \qquad (236)$$

while the other current $i_{s\beta}$ is measured as a sum of two measured instantaneous phase currents in accordance with the expression:

$$i_{s\beta} = \frac{1}{\sqrt{3}} \cdot i_{sa} + \frac{2}{\sqrt{3}} \cdot i_{sb}. \qquad (237)$$

The two-phase stator currents $i_{s\alpha}$ and $i_{s\beta}$ of the induction motor 1 are actual values of two projections of the stator current vector $\bar{i}_s$ (FIG. 1) ontoo the axes $\alpha$ and $\beta$ of the stationary Cartesian system of coordinates, which is rigidly oriented by the axis $\alpha$ along the axis "a" of the reference stator phase winding "A" of the induction motor 1 (FIG. 19).

Inverse vector conversion of the measured two-phase stator current $i_{s\alpha}$ and $i_{s\beta}$ into the measured stator orthophasal current $I_{ort}$ is performed in the digital-to-analog two-vector Cartesian coordinate inverse converter 161.

Simultaneously, the two-phase voltage $U_{s\alpha}$ and $U_{s\beta}$ of the induction motor stator is measured in the measuring transducer 150 according to the expressions:

$$U_{s\alpha} = U_{sa}, \qquad (238)$$

$$U_{s\beta} = \frac{1}{\sqrt{3}} U_{sa} + \frac{2}{\sqrt{3}} U_{sb}, \qquad (239)$$

where $U_{sa}$ and $U_{sb}$ are measured instantaneous phase voltages in the reference chase winding "A" and phase winding "B" of the induction motor stator.

According to the vector diagram of FIG. 1, the two-phase stator voltage $U_{s\alpha}$ and $U_{s\beta}$ is characterized by two projections of the voltage vector $\bar{U}_s$ onto the axes $\alpha$ and $\beta$ of the stationary Cartesian system of coordinates, oriented by the axis $\alpha$ along the axis "a" of the reference phase winding "A" of the induction motor stator.

Signals of the measured two-phase rotor flux linkage $\psi_{r\alpha}$ and $\psi_{r\beta}$ are produced in conformity with the equation (19) in the measuring transducer 150 (FIG. 19) according to the following expressions:

$$\psi_{r\alpha} = \left[ \frac{L_r}{L_m} \int_0^{t_1} (U_{s\alpha} - R_s \cdot i_{s\alpha}) dt \right] - \qquad (240)$$

$$\left( \frac{\delta \cdot L_s \cdot L_r}{L_m} \right) \cdot i_{s\alpha}$$

$$\psi_{r\beta} = \left[ \frac{L_r}{L_m} \int_0^{t_1} (U_{s\beta} - R_s \cdot i_{s\beta}) dt \right] - \qquad (241)$$

$$\left( \frac{\delta \cdot L_s \cdot L_r}{L_m} \right) \cdot i_{s\beta}$$

where $t_1$ is the time from the initial to the actual moment of measurement;

$$\delta = 1 - \frac{L_m^2}{L_s \cdot L_r}$$

$R_s$ is the resulting dissipation coefficient of the induction motor 1; and $R_s$ is the stator resistance.

Signals of the measured two-phase rotor flux linkage $\psi_{r\alpha}$, $\psi_{r\beta}$ characterize projections of the rotor flux linkage vector $\bar{\psi}_r$ (FIG. 1) in the stationary Cartesian system of coordinates $\alpha$, $\beta$, which is oriented by the axis $\alpha$ along the axis "a" of the reference stator phase winding "A" of the induction motor 1.

Inverted signals of the measured two-phase current $i_{s\beta}$ and $i_{s\alpha}$ and the measured two-phase rotor flux linkage $-\psi_{r\alpha}$ and $-\psi_{r\beta}$ are supplied from respective measuring outputs 157, 158, 159, and 160 (FIG. 19) of the measuring transducer 150 to the first four respective inputs 162, 163, 164, and 165 of the digital-to-analog two-vector Cartesian coordinate inverse converter 161 whose outputs 166, 167, and 168 are, respectively, the measured stator current amplitude $I_{ort}$ (output 166), the measured co-phasal rotor flux linkage $\psi_{r\,syn}$ (output 167), and the measured ortho-phasal rotor flux linkage $\psi_{r\,ort}$ (output 168), which are synchronized by the synchronization phase $\phi^*_s$ whose cosine function $\cos \phi^*_s$ and sine function $\sin \phi^*_s$ are formed by digital signals fed, respectively, to the digital inputs 169 and 170 of the d/a two-vector inverse converter 161 of Cartesian coordinates.

Using six d/a converters 171, 172, 173, 174, 175, and 176, three summing and two inverting amplifiers 177, 178, 179, 180, and 181, the d/a two-vector Cartesian coordinate inverse converter 161 synchronizes measurements of the two-phase stator current $i_{s\alpha}$, $i_{s\beta}$ and two-phase rotor flux linkage $\psi_{r\alpha}$, $\psi_{r\beta}$ by means of the synchronization phase $\phi^*_s$ in accordance with the equations:

$$I_{ort} = i_{s\beta} \cdot \cos \phi^*_s - i_{s\alpha} \cdot \sin \phi^*_s, \qquad (242)$$

$$\psi_{r\,ort} = \psi_{r\beta} \cdot \cos \phi^*_s - \psi_{r\alpha} \cdot \sin \phi^*_s, \qquad (243)$$

$$\psi_{r\,syn} = \psi_{r\beta} \cdot \sin \phi^*_s + \psi_{r\alpha} \cdot \cos \phi^*_s. \qquad (244)$$

The digital-to-analog converters 171 invert input analog signals, which is taken into account by the circuits of the summing and inverting amplifiers 177–180.

The equation (242) realized by the first and second digital-to-analog converters 171 and 172, the first inverting amplifier 177, and the first summing amplifier 178 of the inverse converter 161 effectively corresponds to the equation of vector conversion of coordinates $i_{s\alpha}$ and $i_{s\beta}$ of the stator current vector $\bar{i}_s$ from the stationary Cartesian system of coordinates $\alpha$, $\beta$ (FIG. 1) into the orthogonal projection $i_{sx}$ of the rotating Cartesian system of coordinates Y-X onto the axis "X" orthogonal to the axis "Y" to which the angle of the synchronization phase $\phi_s$ is referred to.

A signal of the measured ortho-phasal current amplitude $I_{ort}$ determined by the equation (242) is produced at the output 166 (FIG. 19) of the inverse converter 161.

The equations (243) and (244) realized by the third, fourth, fifth, and sixth d/a converters 173, 174, 175, and 176, two summing amplifiers 179 and 180, and inverting amplifier 181 correspond to the equations of vector conversion of the rotor flux linkage vector $\bar{\psi}_r$ from the stationary Cartesian system of coordinates $\alpha$, $\beta$ (FIG. 1) into the rotating Cartesian system of coordinates Y-X, which forms, by the axis "Y" and axis "$\alpha$" the angle $\phi^*_s$ of the synchronization phase.

Since the summing amplifiers 179 and 180 (FIG. 19) invert the sum of their input signals, an inverted signal of the measured co-phasal rotor flux linkage $(-\psi_{r\,syn})$ is produced at the output 167 of the co-phasal rotor flux linkage measuring circuit of the inverse converter 161, while an inverted signal of the measured ortho-phasal rotor flux linkage $(-\psi_{r\,ort})$ is produced at the output 168 of the ortho-phasal rotor flux linkage measuring circuit.

In order to satisfy the synchronization condition $\phi^*_s = \phi_s$ where $\phi_s$ is the synchronous phase of the rotor flux linkage in relation to the rotor of the induction motor 1, the projection of the actual vector $\psi_r$ of the rotor flux linkage onto the orthogonal axis "X" (FIG. 1) should be equal to zero in all operational modes of the induction motor 1:

$$\psi_{rx} = \psi_{r\,opt} = 0. \tag{245}$$

When the synchronization condition $\phi^*_s = \phi_s$ is complied with according to the identity (245), the vector $\overline{\psi}_r$ of the rotor flux linkage contstanty coincides in direction with the axis "Y" of the Cartesian system of coordinates Y-X rotating about the stationary axis $\alpha$ (axis "a" of the reference stator phase winding "A" of the induction motor 1 (FIG. 19) at a synchronization frequency $\omega^*_s$.

The inverted signal $-\psi_{r\,ort}$ of the measured ortho-phasal rotor flux linkage is supplied from the output 168 of the inverse converter 161 to the input of the first proportional-plus-integral amplifier 182 (integral-action controller of the rotor ortho-phasal flux linkage).

Since no signal is applied to the second control input of the first proportional-plus-integral controller 182, the rotor ortho-phasal flux linkage is controlled astatically with respect to the desired amplitude $\psi_{r\,ort}$ of the ortho-phasal rotor flux linkage, which is identically equal to zero:

$$\psi^*_{r\,ort} = 0. \tag{246}$$

Since the steady-state error is equal to zero during integral-action control:

$$\psi^*_{r\,ort} - \psi_{r\,ort} = 0, \tag{247}$$

the measured ortho-phasal rotor flux linkage is brought to the zero level in conformity with the equations (246) and (247) by the proportional-plus-integral controller 182, and the synchronization condition $\phi^*_s = \phi_s$ is complied with according to the equation (245).

According to the vector diagram of FIG. 1, equalization to zero of the projection $\psi_{rx}$ of the rotor flux vector $\overline{\psi}_r$ onto the orthogonal axis "X" of the Cartesian system of coordinates Y-X is in fact coersive orientation of the axis "Y" of the Cartesian system of coordinates Y-X by the vector $\overline{\psi}_r$ of the rotor flux linkage in accordance with the equations (25).

The negative feedback signal $-\psi_{r\,syn}$ of the rotor co-phasal flux linkage is supplied from the output 167 of the co-phasal rotor flux linkage measuring circuit of the inverse converter 161 to the feedback input of the second proportional-plus-integral controller 183 (integral-action controller of the rotor co-phasal flux linkage).

Simultaneously, the ortho-phasal current positive feedback signal is supplied from the output 166 of the ortho-phasal current measuring circuit of the inverse converter 161 to the first input of the summing amplifier 184. This feedback signal is controlled, if the rotor flux linkage amplitude $\psi_r = \psi_{ro}$ is constant, as a function of the rotor flux linkage slip $\Delta\omega$ relative to the rotor according to the equations (26), (28), and (29) in conformity with the following formula:

$$\Delta\omega = \frac{R_r}{L_r} \cdot \frac{L_m}{\psi_{ro}} \cdot I_{ort}. \tag{248}$$

The summing amplifier 184, generator of the synchronous frequency, produces synchronization frequency $\omega^*_s$ of the magnatic field vector controller 185, which is equal to the desired frequency of the rotor flux linkage by adding the signal $\Delta\omega$ proportional, according to the formula (248), to the measured ortho-phasal current amplitude $I_{ort}$ to the signal of the desired rotor speed $\omega^*$, which is delivered to the second control input 186 of the magnetic field vector controller 185 from the output of the rotor speed setting unit 38.

A constant signal assigning the desired amplitude $\psi^*_{ro}$ of the rotor flux linkage is supplied from the output of the unit 36 assigning the rotor flux linkage amplitude to the third control input 187 of the magnetic field vector controller 185, which is the second input of the proportional-plus-integral controller 183 of the rotor co-phasal flux linkage.

Signals produced at the outputs 188, 189, and 190 of the magnetic field vector controler 185 are to assign the stator current vector $\bar{i}_s$ in the Cartesian coordinates X-Y oriented by the axis "Y" in relation to the rotor flux linkage vector $\overline{\psi}_r$ with some dynamic angular error $\Delta\phi$ with respect to the actual angular position of the synchronous phase $\phi_s$ of the rotor flux linkage vector $\overline{\psi}_r$.

The dynamic angular error $\Delta\phi$ of the magnetic field vector controller 185 occurs due to the disturbance upset introduced by the load of the induction motor 1 or when the signal $\omega^*$ assigning the rotor speed is applied to the control input 186. The signal assigning the synchronization frequency $\omega^*_s$ is supplied from the frequency output 189 of the magnetic field vector controller 185 to the frequency input 4 of the transvector inverter 2 and converted into the synchronization phase $\phi^*_s$ equal to $$\phi_s^* = \phi_{so}^* + \int_0^\infty \left( \omega^* + \frac{R_r}{L_p} \cdot \frac{L_m}{\psi_{ro}} \cdot I_{ort} \right) dt. \tag{249}$$

The digital code $\cos\phi^*_s$ of the cosine function of the synchronization phase $\phi^*_s$ is supplied from the digital output of the unit 20 for transvector generation of desired instantaneous phase currents of the transvector inverter 2 to the digital output 191 of the same transvector inverter 2, while the digital code $\sin\phi^*_s$ of the sine function of the synchronization phase $\phi^*_s$ is supplied to the digital output 192. These digital codes are delivered, respectively, to the inputs 169 and 170 of the magnetic field vector controller 185 and are used for vector conversion of the two measured vectors: the stator current vector $\bar{i}_s$ and the rotor flux linkage vector $\overline{\psi}_r$.

Initially, with t=0, the stator current phase $\epsilon_{so}$ is constant and equal to the initial synchronization phase $\phi^*_{so}$.

The axis "Y" (FIG. 1) of the Cartesian system of coordinates Y-X makes the initial angle $\epsilon_{so} = = \phi^*_{so}$ with the axis "$\alpha$" of the stationary Cartesian system of coordinates $\alpha$-$\beta$In this case, no signal is applied to the ortho-phasal input 3 (FIG. 19) of the transvector inverter 2, constant phase currents $i_{sa}$, $i_{sb}$, $i_{sc}$ of the induction motor stator are dependent on the constant cophasal current amplitude $I_{syn}$ which is produce by the constant signal $i^*_{syo}$ on the co-phasal input 5 of the transvector inverter 2.

This initial condition corresponds to the vector $\bar{i}_s$ of the stator current being oriented according to the axis "Y" (FIG. 1) of the Cartesian system of coordinates Y-X for which the differential equations (22) and (23) have the following form:

$$\frac{L_r}{R_r} \cdot \frac{d\psi_{ry}}{dt} + \psi_{ry} = \frac{L_r}{R_r} \cdot \Delta\omega_{is} \cdot \psi_{rx} + L_m \cdot i_s, \quad (250)$$

$$\frac{L_r}{R_r} \cdot \frac{d\psi_{rx}}{dt} + \psi_{rx} = \frac{L_r}{R_r} \cdot \Delta\omega_{is} \cdot \psi_{ry}, \quad (251)$$

where $i_s$ is the magnitude of the stator current vector, which initially, when t=0, is equal to $i^*_{syo}==I_{syn}$;

$$\Delta\omega_{is} = \frac{d\epsilon_r}{dt}$$

is the slip of the stator current vector relative to the rotor;

$\epsilon_r$ is the phase angle of the stator current, relative to the rotor axis;

$\psi_{ry}$ is the projection of the rotor flux linkage vector onto the stator current vector axis;

$\psi_{rx}$ is the projection of the rotor flux linkage vector onto an axis orthogonal to the stator current vector.

When an active load moment is applied to the shaft of the induction motor 1, the rotor is angularly displaced (as axis $\overline{R}$ indicates in FIG. 1) in the direction of the applied active load moment. The axis $\overline{R}$ moves clockwise, the angle $\epsilon_r$ increases, and the derivative $$\frac{d\epsilon_r}{dt} = \Delta\omega_{is}$$

is positive.

Since initially the original rotor flux linkage vector $\overline{\psi}_{ro}$ coincides with the stator current vector $\bar{i}_s$, when t=0, $\psi_{rx}=0$ and $\psi_{ry}=\psi_{ro}$. The positive stator current slip $\Delta\omega_{is}$ relative to the rotor, when $\psi_{ry}=\psi_{ro}$ is positive conformably to the equation (251), results in appearance of a negative projection $-\psi_{rx}$ of the rotor flux linkage vector, which is orthogonal relative to the stator current vector $\bar{i}_s$ and starts growing in the negative direction of the axis "X" according to the aperiodic law with a time constant $$T_r = \frac{L_r}{R_r}.$$

This leads to the decrease of the positive projection $\psi_{ry}$ of the rotor flux linkage vector $\overline{\psi}_r$ in conformity with the equation (250) and to reduction of the rate of change of the projection $-\psi_{rx}$ according to equation (251).

Decreasing projection $\psi_{ry}$ of the rotor flux linkage vector $\psi_r$ results in reduction of the nagative signal $-\psi_{r\,syn}$ at the output 166 of the co-phasal rotor flux linkage measuring circuit (FIG. 19). A positive error signal indicating the difference between the input signals of the proportional-plus-integral controller 183 is produced. This causes the stator current amplitude $i_s > i_{so}$ to grow along the axis "Y" of the initial direction of the stator current vector $\bar{i}_s$ until the measured co-phasal rotor flux linkage reaches the constant rotor flux linkage amplitude $\psi_{ro}$.

Simultaneously, generation of the positive signal $-(-\psi_{r\,syn})$ of the negative feedback at the output 167 of the ortho-phasal rotor flux linkage measuring circuit results in generation of positive ortho-phasal current $I_{ort}$ due to the step and further increase of the output signal $i^*_{sx}$ of the proportional-plus-integral controller 182. As follows from the vector diagram of FIG. 1, the positive orthogonal projection $i_{sx}$ onto the axis "X" of the Cartesian system of coordinates Y-X means that the phase of the stator current vector $\bar{i}_s$ is shifted in the positive direction (counterclockwise).

This phase shift of the stator current vector $\bar{i}_s$ produces torque M of the induction motor 1, which acts in the opposite direction with respect to the active load moment applied to the shaft of the induction motor 1 (FIG. 19).

Simultaneously, the phase shift of the stator current vector $\bar{i}_s$ in the positive direction in relation to the original position of the axis "Y, which had been assigned by the initial synchronization phase $\phi^*_{so}$, results in that the signal $I_{ort}$ is generated at the output 166 of the ortho-phasal current measuring circuit and the signal assigning the synchronization frequency $\omega^*_s$ is generated at the output of the summing amplifier 184, which is the synchronous frequency generator.

According to the equation (249), this leads to displacement of the synchronization $\phi^*_s$ in the positive direction and to synchronization of the change of the angular position $\phi^*_s$ of the synchronization axis "Y" relative to the angular motion of the rotor flux linkage vector $\overline{\psi}_r$, while the desired angle $\epsilon_\psi$ of the phase shift of the stator current relative to the rotor flux linkage is maintained.

This process of producing and maintaining the torque of the induction motor 1, which opposes the active load moment, ensures that the speedtorque characteristics induction motor 1 are rigid and linear. In fact they are close to those of a closed-loop speed-adjustable asynchronous electric drive where integral-action speed control is employed. This is achieved by the above automatic process of reorientation of the Cartesian system of coordinates Y-X from the position where the axis "Y" is referred to the stator current vector $\bar{i}_s\,(\overline{H}_{01}=\bar{i}_s)$ to the position where the axis "Y" is referred to the rotor flux linkage vector $\overline{\psi}_r\,(\overline{H}_{02}=\overline{\psi}_r)$. This reorientation is performed by means of the magnetic field vector controller 185 which modifies the synchronization phase $\phi^*_s$ to reach the synchronous phase $\phi_s$ of the rotor flux linkage and employs integral-action control to bring the ortho-phasal rotor flux linkage to zero $\psi_{r\,ort}=\psi_{rx}=0$.

In steady-state conditions, when the induction motor torque M is equal to the constant load moment M, the instantaneous phase current $i_{sa}$ in the reference stator phase winding "A" of the induction motor 1 is controlled in conformity with the law:

$$i_{sa}(t) = \frac{\psi_{ro}^*}{L_m} \cdot \quad (252)$$

$$\cos\left[\phi_{so}^* + \int_0^\infty \left(\omega^* + \frac{R_r \cdot L_m}{L_r \cdot \psi_{ro}^*} \cdot I_{ort}\right) dt\right] -$$

$$I_{ort} \cdot \sin\left[\phi_{so}^* + \int_0^\infty \left(\omega^* + \frac{R_r \cdot L_m}{L_r \cdot \psi_{ro}^*} \cdot I_{ort}\right) dt\right],$$

where $I_{ort}$ is the measured ortho-phasal current determined according to the formula (242)

$\psi^*_{ro}$ is the constant desired amplitude of the rotor flux linkage;

$\omega^*$ is the desired speed of the rotor.

When the control input assigning the rotor speed $\omega^*$ at the control input 186 of the magnetic field vector controller 185 is modified, there is produced a dynamic angular error $\Delta\phi$ of the synchronization phase $\phi^*_s$ relative to the synchronous phase $\phi_s$ of the rotor flux linkage, which is given by the equation: $\Delta\phi = \phi_s - \phi^*_s$, where $\Delta\phi$ is the dynamic angular error in the synchronization phase;

$\phi^*_s$ is the synchronization phase expressed by the actual angle of the synchronization axis "Y" in relation to the stationary stator axis "$\alpha$".

As the rotor flux linkage vector $\bar{\psi}_r$ is shifted to an angle $\Delta\phi$ with respect to the synchronization axis "Y", a signal $\psi_{r\,ort}$ of the ortho-phasal rotor flux linkage is generated at the output 168 of the rotor ortho-phasal flux linkage measuring circuit and compared with the zero level of the ortho-phasal rotor flux linkage at the output of the integral-action controller 182 of the rotor ortho-phasal flux linkage. This results in a signal $i^*_{sx}$ assigning the ortho-phasal current $I_{ort}$ is generated and starts growing. The signal of the measured ortho-phasal current amplitude $I_{ort}$ at the output 166 of the ortho-phasal current measuring circuit is also generated and starts growing. The signal $\omega^*_s$ assigning the synchronous frequency of the stator current at the frequency input 4 of the transvector inverter 2 is modified.

The above process of control synchronization is made stable by acting on the angular motion of the stator current vector in relation to the synchronization phase in opposite directions by two controllers 182 and 183. This results in coersive orientation of the axis "Y" by the rotor flux linkage vector $\bar{\psi}_r$. The angular position of the synchronization axis "Y" coinciding with the rotor flux linkage vector $\bar{\psi}_r$ is assigned via a control channel by the synchronization frequency $\omega^*_s$ applied to the frequency input 4 of the transvector inverter 2.

In case of disturbances introduced by control inputs or load, coersive synchronization of control and measurement of the stator current vector $\bar{i}_s$ in relation to the rotor flux linkage vector $\bar{\psi}_r$ is performed as follows.

The measured two-phase rotor flux linkage is given by the equations:

$$\psi_{r\alpha} = \psi_r \cos\phi_s \quad (253)$$

$$\psi_{r\beta} = \psi_r \sin\phi_s \quad (254)$$

where $\phi_s$ is the phase of the actual rotor flux linkage;

$\psi_r$ is the amplitude of the actual rotor flux linkage.

The measured two-phase flux linkage of the rotor has its ortho-phasal current amplitude $I_{ort}$ affect the control channel so that the ortho-phasal rotor flux linkage measured in accordance with the equation (243) is brought to the zero level $\psi_{r\,ort} = 0$ where the following equality is complied with:

$$\psi_{r\beta} \cdot \cos\phi^*_s = \psi_{r\alpha} \sin\phi^*_s, \quad (255)$$

where $\phi^*_s$ is the actual synchronization phase assigned by the input signal $\delta^*$ assigning the desired rotor speed.

According to the equations (253), (254), and (255), while the ortho-phasal rotor flux linkage is being brought to the zero level, the following equality is complied with:

$$\psi_r \sin\phi_s \cos\phi^*_s - \psi_r \cos\phi_s \sin\phi^*_s = 0 \quad (256)$$

From the equality (256) it follows:

$$\psi_r \sin(\phi_s - \phi^*_s) = 0 \quad (257)$$

This equality is complied with when the actual synchronization phase $\phi^*_s$ is equal to the synchronous phase $\phi_s$ of the actual rotor flux linkage.

The equations (255) and (257) characterize the process of coersive automatic orientation of the stator current vector according to the rotor flux linkage vector in response modifications of the signal $\omega^*$ assigning the rotor speed when the load moment varies. The result is vector control of the magnetic field, wherein the angular position and the magnitude of the rotor flux linkage vector are automatically controlled, and, ultimately, invariant control of the induction motor torque in proportion to the torque-producing component $i_{sx}$ of the stator current amplitude, assigned by the steady-state amplitude $I_{ort}$ of the ortho-phasal current.

The ortho-phasal current amplitude $I_{ort}$, the ortho-phasal and co-phasal rotor flux linkages $\psi_{r\,ort}$ and $\psi_{r\,syn}$ are measured by synchronizing measurements of the values $I_{ort}$, $\psi_{r\,ort}$, and $\psi_{r\,syn}$ by the control synchronization phase $\phi^*_s$ assigned by the rotor speed $\delta^*$ control input taken from the rotor speed setting unit 38. The two-phase rotor flux linkage ($\psi_{r\alpha}$ and $\psi_{r\beta}$) and the two-phase stator current ($i_{s\alpha}$, $i_{s\beta}$) synchronized by the synchronization phase $\phi^*_s$ are measured by means of the measuring transducer 150.

The measuring transducer 150 operates as follows.

Six power switches 193, 194, 195, 196, 197, and 198, (FIG. 20) of the power inverter 12 are operated by control pulses as functions of the errors of the assigned and measured instantaneous phase currents $i_{sa}$, $i_{sb}$, $i_{sc}$ measured by the phase current transducers 199, 200 and 201 of the power inverter 12. Constant voltage is supplied to the power inputs 202 and 203 of the power inverter 12 from the power source of the power inverter 12, e.g. storage battery or supply-line voltage rectifier.

Control pulses are supplied successively to three pairs of control inputs 204 and 205, 206 and 207, 208 and 209 from the outputs of three control pulse generating units 13, 14, 15. In consequence, the stator phase windings "A", "B", "C" of the induction motor 1 are successively connected to the power inputs 202 and 203 of the power inverter 12 via inputs 151, 152, 153 and power outputs 154, 155, 156 of the measuring transducer 150.

Succesive modification of duration of energized and deenergized states of the power switches 193, 195, 197 and power switches 194, 196, 198 results in pulse-duration control of instantaneous phase currents measured in phases "a" and "b" by the current measuring circuit 210 of the measuring transducer 150. A signal of the measured instantaneous phase current $i_{sa}$ is produced at the output of the phase current transducer 211, while a signal of the measured instantaneous phase current $I_{sb}$ is produced at the output of the phase current transducer 212.

When the stator windings of the induction motor 1 are arranged in a "star" connection, the stator phase voltages are measured by means of the voltage measuring circuit 213 which is a "double star" arrangement comprising three pairs of resistors 214, 215 (phase "a"), 216, 217 (phase "b"), 218 and 219 (phase "c"). The artificial zero point 220 of the resistor "double star" arrangement is used to measure phase voltages in phases "a" and "b".

Signals of the measured instantaneous phase current $i_{sa}$, $i_{sb}$, which are electrically isolated from the power circuit of the power inverter 12, are produced at the outputs of the decoupling units 221 and 222, while signals of the measured instantaneous phase voltages $U_{sb}$ and $U_{sb}$, which are electrically isolated from the power circuit of the power inverter 12, are produced at the outputs of the decoupling units 223 and 224, respectively.

Joined first outputs of the decoupling units 221, 222, 223, 224 form the zero line 225 of the measuring transducer 150, which is used as a reference for further conversion of the output voltages of the decoupling units 221, 222, 223, and 224.

The inverted error signal $(U_{s\beta} - R_s \cdot i_{s\beta})$ is produced, according to the equations (239) and (237), at the outputs of the first adder 226, an inverted current signal $(-i_{s\beta})$ being produced at the output of the second adder 227 according to the equation (237).

The inverted error signal $(U_{sa} - R_s \cdot i_{sa})$ is produced, according to the equations (238) and (236), at the output of the third adder 228, the inverted current signal $(-i_{sa})$ being produced at the output of the inverting amplifier 229, according to the equation (236), and further fed to the second input of the adder 228.

Two-phase stator flux linkage signals are produced at the outputs of the integrators 230 and 231 in conformity with the following equations:

$$\psi_{sa} = \int_0^{t1} (U_{sa} - R_s \cdot i_{sa}) dt, \quad (258)$$

$$\psi_{s\beta} = \int_0^{t1} (U_{s\beta} - R_s \cdot i_{s\beta}) dt. \quad (259)$$

The equations (258) and (259) are the consequence of the equations (20) and (21) subject to the axis "Y" (FIG. 1) of the Cartesian system of coordinates Y-X being oriented according to the axis $\alpha$ of the stationary Cartesian system of coordinates $\alpha - \beta$ and $\delta_k = 0$, which is valid for measurements according to the above described circuit of the measuring transducer 150 (FIG. 20).

According to the equation (19) the output of the fourth adder 232 is an inverted signal of the measured rotor flux linkage along the axis $\beta$, which is given by the expression (241), while the output of the fifth adder 233 is an inverted signal of the measured rotor flux linkage along the axis $\alpha$, which is given by the expression (240). The inverted signal $-i_{sa}$ is generated by the inverting amplifier 229 of the measuring transducer 150.

The inverted current signal $-i_{s\beta}$ is supplied from the output of the second adder 227 to the first measuring output 157, while the inverted current signal $-i_{sa}$ is supplied from the output of the inverting amplifier 229 to the second measuring output 158 of the measuring transducer 150.

The rotor inverted flux linkage signal $-\psi_{ra}$ is supplied from the output of the fifth adder 233 to the third measuring output 159, while the rotor inverted flux linkage signal $-\psi_{r\beta}$ is supplied thereto from the output of the fourth adder 232.

Inverted signals of the two-phase stator current $-i_{sa}$ and $-i_{s\beta}$ and inverted signals of the two-phase rotor flux linkage $\psi_{ra}$ and $\psi_{r\beta}$ are supplied from the measuring outputs 157 and 158 of the measuring transducer 150 and from the measuring outputs 159 and 160 of the rotor flux linkage two-phase measuring transducer 234 of the transducer 150 to respective measuring inputs 162, 163 and 164, 165 (FIG. 19) of the magnetic field vector controller 185.

In the electric drive having open-loop speed control, shown in FIGS. 19 and 20, the rotor speed of the induction motor 1 is controlled without a speed sensor or any other transducer connected to the induction motor 1. The induction motor 1 can, therefore, be connected to the autonomous electronic package of the electric drive by a triplex power cable coupled to the outputs 154, 155, and 156 (FIGS. 19 and 20) of the measuring transducer 150 which is structurally united with the transvector inverter 2 (FIG. 19) and the magnetic field vector controller 185 to form said electronic package of the electric drive. This offers the advantage of making mechanical parts more reliable, smaller, and cheaper by eliminating transducers connected to the induction motor, providing speed control over a wider range, and ensuring linear and rigorous speed-torque characteristics. The circuitry comprises only two phase current transducers 211 and 312 instead of the former transducers 199, 200, and 201.

The above methods of vector control of an induction or asynchronous motor and electric drives proposed to realize these methods permit interrelated control of dynamic, power, and thermal processes in an induction motor through phase-current control and interrelated modification of the magnitude and space position of the magnetic field depending on the desired induction motor torque by controlling the instantaneous stator current phase. This offers the advantage of faster and more accurate control of the rotor speed and induction motor torque and, simultaneously, reduction of power losses and heating of the induction motor.

The herein disclosed methods of phase-current adaptive control can solve basic technical problems of induction motor control, which had been the obstacle to the full-scale use of induction motor in fast-action and precision drive systems for robots, NC machine tools, flexible production systems. The key advantages offered by these control methods are as follows:

1. Invariant control of the induction motor torque is achieved by controlling the magnitude and angular position of the magnetic flux. The torque of an induction motor can be controlled without inertia in accordance with any required law, including step changes, in conformity with control inputs prescribing the desired induction motor torque over a wide range irrespective of the actual magnitude of the magnetic field. This invariant control of the induction motor torque, employed in closed-loop speed control systems of the above described electric devices, made it possible to cut down the torque adjustment time to 0.0005 seconds, to increase the speed of response of the adjustable-speed electric drive with the bandwidth of the closed-loop rotor speed control of up to 250 Hz (the shaft of the induction motor reaching the desired speed if the phase shift does not exceed 90°).

2. Optimal, in terms of motor energy, control of the stator current and magnetic field is achieved both in steady-state and dynamic conditions of the induction motor. In steady-state conditions, the minimal stator current is provided for a given load moment, as well as the minimal initial excitation current, minimal heating of the stator winding insulation with zero load moment, minimal heating of the stator winding insulation with varying load moment. In dynamic conditions, the maximum induction motor torque is provided with a limited stator current and within the permissible range of temperature of the stator winding insulation, as well as the maximum rotor acceleration with limited stator current.

The energy optimal control realized in the above electric drive by means of adaptive fourzone phase-vector control makes it possible to achieve, as compared to prior art electric drives, at least a two-fold reduction of the initial excitation current, a four-fold decrease of the heating of the stator winding insulation during the initial excitation period, and a two-fold rise of the ratio of the maximum permissible torque of the induction motor to the stator current amplitude. It also permits an increase of the ratio of the torque rate of change to the stator current amplitude rate of change at least to two. The torque of the induction motor can be forced by at least 40% with the stator current amplitude being kept constant. Also, it can be forced to become ten times as high as the nominal induction motor torque, the stator current amplitude being only five times as high as the nominal value. The speed control range can be widened to become at least two times as large as before, counting up from the nominal speed, while the accuracy of speed control remains unaffected.

The herein disclosed electric drive with power optimal control permits minimizing the weight, size, and cost of the electromechanical module (induction motor plus transducers) for servo drives of robots of predetermined load capacity and efficiency and provides the desired accuracy and positioning repeatability.

The herein disclosed electric drive equipped with a temperature adaptation system makes it possible to fully use the induction motor torque, acceleration, and power, while keeping the heating of the stator winding insulation within permissible limits. It can help increase the efficiency of flexible production systems by increasing the frequency of positioning cycles to the maximum to adapt to varying and reprogrammable manufacturing processes.

Control of the disclosed electric drives is optimized in terms of energy ahnd thermal criteria and provides maximum motor torque and mechanical power. It permits at least a two-fold increase in the maximum specific moment of the electromechanical module equipped with an induction motor and a reduction gear. When high-frequency (nominal frequency of 200, 400 Hz) induction motors and high-speed transmissions with a high gear ratio (up to 200–500) are used, the disclosed control method permits at least a two-fold decrease of the weight of the electromechanical module as opposed to electromechanical modules equipped with dc motors. Induction motors can, therefore, be used on a wide scale instead of motors equipped with permanent magnets due to their high economic efficiency in robot technology and automatic manufacturing systems.

3. Maximum dynamic performance and optimal, in terms of the speed of response, operation of the electric drive are achieved while the rotor speed and position are controlled linearly irrespective of the load moment even to the zero speed.

The disclosed speed-adjustable electric drive having a frequency-current control system provides astatic (integral-action) linear control of the rotor speed with an error, at the lowest rotor speed, which is less than the nominal rotor speed by a factor of at least 10,000 and is equal to 0.02–0.04 rpm. The shaft of the induction motor can be kept at a zero speed for lengthy periods of time (holding without brake) while the active load moment varies. In case of a sudden step increment to the nominal load moment, the rotor speed recovery time (settling time) is less than 0.01 sec.

In the disclosed electric drive (asynchronous servo drive), the steady-state positioning error, during point-to-point robot control, amounts to one increment of an incremental (pulse) transducer, which amounts to less than eight seconds of arc for an electromechanical module whose reduction gear ratio is 200.

The dynamic error, during continuous-path or contouring control, is two increments of the incremental (pulse) transducer, which amounts to the output shaft error of an electromechanical module of less than 15 seconds of arc.

The positioning accuracy and high repeatability achieved irrespective of the temperature of the induction motor makes it possible to use the herein disclosed electric drive (asynchronous servo drive) in the most accurate spot welding and assembly robots wherein the economic effect is achieved through lower cost and weight of the electromechanical module combined with improved accuracy and speed of response.

The herein disclosed electric drive having an open-loop speed control system and a vector magnetic field controller without transducers structurally connected to the induction motor is characterized by speed control parameters which are very close to those achieved in the closed-loop speed control electric drives. It permits accurate speed control of devices located in irregular, chemically active media or in confined spaces where transducers connected to the induction motor cannot be employed.

The proposed induction motor control method and an electric drive realizing this method provides for the electric drive control system to be flexible so that the control configuration can be rearranged. It becomes possible to make use of modules to structure different arrangement of electric drives, employing various combinations of operational and structural properties of the proposed set of functional control modules which can be joined into a control processor based on digital-to-analog components, as described above, or on a microprocessor. The foregoing control methods and algorithms can be realized according to the above equations in order to attain desired control qualities and performance of the electric drive equipped with an induction motor.

In this manner, the field of application of the herein disclosed electric drives can be expanded to cover both conventional manufacturing machines and devices and high-precision flexible automation systems equipped with programmable microprocessors.

It is apparent to those skilled in the art that the circuitry of the electric drives realizing the herein disclosed control methods can have other configurations and employ more integrated components.

What is claimed is:

1. A method of induction motor control, wherein interrelated control is provided for the rotor speed, the torque of said induction motor, the amplitude of the rotor flux linkage, and steady-state, dynamic, electromagnetic, power and thermal processes in said induction motor by introducing vector phase-current control involving interrelated changes of the stator current phase and amplitude, the intensity and angular position of the magnetic field, which are defined by the phase and said amplitude of the rotor flux linkage as functions of the desired torque of said induction motor, and, to this end, comprises the steps of assigning a control input proportional to the desired amplitude of the rotor flux linkage; producing a first quadrature component of the desired stator current amplitude defined by the flux-producing component of said stator current amplitude as a function of said desired amplitude of the rotor flux linkage; assigning a second control input whose magnitude is proportional to said desired torque of said induction motor, as a function of the desired rotor speed and the actual magnitude of said rotor speed; producing a second quadrature component of said desired stator current amplitude, which defines the torque-producing component of said stator current amplitude, as a function of said magnitude of said desired torque of said induction motor; controlling, simultaneously with the step of producing the second quadrature component, the stator current synchronous frequency equal to the steady-state frequency of symmetrical instantaneous stator phase currents in steady-state conditions of said induction motor; generating the synchronization frequency defined by said stator current synchronous frequency equal to the sum of two components of said synchronization frequency; changing one component in proportion with said rotor speed; changing second component of said synchronization frequency as a function of the ratio of said desired torque of said induction motor to the square value of said desired amplitude of the rotor flux linkage; effecting phase-after-phase control of said symmetrical instantaneous stator phase currents in the phase windings of said stator of said induction motor, as a function of the difference between the desired and said measured instantaneous stator phase currents; producing said desired stator current amplitude equal to said instantaneous phase current amplitude and said stator current amplitude equal to the quadrature sum of said first and second quadrature components of said desired stator current amplitude; producing said phase of the desired and measured instantaneous phase currents by sweeping said synchronization frequency into a synchronization phase equal to said phase of said rotor flux linkage and the synchronous stator current phase and defined by the instantaneous phase of said instantaneous stator current phase in one of said stator phase windings, which is a reference phase winding of said stator, with the zero value of said desired torque of said induction motor; producing said current phase of said stator, which is defined by said instantaneous phase of the instantaneous stator phase current in said reference phase winding of said stator of said induction motor; changing said stator current phase relative to said synchronous stator current synchronous phase to a value of the stator current phase shift proportional to the inverse tangent function of the ratio of said torque-producing component of the stator current amplitude to said flux-producing component of the stator current amplitude; controlling the stator current amplitude as a function of the desired torque of said induction motor by increasing said desired amplitude of the rotor flux linkage in response to the increase in said torque of said induction motor; and analogously and symmetrically controlling said instantaneous phase currents in other said stator windings.

2. A method as claimed in claim 1, wherein, in order to control said induction motor in the Cartesian coordinates synchronized by said synchronization frequency with said synchronization phase, said synchronization phase is additionally controlled by the further steps of changing said second component of the synchronization frequency, which is defined by the slip of the rotor flux linkage in relation to said rotor of said induction motor, in proportion to the ratio between said torque-producing component of said stator current amplitude and the actual value of said desired amplitude odf the rotor flux linkage; increasing, in response to an increase of said desired torque of said induction motor, said actual value of said desired amplitude of the rotor flux linkage as a function of time according to the aperiodic law; changing said flux-producing component of the stator current amplitude, which is equal to the first quadrature component of said desired stator current amplitude, as a function of the steady-state value of said amplitude of the rotor flux linkage, said ratio being prescribed by the magnetization characteristic of said induction motor; and changing said torque-producing component of the stator current amplitude, which is equal to said second quadrature component of the desired stator current amplitude, in proportion to the ratio of said desired torque of said induction motor to said actual value of said desired amplitude of the rotor flux linkage.

3. A method as claimed in claim 2, wherein the magnitude and direction of said stator current phase shift in relation to said synchronous stator current synchronous phase equal to said synchronization phase are controlled by the steps of generating said instantaneous stator phase current in said reference phase winding of said stator so that it is equal to the difference between two periodic currents; generating one current, which is co-phasal current, by synchronizing the rate of change of said flux-producing component of the stator current amplitude according to the cosine law as a function of said synchronization phase; generating the second current, which is ortho-phasal current, by synchronizing the control process with said synchronization frequency of said torque-producing component of the stator current amplitude according to the sine law as a function of said synchronization phase; shifting, in case of an instantaneous increment of said desired torque of said induction motor, the stator current phase by a step in a respective direction in relation to said synchronization phase by means of a step change in the magnitude and direction of said ortho-phasal current; continuously shifting, in case of a change in said actual desired amplitude of the rotor flux linkage, said stator current phase by changing said co-phasal current; and shifting said actual desired amplitude of the rotor flux linkage as a function of said flux-producing component of the stator current amplitude in accordance with the aperiodic law with a time constant equal to the electromagnetic constant of said rotor.

4. A method as claimed in claim 3, further comprising shifting said instantaneous phase of said instantaneous stator phase current in said reference stator phase winding in relation to the stator current synchronous phase to a constant value of said current phase shift to reach the quantity $\pm \pi/4$; changing, uniformly and simultaneously, said torque-producing and flux-producing components of the stator current amplitude as a functions of said desired torque of said induction motor generating, in case of a momentary increment of said desired torque of said induction motor, said instantaneous stator current amplitude in proportion to said torque-producing and flux-producing components of the stator current amplitude in accordance with the law $$i_s = \sqrt{2} \cdot \frac{\sqrt{\frac{2L_r}{3Z_p}}}{L_m} \cdot \frac{M^*}{\sqrt{M_o^* + (M^* - M_o^*)(1 - e^{-\frac{2t}{T_r}})}},$$

where
- $i_s$—said instantaneous amplitude of the stator phase current;
- e—natural number or positive integer;
- t—actual time of the transient process;
- $L_r$—rotor inductance;
- $Z_p$—number of pole pairs of the induction motor;
- $L_m$—mutual inductance;
- $M^*$—said desired torque of the induction motor;
- $M^*_o$—initial desired torque of the induction motor;
- $T_r = L_r/R_r$—said electromagnetic time constant of said rotor;
- $R_r$—rotor resistance, while said second component ($\Delta\omega$) of the stator current frequency, which corresponds to said slip of the rotor flux linkage and is equal to the slip of said stator current, is controlled according to the law $$\Delta\omega = \frac{R_r}{L_r} \cdot \frac{M^*}{\sqrt{M_o^* + (M^* - M_o^*)(1 - e^{-\frac{2t}{T_r}})}}.$$

5. A method as claimed in claim 4, further comprising changing said stator current phase shift in relation to said stator current synchronous phase and said synchronization phase are as functions of the boundary values of the maximum stator current and voltage amplitudes, said desired boundary torque of said induction motor, the measured rotor speed, and the desired duration of the torque forcing of said induction motor; controlling the level of saturation of the magnetic core of said induction motor as a function of said boundary values by means of multi-zone phase-vector control of said induction motor, which comprises the steps of changing, in each control zone, the laws of interrelated control of said ortho-phasal and co-phasal currents, and, specifically, in the first phase-current control zone, when said desired torque and the measured rotor speed are less than their boundary values of the desired torque and measured speed, reducing by at least one half the values of said desired amplitude of the rotor flux linkage, said flux-producing component of the stator current amplitude, and said co-phasal current in relation to respective values in the nominal steady-state operational condition of said induction motor; exciting an initial magnetic field in said induction motor with said constant amplitude of the rotor flux linkage, whose magnitude is proportional to the amplitude of said co-phasal current, as a function of said boundary value of said maximum stator current amplitude and of the initial value of said desired torque of the induction motor; changing said stator current phase shift in relation to said synchronization phase and said stator current synchronous phase in response to a change in said desired torque of the induction motor by changing said amplitude of said ortho-phasal current in proportion to said desired torque of the induction motor, while said instantaneous phase current in said reference stator phase winding of the induction motor is controlled according to the law $$i_{sa}(t) = K_1\psi_{ro}^*\cos\int_o^t(\omega + K_2M^*)dt - K_3M^*\sin\int_o^t(\omega + K_2M^*)dt,$$

where
- $i_{sa}(t)$—instantaneous phase current in said reference phase winding of the stator;
- $M^*$—said desired torque of the induction motor;
- $K_1, K_2, K_3$—constant coneffficients dictated by the parameters of the induction motor;
- $\psi^*_{ro} \leq 0.5\psi_{rn}$—initial amplitude of said rotor flux linkage;
- $\psi_{rn}$—nominal amplitude of said rotor flux linkage;
- $\omega$—said speed of said rotor, and, in the second zone of said phase-current control, when said desired torque of the induction motor exceeds said boundary value of said desired torque and when said measured rotor speed; is less than said boundary value of the measured rotor speed, generating said constant stator current phase shift $\epsilon\phi = \pm\pi/4$ in relation to said synchronization phase and said synchronous phase of the stator current by changing, uniformly and simultaneously, said amplitudes of said ortho-phasal and co-phasal currents as functions of said desired torque of said induction motor and by simultaneously changing, according to the aperiodic law, said desired amplitude of the rotor flux linkage as a function of said co-phasal current amplitude corresponding to the magnetization characteristic of said induction motor, and, in said third zone of said phase-current control, when said measured rotor speed exceeds said boundary value of said measured rotor speed; increasing the absolute value of said stator current phase shift $|\epsilon_g| > (\pi/4)$ in relation to said stator current synchronous phase in response to the growth of said rotor speed by decreasing said co-phasal current amplitude depending on said boundary value of said maximum stator voltage amplitude and said rotor speed.

6. A method as claimed in claim 5, further comprising the steps of generating said maximum torque of said induction motor, during the momentary period of the maximum torque forcing and during acceleration for a forcing period shorter than said electromagnetic time constant of the rotor; making a step change in said stator current phase to the phase angle $\pm\pi/2$ in relation to said synchronous phase of the stator current by disconnecting said co-phasal current; disconnecting said co-phasal current for the desired period of forcing the torque of said inductoion motor; abruptly increasing said ortho-phasal current to a value which is not more than said maximum stator current amplitude; forcing said torque of the induction motor in said zone of phase-current control, to exceed said torque of the induction motor in the period prior to forcing by a factor of at least 1.4; maintaining said stator current amplitude constant as during the forcing period, when it is equal to the stator current amplitude prior to forcing, even after said co-phasal current is disconnected by increasing said ortho-phasal current by a quantity less than the disconnected co-phasal current by a factor of approximately 2.

* * * * *